US005517671A

United States Patent [19]

Parks et al.

[11] Patent Number: 5,517,671

[45] Date of Patent: May 14, 1996

[54] SYSTEM FOR DESIGNATING A PLURALITY OF I/O DEVICES TO A PLURALITY OF I/O CHANNELS AND CONNECTING AND BUFFERING THE PLURALITY OF I/O CHANNELS TO A SINGLE SYSTEM BUS

[75] Inventors: Terry J. Parks, Round Rock; Darius D. Gaskins, Austin, both of Tex.

[73] Assignee: Dell USA, L.P., Austin, Tex.

[21] Appl. No.: 100,714

[22] Filed: Jul. 30, 1993

[51] Int. Cl.[6] ..................... G06F 13/00; G06F 13/14; G06F 13/20

[52] U.S. Cl. .................... 395/860; 395/823; 395/200.01; 395/427; 364/239; 364/242.6; 364/242.92; 364/243.41

[58] Field of Search ..................... 395/275, 725, 395/325, 821, 823, 200.01, 427, 860, 287

[56] References Cited

U.S. PATENT DOCUMENTS

| | | | |
|---|---|---|---|
| 4,754,433 | 6/1988 | Chin et al. | 365/189 |
| 4,835,346 | 5/1989 | Setton et al. | 178/17.5 |
| 4,953,180 | 8/1990 | Fieschi et al. | 375/7 |
| 5,045,997 | 9/1991 | Watanabe | 364/200 |
| 5,179,667 | 1/1993 | Iyer | 395/275 |
| 5,193,193 | 3/1993 | Iyer | 395/725 |
| 5,195,185 | 3/1993 | Marenin | 395/325 |
| 5,396,602 | 3/1995 | Amini et al. | 395/325 |
| 5,418,967 | 5/1995 | Simcoe et al. | 395/725 |

*Primary Examiner*—Thomas C. Lee
*Assistant Examiner*—Rehana P. Krick
*Attorney, Agent, or Firm*—Henry Garrana; Michelle Turner

[57] ABSTRACT

A system for connecting a plurality of input/output (I/O) channels to a single computer system bus. A system controller establishes priority among the I/O channels competing for access to the system bus. A plurality of I/O channel bridges are connected to the system bus and interface with EISA channels. The I/O bridges receive data from the EISA channels at one data rate and transmit the data to the system bus at another data rate. Data is stored within the I/O bridges in a cache memory device until commanded to transmit the data to the system bus by the system controller.

7 Claims, 3 Drawing Sheets

SYSTEM FOR DESIGNATING A PLURALITY OF I/O DEVICES TO A PLURALITY OF I/O CHANNELS AND CONNECTING AND BUFFERING THE PLURALITY OF I/O CHANNELS TO A SINGLE SYSTEM BUS

CROSS REFERENCE TO RELATED APPLICATIONS

This application is related to the following U.S. patent applications:

| Ser. No. | Title | Inventors |
|---|---|---|
| 08/093,841 now pending | System and Method for Memory Mapping | Terry J. Parks and Darius D. Gaskins |
| 08/096,588 now pending | Combined Multiplexer Interrupt Controller and Interprocessor Communication Mechanism | Terry J. Parks and Darius D. Gaskins |

All of the related applications are assigned to the assignee of the present invention, and are hereby incorporated herein in their entirety by this reference thereto.

REFERENCE TO AN APPENDIX

This application has an appendix. The appendix comprises the following documents:

Preliminary Chimaera Architectural Specification, Version 0.20, dated Feb. 16, 1993

Hydra Dell P/N 24002 Specification, Version 1.85, dated Apr. 14, 1992

Bifrost Specification, Version 1.2, dated May 8, 1992

Lethe Bus VHDL Model, dated Apr. 8, 1992

Bifrost-A VHDL Gorp, dated Apr. 17, 1992

Bifrost Hierarchy, Version 1.1, dated Apr. 20, 1992

Fifty (50) circuit diagrams depicting various portions of an actually designed embodiment of the present invention

BACKGROUND OF THE INVENTION

1. Field of the Invention

This invention relates to input/output (I/O) channels for computer systems and, more particularly, to a method and apparatus for connecting two I/O channels to a single computer system bus.

2. History of the Prior Art

Computer systems have historically been limited by the capacity or data transfer rate of their input/output systems. The ability of computers to accept and utilize data has always been greater than the rate at which data could be input or output. For example, long after computational speeds were far greater than the physical speed at which "IBM" cards could be fed through a card reader and read, those cards and their data-carrying holes were still the industry standard for data input. Today, computer system busses in personal computers can move data around at about 267 MBytes/sec, (hereinafter 267 MBytes/sec) while the industry standard EISA I/O channel, which connects data-inputting peripherals to the computer system bus, operates at only about 33 MBytes/sec (hereinafter, 33 MBytes/sec).

In current systems the EISA I/O channel and the system bus are connected onto one bus while EISA transfers are occurring. In such I/O-bound systems, this can cause dramatic performance degradation. Connecting the 267 MBytes/sec system bus to the 33 MBytes/sec EISA I/O channel wastes over 87% of the system bus bandwidth.

There is a need for systems which are capable of inputting data at a greater rate in order to more efficiently utilize the computational capacity of modern computer systems. If more than one EISA I/O channel could be attached to the system bus, the input rate could be increased, but until now, there has been no method or apparatus to control such multiple EISA channels and determine priorities between competing input signals.

Based upon the foregoing, it should be understood and appreciated that prior art systems in which a single EISA I/O channel and a system bus are connected onto one bus while EISA transfers are occurring are grossly inefficient. This is a major problem of the prior art. It should also be understood and appreciated that any efforts to solve that major problem by attaching more than one EISA I/O channel to the system bus immediately raise complex control issues. It is another problem of the prior art that a satisfactory solution to those complex control issues has not yet been provided.

SUMMARY OF THE INVENTION

A broad object of the present invention is to provide a system and method for enhancing the I/O capability of computer systems.

Another object of the present invention is to provide a scheme for efficiently connecting more than one EISA I/O channel to a system bus.

Yet another object of the present invention is to provide a scheme for establishing priorities among multiple I/O channels connected to a computer system bus.

Still another object of the present invention is to provide a system and method whereby I/O data can be received from an I/O channel at a first, relatively slow rate, and subsequently transmitted onto a system bus at a second, relatively fast, rate.

According to the teachings of the present invention EISA data is stored in an I/O cache in an EISA I/O channel bridge until it can be transferred at the full 267 MBytes/sec rate of the system bus. A system controller establishes priority among competing I/O channels and controls the transmission of data on and off the system bus. The present invention thereby provides a system to connect and control multiple EISA I/O channels to a computer system bus.

In one aspect, the present invention is a system for connecting a plurality of input/output (I/O) channels to a single computer system bus. The system comprises a system controller which is connected to the computer system bus for establishing priority among I/O channels competing for access to the computer system bus. A plurality of I/O channel bridges receive control, address, and data signals from the I/O channels at a first data rate, and transmit these signals to the computer system bus at a second data rate. The I/O bridges include a cache memory device for storing the control, address, and data signals until allowed to transmit the signals to the computer system bus by the system controller.

In another aspect, the present invention is a method of connecting a plurality of I/O channels to a single computer system bus. First, a system controller and a plurality of I/O channel bridges are connected to the computer system bus. The system controller is used to establish priority among the plurality of I/O channels competing for access to the computer system bus. The I/O channel bridges are used to receive control, address, and data signals from the plurality of I/O channels at a first data rate. Next, the control, address, and data signals are stored within the I/O channel bridges. Finally, the stored control, address, and data signals are transmitted from the I/O channel bridges to the computer system bus at a second data rate when allowed to transmit by the system controller.

Based upon the foregoing, it should be understood and appreciated that the system and method of the present invention offers a number of advantages over prior art systems and methods. With respect to computer systems broadly, one advantage of the present invention is the fact that it allows more efficient use of the computational capacity of modern computer systems. Another advantage is the fact that it substantially improves computer system performance, especially when incorporated into a computer system with a large I/O bandwidth. Yet other advantages of the present invention are its simplicity (e.g., use of multiple I/O channels as opposed to more complex schemes) and its effectiveness (e.g., the fact that it offers complete control).

BRIEF DESCRIPTION OF THE DRAWINGS

For more complete understanding of the present invention, and for further objects and advantages thereof, reference may now be made to the following detailed description of the invention, taken in conjunction with the accompanying drawings wherein.

DETAILED DESCRIPTION OF THE INVENTION

Figure 1:
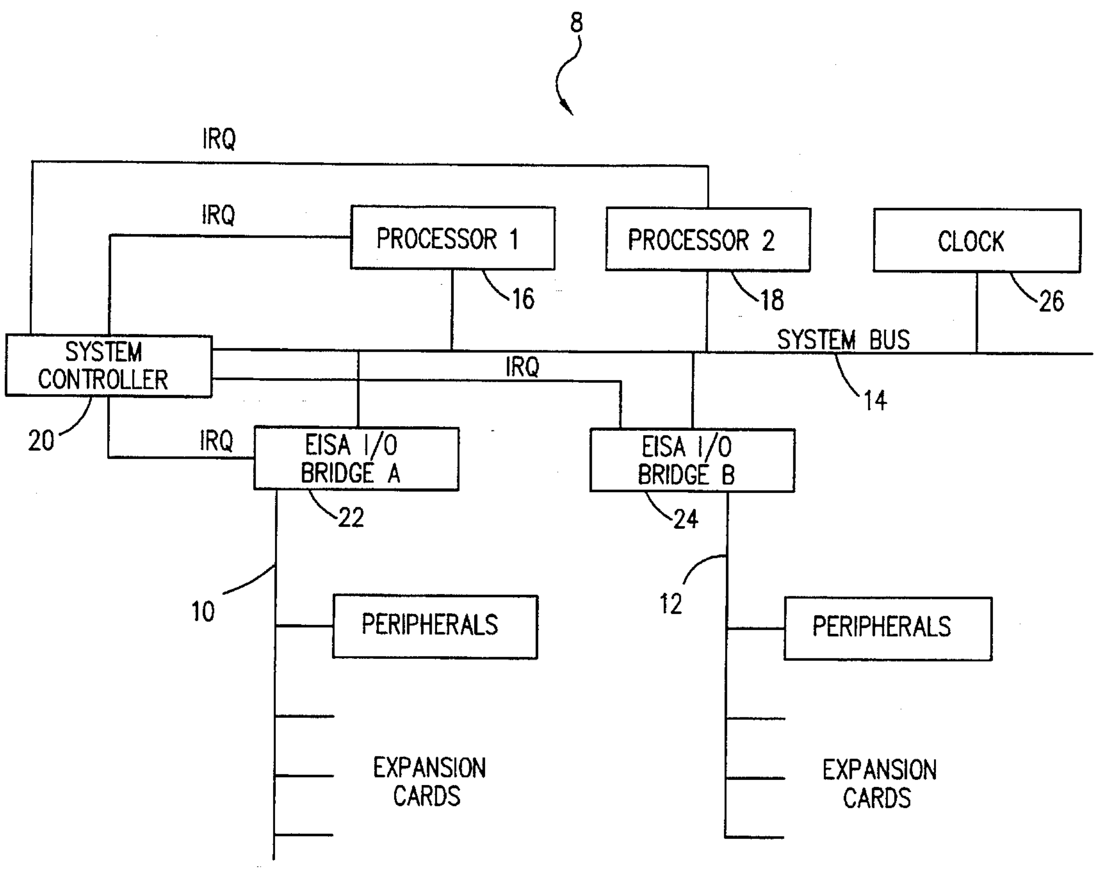
FIG. 1 is a high level block diagram of a personal computer system which includes an apparatus for connecting two EISA I/O channels to a system bus according to the teachings of the present invention.

Referring now to the drawings wherein like or similar elements are designated with identical reference numerals throughout the several views and, more particularly, to FIG. 1, there is shown a block diagram of a personal computer architecture 8 which includes an apparatus for connecting two EISA I/O channels 10, 12 to a system bus 14 in one embodiment of the system of the present invention. One or more processors 16, 18 may also be connected to the system bus 14. An overall system controller 20 controls the prioritization and input of data from the two EISA I/O channels 10, 12.

Data from each EISA I/O channel 10, 12 must pass through an I/O bridge 22, 24. The I/O bridges 22, 24 are subsystems which perform the functions of providing front-end interfaces directly to the system bus 14; providing back-end interfaces directly to the EISA I/O channels 10, 12; decoupling the EISA I/O channels 10, 12 from the system bus 14; and storing EISA I/O channel data in a cache memory until a burst of data can be sent onto the system bus. On a more detailed level, each bridge may comprise an application specific integrated circuit ("ASIC") to handle address and control transfer, and two ASIC's to handle data transfer. The former element could be connected to the latter two elements by an internal bridge interface bus and it could provide virtually all of the functionality needed by them.

The system bus 14 includes a 64-bit data bus and a 32-bit address bus. A system bus clock 26 operates at a frequency of 33⅓ Mhz. The system bus 14 supports all communications between processors, memories, and I/O channels in the computer system.

The main processor used in the preferred embodiment is, for example, a 66⅔ Mhz Pentium microprocessor from Intel Corporation. Other processors may also be used. For instance, higher speed processors may be used if supported with synchronizers in the system controller 20. Likewise, slower speed i486 processors may also be used if supported with synchronizers in the system controller 20. Alternatively, 50 Mhz i486 processors may be run synchronously with only mild performance degradation.

The system 8 of the present invention is optimized for uniprocessor performance, but provides good support for multiprocessor performance due to the following design characteristics:

(1) The system bus 14 runs at approximately 267 MBytes/second, thereby providing sufficient bandwidth to run two Pentium microprocessors;

(2) The computer system 8 is designed to work with six nodes (i.e., device connection points) on the system bus; combinations of the following devices may be connected at the six nodes:

(a) Memory controllers (1 or 2);

(b) EISA I/O channel bridges (1 to 4);

(c) Processor cards (1 to 4); and (d) Other masters/slaves;

(3) The system controller 20, together with an EISA bridge (e.g., bridge 22 or 24), acts as a multiprocessor interrupt controller (MIC) to coordinate and arbitrate interrupts on the system bus 14; and (4) Interprocessor communications (IPC) messages are generated and transmitted over the system bus 14 between processors and other devices.

Further details regarding the structure and operation of the computer system 8 may be found in the appendix.

Within embodiments of the present invention, the system controller 20 integrates all of the unique functions of the system and acts as a central arbiter between devices competing for system access. Possible functions of the system controller 20 in an embodiment of the present invention include system bus arbitration; implementation of interprocessor communications (IPC) messages; multiprocessor interrupt control (MIC), including programmable periodic interruption of each processor in the system; and floating point error interrupt support. Other possible functions of the system controller are error handling and reporting; communicating as a diagnostics controller port with a dedicated diagnostics processor; providing support for Halt, Shutdown, and Flush cycles; and providing cycle control for all system chipset register reads and writes.

Further details about the system controller 20 are set forth hereinbelow. Additionally, a complete description of an actually designed system controller 20 may be found in the "Hydra Dell P/N 24002 Specification" in the appendix.

The system controller 20 enables the input of data to the system bus 14 through the use of interrupts. In a preferred embodiment of the present invention, there are two methods of generating interrupts. One method offers optimum performance, and the other offers optimum compatibility for DOS. The interrupt mode is selected by programming an INTMODE bit in a CONFIG system configuration register.

When operating in the optimum performance mode, the system 8 may operate in either a parallel or a serial mode. In either mode, the system controller 20 passes an interrupt from a programmable interrupt controller (e.g., an Intel 8259) to one of the I/O bridges 22, 24. The I/O bridge then uses the IPC interrupt request protocol. In addition to higher performance, the optimum performance mode also provides increased functionality by allowing intelligent interrupt redirection.

The parallel mode allows interrupts from both I/O channels to be processed by the system controller 20 concurrently. Serial mode forces the system controller 20 to process one interrupt at a time. For example, if both I/O channels request an interrupt, one interrupt is held while the other interrupt is serviced. The held interrupt remains on hold until the service routine for the serviced interrupt signals through an IPC message that the held interrupt may be serviced. When running in this optimum performance serial mode, it is required that all I/O interrupt service routines signal with the IPC message that enables the next interrupt.

With special reference to I/O channel 10 (or I/O channel "A") and associated I/O channel A bridge 22, the following is the sequence of events carried out during the optimum performance parallel mode:

1. An interrupt request is transmitted from a programmable interrupt controller to the system controller 20.

2. If the system controller 20 has completed processing the previous interrupt from I/O channel A 10, the system controller 20 activates an interrupt to the I/O channel A bridge 22. In parallel mode, the previous interrupt is considered to be completed when the CPU issues a second interrupt acknowledge to the interrupt from I/O channel A.

3. When the I/O channel A bridge 22 recognizes an interrupt request, it flushes its store queue, and then generates an interrupt acknowledge to read the vector from the programmable interrupt controller.

4. The I/O channel A bridge 22 then translates the vector from the programmable interrupt controller into a processor number and processor vector by performing a table lookup.

5. The processor number and vector is then packaged into an interprocessor communications (IPC) message.

6. The I/O channel A bridge 22 arbitrates for the system bus 14 and writes this IPC message to the system controller 20.

7. The system controller 20 decodes the IPC and interrupts the appropriate processor 16 or 18.

8. When the interrupted processor 16 or 18 responds with its second interrupt acknowledgment, the system controller 20 provides the vector specified for that processor in the IPC message, and is ready to process the next interrupt from I/O channel A.

Also with special reference to I/O channel A 10 and associated I/O channel A bridge 22, the following is the sequence of events carried out during the optimum performance serial mode:

1. An interrupt request runs from the programmable interrupt controller into the system controller 20.

2. If the system controller 20 has completed processing the previous interrupt, the system controller 20 activates an interrupt to I/O channel A bridge 22. In serial mode, the previous interrupt is considered completed when the interrupt service routine from the last interrupt serviced issues an end-of-interrupt IPC message. Note that in this mode only one interrupt from either I/O channel is allowed to be active at any one time.

3. When I/O channel A bridge 22 recognizes an interrupt request, it flushes its store queue and then generates the interrupt acknowledge to read the vector from the programmable interrupt controller.

4. The I/O channel A bridge 22 then translates the vector from the programmable interrupt controller into a processor number and processor vector by performing a table lookup.

5. The processor number and vector is then processed into an interprocessor communication (IPC) message.

6. The I/O channel A bridge 22 arbitrates for the system bus 14 and writes this IPC message to the system controller 20.

7. The system controller 22 decodes the IPC message and interrupts the appropriate processor 16 or 18.

8. When the interrupted processor 16 or 18 responds with its second interrupt acknowledge, the system controller 20 provides the vector specified for that processor in the IPC message.

9. When the processor generates the end-of-interrupt IPC, the system controller 20 has completed processing the interrupts.

The optimum performance mode creates a window between the time that the I/O channel bridge acknowledges the interrupt from the ISP and the processor acknowledges the interrupt from the system controller 20. This window is not strictly DOS compatible and, therefore, under some circumstances the system may need to operate in the optimum compatibility mode. In the optimum compatibility mode, the system controller 20 passes interrupts directly from the ISP to the CPU. The CPU then deals directly with the primary ISP to handle the interrupt.

It should be noted that a system running in the full DOS compatibility mode will support only one processor. However, in an alternative embodiment, a boot processor runs DOS while the remaining processors run another operating system. The system controller 20 does not support two I/O channels when running in a uniprocessor, fully DOS-compatible mode.

The system controller 20 may also function as a multiprocessing interrupt controller (MIC) which allows specific vectored interrupts to be routed to an arbitrary processor. The implementation scheme requires the cooperation of the EISA I/O bridges 22 and 24 and the system controller 20. Further details are provided in the related application DC-00228, which has been incorporated by reference herein.

The system bus 14 is equipped with a fully programmable system clock 26 which generates periodic interrupts and controls the various system time-outs. The system clock 26 is divided by a 13-bit value in a timer divisor register (TDR) to generate an intermediate clock signal. The intermediate clock also drives a second counter/divider stage which is used to generate the periodic interrupts. The divisor for this stage is set in a timer period register (TIP). To generate skewed periodic interrupts to each of the processors, interrupt timer count registers (TIC) are set to different values in the range of zero up to the value set in the TIP. These four-count compare registers generate their interrupt when the count in the timer matches the count in the register. Default values for all of these registers assume a 33-Mhz system bus clock and provide skewed 60 Hz processor interrupts. The second counter stage contains an 8-bit value which is available to the processors in the interrupt timer count register (TIC). This can be used for timing operations requiring finer granularity than is provided through the periodic interrupts.

The system controller 20 may also function as a diagnostics controller port. In order to provide for base systems diagnosis and system monitoring functions, the system controller 20 has an 8-bit I/O port that provides a gateway between system processors and an external diagnostics processor. The diagnostics processor can provide system monitoring functions such as power warning, thermal warning, fan rotation monitoring, air filter monitoring, uninterruptable power supply (UPS) interface, diagnostic panel interface, and remote and local diagnostics control.

The system controller 20 provides interrupt vectors to processors on interrupt acknowledge cycles which must be on the low byte of the data bus. There are six index registers, one for each processor, and one for each of the two possible I/O channels. The index registers always increment by words. Individual bytes are accessed via the appropriate enables.

Since the system controller 20 is designed for a multiprocessor system, there are certain registers that are duplicated for each processor. In order to provide quick access to these registers without the requirement that a processor know its identity, the processor specific registers are multiplexed together via bus grant bits.

As noted above, the computer system is designed to work with six nodes on the system bus. The six system nodes may be masters, slaves, or both and some of these nodes may contain cache memory devices. As a result, data stored in main memory is not always valid. Correct data may reside in a system node's cache. Memory coherency is maintained by maintaining cache line state information in each node's cache.

Cache lines may exist in any of four states: Modified, Exclusive, Shared, or Invalid (MESI). The system bus orchestrates the system-based transitions of these states by following what is known as a MESI protocol. In this protocol, when a cache line is in the modified state, the line is valid, and the line is not valid in any other cache or system memory. When a cache line is in the exclusive state, the line is valid; it does not exist in any other cache, but is available in system memory. When a cache line is in the shared state, the line is valid, and it exists in at least one other cache as well as in system memory. When a cache line is in the invalid state, the line is not valid, and it may or may not be valid elsewhere.

Figure 2:
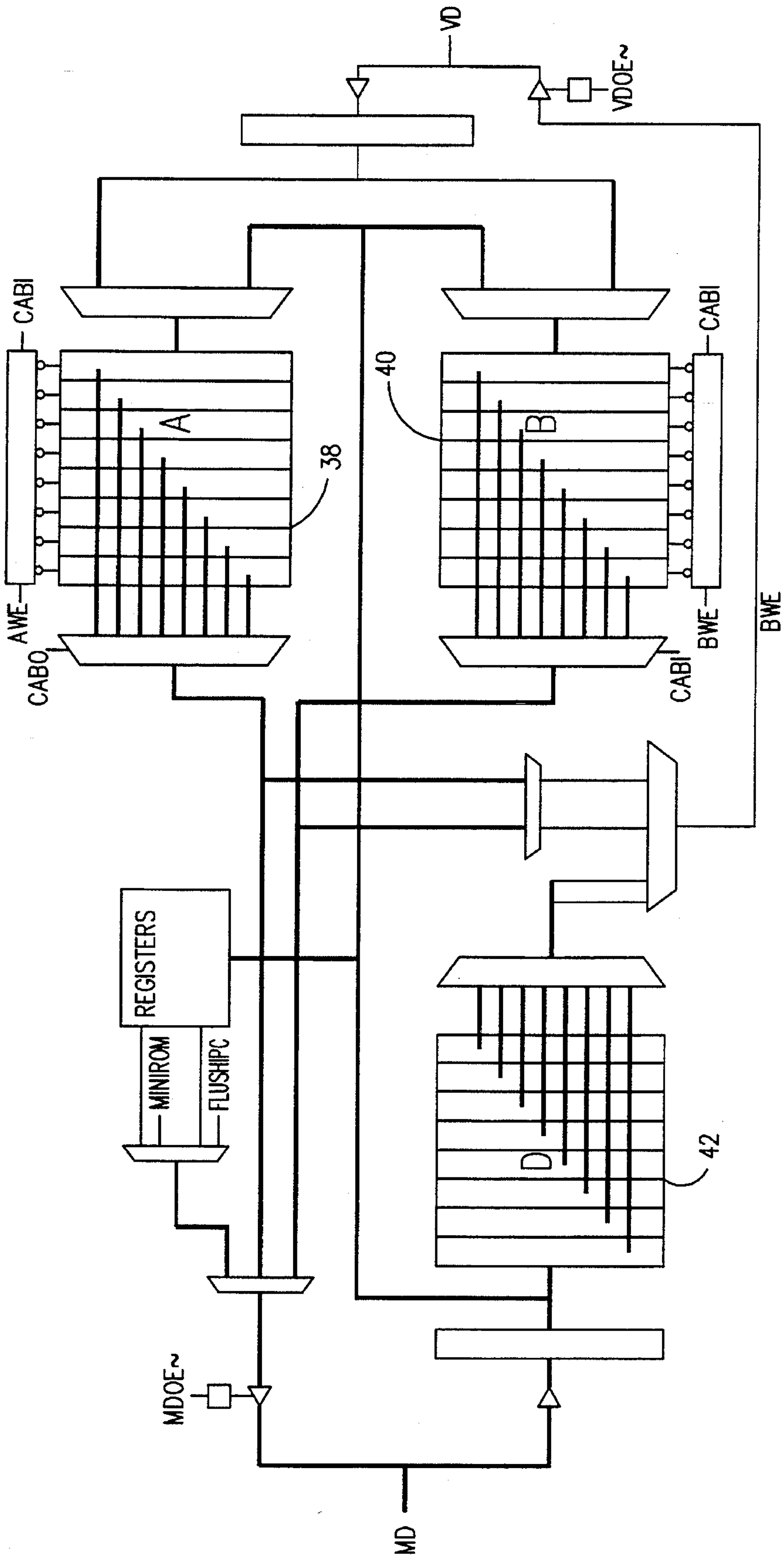
FIG. 2 is a block diagram showing the data flow in one embodiment of an EISA I/O bridge constructed in accordance with the teachings of the present invention.
Figure 3:
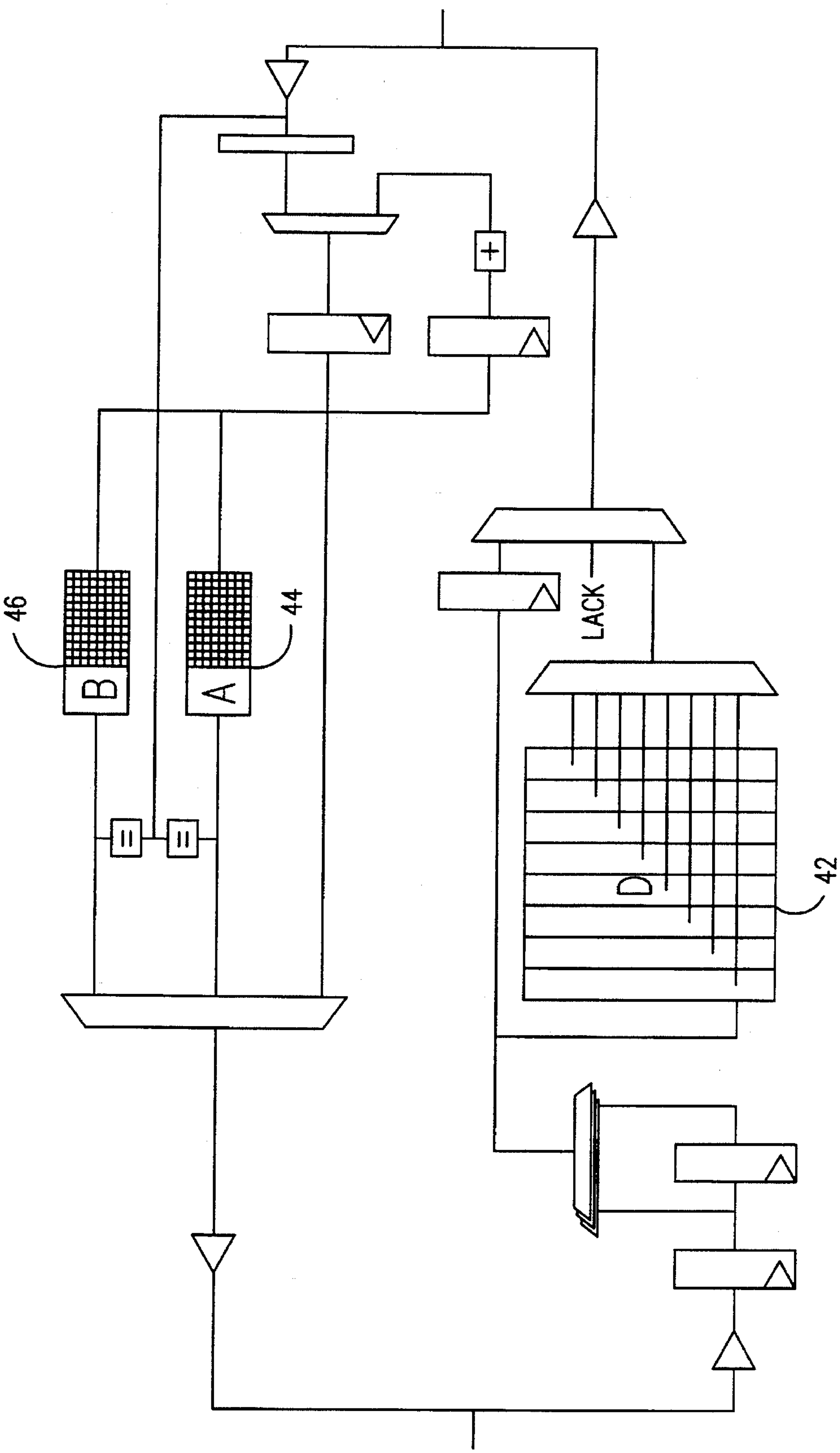
FIG. 3 is a block diagram showing the address flow in one embodiment of an EISA I/O bridge constructed in accordance with the teachings of the present invention.

Referring now to FIGS. 2 and 3 there are shown block diagrams depicting the dataflow and the address flow, respectively, in one embodiment of an EISA input/output (I/O) bridge 22, 24 constructed in accordance with the teachings of the present invention. The EISA I/O bridge provides an EISA interface offering substantially improved performance for systems with large I/O bandwidths. The EISA interface provides a normal/slave interface for programmed I/O. A store queue for stores to EISA is programmably enabled or disabled with fine granularity.

Each I/O channel bridge contains a cache memory device which stores data which are being accessed by direct memory access (DMA) channels, ISA channels, and EISA masters on the I/O channel. This cache is write-through and supports the MESI cache coherency protocol. The I/O cache also allows the decoupling of the system bus 14 and the EISA I/O channel 10, 12.

Referring now specifically to FIG. 2, which shows the dataflow within a bridge 22 or 24, it may be seen that there are two bi-directional cache line length buffers 38, 40 and a store queue 42. The store queue 42 is allocated exclusively as an intermediate repository for system stores to the I/O channel. The buffers 38, 40 are allocated as an intermediate repository for I/O channel data for I/O channel mastered cycles or for system to I/O reads. Reads and writes between the system bus and the I/O channel may be accomplished by conventional means.

Referring now specifically to FIG. 3, which shows the address flow in a bridge 22 or 24, it may be seen that at a high level, each element on the "data side" has an analog on the "address side". Buffers 44, 46 and store queue 48 represent the address of the data which resides in the buffers 38, 40 (depicted in FIG. 2). The remainder of the elements depicted in FIG. 3 enable the overall bridge 22 or 24 to pipeline system cycles, to implement try again later (TAL) cycles, and to prefetch I/O channel transfers.

When a DMA channel, an ISA channel, or an EISA master is performing reads, its cache line is fetched into the EISA cache memory. Further operations on that cache line occur within the EISA cache. Thus, the system bus 14 is not tied up with slower I/O devices. EISA data is prefetched into the cache and stored until it can be burst onto the system bus 14 at the high bus rate of 267 MBytes/second. When performing write instructions, there are effectively two ping-pong buffers 38, 40 into which the writes occur. Whenever a buffer is full it is written to memory with a system bus burst.

Storing EISA data in the I/O cache until it can be transferred at the full 267 MBytes/sec rate of the system bus, provides a system to connect and control multiple EISA I/O channels to a computer system bus, for systems requiring enhanced I/O capability.

The EISA I/O channel bridge system described herein allows the connection of two EISA channels to the system bus. Because of the architecture of the EISA I/O channel, multiple channels cannot be entirely symmetric. This causes certain limitations. First, there is a maximum of fourteen EISA slots available if two channels are used. This is a limit on geographical addressing in EISA and does not apply to memory mapped devices or ISA devices. Second, one of the two EISA busses must be specified as a default bus. All access which are not known to go to another channel or to main memory must go to the default EISA channel. Third, all ISA adaptor cards must go in the default channel. Additionally, EISA channel-to-channel operations which transfer to other channels are not supported.

As previously mentioned, interrupts are handled through a multi-processing interrupt controller (MIC) which allows specific vectored interrupts to be routed to an arbitrary processor. As also previously mentioned, the implementation of this process requires the cooperation of the I/O bridge 22 or 24 and the system controller 20.

As noted above, all ISA I/O access are sent to the default EISA channel. EISA masters on channels other than the default channel have their ISA accesses sent out on the system bus and onto the default channel. EISA or geographically addressed I/O accesses are sent to the appropriate channel. Each channel has a bit mask comprising 16 bits, indicating which geographical addresses it owns. Each channel only responds to addresses in the range indicated in its bit map.

Since the I/O bridge system described herein implements a two bus system, both of which are arbitrated for independently, there is a potential deadlock situation. This occurs when a system bus master is performing a read from the EISA bus and an EISA master is simultaneously performing a read of system storage. The I/O bridge must recognize this occurrence before the end of the cacheability window. System bus cycles are then preempted before the end of the cacheability window. The I/O bridge preempts the system bus master and runs the EISA master cycle.

Although the foregoing description is enough to enable those in the art to practice the present invention, to facilitate such practice there is an appendix hereto in which complete design details of a particular embodiment of the present invention are set forth. For example, on page 12 of the "Bifrost Specification" is a high level diagram of a system 8 showing all major components and how they are interconnected with address, control, and data lines. The only components depicted in that figure that are not discussed in detail herein or in the appendix are components well known to those skilled in the art, such as Intel's 82350 EISA chip set. As those skilled in the art know, the 82350 EISA chip set comprises three basic chips—an 82352 bus buffer (EBB), an 82357 integrated system peripheral (ISP), and an 82358 EISA bus controller (EBC).

The EBC is the bridge between different masters and slaves. It performs all of the cycle translations required to talk to ISA and EISA boards with different data widths. Furthermore, it can tie into either 80386 or 80486 CPUs and control the address and data bus buffers between the host bus and the EISA bus.

One special feature of the EBC is its ability to allow host slaves to stretch the bus clock period. As a result, slower host slaves responding to bus master cycles do not have to add full bus clock (BCLK) wait states, but can stall the master for periods in increments of the host CPU clock.

The ISP, like standard PC chip sets, integrates the commonly required system resources. Those resources include seven 32-bit DMA channels, two 8-channel interrupt controllers, five 16-bit timer/counters, and refresh control and arbitration logic. The buffer chip includes bus buffers for a 32-bit path of the EISA bus.

Based upon the foregoing, those skilled in the art should now understand and appreciate that the present invention provides a system for connecting a plurality of I/O channels to a single computer bus. In embodiments of the present invention, a system controller establishes priority among the I/O channels competing for access to the system bus. A plurality of I/O channel bridges are connected to the system bus and interface with EISA channels. The I/O bridges receive data from the EISA channels at one data rate and transmit the data to the system bus at another data rate. Data is then stored within the I/O bridges in a cache memory device until commanded to transmit the data to the system bus by the system controller.

It is thus believed that the operation and construction of the present invention are apparent from the foregoing description. While the method, apparatus and system shown and described has been characterized as being preferred, it will be readily apparent that various changes and modifications could be made therein without departing from the spirit and scope of the invention as defined in the following claims.

Terry J. Parks
909 Blue Spring Circle
Round Rock, TX 78681

Darius D. Gaskins
7713 Basil Drive
Austin, TX 78750

DELL USA, L.P.

SYSTEM AND METHOD FOR CONNECTING TWO I/O CHANNELS TO A SYSTEM BUS

DC-00229
13644\0524

APPENDIX

TABLE OF CONTENTS

| Document: | Tab Number |
|---|---|
| Preliminary Chimra Architectural Specification, Version 0.20, dated February 16, 1993 | 1 |
| Hydra Dell P/N 24002 Specification, Version 1.85, dated April 14, 1992 | 2 |
| Bifrost Specification, Version 1.2, dated May 8, 1992 | 3 |
| Lethe Bus VHDL Model, date April 8, 1992 | 4 |
| Bifrost-A VHDL Gorp, dated April 17, 1992 | 5 |
| Bifrost Hierarchy, Version 1.1, dated April 20, 1992 | 6 |
| Fifty (50) circuit diagrams depicting various portions of an actually designed embodiment of the present invention | 7 |

Preliminary Chimra Architectural Specification

Version 0.20

Terry J. Parks Darius Gaskins

February 16, 1993

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1993

Contents

1 Introduction 1
1.1 Lethe Bus - the System Bus 1
1.2 Processor Complexes 2
1.3 Multiprocessor support 2
1.4 Memory Controller 3
1.5 EISA Interface 3
1.6 Reliability Features 3
1.7 Chip Set 3

2 Lethe Bus Architecture 7
2.1 General 7
2.2 M.E.S.I. Protocol 8
2.2.1 M.E.S.I. Cache States 8
2.2.2 M.E.S.I. State Transitions 8
2.2.3 Multiprocessing Hooks 8
2.3 Arbitration Protocol 9
2.3.1 Bus Parking 9
2.3.2 Bus Camping 9
2.3.3 Sub–Mastership 9
2.3.4 Read Snarfing 10
2.3.5 Split Transactions 10
2.4 Pipelining Protocol 10
2.4.1 Address Bus Pipelining 11
2.4.2 Data Bus Pipelining 11
2.4.3 Pipelining Examples 12
2.4.4 Write–Back Cycles 12
2.5 Snoop Window 13
2.5.1 Snoop Status 13
2.6 Cacheability Window/ Memory Mapping 13
2.6.1 Cacheability Characterization 13
2.6.2 Cacheability Window 14
2.7 Cycle Types 14

2.7.1 Interrupt Acknowledge . . . . 14
2.7.2 Special Cycles . . . . 14
2.7.3 I/O Reads and Writes . . . . 15
2.7.4 Memory Data/Control Read . . . . 16
2.7.5 Memory Data Write . . . . 16
2.8 Electrical Characteristics . . . . 17
2.8.1 Bus Protocol . . . . 17
2.8.2 Sampling . . . . 18
2.8.3 Sampling Hold . . . . 18
2.8.4 Driver Overlap . . . . 18
2.8.5 Clocking . . . . 18
2.9 Signals . . . . 19
2.9.1 Address and Data . . . . 19
2.9.2 Transfer Control . . . . 19
2.9.3 Arbitration . . . . 19
2.9.4 Boundary Scan Support . . . . 20
2.9.5 Cacheability Support . . . . 20
2.9.6 Snooping Support . . . . 21
2.9.7 Parity Support . . . . 21

3 Multiprocessor Support 23
3.1 Interprocessor Communication . . . . 24
3.1.1 Interrrupt Request . . . . 24
3.1.2 Action Request . . . . 25
3.1.3 Message Transfer . . . . 25
3.2 Multiprocessor Interrupt Controller . . . . 26
3.2.1 Vectored Interrupts . . . . 26
3.3 Periodic Interrupt Generation . . . . 26
3.4 Reset and Power Up Sequencing . . . . 26

4 Compatibility or Lack Thereof 27
4.1 ISA Masters . . . . 27

5 Global Memory Mapping 29
5.1 Attributes . . . . 29
5.2 Distributed Memory Mapping . . . . 30
5.3 Slave Memory Mapping . . . . 30
5.3.1 Static Descriptors . . . . 31
5.3.2 Region Descriptors . . . . 31
5.4 I/O Mapping . . . . 32
5.5 Chimæra Register Mapping . . . . 32
5.5.1 Lethe Geographic I/O Addressing . . . . 32
5.6 I/O Space Address Relocations . . . . 33

6 Software Compatibility 35
6.1 General . . . . . 35
6.2 Compatibility Issues . . . . . 35
6.2.1 Special Cycles . . . . . 35
6.2.2 Lock . . . . . 36
6.2.3 EISA Lock . . . . . 36

7 RATS 37
7.1 General . . . . . 37
7.2 Error Detection & Correction . . . . . 37
7.2.1 Error Detection . . . . . 37
7.3 Error Reporting . . . . . 38
7.4 Error Retry . . . . . 38
7.5 Diagnostics . . . . . 38
7.5.1 Error Reporting Interrupts . . . . . 38
7.5.2 Diagnostic Processor Interface . . . . . 38
7.5.3 JTAG Interface . . . . . 39
7.6 POST . . . . . 39

8 Bifrost – the EISA Bus Bridge 40
8.1 General . . . . . 40
8.2 I/O cache . . . . . 41
8.2.1 Cache Organization . . . . . 41
8.2.2 Cache Coherency Protocol . . . . . 42
8.2.3 Scheduling Write Backs . . . . . 43
8.2.4 Reload Policy . . . . . 43
8.3 Store Queue . . . . . 43
8.3.1 Flushing Events . . . . . 43
8.4 Region Attribute Descriptors . . . . . 43
8.4.1 Memory Descriptors . . . . . 44
8.5 Multiple EISA Channels . . . . . 44
8.5.1 Limitations . . . . . 45
8.5.2 Architecture . . . . . 45
8.6 Lock Handling . . . . . 46
8.7 Deadlock Prevention . . . . . 46
8.8 Address Map . . . . . 47
8.9 Registers . . . . . 48
8.9.1 Control and Enables . . . . . 48
8.9.2 Region Descriptors . . . . . 49
8.9.3 Interrupt Mapping . . . . . 51

9 Bifrost-A – Address Path 53
9.1 Internal Architecture . . . 53
9.1.1 Cache Tags . . . 53
9.2 Signals . . . 56
9.2.1 Lethe Interface . . . 56
9.2.2 Arbitration . . . 56
9.2.3 Cacheability Support . . . 57
9.2.4 Snooping Support . . . 58
9.2.5 Virtual Host Bus Interface . . . 59
9.2.6 EISA and ISA Interface . . . 60
9.2.7 Bifrost-D Interface . . . 60
9.2.8 Boundary Scan Support . . . 60
9.2.9 Miscellaneous . . . 61

10 Bifrost-D – Data Path 63
10.1 General . . . 63
10.2 Internal Architecture . . . 63
10.2.1 Data Path Elements . . . 63
10.2.2 Data Transfer Control . . . 63
10.3 Signals . . . 65
10.3.1 Lethe Interface . . . 65
10.3.2 System Bus Interface . . . 65
10.3.3 Bifrost-A Interface . . . 65
10.3.4 Boundary Scan Support . . . 66

11 Asgard – the Memory Bus Controller 67
11.1 General . . . 67
11.2 CPU Transfer Tracking . . . 68
11.3 Lethe Bus Transfer Tracking . . . 68
11.3.1 Lethe Master . . . 68
11.3.2 Lethe Slave . . . 68
11.4 Asgard Signals . . . 69
11.4.1 Lethe Bus . . . 69
11.4.2 C5/C8 . . . 71
11.4.3 CPU . . . 72
11.4.4 General . . . 72
11.4.5 Boundary Scan Support . . . 72

12 Gryphon – the Memory Controller 73
12.1 General . . . 73
12.2 Memory Architecture . . . 73
12.3 Macro Architecture . . . 74
12.3.1 Address Controller . . . 74
12.3.2 Data Flow Chip . . . 76

12.4 Address Map . . . . . . . . . . 79
12.5 Registers . . . . . . . . . . 79
12.5.1 Region Descriptors . . . . . . . . . . 79
12.6 Signals . . . . . . . . . . 81
12.6.1 GryphonA . . . . . . . . . . 81
12.6.2 GryphonD . . . . . . . . . . 83

13 Hydra – the System Controller 85
13.1 Architecture . . . . . . . . . . 85
13.1.1 Arbitration . . . . . . . . . . 85
13.1.2 Interprocessor Communications . . . . . . . . . . 86
13.1.3 NMI Handling . . . . . . . . . . 86
13.1.4 Multiprocessor Interrupt Controller . . . . . . . . . . 87
13.1.5 Periodic Interrupt . . . . . . . . . . 87
13.1.6 Reset and Power-up Sequencing . . . . . . . . . . 87
13.1.7 Error handling . . . . . . . . . . 87
13.1.8 Microwire Port . . . . . . . . . . 88
13.1.9 JTAG Master Port . . . . . . . . . . 88
13.1.10 Halt and Shutdown Handling . . . . . . . . . . 89
13.2 Address Map . . . . . . . . . . 90
13.3 Registers . . . . . . . . . . 91
13.3.1 Configuration Registers . . . . . . . . . . 91
13.3.2 Interrupt Control . . . . . . . . . . 91
13.3.3 Timer Control . . . . . . . . . . 93
13.3.4 Reset Control . . . . . . . . . . 94
13.3.5 Error Handling and Reporting . . . . . . . . . . 94
13.3.6 JTAG Interface . . . . . . . . . . 94
13.4 Signals . . . . . . . . . . 94
13.4.1 Lethe Interface . . . . . . . . . . 94
13.4.2 Arbitration . . . . . . . . . . 94
13.4.3 Interrupt Control . . . . . . . . . . 95
13.4.4 System Control . . . . . . . . . . 95
13.4.5 Boundary Scan Support . . . . . . . . . . 95

Summary of Amendments

- Version 0.1 - June 27, 1991
  - Created
- Version 0.11 - July 2, 1991
  - Added Asgard chapter
  - Refined Lethe chapter
  - Refined Gryphon chapter
- Version 0.12 - July 8, 1991
  - Added Hydra chapter
- Version 0.13 - July 16, 1991
  - Changed the Bifrost cache to be two way set associative with 32 lines. The lines are no longer associated with specific DMA channels or masters.
  - Changed Lethe pipelining.
- Version 0.14 - July 31, 1991
  - Corrected Gross Errors.
  - Elaborated on Lethe cycle types.
  - Added Split Transaction to Secondary buses.
- Version 0.20 - February 16, 1993
  - Added Index
  - Bifrost cache is now write thru.
  - Cache lines are 64 bytes long only.
  - Removed the internal architecture portions of the Bifrost chapters, this will be moved into the Bifrost VHDL listings.

- Snoops are not perfromed to determin if the EISA ping-pong buffers are dirty. They are still performed to invalidate the ping-pong buffers.
- Elaborated on memory mapping and the register addressing scheme.
- Documented how Hydra handles Halt and Shutdown Cycles.
- Documented how Hydra handles NMIs.

Preface

General Definitions

Naming Conventions

Data Sizes and Values byte 8 bits short or halfword 16 bits word 32 bits long word 64 bits

Bit 0 is the low order bit of any quantity. Byte 0 is the low order byte of any quantity.

Set means to bring a line or bit to a one or high state. Clear means to bring a line or bit to a zero or low state. Assert means to bring a line to its active state. Deassert means to bring a line to its inactive state.

Data values are described using VHDL syntax.

Decimal Decimal numbers are written as normal.

Binary Binary numbers are preceeded with a B and enclosed in single quotes, ie B'101' is 5 in binary.

Octal Octal numbers are preceeded with a O and enclosed in single quotes, ie O'101' is 65 in octal.

Hexadecimal Hex numbers are preceeded with a X and enclosed in single quotes, ie X'101' is 257 in hex.

Signal Polarity

- Negative active signals and bits are written with a TILDE~.

- Positive active signals and bits are written without a TILDE~.
- De–asserted signals are written with an $\overline{\text{OVERBAR}}$.
- Asserted signals are written without an $\overline{\text{OVERBAR}}$.

Suggested Reading

This document describes aspects of the Chimaera architecture which cannot be found elseware. The following documents should be used for reference:

- Intel C5/C8 External Design Specification
- Intel P5 External Design Specification
- Intel Designing a Memory Bus Controller for the C5/C8 Cache
- EISA Specification Version 3.10
- IEEE P1149.1 – Standard Test Access Port and Boundary-Scan Architecture
- Intel 82350DT EISA Chipset Manual

Misc

Revisions to this document are indicated by the bar at the left hand side of this page.

Chapter 1

Introduction

Chimæra - *A fire-breathing monster of divine origin. It was part lion, part goat, and part dragon.*

Chimæra is the architecture of Dell's top-of-the-line i586-based personal computer family. It has the following features:

- Write back cache support.
- 64 bit multi-master system bus with M.E.S.I. cache coherency support.
- EISA Cacheing Bridge- a system bus node which couples the EISA bus to the System bus with high throughput while maintaining memory coherency.
- Multiprocessing- At most four processors.
- ECC memory - up to 1 Gigabyte.

1.1 Lethe Bus - the System Bus

The system bus has the following features:

- 64 bit data and 32 bit address bus.
- $33\frac{1}{3}$ Mhz. bus clock
- Pipelined Address/Data Mastership.
- Data Parity.

- Read Snarfing.
- Write Merging.
- Snoop Filtering.
- Sub-mastership for low write-back latency.
- Bus Locking
- JTAG Boundary Scan.

1.2 Processor Complexes

The main processor complex is a $66\frac{2}{3}$ Mhz P5 with C5/C8 cache controller. The cache controller operates in write-back mode. The cache and line siz:s are TBD.

Other processors can be connected to the Lethe bus with some effort:

- Higher speed P5's can be supported with synchronizers in the system bus controller.
- Slower speed i486's can be supported with synchronizers in the system bus controller. Alternatively, 50MHz. i486's can run synchronously with mild performance degradation.
- A N11 processor card could easily be built (the C5 supports N11).
- An R4000 or an 88110 processor card should be architecturally feasible to support. However, little effort will be expended to accomodate either of these.

1.3 Multiprocessor support

The system is optimized for uniprocessor performance, but support is built in for good multiprocessor performance:

- The system bus and memory controller support multiple masters, write-back caches, and full cache coherency.
- The system bus runs at $266\frac{2}{3}$ MBytes/sec. This will *hopefully* be enough bandwidth to run two P5's.
- The chip set is designed to work with six nodes on the system bus. Potential nodes are:
  1. Memory controller (1 or 2)
  2. EISA bus bridge ($1 \leq N \leq 4$)
  3. Processor cards ($1 \leq N \leq 4$)
  4. Other Masters/Slaves
- Multiprocessor interrupt controller
- Interprocessor communications

1.4 Memory Controller

The Lethe bus may have one or two memory subsystems. At the core of each subsystem is the Gryphon three-chip memory controller. Gryphon is capable of sustaining full memory bandwidth throughout the duration of line bursts. It does so with minimal latency. Latency is minimized by keeping four active pages per subsystem. ECC support is pipelined and handled on 32 bit words.

1.5 EISA Interface

The EISA interface is the most unique portion of the system. It will probably be the major differentiator between Chimæra and competitors' systems. For systems with large I/O bandwidths the performance improvement will be substantial.

The EISA interface will provide a normal slave interface for programmed I/O. There will be a store queue for stores to EISA which can be programmably enabled or disabled with fine granularity.

The bus master interface is quite unique in our marketplace. When an EISA master, an ISA master, or a DMA channel is perfroming reads; the cache line it is operating on is fetched into the EISA cache. Further operations on that cache line occur within the EISA cache, thus the system bus is not tied up with slow I/O devices. EISA bursts get prefetched into the cache so that the cache can keep up with the maximum EISA burst rate. For writes, there are two ping-pong buffers which wries occur into. When a buffer is finished it is written to memory with a Lethe bus burst. It is therefor like a store queue on writes. The EISA cache supports the full MESI cache coherency protocol and performs snarfing to get reasonable performance while bursting dirty lines out of a processors cache[1].

1.6 Reliability Features

All chips in the chip set will support JTAG boundary scan, with as much JTAG controlled self-test as possible. The JTAG bus will be run on the system bus so that processor cards can connect as well. The P5, C5, and C8 already support JTAG. This will allow simple and inexpensive board test and incoming inspection. A follow—on service processor could then provide complete system diagnostics in an enhanced RATS environment.

1.7 Chip Set

The Chimæra system architecture is shown in Figure 1.1. The Dell components are:

- Gryphon- Address and data memory controller chips
- Asgard- MBC for C5 & C8
- Hydra- Arbiter and multiprocessor interrupt controller

[1] This may seem esoteric but the majority if not all burst reads will be dirty in a processors cache, so without snarfing I/O bus utilization will be doubled.

Figure 1.1: Chimæra System

- Bifrost- Address and data EISA / ISA interface chips

Chapter 2

Lethe Bus Architecture

Lethe- *A river in Hades whose waters the dead drink so that they might forget the deeds and actions of their lives.*

2.1 General

The Lethe bus supports all communications between processors, memory, and I/O channels in the Chimæra system. The bus is based upon the following criteria:

- M.E.S.I. Protocol
- 64 Bit Data Bus.
- Eight Transfers per cache line.
- $33\frac{1}{3}$ MHz. Synchronous Transfers.
- Cache Line Transfer Support
- Sub–Cache Line Transfer Support (Write Through Support)
- Data Bus Parity
- Pipelined Bus Mastership with Parking and Centralized Arbitration
- Read–Snarfing
- Write–Merging
- Write–Allocation
- Boundary Scan Support

2.2 M.E.S.I. Protocol

The Lethe bus is a common interconnect for up to six system nodes. System nodes may be masters, slaves, or both. Nodes which cache memory cycles may do so with read and write cycles. As a result, data stored in main memory is not always valid. Correct data may reside in a system node's cache. Memory coherency is maintained by maintaining cache line state information in each cacheing node's cache. Cache lines can exist in any of four states: Modified, Exclusive, Shared, or Invalid. The Lethe bus orchestrates the system based transitions of these states by following what is known as a M.E.S.I. protocol.

2.2.1 M.E.S.I. Cache States

[M] odified: When a cache line is in the modified state, the line is valid, and the line is not valid in any other cache or system memory.

[E] xclusive: When a cache line is in the exclusive state, the line is valid, it does not exist in any other cache, but it is available in system memory.

[S] hared: When a cache line is in the shared state, the line is valid, and it exists in at least one other cache as well as system memory.

[I] nvalid: When a cache line is in the invalid state, the line is not valid, and may or may not be valid elsewhere.

2.2.2 M.E.S.I. State Transitions

2.2.3 Multiprocessing Hooks

The Lethe M.E.S.I. is optimized for uniprocessing, but it includes several features which enhance multiprocessing performance.

Write–Allocation: The Lethe bus supports a special write–allocation cycle. This cycle occurs on a write to an Invalid line in the C5/C8. The write–allocate cycle is a two–part cycle composed of a single transfer write followed by a line–fill.

Other caches allocate cache lines on write with read–for–ownership. Read for ownership differs from our allocation scheme in that the write never occurs on the Lethe bus. The write is merged into the new cache line. As a result, the allocated line is immediately dirty, requiring a subsequent write–back.

Our write–allocation scheme gives us the improved hit rates of write–allocation while keeping the number of modified lines to a minimum.

Bus Pipelining: The address is pipelined before the end of the data transfer. This decreases snoop overhead by letting it overlap the previous cycle's data phase.

Split Transactions: When a processor reads from a secondary bus, the read is 'split' over two Lethe bus masterships. The master indicates his intentions during the first mastership. He is then locked off the Lethe bus until the slave completes the read. Once this is done the master re-arbitrates and completes the read. This eliminates the Lethe 'dead time' during a slow secondary bus read.

2.3 Arbitration Protocol

The Lethe bus can have from two to five masters. These masters arbitrate for the bus through the central arbiter, Hydra. Devices which desire the bus submit MREQ~ [*i*] asserted to the arbiter. When the current device no longer desires the bus the arbiter asserts MGR~ [*i*] to the highest priority requestor. When other masters request the bus they are arb–ed in the later of:

- the clock of the current master's MREQ~ [*i*] de–assertion (or)

- the clock of the new master's MREQ~ [*i*] assertion[1].

2.3.1 Bus Parking

The arbiter supports bus parking[2]. When the parked master asserts MREQ~ [*i*], he is guaranteed immediate access to the bus. See Figure ?? on page ??.

2.3.2 Bus Camping

When a device is camping[3] on the bus, the arbiter may preempt that master by de–asserting MGR~ [*i*]. Once the current cycle is over[4], the master will then be required to re–arbitrate before his next cycle. See Figure ?? on page ??.

2.3.3 Sub–Mastership

Masters can be preempted temporarily if snoop hits occur. For example, when a master requests a line of data, if the data exists in the modified state in another node's cache, the other cache will automatically be granted sub-mastership of the bus.

Sub–mastership implies that the arbiter is uninvolved in the mastership transferral, and that the slave will briefly supply the required data, and immediately relinquish the bus to the previous master. In this particular case the data supplied by the sub-master will be sunk by memory and the original master. This is known as read snarfing.

[1] See Figure ?? on page ??.
[2] When no request is present, the last requesting device retains mastership.
[3] Retains the bus for multiple cycles without de-asserting MREQ~ [*i*].
[4] When the current cycle's last data phase has been initiated

2.3.4 Read Snarfing

Read snarfing occurs in write–back cacheable regions of memory when a processor read or write misses its primary and secondary caches, but the data in question is dirty in another node's cache. When this is the case the other node is granted sub–mastership of the bus. As soon as he is ready, the sub-master transfers the dirty line to memory. While the data is transferring to memory the original master *snarfs* the line. If the original cycle was a write, the master merges the dirty data around the original write and places the new line into his cache. The cache who had the dirty data invalidates his line. If the original cycle was a read, the master places the entire line into his cache. In either case, memory is also updated, so the allocated line is shared for the read case, and exclusive for the write case.

2.3.5 Split Transactions

Lethe master reads from the system's secondary buses require special treatment. These transactions are split to allow other masters access to the bus while the read is occuring.

When a Lethe master issues a read to a secondary bus, that bus responds by asserting MTAL~. MTAL~ tells the Lethe master to give up the bus and try again later. As soon as the cacheability windw is closed, the master deasserts his MREQ~ for a minimum of one MCLK. Other masters are free to arbitrate for the Lethe bus and execute cycles. Meanwhile, the original Lethe master patiently watches with his MREQ~ [*i*] asserted. When the original master's MGR~ is re–asserted, the active slave may or may not have completed. If it has not completed the slave again asserts MTAL~. If the EISA read is complete, the original master can complete his cycle on his next mastership. See Fig ?? on page ??. Decoupling the two buses solves two problems:

- If the current Lethe bus master desires to read from the secondary bus, and a master on the secondary bus desires to read from the Lethe bus, the secondary bus master must obtain the Lethe bus.
- Secondary bus reads are inherently slow. Without a split protocol the Lethe bus can be vacated for tens of $\mu$Seconds.

2.4 Pipelining Protocol

The Lethe bus pipelines addresses. The address bus can transition to the next desired address before the current cycle has completed. This is true for cycles originating from the same master as well as those originating from different masters.

Address pipelining allows for most of the current cycle's snoop delay to be overlapped with the data phase of the previous cycle. It also allows the slave devices to anticipate the next cycle's requirements.

2.4.1 Address Bus Pipelining

The address bus is piped between masters with the MREQ~ [*i*] and MGR~ [*i*] pins. When a node wants to execute a cycle on the bus, Asgard or Bifrost requests the bus with the assertion of the MREQ~ [*i*] signal. The assertion of MGR~ [*i*] gives address mastership to this node. The cycle's address phase begins with the assertion of MADS~. The address is valid and MREQ~ [*i*] remains asserted from this point until the the snoop window is over and the final data phase of the cycle has begun. The final data phase begins when MDBB~ is asserted for the last time in this cycle. This is when the slave responds with data on a read with no dirty hit, when the sub-master drives data on a write-back, when the master drives data on a master write-back, or when the active slave drives data on a read-allocate.

When the snoop window is over and the final data phase has begun, the current master can retain, park, or relinquish mastership of the bus. If the current master has another pending cycle and the system controller has not revoked mastership by de-asserting MGR~ [*i*], the master can begin that cycle by asserting MADS~ and keeping MREQ~ [*i*] asserted. If the current master has no more cycles pending he automatically parks on the bus until another master asserts his MREQ~ [*i*]. All masters follow this protocol.

The next cycle's address phase begins when:

- a cycle is pending
- the current cycle's snoop window has completed
- the final data phase of the current cycle has begun

2.4.2 Data Bus Pipelining

Data bus pipelining is simplified by the address pipelining interlocks. Since the current address master retains the address bus until the onset of the final data phase, the next cycle's data phase can *always* start at the end of the current data phase. When a master is given control of the address bus, he is guaranteed mastership of the data bus as soon as the current data phase is over. In consequence, once a master has asserted MADS~, he can drive or receive data the clock after he samples MDBB~ de-asserted. However, processor read data should not be driven until the snoop window has closed.

A cycle's data phase can begin when:

- the data is available
- the previous cycle's dataphase is complete (MDBB~ is de-asserted)
- (Processor reads) the snoop window has completed

2.4.3 Pipelining Examples

Address/Data pipelining for one master is shown in Figure ?? on page ??. The C5 initiates a cycle with CADS~ asserted in the first CT1 along with the control signals indicating a memory data write. At this point Asgard arbitrates for the bus with the assertion of its personal MREQ~ [*i*]. Hydra responds with MGR~ [*i*] an arbitrary two clocks later. At this point the local Asgard starts the cycle on the bus with the assertion of MADS~ and the appropriate control signals (ADDR and TGR and IDLE). The MDBB~ signal is also asserted to indicate to the slaves that the data is available. The active slave asserts the MBRDY~ signal to keep the data pipeline flowing. Meanwhile the slaves vote on the cacheability window and the snoop window. The active slave controls the outcome of the cacheability information. All slaves have the opportunity to respond to the snoop. In this instance the information is not resident in any cache, so the transfer of data to memory is allowed to complete normally. The C5/C8 can pipeline its next cycle as soon as the cacheability window completes. In this case the next cycle (indicated by the assertion of CADS~) is sampled by Asgard on the same clock as the assertion of KWEND~. Consequently, Asgard is able to initiate the next cycle.

Multi-master address/data pipelining is shown in Figure ?? on page ??.

2.4.4 Write-Back Cycles

Lethe bus cycles which require write-backs of dirty data are handled uniquely. The slave device which possesses the dirty data is given temporary sub-mastership of the Lethe bus to expedite the write-back.

Read Allocate w/Write Back

When the write-back was caused by a read cycle the memory controller never initiates a read on the Lethe bus. Instead, it waits for the close of the cacheability window. When it samples the MHITM~ line asserted, it realizes that the read has become a write-back. The current master allows the sub-master to take over the bus. The sub-master asserts MDBB~ as soon as the write-back data is available. Gryphon treats the write-back as a normal write. Gryphon asserts MBRDY~ and queues the data into its write FIFO. Coincedently, the master snarfs the data.

The address and control signals never reflect the write-back. They can be pipelined as soon as the final data phase is initiated (i.e. when the write-back MDBB~ is sampled asserted. See Fig ??, page ??.

Write Allocate w/Write Back

When a write-allocate cycle causes a write-back the scenario is slightly different. The master's write always transfers on Lethe before the write-back. It may complete before the snoop window has closed. Once both the snoop window and the write cycle are over, the write-back is allowed to start. The write-back data is merged in Gryphon's write buffer and snarfed by the C5/C8. The merged write data is then written to memory. See Fig ??, page ??.

2.5 Snoop Window

Lethe's M.E.S.I. protocol requires that cacheing slaves snoop bus activity. Unfortunately, the temporal relationship of snoop initiation to snoop status is non–deterministic. Consequently, potential snooping nodes vote on when snoop status should be sampled. When all nodes complete their snoops, the snoop window is closed.

The voting is handled by isolating the SWEND~ [*i*] signals. Each node has an individual version of this. The SWEND~ [*i*]'s are OR–ed together to create the consensus snoop window end, SWENDc~. When SWENDc~ is asserted the snoop window is said to have ended.

2.5.1 Snoop Status

The snoop status is contained on two signals, MTHIT~ and MHITM~. The individual versions of these are AND–ed and sampled at snoop window end.

| MTHIT~ | MHITM~ | STATUS |
|---|---|---|
| 1 | 1 | None |
| 1 | 0 | - |
| 0 | 1 | Hit, Not Dirty |
| 0 | 0 | Dirty Hit |

2.6 Cacheability Window/ Memory Mapping

Chimæra's physical memory is mapped with hardware descriptors distributed between the slave nodes of the Lethe bus. Slaves are responsible for characterizing memory regions which they own.

2.6.1 Cacheability Characterization

Regions are characterized with the consensus cacheablity signals. These are:

MKENc~: Cacheability Indication

MROc~: Read Only Indication

MWTc~: Write Through Indication

MTALc~: Try Again Later

The active slave node drives valid cacheability information on its cacheability signals. Other slave nodes de–assert their individual cacheability signals. The individual cacheability signals are AND–ed together to form the consensus cacheability signals[5].

[5] Individual signals, like MTAL~ [*i*], are AND–ed together to form consensus signals, like MTALc~.

| MIO | DC | WR | Type |
|---|---|---|---|
| 0 | 0 | 0 | Interrupt Acknowledge |
| 0 | 0 | 1 | Special Cycles |
| 0 | 1 | 0 | I/O Read |
| 0 | 1 | 1 | I/O Write |
| 1 | 0 | 0 | Memory Code Read |
| 1 | 0 | 1 | - |
| 1 | 1 | 0 | Memory Data Read |
| 1 | 1 | 1 | Memory Data Write |

Table 2.1: P5 Cycle Types

2.6.2 Cacheability Window

The consensus characterization is sampled in the address phase of the cycle at the end of the cacheability window. The cacheability window is closed when all the bus slaves respond to the current address phase with KWENDo~ asserted. At this point the above signals are sampled by the current mastering MBC.

2.7 Cycle Types

The Lethe bus supports all of the P5 cycle types. These are shown in Table 2.1. Lethe extends these cycle types to support write–back. Lethe's cycle types are shown in Table 2.2.

2.7.1 Interrupt Acknowledge

Interrupts in the Chimæra system are virtualized. Bifrost routes EISA based interrupts to the system controller via the I.P.C. mechanism. The system controller routes the interrupts to the processors using an internal descriptor. The processors then issue interrupt acknowledge cycles to the system controller The system controller responds with the appropriate interrupt vector.

Interrupt Acknowledge cycles are always non-cacheable. They originate from a processor who is interrupted by the system controller. The system controller responds to the acknowledge cycle with a interrupt vector which indicates the source and type of interrupt. The cycle is ignored by other bus slaves.

2.7.2 Special Cycles

Halt Cycle

Halt cycles emanate from mastering processors. They are sunk by the system controller. The halted processor remains halted until the next interrupt.

| MMIO | MDC | MWR | MPALLC~ | Type | Sink |
|---|---|---|---|---|---|
| 0 | 0 | 0 | 1 | Interrupt Acknowledge | Hydra |
| 0 | 0 | 1 | 1 | Special Cycles | Hydra |
| 0 | 1 | 0 | 1 | I/O Read | Bifrost |
| 0 | 1 | 1 | 1 | I/O Write | Bifrost |
| 1 | 0 | 0 | 0 | Code Read Allocate | Gryphon |
| 1 | 0 | 0 | 1 | Code TAL Read | Bifrost |
| 1 | 0 | 1 | – | – | – |
| 1 | 1 | 0 | 0 | Read Allocate | Gryphon |
| 1 | 1 | 0 | 1 | TAL Read | Bifrost |
| 1 | 1 | 1 | 0 | Write–Allocate | Gryphon |
| 1 | 1 | 1 | 1 | Write–Back Cycle | Gryphon |
| 1 | 1 | 1 | X | Write–Through | Bifrost |
| 1 | 1 | 1 | X | Write–Through | Gryphon |
| 1 | 1 | 1 | X | Non–Cacheable Write | Bifrost |

Table 2.2: Lethe Cycle Types

Shutdown Cycle

Shutdown cycles are sunk by the system controller. The mastering processor is reset by the system controller[6].

Flush/Write–Back/Flush Acknowledge Cycles

Flush cycles are sunk by the system controller. The mastering processor's cache is flushed as a result[7].

Branch Trace Cycle

Branch trace cycles propagate to the system controller where they are ignored.

2.7.3 I/O Reads and Writes

I/O cycles which are not in the range of register cycles or I.P.C. cycles go to one of the EISA buses. The are single beat transfers.

[6] It may be important that other processors be informed of this occurance. The I.P.C. mechanism would be a good medium for this.

[7] It seems reasonable that all other caches should be flushed, too. This merits further thought.

2.7.4 Memory Data/Control Read

TAL Read

All reads to secondary buses are 'split' to save Lethe bus bandwidth. Cacheable secondary bus reads are allocations. One such example is shown in Figure ?? on page ??. It is described on page 10.

Read–Allocate

Cacheable read cycles are all of line length. When the data is mapped to an EISA device, the cycle is write–through. These result in Shared lines in the master's cache.

Reads mapped to Gryphon are write–back. These result in Exclusive lines in the master's cache if the line is not present in other's caches. Otherwise, Shared lines result.

A sample read–allocation cycle is shown in Figure ?? on page ??. In this case the valid data was valid and dirty in another master's cache. The data transfer begins when the second cache has the dirty data available. At this point the next cycle's address is also pipelined.

2.7.5 Memory Data Write

Write–Allocate

These cycles are writes which miss the C5/C8. A single beat write is initiated on the Lethe bus, Gryphon sinks the write, Gryphon sources the entire line to the master, then Gryphon writes the data to memory. If the line is dirty in another node's cache the read is sourced by that cache.

Write–allocation is shown in Figure ?? on page ??. Here, a master writes new data to address 0. The data is transferred to Gryphon before the end of the snoop window. The snoop window closes with a hit indicated by another caching slave. When that slave is ready, he asserts MDBB~. This indicates that the data is ready to the memory controller and the original master. Gryphon queues the data into his data FIFO around the single beat's data. Transfers continue while MBRDY~ remains asserted. In the meantime the original master has already pipelined the next cycle's address phase. The current cycle's data phase ends with MDBB~'s de–assertion and the sampling of MBRDY~ and MBLAST~ asserted.

Write–Through

Write–through cycles are essencially write–allocate cycles where the allocation is either not possible or not necesary. This will occur under the following circumstances:

Processor Write Hits to Local Shared Lines: Write hits to Shared lines are differentiated from write–allocates with the de–assertion of MPALLC~. This is shown in Fig ?? on page ??. Write–through cycles which originate from processors are always one beat long. They are snooped, but write–backs never result.

Processor Writes to Secondary Buses[8]: Writes to the secondary buses can never be allocated. However, this may not be reflected on the MPALLC~ signal. The secondary bus must indicate that the cycle can't be allocated with the assertion of MWT~ at cacheability window end. Other Lethe devices can use the same technique to keep writes from being allocated. One such example is shown in Figure ?? on page ??.

Secondary Bus Master Writes to Lethe: Writes from secondary bus masters are always write-through. They can be from one to eight beats long. Single beat cycles can be sparce[9]. Cycles longer than one beat are never sparce.

Sub cache–line length cycles may require write–backs. An example of a three beat transfer is shown in Fig ??on page ??. In this example the write is a hit to a dirty line in a processors cache. The write–through data and the write–back data are merged in Gryphon-D before they are transferred to memory.

Cache–line length cycles may hit dirty line in processor caches, but they never require write-backs. Write–backs are suppresses with the de–assertion of the MSNPWB~ signal. Snooping nodes sample this at the onset of the cycles address phase. When MSNPWB~ is sampled inactive, MHITM~ is *never* asserted.

Non–Cacheable Writes

Non-cacheable writes execute similarly to write–through cycles. The minor difference lies in the way the allocation is avoided. An address can be forced non-cacheable by the master or by the active slave. In either case the slave should assert MWT~. If the master does not actively force the cycle non–cacheable, the slave must[10], and he also must ignore the sense of MPALLC~[11].

Stand–Alone Write–Back

Allocation cycles may force dirty lines to vacate a cache. Stand–alone write–back cycles occur in this case. These cycles are always of cache–line length.

An example is shown in Figure ?? on page ??. Stand–alone write back cycles are differentiated from write–allocate cycles with the MPALLC~ signal. Stand–alone write–back cycles only occur when MPALLC~ is de–asserted.

Though snooping is not necesary on stand–alone write-back cycles, there is no way to differentiate these cycles from Bifrost write–through cycles. Consequently, snoops will occur, but there will never be any snoop hits.

2.8 Electrical Characteristics

2.8.1 Bus Protocol

The Lethe Bus is fundamentally a synchronous bus. Signals transition on the rising edge of MCLK. Exceptions to this rule are rare[12].

[9] Sparce means that the byte enables are not all asserted, i.e. the beat is not 64 bits wide.
[10] Assuming the address really should be cacheable.
[11] MPALLC~ really only indicates that the current master can do an allocate, not that he will.
[12] Strobes are deasserted on the rising edge of MCLK, but when mastership is relinquished, the de–asserted signals are tri–stated on the next falling edge of MCLK.

2.8.2 Sampling

Lethe bus signals are sampled on the rising edge of MCLK. Latch cheating[13] is anticipated for the MD bus. Strobes are not guaranteed to be free of glitches. However, they like all signals are guaranteed to meet set–up and hold times to the rising edge of MCLK.

2.8.3 Sampling Hold

MD sampling hold will be ensured by design. Write data will be synchronous to MOCLK. MOCLK is generated locally on each processor card. MOCLK trails MCLK by 2 nS.[14].

2.8.4 Driver Overlap

Bussed signals are never driven by two or more sources at the same time. Arbitrary buses (MD,MA,MC) always float for at least one clock between masters. Strobes (MADS~,MDBB~) are always de–asserted, then tri–stated between masters. This may occur in two succesive MCLK's, or within the same clock. In the latter circumstance the strobe is de-asserted on the rise of MCLK and tri–stated one half MCLK later. Strobes should be lightly pulled–up.

2.8.5 Clocking

It is assumed that there will be one central system clock, MCLK. This clock will be routed, with great care taken to minimize skew, to each bus node. Each bus node will then buffer this clock with a phase–locked loop. This P.L.L. will generate buffered clocks of three flavors:

1. MCLK: A buffered version of the global MCLK.
2. MOCLK: A buffered version of the global MCLK. Locked to 2 nS. after MCLK.
3. CLK: A double–speed version of the global MCLK.

[13] By latch cheating I mean that slaves will sample the MD bus with active low latches clocked on MCLK. Slaves will then be able to use the MD bus somewhat before the rising edge of MCLK.

[14] Subject to change

2.9 Signals

2.9.1 Address and Data

| NAME | DESCRIPTION | CLOCK |
|---|---|---|
| MA[31:3] | Lethe Address Bus | MCLK |
| MD[63:0] | Lethe Data Bus | MCLK |
| MP[7:0] | Lethe Data Parity Bus | MCLK |
| MBE~[7:0] | Byte enables indicate which bytes of the data bus have or are requesting data. | MCLK |

2.9.2 Transfer Control

| NAME | DESCRIPTION | CLOCK |
|---|---|---|
| MADS~ | Lethe bus address strobe. Indicates that the current master is driving the next cycles address. | MCLK |
| MDBB~ | Data Strobe. This signal is driven by the device currently driving the data bus. For write cycles this means that as soon as the write data is available if the previous cycle's data phase is over, the mastering Asgard drives data and asserts the **MDBB~**. For read cycles **MDBB~** is asserted by the active slave when the data is available and the snoop window is over. | MCLK |
| MMIO | Memory or I/O Cycle Indication | MCLK |
| MDC | Data or Code Cycle Indication | MCLK |
| MWR | Write or Read Cycle Indication | MCLK |
| MPALLC~ | Potential Allocate Cycle Indication | MCLK |
| MLOCK~ | Lock Indication | MCLK |
| MBRDY~ | Burst Ready Indication | MCLK |
| MBLAST~ | Burst Last Indication | MCLK |

2.9.3 Arbitration

| NAME | DESCRIPTION | CLOCK |
|---|---|---|
| MREQ~ [*i*] | M Bus Request. Each system node has an individual version of this pin. | MCLK |
| MGR~ [*i*] | M Bus Grant. Each system node has an individual version of this pin. | MCLK |

2.9.4 Boundary Scan Support

| NAME | DESCRIPTION | CLOCK |
|---|---|---|
| TDI | Test Data In | TCLK |
| TDO | Test Data Out | TCLK |
| TCLK | Test Clock | — |
| TMDS | Test Mode Select | TCLK |

2.9.5 Cacheability Support

| NAME | DESCRIPTION | CLOCK |
|---|---|---|
| MKWEND~ [i] | Cacheability window end indication. Driven by each snooping device. | MCLK |
| MKWENDc~ | Cacheability window end indication. The logical OR of the MKWENDo~ signals. | MCLK |
| MWT~ [i] | Cacheability type. Active slave drives valid level, others drive de-asserted. | MCLK |
| MWTc~ | Cacheability type. Indicates that the current cycle is write through. Sampled at the end of the cachebility window by the current master. | MCLK |
| MRO~ [i] | Read only indication. Active slave drives valid level, others drive de-asserted. | MCLK |
| MROc~ | Read only indication. Indicates that the current cycle is ultimately from a read only device, and that, when cached, it should not be affected by writes. Sampled at the end of the cachebility window by the current master. | MCLK |
| MKEN~ [i] | Cacheability indication. Indicates that the current cycle is cacheable. Active slave drives valid level, others drive de-asserted. | MCLK |
| MKENc~ | Cacheability indication. Sampled at the end of the cachebility window by the current master. | MCLK |
| MTAL~ [i] | Memory cycle try again later signal. Active slave drives valid level, others drive de-asserted. | MCLK |
| MTALc~ | Memory cycle try again later signal. The logical **AND** of all the slave's MTALo~'s. Sampled at the end of the cacheability window. | MCLK |

2.9.6 Snooping Support

| NAME | DESCRIPTION | CLOCK |
|---|---|---|
| MSWEND~ [i] | Snooping window end indication. Driven by each snooping device. | MCLK |
| MSWENDc~ | Snooping window end indication. The logical **AND** of the MSWENDo~ signals. | MCLK |
| MSNPWB~ | Snoop write back enable. Driven by current bus master when a dirty hit does not need to cause a write-back. | MCLK |
| MTHITc~ | Tag hit. Input to current bus master. Indicates that the current cycle is a hit to a slave's cache. Sampled at the end of the snoop window by the current bus master. | MCLK |
| MTHITo~ | Tag hit. Active slave drives valid level, others drive asserted. | MCLK |
| MHITMc~ | Tag hit to modified line. Input to current bus masters MBC. Indicates that the current cycle is a hit to this slave's cache, and that line has been modified. | MCLK |
| MHITM~ [i] | Tag hit to modified line. Indicates that the current cycle is a hit to the slave's cache, and that line has been modified. | MCLK |

2.9.7 Parity Support

| NAME | DESCRIPTION | CLOCK |
|---|---|---|
| MPERR~ | Memory parity error. | MCLK |
| MSERR~ | Memory soft error. Indicates that one of the memory controllers has detected a single bit ECC error. | MCLK |
| MSID[2:0] | Memory slave ID bus. Indicates to the system controller who is the active slave. This ID is only valid when **MDBB~** is asserted. | MCLK |

Chapter 3

Multiprocessor Support

The Chimæra architecture supports multiprocessing in various ways:

- High bandwidth cache coherent system bus see section 2 on 7 for details.
- Multiprocessor bus arbitration see section 2.3 on 9 for details.
- Multiprocessor interrupt controller which routes hardware interrupts to various processors.
- Timer which can generate periodic interrupts to each processor.
- Interprocessor communications.
- Reset and powerup sequencing.
- Multiple EISA I/O channels can be supported.
- Bus Locking.

Multiprocessing presents certain limitations on the software, and so a Chimæra system when running in a multiprocessing environment is permitted certain incompatibilies with existing PC standards. The following features are felt to be either not neccessary or can be implemented in an incompatible manner in a multiprocessing evironment:

- Gate A20
- Speed switching
- Shutdown Handling

3.1 Interprocessor Communication

Interprocessor communications are implemented as 16 bit I/O writes to I/O address X'????'. The format of the IPC message is:

| 2 bits | 3 bits | 3 bits | 8 bits |
|---|---|---|---|
| IPC type | Source ID | Destination ID | Type defined |

Type Indicates the type of IPC message:

B'00' – Interrupt Request

B'01' – Action Request

B'10' – Message Transfer

B'11' – *Somebody will think of something*

Source ID Indicates the ID of the master who sent the IPC message. The high bit of the ID indicates whether the master was:

B'0' A Processor.

B'1' An I/O channel.

The lower two bits indicates which I/O channel or processor it was.

Destination ID Indicates the master who this IPC message is addressed to. It has the same format as described above for source ID.

Type Defined This data is defined specifically by each type of IPC message.

A processor can read the last IPC message sent to it from Hydra.

3.1.1 Interrupt Request

| | 3 bits | 3 bits | 8 bits |
|---|---|---|---|
| B'00' | Source ID | Destination ID | Interrupt Vector |

This message generates an interrupt request to the processor specified in destination ID. When that processor responds with an interrupt acknowledge, it will be given the vector provided in the vector field of the IPC message. This allows any processor to vector any other processor to any of the 255 available interrupt vectors.

Some of the destination IDs have specific meanings:

B'000' – B'011 The processor indicated by the low two bits of the destination ID.

B'100' Unused

B'101' Unused

B'110' Dispatched – Interrupt the processor with lowest priority task executing as given by the Master Task Priority Register in Hydra.

B'111' Global – Interrupt all processor with this vector.

| Programmer's Note |
|---|
| This message should not be sent to an I/O channel. |

3.1.2 Action Request

| | 3 bits | 3 bits | 8 bits |
|---|---|---|---|
| B'01' | Source ID | Destination ID | Action |

This message provides gross control of system hardware. The actions provided are:

| | set | clear | | set | clear | | |
|---|---|---|---|---|---|---|---|
| global | reset | reset | sync | flush | flush | NMI | reserved |

Global Indicates that all nodes which implement IPCs should respond to this message, ignoring the destination ID.

Set Reset Asserts reset to the node in destination ID. Global messages to Set Reset are ignored.

Clear Reset Deasserts reset to the node in destination ID. Global messages to Clear Reset are ignored.

Sync Asserts Sync to the node in destination ID.

Set Flush Asserts Flush to the node in destination ID.

Clear Flush Deasserts Flush to the node in destination ID.

NMI Assert a non maskable interrupt to the node in destination ID.

3.1.3 Message Transfer

| | 3 bits | 3 bits | 8 bits |
|---|---|---|---|
| B'10' | Source ID | Destination ID | Message Data |

This message provides for the delivery of a single byte of information from processor to processor. Reception of this message generates an interrupt with a specific vector. The processor can then read the entire message from Hydra and extract the message.

3.2 Multiprocessor Interrupt Controller

3.2.1 Vectored Interrupts

The Multiprocessing interrupt controller (MIC) allows specific vectored interrupts to be routed to an arbitrary processor. The scheme used to implement this is fairly complex, but very powerful. It requires the cooperation of Bifrost the EISA bridge and Hydra the system controller.

1. The interrupt request from the 8259 in the ISP is run into Bifrost-A.
2. When Bifrost-A sees an interrupt request, it flushes its store queue, and then generates the interrupt acknowledges to read the vector from the 8259.
3. Bifrost-A then translates the 8259 vector into a processor number and processor vector by performing a table lookup.
4. The processor number and vector is then packaged into a interprocessor communication (IPC) message.
5. Bifrost arbitrates for the Lethe bus, and writes this IPC message to Hydra.
6. Hydra decodes the IPC, and interrupts the appropriate processor.
7. When the processor responds with an interrupt acknowledge, Hydra provides the vector specified for that processor in the original IPC message.

3.3 Periodic Interrupt Generation

Periodic interrupts are generated by the addition of one timer/counter to the system. This timer/counter generates a interrupt with programmable vector to all processors in the system with a programmable period. The interrupts to the processors are distributed equally through the timer period, so that only one of the processors is servicing a periodic interrupt at a time. The other EISA timers are still available for other uses.

3.4 Reset and Power Up Sequencing

Reset sequencing is provide by Hydra. At system reset Hydra resets all processor except Processor B'00'. After processor B'00' comes up it can bring the other processors out of reset through the IPC mechanism.

Chapter 4

Compatibility or Lack Thereof

The Chimæra architecture aims at being perfectly PC compatible. Deviations from this goal are described below.

4.1 ISA Masters

Some[1] antique ISA bus master cards assume they know how long a particular cycle will take and ignore CHRDY. These cards cannot be made to work in systems with a write back cache, because they might access dirty data in somebodies cache and have to wait for the write back to occur before valid data is available. Even with read snarfing this may take longer then the master chooses to wait.

Since this cannot be made to work in the general case, Chimæra will not attempt to make it work at all. All masters on the I/O channel must respect CHRDY or EXRDY whichever is appropriate.

[1] If someone had a list of these cards, it would be quite useful.

Chapter 5

Global Memory Mapping

The Chimæra system architecture provides for a 4 Gigabyte physical memory address space. It also provides for a 64 Kilobyte I/O address space. These two disjoint sets are partitioned between Lethe's slaves. Where $M$ is the set of all memory addresses, and $m_i$ is the subset of $M$ which resides in the $i$-th Lethe slave:

$$M \equiv m_1 \cup m_2 \cup \ldots \cup m_n \tag{5.1}$$

Further:

$\forall_{1 \leq i \leq N}, \forall_{1 \leq j \leq N}$ :

$$i \neq j \Rightarrow \emptyset \equiv m_i \cap m_j \tag{5.2}$$

The same can be said for I/O.

5.1 Attributes

The Chimæra memory address space is divided up into regions which can have different attributes. The attributes supported are:

Cacheable Indicates whether a processor is permitted to place a copy of the returned data in her cache.

Write Thru [Asserted[ Indicates that a processor is not permitted to mark the returned data as exclusive in her cache. If it is marked exclusive, subsequent writes to the same line will be performed only on the cache, they will not be reflected on the bus. [De-Asserted] Writes are permitted to

Read Only Indicates whether the returned data can be written to.

Locale Indicates where in the system the access is to be satisfied from, the exact interpretation of this attribute is slave specific.

5.2 Distributed Memory Mapping

Chimæra's physical memory and I/O is mapped with hardware descriptors distributed between the slave nodes of the Lethe bus. Each potential slave is responsible for characterizing memory regions which it owns. That characterization is done with the following Lethe bus signals.

MKEN~ Cacheable

MRO~ Read Only

MWT~ Write Thru

These signals are voted upon:

- Slaves who do not own the current cycle are expected to de-assert all the above signals.
- Slaves who own the current cycle drive correct status.

The AND of all slave's signals is sampled by the current master, who then knows what to expect.

Bifrost needs to support the memory mapping needs of the entire system, because the default Bifrost must be the sink of all accesses which go nowhere else. Bifrost therefor has a duplicate set of all region descriptors which indicate locale for Bifrost's internal use. Bifrost does not drive the bus signals when it is not the selected slave..

5.3 Slave Memory Mapping

Mapping is intended to be simple so that slave determination can be quick. Consequently, memory is represented as large contiguous blocks. These blocks abut other slaves memory ranges.

Unfortunately, there are a variety of memory regions which cannot be represented as large blocks. These are devices which typically reside in a small physical address space which abuts or overlaps memory on another Lethe node.

These situations are handled by five types of descriptors:

BSMD – Base System Memory Descriptor This descriptor indicates the highest address for Lethe resident physical memory. This is all the memory behind Gryphon. This region is assumed to start at address X"00000000". If there are two Gryphon's in a system, it is assumed that their memory regions abut and make one large contiguous region.

CRD – Conjunctive Region Descriptors These descriptors map regions which reside on the Lethe bus but not behind Gryphon. This is meant to allow Lethe bus frame buffers and other very high bandwidth memory mapped I/O adapters to exist on the Lethe bus.

DRD – Disjunctive Region Descriptors These descriptors map regions which reside on one of the EISA busses.

SD – Static Descriptors Static descriptors map specific address ranges which are unique in the PC architecture. This is mostly in the first megabyte of address space, and the various system ROM spaces.

DD – Default Descriptor This descriptor specifies the attributes of any region not specified by one of the above mentioned descriptors.

Gryphon owns all memory such that:

$$GryhonMemory \equiv \{\forall A \| A < BSMD\} - \{\forall A \| A \in DRD\} - \{\forall A \| A \in SD \wedge SD \Rightarrow \overline{Gryphon}\} \quad (5.3)$$

Bifrost owns all memory such that:

$$BifrostMemory \equiv \{\forall A \| A > BSMD\} - \{\forall A \| A \in CRD\} - \{\forall A \| A \in SD \wedge SD \Rightarrow \overline{Bifrost}\} \cup \{\forall A \| A \in DRD\} \quad (5.4)$$

Lethe Slaves other then Bifrost and Gryphon own all memory such that:

$$LetheMemory \equiv \{\forall A \| A \in DRD_{Bifrost}\} \cap \{\forall A \| A \in DRD_{Gryphon}\} \quad (5.5)$$

5.3.1 Static Descriptors

Static descriptors exist to map the following regions:

| Block Name | Start Address | End Address |
|---|---|---|
| XMA | X"00040000" | X"0007FFFF" |
| Blk89 | X"00080000" | X"0009FFFF" |
| BlkA | X"000A0000" | X"000AFFFF" |
| BlkB | X"000B0000" | X"000BFFFF" |
| BlkC0 | X"000C0000" | X"000C7FFF" |
| BlkC8 | X"000C8000" | X"000CFFFF" |
| BlkD | X"000D0000" | X"000DFFFF" |
| BlkE | X"000E0000" | X"000EFFFF" |
| BlkF | X"000F0000" | X"000FFFFF" |
| Blk14-16M | X"00E00000" | X"00FFFFFF" |
| Blk16M64K | X"00FF0000" | X"00FFFFFF" |

5.3.2 Region Descriptors

One of the most important selling points of the P.C. is the vast pool of peripherals which may be used. These peripherals are typically flexible. They have several ranges of memory in which they can reside. However, since Chimæra is capable of having 15 EISA slots, the memory mapping can be difficult. Chimæra slaves have at least eight base/mask region descriptors. These can be used to map as local or foreign any $2^n$ sized memory region.

Memory descriptors are based on a sixteen bit base address and a sixteen bit mask. A VHDL description of the exact semantics is:

```
Hit <= ((address(31 downto 16) xor descriptorBase) and Mask) = X'0000' ;
```

5.4 I/O Mapping

I/O cycles are relegated to the EISA bus. Each EISA slot is assigned a 1 KByte I/O space. ISA I/O accesses are always sent to the default channel.

> Board Dude's Note
>
> This means that an eight slot box with two I/O channels, four slots on each channel, can only have four ISA I/O cards installed.

The mapping between EISA slot and channel can be programmed into Bifrost. See Section 8.5.2 on page 45 for details.

5.5 Chimæra Register Mapping

The only exception to the above I/O mapping is the Chimæra register region. This region is defined as the sixteen byte region I/O region between addresses X"000000EO" and X"000000EF". This region is also aliased into a high memory region between addresses X"FF0000E0" and X"FF0000EF". See Section 5.6 on page 33 for details. This region is responded to by Chimæra peripherals only.

Each Chimæra peripheral gets two bytes of I/O space:

Index Register Located at the lower of the two I/O addresses is written to indicate the actual address of the subsequent data access. In general multiprocessor index coherency is not insured by the hardware, because most registers are not meant to be accessed except at initialization time. Hydra however may have registers which need to be accessed in the general operation of the system. If this turns out to be the case, then Hydra will have a seperate index register for each master. The selection being made by which master is currently granted the bus.

Data Register Located at the higher of the two I/O addresses is accessed to read or write data to the register that the index register is currently pointed at. Accesses to the data register automatically increment the index register.

The chips will be designed in such that when multiple chips need to be programmed with the same information, the information is represented in an identical manner in each chip. This includes the bit order within registers and the order of registers within the indexed area.

5.5.1 Lethe Geographic I/O Addressing

I/O accesses within the Chimæra system are resloved with geographic addressing. The chips are informed which slot they are inserted into by pullups and pulldowns on certain lines during reset. the lines affected are:

- MKEN~
- MRO~
- MWT~

These signals are not bussed, and all slaves generated them. At reset time the slave floats the signals and latches the value put there by the pullups and pulldowns, this is that slaves slot ID. The signal definitions are:

| Slot ID | MKEN~ | MRO~ | MWT~ | Comment |
|---|---|---|---|---|
| 0 | 0 | 0 | 0 | Reserved for Hydra |
| 1 | 0 | 0 | 1 | Reserved for Hydra |
| 2 | 0 | 1 | 0 | |
| 3 | 0 | 1 | 1 | |
| 4 | 1 | 0 | 0 | |
| 5 | 1 | 0 | 1 | |
| 6 | 1 | 1 | 0 | |
| 7 | 1 | 1 | 1 | |

The particular slot ID a slave has determines the byte enables used to access it. Hydra is on byte enables 0 and 1 because it has to respond to interrupt acknowledge cycles which are on byte 0. The other slaves are spread across the byte lanes of the data bus to reduce loading.

Board Dude's Note

This implies that a Lethe card slave must be customized for the slot it is to inhabit. In particular if two Gryphons are planned to live on cards then two cards must be built which run different bytes to the data port of Gryphon-A. The same is true of course for Bifrost-A. This should not be a problem because there is now no plan to put any of these chips on cards.

5.6 I/O Space Address Relocations

The upper 64 megabytes of address space are aliased into I/O channel specific accesses. This supports four I/O channels with 16 meg of address space each. The lower 64K of each of these regions is dedicated to I/O cycles.

The upper 16 meg in this region goes to the default I/O channel the BIOS boot ROM is required to be on this I/O channel.

This address relocation is provided for three reasons:

- So that boot code and diagnostics can look at what is in the system without programming the Bifrost descriptors.
- To support ISA devices in secondary I/O channels.
- To support RISC processors which do not have I/O instructions.

Chapter 6

Software Compatibility

6.1 General

Products utilizing the Chimæra architecture are designed for compatibility with current and future versions of:

- DOS
- UNIX
- Novell
- OS/2
- Anything else relavant

6.2 Compatibility Issues

Chimæra's multiprocessing and multiple EISA buses begs the following compatibility questions:

- How are special cycles handled?
- How is LOCK~ handled?
- How is EISA LOCK~ handled?

6.2.1 Special Cycles

Cache related special cycles will be handled by cache–ing nodes directly. Should only the master be affected?

Halts and shutdowns will be sunk by the system controller, Asgard. Asgard will RESET~ the current master. It may inform other processors of the occurance via I.P.C..

6.2.2 Lock

Masters who issue lock cycles will not give up[1] the Lethe bus from the point at which they are guarranteed to finish the first transfer until the end of the last LOCK–ed transfer.

6.2.3 EISA Lock

Our current systems make no guarrantees regarding LOCK–ed cycles. If the ISP allows LOCK–ing masters to have split bus masterships, the processor is free to cause problems. Are we to do the same?

[1]They will not de–assert MREQ~ even in the face of a MGT~ preempt.

Chapter 7

RATS

RATS- *furry little nasty things*

7.1 General

Products utilizing the Chimæra architecture are designed to be Reliable, Accessable, Testable, and Serviceable. To achieve these ends the following are part of Chimæra:

- Error Detection & Correction
  - Parity / 2 Bit ECC Errors
  - Soft Errors (1 bit ECC)
- Error Reporting
- Error Retry
- Diagnostics
- POST

7.2 Error Detection & Correction

Chimæra supports a high degree of error detection and supports error correction where it is most valuable.

7.2.1 Error Detection

System memory is one of the most error-prone aspects of PC's. Chimæra detects system memory errors of four flavors[1]:

[1] All on 32-bit quantities

1. Single bit errors
2. Double bit errors
3. Most $N$-bit errors ($N$ is even)
4. Gross errors (All one's or zero's)

Bus errors are far less frequent, but no less serious to the end user. Both the address and data buses are checked for single bit errors[2].

7.3 Error Reporting

Bus errors and memory errors will be reported to the system controller. Reporting will timely such that the system controller will be able to latch the errant data's address and source. The source will be derived from the Lethe bus' source I.D. bits. These bits are always driven during data transfers with the current data source.

7.4 Error Retry

Correctable errors will have no impact to the cycle pipeline. Uncorrectable errors will not effect the current cycle, but will result in cycle retries. Cycle retries will either continue until data is no longer invalid, or time out with a posted NMI.

7.5 Diagnostics

Hardware diagnostic support will be available. Notable features are:

- Error Reporting Interrupts
- Diagnostics Processor Interface
- JTAG Interface

7.5.1 Error Reporting Interrupts

The system controller monitors bus activity. If parity errors arise, Hydra will report these errors by asserting a programmable interrupt. Note that error reporting is strictly a diagnostic activity; if retries fail indefinately, NMI's may be appropriate.

7.5.2 Diagnostic Processor Interface

Hydra will also have a serial interface which will allow it to be connected to diagnostic processor. This interface will allow the diagnostic processor, a National COP, to monitor the system bus through the serial port, and forward errant conditions via the system controller's I.P.C. mechanism.

[2] Per byte.

7.5.3 JTAG Interface

The COP will be able to access other hardware in the system through JTAG.

The JTAG support is meant to test connectivity, this also tests the I/O pads of the chips and therefore gives a good coverage of chip functionality because:

1. The predominate failure mode of a chip is the destruction of an I/O pad or the breaking of a wire bond. These failures are caused by static discharge or mecanical shock.
2. It is extremely rare for an internal gate to fail after it has been tested good during manufacturing.
3. The only other major failure mode other than (1) is total catostrophic failure of the chip, this is caused by over voltage or over temperature operation or possibly by metal migration or some such other mechanism. This leads to total failure of the chip such that the scan paths would not work and the JTAG boundayr scan would still catch the failure.

The JTAG support in the chip need not therefor be able to supply inputs to a chip. The scan cell on an input is used for observability only. It is not necessary to provide an output scan cell if it is known that the signal is not observable thru some other JTAG input. These signals are basically the memory control signals. The virtual host bus signals might be in this class, but it is hoped that Dell will someday have its own EBC and ISP which will include JTAG; and so includeing JTAG on these signals is desirable.

7.6 POST

Chimæra systems will utilize the above features along with current techniques to implement a Power On Self Test.

Chapter 8

Bifrost – the EISA Bus Bridge

Bifrost– *the heavenly rainbow built by the Aesir for use as a bridge between Asgard and Midgard.*

8.1 General

Bifrost is the Lethe system bus to EISA I/O bus bridge. It is described as a subsystem, following chapters will describe each chip in detail. The main features of Bifrost are:

- Decouples EISA I/O bus from system bus.
- Front end interfaces directly to the Lethe system bus.
- Back end is virtual host bus specified by the Intel EISA-DT chipset.
- Integrates the Intel DT chipset advanced data paths (ADPs) for use in non-buffered systems.
- Caches system memory used by EISA and ISA masters and DMA channels.
- Cache is write thru with two large (64 bytes each) store buffers.
- Prefetches into cache to keep up with EISA bursts.
- Eight deep store queue for EISA I/O and memory accesses.
- Descriptors to control store queue.
- Support for multiple EISA busses.
- Contains eight cacheablility descriptors, one for each slot.

8.2 I/O cache

The primary motivation for Bifrost is the addition of a cache which caches main memory locations which are being accessed by DMA channels and masters on the I/O channel. This cache is write thru and supports the MESI cache coherency protocol.

The cache is required to get any I/O performance in a system with write back caches and MESI cache coherency:

- I/O channel reads will typically be to lines recently dirtied by a CPU. This is because a processor typically writes to a buffer and then schedules it to be written to an I/O device. The caches are large enough to make it likely that the buffer does not get written back from the cache before the I/O occurs[1].

- The MESI protocol requires all caches to snoop on reads and writes, this snoop can take a long time. A cache can decide that it contains the only valid copy of the requested read data because it has modified the data and has not yet written it out to system storage.

- The read request must then be put off while the cache updates system storage so that all masters can have a coherent view of storage.

- It is clear that if this protocol were followed for every word of an EISA burst, it would not be possible to keep up with the EISA burst rate.

A further optimization allowed by the I/O cache is the decoupling of the busses. Currently the EISA bus and the system bus are connected into one bus while EISA transfers are occuring. In an I/O bound system this can cause dramatic performance degradation. For instance the Lethe system bus transfers data at a maximum of 218 megabytes per second. The EISA bus transfers data at a maximum of 33 megabytes per second. Connecting the two busses wastes 85% of the Lethe bus bandwidth. In other words if the EISA bus is transfering at its full bandwidth, a system with connected busses will have no bandwidth for the processor, while a system with the I/O cache will still have 85% of its memory bandwidth available for the processor. This makes it possible in fact to build a system with multiple EISA I/O channels for systems requiring serious I/O capability.

8.2.1 Cache Organization

The cache lines are 64 byte long. The cache is two way set associative with 32 lines. The addresses are arranged so that all lines in a particular 4k page map to the same line address. This way a transfer to a page will ping-pong between the two lines that that page maps to, and will not overwrite the entire cache. This allows I/O to be occuring to sixteen different regions of the memory space simultaneously. There is a slight possibility of thrashing with this organization, but it is felt small enough to not be a major concern, especially considering the simplification in the cache design that this allows.

[1] This is pure conjecture.

8.2.2 Cache Coherency Protocol

The Bifrost cache implements the write thru subset of the MESI protocol described in section 2.2 on page 8.

EISA Reads of System Memory

EISA reads are implemented exactly as in the MESI protocol. The read is first looked up in the Bifrost cache. If it is a hit, the line is transferred to the read buffer from which subsequent reads from the same line are satisfied, thus freeing the cache for snoops and prefetches. If it is a miss, the line is fetched from system memory, starting with the word which caused the miss and wrapping around to fill the entire line. Snarfing is implemented to perform cache to cache transfers on modified line writebacks of Bifrost reload data.

In either case after the current line has been reloaded, or transfered to the read buffer; a prefetch of the next contiguous line is performed if the device is a DMA channel or a bursting EISA master.

When a line gets transferred to the EISA read buffer, it is not invalidated in the cache. Invalidation occurs when the device reads past the end of the line, and the subsequent line is transferred to the read buffer, and the prefetch is started on the next line. This insures that slow DMA devices which are interleaved with other masters will not have their buffers prematurely invalidated.

EISA Writes to System Memory

The write is first looked up in the Bifrost cache. If it is a hit, the line is transferred to the write buffer where subsequent writes to the same line also occur, freeing the cache for snoops. If it is a miss, the write occurs into the EISA write buffers. Writes continue into that buffer until a write misses. At this time the buffer is scheduled to be written to memory.

Writes which do not start on 64 bit boundaries may have the beginning portion of the write started earlier so that when it is time to dump the entire buffer, a Lethe burst can be used.

Snooping

Bifrost performs snooping on the:

1. cache
2. EISA write buffer
3. EISA read buffer
4. Store Back Buffer
5. Reload Buffer The store queue does not get snooped because all EISA read accesses flush the store queue.

All snoops except EISA write buffer snoops conform to the MESI protocol and support snarfing and cache to cache transfers. The EISA write buffers are not snooped at all.

8.2.3 Scheduling Write Backs

Write-backs are scheduled in the following cases:

- A burst or DMA access runs off the end of a line.
- A DMA access is in progress and the EOP signal on the EISA bus gets asserted.
- A EISA write misses in the current write buffer.

8.2.4 Reload Policy

The reload policy is least recently used.

8.3 Store Queue

Bifrost implements a store queue for I/O and memory accesses to the EISA channel. The queue is eight 32 bit words deep. Partial word stores are not accumulated and writes always occur in order. There are many synchronizing events which flush the store queue. These are required to make the store queue transparent to software.

8.3.1 Flushing Events

The following events are synchronizing and flush the store queue:

- I/O reads
- Memory reads
- I/O writes which are non-postable.
- Memory writes which are non-postable.
- Interrupt acknowledge cycles.

8.4 Region Attribute Descriptors

Bifrost needs region attribute descriptors to describe many attributes:

Lethe Memory Map Bifrost-A generates Host local Mem to the EBC and must therefore know which portions of memory are on the Lethe Bus. Using the Memory controller descriptors would require arbitrating for the Lethe bus before we knew a transfer was going there and would negate some of the advantages of the split bus architecture. The descriptors actually contain a superset of the memory controller descriptors data:

- Descriptors for memory behind the memory controller
- Descriptors for memory on an additional EISA bus

- Descriptors for memory mapped Lethe devices – like a frame buffer.

EISA Memory Attributes There are eight[2] EISA memory regions whose attributes can be specified. The attributes of blocks in the region between 640K and 1Meg can also be specified. The attributes supported are:

Cachability Whether a Lethe master can cache the region.

Post Writes Whether writes to the region may be posted into the store queue.

Write Protected Whether writes to the region are actually performed by the hardware.

Regions not specified default to Cacheable, Post-writes, no write protect[3].

Lethe I/O Map Bifrost-A generates Host local I/O to the EBC and must therefore know which portions of the I/O space are on the Lethe bus.

EISA I/O Attributes There are eight[4] EISA I/O regions whose attributes can be specified. The attributes supported are:

Post Writes Whether writes to the region may be posted into the store queue.

I/O Recovery Whether back to back accesses to the region have hardware recovery time inserted between them.

Regions not specified default to no posted writes and a default I/O recovery time given in a Bifrost-A register depending on the size of the device.

8.4.1 Memory Descriptors

Memory descriptors are based on a sixteen bit base address and a sixteen bit mask. A VHDL description of the exact semantics is:

```
Hit <= ((address(31 downto 16) xor descriptorBase) and Mask) = X'0000' ;
```

8.5 Multiple EISA Channels

Bifrost allows the connection of two EISA channels to the Lethe system bus. This should allow Dell's systems to grow to very high data rates and capacities.

[2]The number could be changed.
[3]If this is presumptous, we could add a register which specified the defaults
[4]The number could be changed.

8.5.1 Limitations

Because of the architecture of the EISA channel, multiple channels cannot be entirely symmetric. This causes certain limitations:

- There is a maximum of fourteen EISA slots available if two channels are used. This is limit on geographical addressing in EISA and does not apply to memory mapped devices or ISA devices. The four channels are provided to support devices like Gnarly which might be able to use the entire bandwidth of a single EISA channel. A system would then need a channel for each Gnarly and then another channel for the rest of the devices.
- There is a specific default EISA bus. All accesses which are not known to go to another channel or main memory go to the default channel.
- All ISA adapter cards must go in the default channel.
- EISA channel to channel operations which transfer to other channels are not supported, as this introduces a deadlock situation which can not be handled. It also adds a considerable amount of descriptor logic to Bifrost with no apparent benefit.

8.5.2 Architecture

Interrupts

Interrupts are handled with the multiprocessor interrupt controller mechanism described in section 3.2 on page 26. Bifrost responds to its channel's interrupts providing the interrupt acknowledges and reading the vector from the PIC. It then does a table look up to determine which processor to send the interrupt to and which vector to give that processor. With this infromation it creates an interprocessor communication message[5] to instruct Hydra to interrupt the appropriate processor. Hydra then provides the vector to that processor when it responds with interrupt acknowledges. All other PIC accesses are handled by the processor.

There is a

I/O Accesses

All ISA I/O accesses get sent to the default EISA channel. EISA masters on channels other than the default channel have their ISA accesses sent out on the Lethe bus and onto the default channel.

EISA or geographically addressed I/O accesses get sent to the appropriate channel. Each channel has a sixteen bit bitmask indicating which geographical addresses it owns. It only responds to addresses in the range indicated in its bit map.

| Programmer's Note |
|---|
| The union of all these bitmaps in the system must have them all set to prevent hanging the system on geographical accesses which no channel responds to – A problem for EISA Config. |

[5]See section 3.1 on page 24.

Memory Accesses

Channel Hardware Resources

Each channel has the standard EISA hardware resources:

- DMA Channels
- Interrupt Controller
- Timer / Counters

These are all fully supported and are available for system use. The base I/O addesses of these devices on each channel are:

Channel 0 – default This channel uses the standard EISA I/O addresses in the ranges of X'0000' thru X'00FF' and X'0400' thru X'04FF'.

Channel 1 This channel uses I/O addresses in the ranges of X'0800' thru X'08FF' and X'0C00' thru X'0CFF'.

Channel 2 This channel uses I/O addresses in the ranges of X'F000' thru X'F0FF' and X'F400' thru X'F4FF'. This is in the address range of EISA slot fifteen and is why there can be only fourteen EISA slots in a machine with more than two channels.

Channel 3 This channel uses I/O addresses in the ranges of X'F800' thru X'F8FF' and X'FC00' thru X'FCFF'.

8.6 Lock Handling

8.7 Deadlock Prevention

Since Bifrost implements a two bus system, both of which get arbitrated for independently, there is a potential deadlock situation. This occurs when a Lethe bus master is performing a read form the EISA bus and a EISA master is simultaneously performing a read of system storage. Bifrost will notice this occurance before the end of the cacheability window. Lethe bus cycles can be prempted before the end of the cacheability window[6]. Bifrost can preempt the Lethe master, and run the EISA master cycle.

There is still a slight problem if the storage location being read from the EISA bus is dirty in somebody's cache. For this reason all EISA channel memory is marked as write thru by Bifrost.

The only uncovered deadlock is the case when two EISA devices on different EISA channels simultaneously attempt to perform a read access a device on each others channel. Since there is no way back off an EISA cycle this situation causes a deadlock. This situation will be detectable by Hydra who will have to handle the deadlock.

[6]BGT~ is never asserted to the C5 before KWEND~.

8.8 Address Map

| | 7/F | 6/E | 5/D | 4/C | 3/B | 2/A | 1/9 | 0/8 |
|---|---|---|---|---|---|---|---|---|
| X"00" | | | | | | | | |
| X"08" | | | | | | | | |
| X"10" | | | | | | | | |
| X"18" | | | | | | | | |
| X"20" | | | | | | | | |
| X"28" | | | | | | | | |
| X"30" | | | | | | | | |
| X"38" | | | | | | | | |
| X"40" | | | | | | | | |
| X"48" | | | | | | | | |
| X"50" | | | | | | | | |
| X"58" | | | | | | | | |
| X"60" | | | | | | | | |
| X"68" | | | | | | | | |
| X"70" | | | | | | | | |
| X"78" | | | | | | | | |
| X"80" | MRM1H | MRM1L | MRB1H | MRB1L | MRM0H | MRM0L | MRB0H | MRB0L |
| X"88" | MRM3H | MRM3L | MRB3H | MRB3L | MRM2H | MRM2L | MRB2H | MRB2L |
| X"90" | MRM5H | MRM5L | MRB5H | MRB5L | MRM4H | MRM4L | MRB4H | MRB4L |
| X"98" | MRM7H | MRM7L | MRB7H | MRB7L | MRM6H | MRM6L | MRB6H | MRB6L |
| X"A0" | MRM9H | MRM9L | MRB9H | MRB9L | MRM8H | MRM8L | MRB8H | MRB8L |
| X"A8" | MRMbH | MRMbL | MRBbH | MRBbL | MRMaH | MRMaL | MRBaH | MRBaL |
| X"B0" | MRMdH | MRMdL | MRBdH | MRBdL | MRMcH | MRMcL | MRBcH | MRBcL |
| X"B8" | MRMfH | MRMfL | MRBfH | MRBfL | MRMeH | MRMeL | MRBeH | MRBeL |
| X"C0" | MRA7 | MRA6 | MRA5 | MRA4 | MRA3 | MRA2 | MRA1 | MRA0 |
| X"C8" | MRAf | MRAe | MRAd | MRAc | MRAb | MRAa | MRA9 | MRA8 |
| X"D0" | | | | | | | BSMDH | BSMDL |
| X"D8" | | | | | | | | |
| X"E0" | | | | | | | | |
| X"E8" | | | | | | | | |
| X"F0" | | | | | | | | |
| X"F8" | | | | | | | | |

8.9 Registers

8.9.1 Control and Enables

BCR0 - Bifrost Configuration Register 0

| 15 | 14 | 13 | 12 | 11 | 10 | 9 | 8 | 7 | 6 | 5 | 4–3 | 2–0 |
|---|---|---|---|---|---|---|---|---|---|---|---|---|
| | | | | | | | | | | PA | SQE | CE |

CE Cache Enable – Specifies the level of functionality of the Bifrost cache.

B'000' ................ Cache totally disabled. No buffering. Each EISA access generates a corresponding Lethe access.

B'001' ............................ Single line buffer. A lookup is performed in the EISA read or write buffer. If it is a hit, the access occurs into the buffer, and does not require a Lethe access.

B'010' Single line buffer with prefetch. Same as above, but if the EISA master is performing sequential operations, the subsequent line is prefetched into the reload buffer.

B'011' ....... Write through cache no prefetch.

B'100' ..... Write through cache with prefetch.

B'101' .............................. prefetch.

B'110' .............................. prefetch.

B'111' .......................................

SQE Store Queue Enable – Specifies the level of functionality of the Bifrost store queue.

B'00' .. Store queue totally disabled. No writes are posted.

B'01' ... Post Memory writes only; obeying the region attribute descriptors of course.

B'10' . Post I/O writes only; obeying the region attribute descriptors of course.

B'11' ............................... Post both memory and I/O writes; obeying the region attribute descriptors of course.

PA Processor Arbitration.

B'0' ........... Processor is included in EISA arbitration only when it has a cycle to this particular bus.

B'1' ..... Processor is always included in EISA arbitration.

8.9.2 Region Descriptors

The sixteen bit registers in the memory region descriptors must be written atomically. The low byte must be written immediately followed by the high byte. The index register auto-increments in this order to facilitate this.

Programmer's Note

Failure to program the registers in this order can cause erroneous values to be written into the registers.

There is no constraint on the order in which these registers can be read.

MRBf - MRB0 – Memory Region Base Address

| 15 – 0 |
|---|
| Descriptor Base Address |

See section 8.4.1 on page 44 for a description on the function of these descriptors.

MRMf - MRM0 – Memory Region Mask

| 15 – 0 |
|---|
| Descriptor Address Mask |

See section 8.4.1 on page 44 for a description on the function of these descriptors.

MRAf - MRA0 – Memory Region Attributes

| 7 | 6 | 5 | 4 | 3 | 2 | 1 | 0 |
|---|---|---|---|---|---|---|---|
| KEN | PW | WP | C/D | | | | DE |

KEN Indicates whether the region is cacheable to a Lethe master. system.

B'0' .......................... Not cacheable.

B'1' .............................. Cacheable.

PW Indicates whether the Bifrost can post writes to the region.

B'0' ................... Writes can be posted.

B'1' ................... Writes are not posted.

C/D Indicates whether this is a conjunctive or disjunctive descriptor.

B'0' ............................. Conjunctive

B'1' ............................... isjunctive

DE Descriptior enable.

B'0' ............ Region descriptor is disabled.

B'1' ............ Region descriptor is enabled.

BSMD – Base System Memory Descriptor

| 15 – 0 |
|---|
| Higest Base System Memory Address + 1 |

GIOAM – Geographic I/O Address Map

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| S15 | S14 | S13 | S12 | S11 | S10 | S9 | S8 | S7 | S6 | S5 | S4 | S3 | S2 | S1 | S0 |

Sn Indicates which geographically addressed I/O ranges are serviced by this EISA channel. It is basically a bit map. The union of the GIOAMs in all Bifrosts must have all bits set. Bifrosts 0 and 1 must have bit S0 set, and Bifrosts 2 and 3 must have bit S15 set. Otherwise the there can be no intersection of the GIOAMs in all Bifrosts in the system.

0 .... I/O slot n is not on this particular EISA channel.

1 I/O slot n is on this particular EISA channel.

GIOSQE – Geographic I/O Store Queue Enable

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Q15 | Q14 | Q13 | Q12 | Q11 | Q10 | Q9 | Q8 | Q7 | Q6 | Q5 | Q4 | Q3 | Q2 | Q1 | Q0 |

Qn Indicates whether accesses to geographically addressed I/O ranges can be posted into the store queue. There should be no bits set in GIOSQE that are not also set in GIOAM.

0 .... Accesses to I/O slot n can not be posted.

1 ........ Accesses to I/O slot n can be posted.

8.9.3 Interrupt Mapping

Chapter 9

Bifrost-A – Address Path

9.1 Internal Architecture

9.1.1 Cache Tags

Tag Mapping

A memory address is mapped into the cache tags as follows:

| 31 ——— 16 | 15 – 12 | 11 — 5 | 4 — 0 |
|---|---|---|---|
| Tag High | Line Address | Tag Low | Byte in Line |

Tag High This is the upper 16 bits of the page address in memory. It is concatenated with the Tag low to generate the address put into the cache tags and compared on cache lookups.

Tag Low This is the line address within a page. It is concatenated with the Tag high to generate the address put into the cache tags and compared on cache lookups.

Line Address This is used to address the cache tags.

Byte in Line This selects the byte or word in the line. It does not appear in the cache tags.

The tags also contain two bits of state for each line:

| 1 | 0 |
|---|---|
| Valid | LRU bit |

Valid Indicates whether the cache line contains vaid data.

B'0' .................................. Invalid

B'1' .................................... Valid

Figure 9.1: Bifrost-A Address Paths

LRU bit Indicates wether this line has been used more recently than the corresponding line in the other set.

B'0' .... The other set was used more recently.

B'1' ......... This set was used more recently.

The cache tags thus contain 22 bits of address and 3 bits of state per set. The tags are implemented as two seperate 16 word by 25 bit three port register files. There is read port dedicated to Lethe and EISA so snoops and lookups can occur concurrently. The write port is used for tag state updates and reloads. Tag state updates are always performed after a read, and so the read data is still around. A merge is performed with the new state data and the old address data, so that a seperate write enable is not needed for the state bits.

Figure 9.2: Bifrost-A cache tags

9.2 Signals

9.2.1 Lethe Interface

| NAME | TYPE | DESCRIPTION | CLOCK |
|---|---|---|---|
| MA[31:3] | I/O | Lethe Address Bus | |
| MBE[7:0] | I/O | Byte enables indicate which bytes of the data bus have or are requesting data. | |
| MCLK | I/O | Lethe Bus Clock | |
| MADS~ | I/O | Lethe bus address strobe. | |
| MDBB~ | I/O | Data Strobe. This signal is driven by the device currently driving the data bus. For write cycles this means that as soon as the write data is available if the previous cycle's data phase is over, the mastering Asgard drives data and asserts the **MDBB~**. For read cycles **MDBB~** is asserted by the active slave when the data is available and the snoop window is over. | MCLK |
| MMIO | I/O | Memory or I/O Cycle Indication | |
| MDC | I/O | Data or Code Cycle Indication | |
| MWR | I/O | Write or Read Cycle Indication | |
| MLOCK~ | I/O | Lock Cycle Indication | |
| MBRDY~ | I/O | Burst Ready Indication | |
| MPICBUSY | O | Multiprocessor interrupt controller busy - indicates that Bifrost should not send IPCs because all elements of the interrupt queue are full. | |

9.2.2 Arbitration

| NAME | TYPE | DESCRIPTION | CLOCK |
|---|---|---|---|
| MREQ~ | O | M Bus Request. Each system node has an individual version of this pin. | MCLK |
| MGR~ | I | M Bus Grant. Each system node has an individual version of this pin. | MCLK |

9.2.3 Cacheability Support

| NAME | TYPE | DESCRIPTION | CLOCK |
|---|---|---|---|
| MKWEND~ | O | Cacheability window end indication. Driven by each snooping device. | MCLK |
| MKWENDc~ | I | Cacheability window end indication. The logical OR of the MKWENDo~ signals. | MCLK |
| MWT~ | O | Cacheability type. Active slave drives valid level, others drive asserted. | MCLK |
| MWTc~ | I | Cacheability type. Indicates that the current cycle is write through. Sampled at the end of the cachebility window by the current master. | MCLK |
| MRO~ | O | Read only indication. Active slave drives valid level, others drive asserted. | MCLK |
| MROc~ | I | Read only indication. Indicates that the current cycle is ultimately from a read only device, and that, when cached, it should not be affected by writes. Sampled at the end of the cachebility window by the current master. | MCLK |
| MKENc~ | I | Cacheability indication. Sampled at the end of the cachebility window by the current master. | MCLK |
| MKEN~ | O | Cacheability indication. Indicates that the current cycle is cacheable. Active slave drives valid level, others drive asserted. | MCLK |

9.2.4 Snooping Support

| NAME | TYPE | DESCRIPTION | CLOCK |
|---|---|---|---|
| MSWEND~ | O | Snooping window end indication. Driven by each snooping device. | MCLK |
| MSWENDc~ | I | Snooping window end indication. The logical OR of the MSWENDo~ signals. | MCLK |
| MSNPSTB~ | I/O | Snoop strobe indication. Driven by current bus master for one clock when snoop is required. | MCLK |
| MTHITc~ | I | Tag hit. Input to current bus master. Indicates that the current cycle is a hit to a slaves cache. Sampled at the end of the snoop window by the current bus master. | MCLK |
| MTHIT~ | O | Tag hit. Active slave drives valid level, others drive asserted. | MCLK |
| MHITMc~ | I | Tag hit to modified line. Input to current bus masters MBC. Indicates that the current cycle is a hit to this slaves cache, and that line has been modified. | MCLK |
| MHITM~ | O | Tag hit to modified line. Indicates that the current cycle is a hit to the slaves cache, and that line has been modified. | MCLK |

9.2.5 Virtual Host Bus Interface

| NAME | TYPE | DESCRIPTION | SOURCE |
|---|---|---|---|
| SA[31:2] | I/O | Virtual host address bus. | |
| SBE~[3:0] | I/O | Byte enables indicate which bytes of the data bus have or are requesting data. | |
| SAS~ | I/O | System Address Strobe | |
| IASALE~ | I/O | Internal Address to System Address Latch Enable - Gates the address output latch and also increments the address in virtual host bus burst sequenecs. | |
| SARDY~ | I/O | System Asynchronous Ready | |
| SM/IO~ | I/O | Memory / $\overline{\text{IO}}$ | |
| SW/R~ | I/O | Write / $\overline{\text{Read}}$ | |
| SD/C~ | I/O | Data / $\overline{\text{Control}}$ | |
| SLOCK~ | I/O | Lock | |
| SBURST~ | I/O | System Burst Indicator | |
| SHOLD | I/O | Hold Request | |
| SHLDA | I/O | Hold Acknowledge | |
| SLOCMEM~ | O | System Local Memory - Indicates that the the current memory cycle will be serviced from somewhere other than the EISA bus. | |
| SLOCIO~ | O | System Local I/O - Indicates that the the current I/O cycle will be serviced from somewhere other than the EISA bus. | |

9.2.6 EISA and ISA Interface

| NAME | TYPE | DESCRIPTION | SOURCE |
|---|---|---|---|
| BCLK | I | Bus Clock | |
| START~ | I | Provides timing control at the start of an EISA cycle | |
| CMD~ | I | Provices timing control within an EISA cycle | |
| MSBURST~ | I/O | Indicates that the current EISA master desires to use burst timings on subsequent cycles. | |
| SLBURST~ | I/O | Indicates that the current EISA slave is capable of using burst timings on subsequent cycles. | |
| REFRESH~ | I | Refresh in progress – indicates the current EISA cycle is a refresh and the cycle need not be refected onto the system bus. | |
| EOP | I/O | End Of Process – indicates the current cycle is the last transfer in a DMA process. | |
| LIOWAIT~ | O | Long I/O Wait – controls the delay between back to back I/O cycles to 8 and 16 bit ISA slaves. | |
| INT | I | CPU interrupt request from ISP | |

9.2.7 Bifrost-D Interface

| NAME | TYPE | DESCRIPTION | SOURCE |
|---|---|---|---|
| CLA[7:0] | O | Cache line address. Bits 8:3 specify the cache line. Bits 2:0 specify the starting address in the line to begin a transfer. | Bifrost-A |
| CTC[2:0] | O | Cache transfer command. An opcode defining what type of cache data transfer to perform. The opcodes are defined in section 10.2.2 on page 63. | Bifrost-A |
| CCS~ | O | Cache command strobe. | Bifrost-A |
| CCACK~ | O | Cache command acknowledge | Bifrost-A |

9.2.8 Boundary Scan Support

| NAME | TYPE | DESCRIPTION | CLOCK |
|---|---|---|---|
| TDI | I | Test Data In | TCLK |
| TDO | O | Test Data Out | TCLK |
| TCLK | I/O | Test Clock | |
| TMDS | I/O | Test Mode Select | TCLK |

9.2.9 Miscellaneous

| NAME | TYPE | DESCRIPTION | SOURCE |
|---|---|---|---|

Chapter 10

Bifrost-D – Data Path

10.1 General

Bifrost-D is the data path chip of the Bifrost Lethe system bus to EISA I/O channel bridge. The system requires two Bifrost-D's for the complete data path. Each Bifrost-D connects to 32 Lethe data bits and 16 EISA data bits.

Bifrost-D has three main functions:

- Eight deep store queue for stores addressed to the EISA channel.
- 32 line by 32 byte line cache of system storage which has recently or will be soon referenced by EISA masters or DMA channels.
- Flow through path to connect Lethe bus to EISA channel.

10.2 Internal Architecture

10.2.1 Data Path Elements

10.2.2 Data Transfer Control

Lethe Data Transfer Control

Cache Data Transfer Control

Cache transfers are handled by high level commands from Bifrost-A. The command interface has four signals groups:

CLA – Cache Line Address Specifies the cache line to transfer, also specifies word in line on which to start the transfer.

CTC – Cache Transfer Command High level cache transfer command opcodes. The defined opcodes are:

Figure 10.1: Bifrost-D data path

| NAME | OPCODE | DESCRIPTION |
|---|---|---|
| NOP | 000 | No operation. |
| FWBB | 001 | Fill write back buffer from cache. |
| DRLB | 010 | Dump reload buffer into cache. |
| DEWB | 011 | Dump EISA write buffer into cache. |
| DEWBM | 100 | Dump EISA write buffer into cache with merge from reload buffer. |
| DEWBB | 101 | Dump EISA write buffer into write back buffer. |
| FERB | 110 | Fill EISA read buffer. |
| DFRB | 111 | Dump reload buffer into cache and concurrently fill EISA read buffer. |

CCS~ – Cache Command Strobe Indicates that CLA and CTC are valid and stable and to begin the request cache transfer.

CCACK~ – Cache Command Acknowledge Indicates the the requested cache transfer has completed, and the cache is available for another transfer.

EISA Data Transfer Control

10.3 Signals

10.3.1 Lethe Interface

| NAME | TYPE | DESCRIPTION | SOURCE |
|---|---|---|---|
| MD[31:0] | I/O | Lethe Data Bus | |
| MDP[3:0] | I/O | Lethe Data Bus Parity | |
| MDPE | I/O | Lethe Data Bus Parity Error | |
| MCLK | I/O | Lethe Bus Clock | |
| MOCLK | I/O | Lethe Bus output clock | |

10.3.2 System Bus Interface

| NAME | TYPE | DESCRIPTION | SOURCE |
|---|---|---|---|
| SD[15:0] | I/O | EISA Data Bus. | |
| SBE~[1:0] | I/O | Byte enables indicate which bytes of the data bus have or are requesting data. | |
| IDSDLE~ | I | Internal Data to System Data Latch Enable | |
| SDVLD | I | System Data Valid Strobe. | |
| SDIDLE~[1:0] | I | System to Internal Data Latch Enables (Byte 1,0) | |
| CPYEN~ | I | Copy Enable | |
| SOE~[1:0] | I/O | System Output Enables | |
| CPYUP | I | Copy Up | |
| SIOE~ | I/O | System Internal Output Enable | |

10.3.3 Bifrost-A Interface

| NAME | TYPE | DESCRIPTION | SOURCE |
|---|---|---|---|
| CLA[8:0] | I | Cache line address. Bits 8:3 specify the cache line. Bits 2:0 specify the starting address in the line to begin a transfer. | Bifrost-A |
| CTC[2:0] | I | Cache transfer command. An opcode defining what type of cache data transfer to perform. The opcodes are defined in section 10.2.2 on page 63. | Bifrost-A |
| CCS~ | I | Cache command strobe. | Bifrost-A |
| CCACK~ | I | Cache command acknowledge | Bifrost-A |

10.3.4 Boundary Scan Support

| NAME | TYPE | DESCRIPTION | CLOCK |
|---|---|---|---|
| TDI | I | Test Data In | TCLK |
| TDO | O | Test Data Out | TCLK |
| TCLK | I/O | Test Clock | |
| TMDS | I/O | Test Mode Select | TCLK |

Chapter 11

Asgard – the Memory Bus Controller

Asgard - *The citadel of the Norse gods. It has many mansions.*

11.1 General

Asgard serves as the interface between the C5/C8 cache controller and the Lethe system bus. It controls the C5/C8's access to the bus completely, making use of the C5's status outputs to discern the C5's needs. It provides the snooping interface to and from the C5. This interface is responsible for maintaining system memory coherency. Asgard's major components[1] are:

4 CPU transfer tracking

5 Lethe bus transfer tracking

3 Bus error detection and retry

2 Cache flushing and sync–ing

7 Lethe bus pipelining

10 Cacheability decode

17 Snoop write–backs (as sub–Master)

M1 Snoop window control to C5

M2 Backoff of C5 when master cycle was another caches dirty line

[1] These are described in detail in Intel's "Designing a Memory Bus Controller for the C5/C8 Cache". They are numbered here and in that document on page 13.

M3 Snoop filtering (as master)

M4 Read snarfing

M5 Read–for–ownership cycle control

M7 Memory cycle abort

M8 LOCK~ protection

M9 LOCK~ de–assertion between separate processor lock's

M11 Snooping during LOCK's

M12 Multiprocessor Interrupts

11.2 CPU Transfer Tracking

Asgard monitors the CPU's bus state. When the CPU misses the C5 on a line fill Asgard is responsible for returning BRDY~'s directly to the CPU. This state is indicated by the C5 with the RDYSRC signal.

11.3 Lethe Bus Transfer Tracking

Asgard handles the C5/C8 → Lethe bus interface.

11.3.1 Lethe Master

Asgard fields cycle requests from the C5, arbitrates for the Lethe bus, and performs the cycle. It handles all translation of MCLK–ed Lethe signals to/from the CLK–ed C5 signals. It also controls snoop initiation and feedback of snoop/cacheability information to the C5.

Lethe master cycles are initiated with the assertion of CADS~. CADS~ occurs when the processor requires information not available in the C5/C8, the processor wants to write to a location outside of the C5/C8, or the processor has issued an I/O or special cycle.

Read Miss When the processor misses the C5/C8 on a memory read cycle, the C5 issues a CADS~ with the memory read indicated on CMIO and CWR. Asgard arbitrates for the Lethe bus if it does not already have ownership. When MGR~ is asserted Asgard asserts MADS~ along with memory read.

11.3.2 Lethe Slave

When other Lethe nodes have mastership of the Lethe bus, Asgard responds to their cycles with snoops to the C5[2]. Asgard votes on the duration of the snoop window. It also forwards the snooped

[2]The C5 autonomously handles CPU snooping.

line's state via MTHIT~ and MHITM~. When the snooped line is dirty Asgard executes a write-back of the dirty line. The write-back cycle is signaled by the assertion of SNPADS~. Asgard is immediately given sub-mastership of Lethe. Asgard supplies the dirty data as soon as he samples MDBB~ de-asserted. When the entire line has been transferred, Asgard relinquishes the bus to the previous master.

11.4 Asgard Signals

11.4.1 Lethe Bus

Cycle Control

| NAME | TYPE | DESCRIPTION | CLOCK |
|---|---|---|---|
| MADS~ | I | Lethe bus **AD**dress **S**trobe. | MCLK |
| MDBB~ | I/O | **D**ata **B**us **B**usy | MCLK |
| MMIO | I/O | **M**emory or **I/O** Cycle Indication | MCLK |
| MDC | I/O | **D**ata or **C**ode Cycle Indication | MCLK |
| MWR | I/O | **W**rite or **R**ead Cycle Indication | MCLK |
| MPALLC~ | I/O | **P**otential **Al**locate Indication | MCLK |
| MLOCK~ | I/O | LOCK Cycle Indication | MCLK |
| MBRDY~ | I/O | **B**urst **Rea**DY Indication | MCLK |
| MBLAST~ | I/O | **B**urst **LAST** Indication | MCLK |

Snooping

| NAME | TYPE | DESCRIPTION | CLOCK |
|---|---|---|---|
| SNPWB~ | I/O | SNooP Write Back enable signal. Indicates that the current snoop can cause a write-back. Connects to the C5 and Asgard. | MCLK |
| SNPNCA~ | I/O | SNooP Non-Cacheable Address signal. Indicates that the current snoop is being instigated by a non-cacheing master this means that a slave that has a dirty copy of the line requested need not go to the Shared state. Connects to the C5 and Asgard. | MCLK |
| MTHITc~ | I | Indicates that the line being snooped is present in a slave's cache. Sunk by the C5 and Asgard. Driven as the MCLK-ed AND of all slaves MTHIT~'s. | MCLK |
| MHITMc~ | I | Indicates that the line being snooped is dirty in a slave's cache. Sunk by the C5 and Asgard. Driven as the MCLK-ed AND of all slaves MTHIT~'s. | MCLK |

Arbitration

| NAME | TYPE | DESCRIPTION | CLOCK |
|---|---|---|---|
| MREQ~ | O | M Bus Request. Each system node has an individual version of this pin. | MCLK |
| MGR~ | I | M Bus Grant. Each system node has an individual version of this pin. | MCLK |

11.4.2 C5/C8

C5/C8 Cycle Control

| NAME | TYPE | DESCRIPTION | CLOCK |
|---|---|---|---|
| CADS~ | I | C5/C8 Address Strobe. | CLK |
| CDTS~ | I | C5/C8 DaTa Strobe. | CLK |
| CMIO | I | C5/C8 Memory (High) I/O (Low) indication. | CLK |
| CDC | I | C5/C8 Data Code indication. | CLK |
| CWR | I | C5/C8 Write Read indication. | CLK |
| CNA~ | I | C5/C8 Next Address request. | CLK |
| CLEN[1:0] | I | C5/C8 Cycle LENgth indication. | CLK |
| KLOCK~ | I | C5/C8 lock cycle indication. | CLK |
| MCACHE~ | I | C5/C8 cache intent signal. Indicates that the C5 would like to cache the cycle. | CLK |
| PALLC~ | I | C5/C8 potential allocate cycle indication. | CLK |
| RDYSRC~ | I | C5/C8 ready source. A high level indicates that the C5 will supply BRDY~'s to the processor. A low level indicates that Asgard should source the BRDY~'s. | CLK |
| SMLN~ | I | C5/C8 indication that the current cycle is the same C5 line as the last one. | CLK |
| MTHIT~ | O | Indicates that the line being snooped is present in a slave's cache. Equivalent to MTHITc~ sync—ed to CLK. | CLK |
| MHITM~ | O | Indicates that the line being snooped is dirty in a slave's cache. Equivalent to MHITMc~ sync—ed to CLK. | CLK |
| BGT~ | O | Bus guarranteed transfer | CLK |

C5/C8 Buffer Control

| NAME | TYPE | DESCRIPTION | CLOCK |
|---|---|---|---|
| MAOE~ | O | C5 memory address output enable. | MCLK |
| MBAOE~ | O | C5 memory burst address output enable. | MCLK |
| MDOE~ | O | C8 memory data output enable. | MCLK |
| MFRZ~ | O | C8 memory data freeze enable. Hold current C8 memory buffers contents to allow for merging in linefill. | MCLK |
| MSEL~ | O | C8 memory buffer chip select. Gates MBRDY~ and resets line counter of selected C8. | MCLK |
| FLUSH~ | O | C5 cache flush. | MCLK |
| SYNC~ | O | C5 cache synchronization. Dumps all dirty lines. | MCLK |

11.4.3 CPU

| NAME | TYPE | DESCRIPTION | CLOCK |
|---|---|---|---|
| BRDY~ | I | CPU burst ready indication. | CLK |

11.4.4 General

| NAME | TYPE | DESCRIPTION | CLOCK |
|---|---|---|---|
| CLK | I | $66\frac{2}{3}$ MHz CPU clock. | |
| MCLK | I | $33\frac{1}{3}$ MHz Lethe bus clock. | |
| RESET | I | System reset ($\geq$ 4100 CLK's). | CLK |

11.4.5 Boundary Scan Support

| NAME | TYPE | DESCRIPTION | CLOCK |
|---|---|---|---|
| TDI | I | Test Data In | TCLK |
| TDO | O | Test Data Out | TCLK |
| TCLK | I | Test Clock | |
| TMDS | I | Test Mode Select | TCLK |

Chapter 12

Gryphon – the Memory Controller

Gryphon- *A fabulous animal, with the body of a lion and the head and wings of an eagle.*

12.1 General

Gryphon is a high perfomance DRAM controller. It is implemented as an address/control chip, and a Data flow chip. Both will be implemented as 160 pin PQFP's with 1 micron gate array process. The chip set resides between the Lethe system bus and the DRAM. It is characterized by the following features:

- Support for 16 to 512 Megabytes of DRAM
- Support for 4 to 16 SIMMs
- One clock per beat in all Line transfers
- Low memory latency
- ECC only
- Peak Read Bandwidth of 256 Megabytes per Second
- Peak Write Bandwidth of 256 Megabytes per Second

12.2 Memory Architecture

High average memory bandwidth is achieved at minimal cost with the following architectural features:

- Two-Way Double Word Interleave
- One to Four Way Page Interleaving

- Write–Merging
- Integrated, Pipelined ECC circuitry
- Separate Read and Write Syndrome Generators
- Single Chip Data Buffering
- Unbuffered CASes
- Bursted Refresh
- Fully Synchronous Memory Interface

12.3 Macro Architecture

12.3.1 Address Controller

The address/control chip is responsible for overall control of the memory subsystem. Its functionality is divided into six inter-related components. These are:

- Lethe bus bus tracking logic
- DRAM control logic
- Address muxing logic
- Data Flow control logic
- RCR Logic
- Register Logic The interaction between these blocks is shown in Figure 12.1.

Lethe Bus Tracking

The Lethe bus is tracked with the Lethe bus model included in this document's appendices. This front end[1] of the Lethe bus model is common to all Lethe nodes. The back end is customized for Gryphon. It will be described in greater detail as that detail becomes available.

[1]The portion of the model which sits directly on the Lethe bus.

Figure 12.1: Address / Control Chip

DRAM Control Logic

Address Mapping Logic

Data Flow Control Logic

RCR Mapping

The memory which resides behind Gryphon is mappable within the mapping quidelines of ??. For the most part memory is contiguous. Gryphon maps a primary memory region. Disjunctive memory regions are used to eliminate regions within the primary memory area to other Lethe nodes. There are no conjunctive memory regions. The system's memory mapping is discussed in more detail in Section 5.3 on page 30.

Primary mapping is handled by a RAM Configuration RAM. RCR entries map memory regions of either 8 or 16 MBytes. There are 32 RCR entries. The entries are divided into 4 components. The mapping of these components is shown below.

| | → WAY-3 ← | → WAY-2 ← | → WAY-1 ← | → WAY-0 ← |
|---|---|---|---|---|
| Region 0 | a | b | c | d |
| Region 1 | a | b | c | d |
| | | ⋮ | | |
| Region 30 | a | b | c | d |
| Region 31 | a | b | c | d |

Within the 8 or 16 MByte regions referred to by each RCR entry the memory can be hashed between the system's four banks. The mapping is contained in the four WAY components. The four WAY components divide each RCR entry's memory region into four sub-regions. This partitioning is shown below, where A[31:3] represents the current address, $W_n$ represents the memory mapped behind WAY-$N$, $M$ represents the memory mapped behind the current RCR entry, and i and j are address bit positions 14 and 13 for 8 MByte mode or 15 and 14 for 16 MByte mode.

$$\forall_{0 \leq n \leq 3} W_n \subset M, where A[i:j] = n \quad (12.1)$$

Register Control Logic

Gryphon's registers sit on eight bits of the Lethe data bus. The exact byte position is deturmined by Gryphon at runtime. This is required to limit the loads on the Lethe data bus.

The registers are indexed within the Chimæra register I/O port. The mapping is discussed in more detail in Section 5.5 on page 32.

12.3.2 Data Flow Chip

The data control chip is the conduit between the Lethe system bus and the memory data bus. It is also responsible for ECC syndrome generation and data correction. A block diagram for the data chip is shown in Figure 12.2. The data flow chip ECC generation and correction is flow through. Consequently processor reads need not be held back from the processor. ECC is implemented on 32 bit wide data quantities. This speeds syndrome generation, lessons the frequency of read-modify-writes, and reduces the overall chip cost dramatically.

ECC Syndome

The syndrome mapping is:

Figure 12.2: Data Flow Chip

| | High Short's Data Bits | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Syn0 | | | 0 | | 0 | | | | | 0 | | | 0 | | 0 | |
| Syn1 | | 1 | | | | 1 | | 1 | | | | | | | | |
| Syn2 | | | | | | | | | 2 | 2 | 2 | 2 | 2 | 2 | 2 | 2 |
| Syn3 | 3 | 3 | 3 | 3 | 3 | 3 | 3 | 3 | 3 | 3 | 3 | 3 | | | | |
| Syn4 | 4 | 4 | 4 | 4 | | | | | | | 4 | | | | 4 | 4 |
| Syn5 | | | | 5 | 5 | 5 | 5 | | | | | 5 | 5 | 5 | | |
| Syn6 | 6 | | | | | | 6 | 6 | 6 | | | | | 6 | | 6 |

| | Low Short's Data Bits | | | | | | | | | | | | | | | |
|---|---|---|---|---|---|---|---|---|---|---|---|---|---|---|---|---|
| | 15 | 14 | 13 | 12 | 11 | 10 | 09 | 08 | 07 | 06 | 05 | 04 | 03 | 02 | 01 | 00 |
| Syn0 | | | | | | | | 0 | 0 | 0 | 0 | 0 | 0 | 0 | 0 | 0 |
| Syn1 | 1 | 1 | 1 | 1 | 1 | 1 | 1 | 1 | 1 | 1 | 1 | 1 | | | | |
| Syn2 | 2 | 2 | 2 | 2 | | | | | 2 | | | | 2 | | | |
| Syn3 | 3 | | | | | | | 3 | | | | | | | | 3 |
| Syn4 | | | | 4 | 4 | 4 | | | | | | 4 | | | 4 | |
| Syn5 | | | 5 | | | 5 | 5 | | | | 5 | | | 5 | | |
| Syn6 | | 6 | | | 6 | | 6 | | | 6 | | | 6 | 6 | 6 | 6 |

The ECC syndromes equations are:

Syn0= $MD0 \oplus MD1 \oplus MD2 \oplus MD3 \oplus MD4 \oplus MD5 \oplus MD6 \oplus MD7 \oplus MD8 \oplus MD17 \oplus MD19 \oplus MD22 \oplus MD27 \oplus MD29$

Syn1= $MD4 \oplus MD5 \oplus MD6 \oplus MD7 \oplus MD8 \oplus MD9 \oplus MD10 \oplus MD11 \oplus MD12 \oplus MD13 \oplus MD14 \oplus MD15 \oplus MD24 \oplus MD26 \oplus MD30$

Syn2= $MD3 \oplus MD7 \oplus MD12 \oplus MD13 \oplus MD14 \oplus MD15 \oplus MD16 \oplus MD17 \oplus MD18 \oplus MD19 \oplus MD20 \oplus MD21 \oplus MD22 \oplus MD23$

Syn3= $MD0 \oplus MD8 \oplus MD15 \oplus MD20 \oplus MD21 \oplus MD22 \oplus MD23 \oplus MD24 \oplus MD25 \oplus MD26 \oplus MD27 \oplus MD28 \oplus MD29 \oplus MD30 \oplus MD31$

Syn4= $MD1 \oplus MD4 \oplus MD10 \oplus MD11 \oplus MD12 \oplus MD16 \oplus MD17 \oplus MD21 \oplus MD28 \oplus MD29 \oplus MD30 \oplus MD31$

Syn5= $MD2 \oplus MD5 \oplus MD9 \oplus MD10 \oplus MD11 \oplus MD18 \oplus MD19 \oplus MD20 \oplus MD25 \oplus MD26 \oplus MD27 \oplus MD28$

Syn6= $MD0 \oplus MD1 \oplus MD2 \oplus MD3 \oplus MD6 \oplus MD9 \oplus MD11 \oplus MD14 \oplus MD16 \oplus MD18 \oplus MD23 \oplus MD24 \oplus MD25 \oplus MD31$

Write Merging

The Lethe bus allows processors to write data before the snoop window has resolved. In consequence, writes must be merged with write–back lines when write–backs occur. The data flow chip handles this. Write cycles are sunk by Gryphon as soon as data is available. When the snoop window closes, Gryphon samples MHITM~. If MHITM~ is asserted, the write–back data is combined with the write–once data and the line is written to memory. If MHITM~ is de-asserted, the write–once data is written to memory.

12.4 Address Map

| | 7/F | 6/E | 5/D | 4/C | 3/B | 2/A | 1/9 | 0/8 |
|---|---|---|---|---|---|---|---|---|
| X"00" | | | | | | | | |
| X"08" | | | | | | | | |
| X"10" | | | | | | | | |
| X"18" | | | | | | | | |
| X"20" | | | | | | | | |
| X"28" | | | | | | | | |
| X"30" | | | | | | | | |
| X"38" | | | | | | | | |
| X"40" | | | | | | | | |
| X"48" | | | | | | | | |
| X"50" | | | | | | | | |
| X"58" | | | | | | | | |
| X"60" | | | | | | | | |
| X"68" | | | | | | | | |
| X"70" | | | | | | | | |
| X"78" | | | | | | | | |
| X"80" | MRM1H | MRM1L | MRB1H | MRB1L | MRM0H | MRM0L | MRB0H | MRB0L |
| X"88" | MRM3H | MRM3L | MRB3H | MRB3L | MRM2H | MRM2L | MRB2H | MRB2L |
| X"90" | MRM5H | MRM5L | MRB5H | MRB5L | MRM4H | MRM4L | MRB4H | MRB4L |
| X"98" | MRM7H | MRM7L | MRB7H | MRB7L | MRM6H | MRM6L | MRB6H | MRB6L |
| X"A0" | | | | | | | | |
| X"A8" | | | | | | | | |
| X"B0" | | | | | | | | |
| X"B8" | | | | | | | | |
| X"C0" | MRA7 | MRA6 | MRA5 | MRA4 | MRA3 | MRA2 | MRA1 | MRA0 |
| X"C8" | | | | | | | | |
| X"D0" | | | | | | | | |
| X"D8" | | | | | | | | |
| X"E0" | | | | | | | | |
| X"E8" | | | | | | | | |
| X"F0" | | | | | | | | |
| X"F8" | | | | | | | | |

12.5 Registers

12.5.1 Region Descriptors

The sixteen bit registers in the memory region descriptors must be written atomically. The low byte must be written immediately followed by the high byte. The index register auto-increments in this order to facilitate this.

Programmer's Note

Failure to program the registers in this order can cause erroneous values to be written into the registers.

There is no constraint on the order in which these registers can be read.

MRBf - MRB0 – Memory Region Base Address

| 15 – 0 |
|---|
| Descriptor Base Address |

See section 8.4.1 on page 44 for a description on the function of these descriptors.

MRMf - MRM0 – Memory Region Mask

| 15 – 0 |
|---|
| Descriptor Address Mask |

See section 8.4.1 on page 44 for a description on the function of these descriptors.

MRAf - MRA0 – Memory Region Attributes

| 7 | 6 | 5 | 4 | 3 | 2 | 1 | 0 |
|---|---|---|---|---|---|---|---|
| KEN | PW | WP | C/D | | | | DE |

KEN Indicates whether the region is cacheable to a Lethe master. system.

B'0' .......................... Not cacheable.

B'1' .............................. Cacheable.

PW Indicates whether the Bifrost can post writes to the region.

B'0' .................... Writes can be posted.

B'1' .................... Writes are not posted.

C/D Indicates whether this is a conjunctive or disjunctive descriptor.

B'0' .............................. Conjunctive

B'1' ............................... Disjunctive

DE Descriptior enable.

B'0' ............ Region descriptor is disabled.

B'1' ............ Region descriptor is enabled.

12.6 Signals

12.6.1 GryphonA

Lethe Bus Control

| NAME | TYPE | DESCRIPTION | CLOCK |
|---|---|---|---|
| MA[31:3] | I | Lethe Address Bus | MCLK |
| MSEQ~ | I | Lethe Address Bus Sequencial Ordering | MCLK |
| MBE~[7:0] | I | Byte enables indicate which bytes of the data bus have or are requesting data. | MCLK |
| MADS~ | I | Address Strobe | MCLK |
| MDBB~ | I | Data Bus Busy. | MCLK |
| MMIO | I | Memory or I/O CycleIndication | MCLK |
| MDC | I | Data or Code Cycle Indication | MCLK |
| MWR | I | Write or Read Cycle Indication | MCLK |
| MPALLC~ | I | Potential Allocation Cycle Indication | MCLK |
| MLOCK~ | I | Lock Cycle Indication | MCLK |
| MBRDY~ | I/O | Burst Ready Indication | MCLK |
| MBLAST~ | I/O | Burst Last Indication | MCLK |

Lethe Cachability

| NAME | TYPE | DESCRIPTION | CLOCK |
|---|---|---|---|
| MKWEND~ | I | Snooping window end indication. | MCLK |
| MRO~ | I/O | Read only indication. Driven by Gryphon. Indicates that the current cycle is ultimately from a read only device, and that, when cached, it should not be affected by writes. Active slave drive drives valid level, others drive deasserted. | MCLK |

Lethe Snooping

| NAME | TYPE | DESCRIPTION | CLOCK |
|---|---|---|---|
| MSWENDc~ | I | Snooping window end indication. The logical OR of the MSWENDo~ signals. | MCLK |
| MHITMc~ | I | Tag hit to modified line. Input to current bus masters MBC. Indicates that the current cycle is a hit to this slaves cache, and that line has been modified. | MCLK |

Gryphon Handshake

| NAME | TYPE | DESCRIPTION | CLOCK |
|---|---|---|---|
| GSTART~ | I | Memory Cycle Indication. | MCLK |

Memory Interface

| NAME | TYPE | DESCRIPTION | CLOCK |
|---|---|---|---|
| RASea[1:0] | O | Bank A Odd Row Address Strobe. | |
| RASeb[1:0] | O | Bank B Odd Row Address Strobe. | |
| RASec[1:0] | O | Bank C Odd Row Address Strobe. | |
| RASed[1:0] | O | Bank D Odd Row Address Strobe. | |
| RASoa[1:0] | O | Bank A Even Row Address Strobe. | |
| RASob[1:0] | O | Bank B Even Row Address Strobe. | |
| RASoc[1:0] | O | Bank C Even Row Address Strobe. | |
| RASod[1:0] | O | Bank D Even Row Address Strobe. | |
| CASea[7:0] | O | Bank A Odd Column Address Strobe. | |
| CASeb[7:0] | O | Bank B Odd Column Address Strobe. | |
| CASec[7:0] | O | Bank C Odd Column Address Strobe. | |
| CASed[7:0] | O | Bank D Odd Column Address Strobe. | |
| CASoa[7:0] | O | Bank A Even Column Address Strobe. | |
| CASob[7:0] | O | Bank B Even Column Address Strobe. | |
| CASoc[7:0] | O | Bank C Even Column Address Strobe. | |
| CASod[7:0] | O | Bank D Even Column Address Strobe. | |
| A[11:2] | O | Memory address bus. | |
| Ae[1:0] | O | Even way memory address bits 1 and 0. | |
| Ao[1:0] | O | Odd way memory address bits 1 and 0. | |
| Wo | O | Even way write enable. | |
| We | O | Odd way write enable. | |

General

| NAME | TYPE | DESCRIPTION | CLOCK |
|---|---|---|---|
| MCLK | I | $33\frac{1}{3}$ MHz Lethe bus clock. | |

Boundary Scan

| NAME | TYPE | DESCRIPTION | CLOCK |
|---|---|---|---|
| TCLK | I | Scan Test Clock. | |
| TDO | o | Scan Data Out. | |
| TDI | I | Scan Data In. | |
| TMODE | I | Scan Mode Selection. | |

12.6.2 GryphonD

Lethe Bus Control

| NAME | TYPE | DESCRIPTION | CLOCK |
|---|---|---|---|
| MA[31:3] | I | Lethe address bus. | MCLK |
| MD[35:0] | I/O | Lethe Data Bus | MCLK |
| MBE~[3:0] | I | Byte enables indicate which bytes of the data bus have or are requesting data. | MCLK |
| MADS~ | I | Address Strobe | MCLK |
| MDBB~ | I | Data Bus Busy. | MCLK |
| MMIO | I | Memory or I/O CycleIndication | MCLK |
| MDC | I | Data or Code Cycle Indication | MCLK |
| MWR | I | Write or Read Cycle Indication | MCLK |
| MPALLC~ | I | Potential Allocation Cycle Indication | MCLK |
| MBRDY~ | I | Burst Ready Indication | MCLK |
| MBLAST~ | I | Burst Last Indication | MCLK |

Lethe Snooping

| NAME | TYPE | DESCRIPTION | CLOCK |
|---|---|---|---|
| MSWENDc~ | I | Snoop Window End Indication. | MCLK |
| MHITMc~ | I | Snoop Hit Modified Indication. | MCLK |

Gryphon Handshake

| NAME | TYPE | DESCRIPTION | CLOCK |
|---|---|---|---|
| GSTART~ | I | Memory Cycle Indication. | MCLK |

Memory Interface

| NAME | TYPE | DESCRIPTION | CLOCK |
|---|---|---|---|
| Do[38:0] | I/O | Odd way memory data bus. | |
| De[38:0] | I/O | Even way memory data bus. | |

General

| NAME | TYPE | DESCRIPTION | CLOCK |
|---|---|---|---|
| MCLK | I | $33\frac{1}{3}$ MHz Lethe bus clock. | |

Boundary Scan

| NAME | TYPE | DESCRIPTION | CLOCK |
|---|---|---|---|
| TCLK | I | Scan Test Clock. | |
| TDO | o | Scan Data Out. | |
| TDI | I | Scan Data In. | |
| TMODE | I | Scan Mode Selection. | |

Chapter 13

Hydra – the System Controller

Hydra - *A mythical nine headed creature.*

13.1 Architecture

Hydra is the system controller. It integrates all the multiprocessor unique functionality of the system. This includes:

- Lethe system bus arbitration.
- Interprocessor communications (IPCs).
- Multiprocessor interrupt controller.
- Provides a periodic interrupt to each processor node in the system.
- Reset and power-up sequencing.
- Error handling and reporting.
- Microwire port for communicating with external COP processor.
- JTAG master for diagnostics.
- Handles Halt and Shutdown cycles.
- Handles floating point error reporting.

13.1.1 Arbitration

Arbitration is performed round robin in two priority levels. Priority is in highest to lowest order:

1. I/O bridges.
2. Processors.

13.1.2 Interprocessor Communications

The IPC mecanism is described in the chapter on multiprocessor support section 3.1 on page 24. The IPC mechanism has a queue of eight pending interrupts. Four of these are allocated to the four possible I/O channels and four are allocated to the processors. Synchronization for the I/O channels is handled in hardware with the signal MPICBUSY. The I/O bridges do not issue IPCs when MPICBUSY is asserted.

Programmer's Note

Processor initiated IPCs must be synchronized by software. If an IPC is issued to a processor which already has an IPC pending, the second IPC will be lost.

13.1.3 NMI Handling

Hydra multiplexes the multiple sources of NMI into a single NMI for each processor. A status register indicates which source generated the NMI and other status related to that particular NMI. The sources and associated status are:

1. System Parity Errors – the current master is interrupted. The slave of the cycle which generated the error is available in the status register. The address which was being accessed is also avaialble.
2. Double Bit ECC Errors – the current master is interrupted. The slave of the cycle which generated the error is available in the status register. The address which was being accessed, and information which can be used to identify the failing SIMM is also available.
3. I/O Channel NMI Requests – the master specicifed in the IPC which Bifrost used to implement this NMI is interrupted. The I/O channel which generated the NMI is available in the status register.
4. IPC NMI Requests – the master specicifed in the IPC is interrupted. The IPC request which generated the interrupt is available.
5. Bus Timouts – the master who initiated the cycle which timed out is interrupted.
6. System Deadlock – Some arbitrary processor is interrupted, the two I/O channels who are causeing the daedlock are identified in the stsaus register.

The Double Bit ECC Errors and System Parity Errors need to be or'ed together to generate a Hydra output PARITY-ERROR which can be routed to the ISP on the default I/O channel to generate EISA comaptible parity error reporting. This can be disabled if the software desires to use Hydra's reporting scheme.

It is possible to mask off each source of NMI with a harware mask.

13.1.4 Multiprocessor Interrupt Controller

The multiprocessor interrupt controller is described in section 3.2 on page 26 and section 8.5.2 on page 45. Hydra's contribution to the MPIC is the IPC facility through which the MPIC is implemented.

Hydra responds with the correct interrupt vector on interrupt acknowledge cycles and also on memory reads from address X"FF???????". This is provided to allow RISC processors to be easily integrated into the system. The RISC processor must still perform two reads and data will only be returned on the second read.

13.1.5 Periodic Interrupt

The timer which generates periodic interrupts divides the 33.33 Mhz MCLK by 2431 to generate a 1371 hertz clock. This 1371 hertz clock is divided by the programmable timer to generate the periodic interrupts. The period of interrupts is programmable between 72.93 $\mu$seconds and 18.67 milliseconds.

There are four count compare registers, which generate their interrupt when the count in the timer matches the count in the register. This is used to implement the phase skewing of the interrupts to the different processors.

13.1.6 Reset and Power-up Sequencing

On power-up or reset, Hydra asserts reset to all masters and slaves. Reset is then deasserted to all slaves and to processor 0. There is a one second timeout during which processor 0 must initiate a bus cycle. If the timeout occurs, processor 0 is reset and the reset to processor 1 is desserted. This timeout continues until Hydra finds a processor which is functional enough to generated bus cycles. When a functional processor is finally found, Hydra leaves the resets asserted to all processors. It is the responsibility of software on the running processor to issue IPCs which take the other processors out of reset at the appropriate time in the boot sequence.

13.1.7 Error handling

Dead Lock Detection and Correction

There is a dead lock condition in Bifrost which can not be prevented in hardware see section 8.7 on page 46 for details. Hydra must detect this dead lock and interrupt a processor with an NMI to have that processor handle the deadlock.

The deadlock is detected by noticing that two sepreate I/O channels are performing accesses and getting TALs. This is the symptom of two I/O channels attempting to simulaneously read each other. The system is still operational and so it seems reasonable to allow a processor to figure out how to fix the problem.

Bus Timeouts

Bus cycles are required to terminate in 2048 clocks or 64 *mu*seconds, this is much longer then should be required to perform any possible cycle[1]. If a cycle exceeds this time limit, Hydra provides a ready and interrupts the master which initiated the cycle with an NMI. This NMI can be masked to allow software to use this feature to search through the Lethe address space without having to worry about Bifrost interferring.

13.1.8 Microwire Port

A microwire (or other similar serial microcontroller communications port) is provided for base systems diagnosis and system monitoring functions. The port is meant to communicate to a processor such as a National COP888 or possibly an 8051.

The purpose of the microcontroller is to provide system monitoring functions such as:

1. power warning
2. thermal warning
3. fan rotation monitoring
4. air filter monitoring
5. UPS interface
6. smartVu interface
7. JTAG Master The possibilities are endless, the uses of the chipset have to decide which microcontroller to use and what features the interface must support. The minimal feature set includes:

- Bidirectional communication with the microcontroller
- Ability of the microcontroller to send a message which Hydra interprets as an IPC.

13.1.9 JTAG Master Port

Diagnostics should have access to a JTAG master to perform fault detection and isolation. This port can be located in one of three places:

1. Hydra
2. In the microcontroller which the Hydra communicates with
3. On a optional diagnostic processor board.

[1] The longest possible cycle is a cache line reload of an eight bit memory on the I/O channel which takes about 1920 clocks. Although it might be resonable to disallow this case

13.1.10 Halt and Shutdown Handling

Hydra provides the ready and terminates all halt and shutdown cycles. On halt cycles no further action is taken. Shutdown cycles are much more complex however. There are two cases:

1. In a uniprocessor system, Hydra resets the entire system upon receiving a shutdown cycle. This is required for standard PC-AT compatability.

2. In a multiprocessor system, Hydra performs the following sequece:

(a) Assert sync to the processor node which has shutdown. This will writeback any dirty data in her cache and insure memory coherency.

(b) Assert reset to the processor node which has shutdown. This is diferent than the single processor case because reset is left asserted.

(c) Interrupt the processor which is next in the prioroty list with a vector specified in a some programmable register to inform her that a processor has gone down.

(d) It is the responsibility of the interrupted processor to handle the rest of the situation. The processor which shutdown is held in reset until some processor sends an IPC which clears the reset.

13.2 Address Map

| | 7/F | 6/E | 5/D | 4/C | 3/B | 2/A | 1/9 | 0/8 |
|---|---|---|---|---|---|---|---|---|
| X"00" | | | | | | | | |
| X"08" | | | | | | | | |
| X"10" | | | | | | | | |
| X"18" | | | | | | | | |
| X"20" | | | | | | | | |
| X"28" | | | | | | | | |
| X"30" | | | | | | | | |
| X"38" | | | | | | | | |
| X"40" | | | | | | | | |
| X"48" | | | | | | | | |
| X"50" | | | | | | | | |
| X"58" | | | | | | | | |
| X"60" | | | | | | | | |
| X"68" | | | | | | | | |
| X"70" | | | | | | | | |
| X"78" | | | | | | | | |
| X"80" | | | | | | | | |
| X"88" | | | | | | | | |
| X"90" | | | | | | | | |
| X"98" | | | | | | | | |
| X"A0" | | | | | | | | |
| X"A8" | | | | | | | | |
| X"B0" | | | | | | | | |
| X"B8" | | | | | | | | |
| X"C0" | | | | | | | | |
| X"C8" | | | | | | | | |
| X"D0" | | | | | | | | |
| X"D8" | | | | | | | | |
| X"E0" | | | | | | | | |
| X"E8" | | | | | | | | |
| X"F0" | | | | | | | | |
| X"F8" | | | | | | | | |

13.3 Registers

13.3.1 Configuration Registers

LMC – Lethe Master Configuration

| 7-6 | 5–4 | 3–2 | 1–0 |
|---|---|---|---|
| M3 | M2 | M1 | M0 |

Mn Indicates what type of node is in each of the nodes of the system.

B'00' .............................. Not present
B'01' .......................... Lethe Bus Slave
B'10' ................... Lethe Bus I/O Bridge
B'11' .......................... Processor Node

MTP3 – MTP0 – Master Task Priority Register

| 7–0 |
|---|
| Master Task Priority |

Master Task Priority The eight bit priority of the processor. This is meant to be dynamically changed to indicate the priority of the task currently executing on a given processor. It is used for determining bus priority in the arbiter, and for dispatching interrupts to the processor running the lowest priority task.

13.3.2 Interrupt Control

IPR – Interrupt Priority Register

| 7 – 6 | 5–4 | 3–2 | 1–0 |
|---|---|---|---|
| SHDNW | IPC | PER | HARD |

Provides two bits each to indicate the relative priority of the three vectored interrupt sources. B'11' is the highest priority. B'00' is the lowest.

SHDNW Relative priority of shutdown interrupts.

IPC Relative priority of interprocessor communication interrupts.

PER Relative priority of periodic interrupts.

HARD Relative priority of hardware interrupts.

Programmer's Note
The priorities have to be strictly ordered. Setting two interrupt priorities equal will break something.

LIPC – Last IPC register

This 16 bit register contains the last IPC which generated an interrupt to a particular processor. IPCs which perform system control such as reset, flush, or sync do not get recorded here. IPCs from the I/O bridge which generate interrupts are not recorded here either. There are actually four of these registers, one for each processor node. The grant on the bus determines which register gets read – a processor can only read its own LIPC.

IMSK – Interrupt Mask Register

| 7 | 6 | 5 | 4 | 3 | 2 | 1 | 0 |
|---|---|---|---|---|---|---|---|
| | | | | | | PERen | IPCen |

PERen A B'1' in this bit enables periodic interrupts.
IPCen A B'1' in this bit enables IPC interrupts.

There are actually four of these registers, one for each processor node. The grant on the bus determines which register gets read – a processor can only access its own IMSK.

NMR – NMI Mask Register

NSR – NMI Status Register

PIV – Periodic Interrupt Vector Register

| 7–0 |
|---|
| Periodic Interrupt Vector |

Periodic Interrupt Vector The eight bit interrupt vector which is returned on interrupt acknowledge cycles which are responding to periodic interrupts.

SIV – Shutdown Interrupt Vector Register

| 7–0 |
|---|
| Shutdown Interrupt Vector |

Shutdown Interrupt Vector The eight bit interrupt vector which is returned on interrupt acknowledge cycles which are responding to shutdown interrupts.

IPCMV – IPC Message Interrupt Vector Register

| 7–0 |
|---|
| IPC Message Interrupt Vector |

IPC Message Interrupt Vector The eight bit interrupt vector which is returned on interrupt acknowledge cycles which are responding to IPC message interrupts.

NSR – NMI Status Register

13.3.3 Timer Control

TIP – Timer Period

| 7–0 |
|---|
| Timer Period |

Timer Period The eight bit period of the timer. Each count is 72.93 μseconds. This number was calculated to closely approximate the 60 and 100 hz desired interrupt periods.

Possible frequencies are:

| Period | Count | Error |
|---|---|---|
| 53 hz | 255 | 0 |
| 60 hz | 228 | .0001% |
| 100hz | 137 | .0001% |
| 1371hz | 1 | 0 |

TCC3 - TCC0 – Timer Count Compare Registers

| 7–0 |
|---|
| Count Period |

Count The eight bit count which gets compared the the value in the periodic timer, and generates an interrupt when the count matches.

There are four of these registers, one for each periodic interrupt. They are used to skew in time the periodic interrupts to the different processors so that they are not entering there timer interrupt at the same time.

13.3.4 Reset Control

13.3.5 Error Handling and Reporting

13.3.6 JTAG Interface

13.4 Signals

13.4.1 Lethe Interface

| NAME | TYPE | DESCRIPTION | CLOCK |
|---|---|---|---|
| MA[31:3] | I/O | Lethe Address Bus | MCLK |
| MD[15:0] | I/O | Lethe Data Bus | MCLK |
| MP[1:0] | I/O | Lethe Data Parity Bus | MCLK |
| MBE[1:0] | I/O | Byte enables indicate which bytes of the data bus have or are requesting data. | MCLK |
| MCLK | I/O | Lethe Bus Clock | |
| MADS~ | I/O | Lethe bus address strobe. | MCLK |
| MDBB~ | I/O | Data Bus Busy Signal | |
| MMIO | I/O | Memory or I/O Cycle Indication | MCLK |
| MDC | I/O | Data or Code Cycle Indication | MCLK |
| MWR | I/O | Write or Read Cycle Indication | MCLK |
| MPALLC~ | I/O | Potential Allocate Cycle Indication. | MCLK |
| MBRDY~ | I/O | Burst Ready Indication | MCLK |
| MSERR | I/O | Memory soft error correction indication. | MCLK |
| MPERR | I/O | Lethe Data Bus Parity Error. Also indicates memory multiple bit errors. | MCLK |
| MSID[2:0] | I/O | Slave ID | MCLK |

13.4.2 Arbitration

| NAME | TYPE | DESCRIPTION | CLOCK |
|---|---|---|---|
| MREQ~[4:0] | I | M Bus Request. Each system node has an individual version of this pin. | MCLK |
| MGR~[4:0] | O | M Bus Grant. Each system node has an individual version of this pin. | MCLK |
| MTAL~ [3 : 0] | I | Secondary channel try again later signal. Driven by secondary bus nodes. Assertion indicates that the current read cycle should be decoupled. Sampled at the end of the cacheablity window. | MCLK |

13.4.3 Interrupt Control

| NAME | TYPE | DESCRIPTION | CLOCK |
|---|---|---|---|
| INT[3:0] | O | Interrupt Request to CPU | MCLK |
| NMI[3:0] | O | Non Maskable Interrupt Request to CPU | MCLK |
| MPICBUSY | O | Multiprocessor interrupt controller busy - indicates that Bifrosts should not send IPCs because all elements of the interrupt queue are full. | MCLK |

13.4.4 System Control

| NAME | TYPE | DESCRIPTION | CLOCK |
|---|---|---|---|
| FLUSH[4:0] | O | Cache Flush Command | MCLK |
| SYNC[4:0] | O | Cache Sync Command | MCLK |
| RESET[4:0] | O | Reset | MCLK |
| PWROK | I | Power OK | Async |

13.4.5 Boundary Scan Support

| NAME | TYPE | DESCRIPTION | CLOCK |
|---|---|---|---|
| TDI | I | Test Data In | TCLK |
| TDO | O | Test Data Out | TCLK |
| TCLK | I/O | Test Clock | |
| TMDS | I/O | Test Mode Select | TCLK |

List of Figures 1.1 Chimæra System . . . . . . . . . . . . . . . . . . . . . . . . . . . . . . . 4

9.1 Bifrost-A Address Paths . . . . . . . . . . . . . . . . . . . . . . . . . . . 54
9.2 Bifrost-A cache tags . . . . . . . . . . . . . . . . . . . . . . . . . . . . 55

10.1 Bifrost-D data path . . . . . . . . . . . . . . . . . . . . . . . . . . . . 64

12.1 Address / Control Chip . . . . . . . . . . . . . . . . . . . . . . . . . . 75
12.2 Data Flow Chip . . . . . . . . . . . . . . . . . . . . . . . . . . . . . . 77

Glossary

A

Active Slave The active slave is the slave to whom the current master's address is mapped.

Alias When a particular memory location or I/O device can be accessed at different addresses. This can be caused by incompletely decoding the address.

Asgard The C5/C8 interface to the Lethe system bus.
[Mythology] The home of the gods.

Assert To bring a signal to its active level.

B

Bandwidth The amount of data that can be communicated over a wire in a particular amount of time. Usually measured in bytes per second.

Bank The smallest identifiable portion of the memory subsystem that gets a unique combination of RAS's and CAS's. Single sided SIMM's contain one bank, double sided SIMM's contain two banks.

Beat A single data transfer. In Lethe this is a piece of data $\leq$ 64 bits wide.

BIDI An abbreviation for bidirectional.

BIOS Basic input output system.

Block The unit of addressability of a cache. There is a seperate tag entry for each block in the cache. There may be multiple lines per block in which case each line has a seperate valid bit in the tags.

Boundary Scan A technique which allows testers to check connectivity between IC's.

Burst Transfer A bus cycle which consists of multiple data states. The duration of the burst can be controlled by either the master or the slave.

Bus Arbitration The period when potential bus masters are contending for bus access and one device is given bus ownership.

Bus Master The device which instigates the cycle.

Bus Slave Any device which is not currently the master.

Bus Tenure The period when a master owns the bus.

C

CAS Column Address Strobe.

Cacheability Window The period from the onset of the address (as indicated by the assertion of MADS~) to the point at which all slaves have deturmined cacheablity. Typically one clock.

Chimæra The name of this system's architecture.
[Mythology] A mythical animal with the head and body of a lion an additional head of a goat and the tail of a serpant.

Coherency An adjective describing a system that will always produce the correct data whether that data is in main storage or some processors local cache.

CMOS Complementary metal oxide semiconductor. A FET logic family.

D

Deassert To bring a signal to its inactive level.

Dirty When a cache line is in the Modified state.

DMA Direct memory access.

Dot-or Wired or. A connection between two signals whose electrical characteristics are such that the signals act as if they are logically ored together.

E

ECC Error correcting code. A memory system which has or supports ECC requires 7 bits of syndrome for 32 bits of data, and 8 bits of syndrome for 64 bits of data. These will allow detection and correction of any single bit errors and detection of two bit errors.

EDC Error Detection and Correction.

Even Parity An error checking scheme in which an extra bit is added for each byte of the memory subsystems word. This bit is set so that each byte has an even number of bits set.

Expulsion When a dirty line is forced out of a cache. Typically the result of another line being allocated.

Exclusive The state of a line of memory where the data represented in that line is valid and identical to that represented in memory, but no other cache has the line.

F

File IBM–ese for hard disk.

First Party DMA An I/O device that becomes bus master when it wants to Access memory. It does not require a DMA controller. It generates the addresses on its own.

FIT rate Failure in time rate. A measure of the number of bit failures per second per bit a dynamic RAM will have.

FRU Field Replacable Unit.

G

Gryphon The name of the memory controller in the Chimæra system.
[Mythology] A fabulous animal with the body of a lion and the head and wings of an eagle.

H

Hit Rate The percentage of accesses which reside in a given device.

Hydra The name of the system controller in the Chimæra system.
[Mythology] A nine–headed creature.

I

I486 Intel's current state–of–the–art microprocessor.

I586 Intel's next state–of–the–art microprocessor. A superscalar version of the I486 with other enhancements and higher operating frequency. Available mid–'92.

Interigation Tantamount to snooping.

Interleave An adjective describing a memory subsystem in which the memory is organized as a multiple ( greater than 1 ) of the system data bus size. When the memory is accessed, it returns more than one word of data. This data is latched and then muxed onto the system data bus on subsequent clocks, thus dramatically increasing the memory bandwidth.

Invalid The state of a line of memory where the data represented in that line is invalid. The correct data may be in main memory or another cache.

IPL Initial program load. IBM–ese for boot.

L

Lethe The main system bus in the Chiimæra system.
[Mythology] A river in hell.

Line The unit of transfer from memory subsystem to cache.

LRU Least recently used. A cache line replacement strategy where the least recently used line is replaced with the new line coming in from a cache line reload.

M

M.B.C. Memory Bus Controller. Though somewhat of misnomer, this is what Intel calls the C5/C8 → Lethe bus interface.

M.E.S.I. An acronym for write–back caches whose lines reside in one of the four M.E.S.I. states: Modified, Exclusive, Shared, or Invalid.

Miss Rate The percentage of accesses which are not in a given device.

Modified The state of a line where the data represented in that line is valid, but different from that represented in main memory.

MTBF Mean time between failures.

O

Odd Parity An error checking scheme in which an extra bit is added for each byte of the memory subsystems word. This bit is set so that each byte has an odd number of bits set.

Open Collector A TTL bus driver that drives a line low or does not drive it at all.

Open Drain A CMOS bus driver that drives a line low or does not drive it at all.

Orthogonality The condition when two bus drivers are attempting to drive the same line to different levels.

P

P5 The name of i586 prototypes.

Page Mode A mode of dynamic RAMs in which RAS stays asserted and subsequent cycles need only assert CAS. This is usually much faster than full RAS cycles.

PCB Printed circuit board.

PIO Programmed I/O. I/O device accesses that require the assistance of the processor. The original IBM PC-AT used PIO to control the disks instead of DMA.

R

RAS Row Address Strobe.

RATS Dell acronym for Reliabilty, Assessability, Testability, and Serviceabilty.

Read Snarf The act of capturing data from a write-back.

Refresh A type of cycle to dynamic RAM's in which the capacitors on which the data is stored are recharged. If refresh does not occur at the correct time, data may be lost.

ROS IBM-ese for ROM.

S

Secondary Bus A bus which is not necesarily tied directly to the Lethe bus, but which has access to Lethe's memory through Bifrost. Typically this is synonymous with the EISA bus.

Shadow RAM RAM that resides in the BIOS ROM address space into which the BIOS is copied. The BIOS ROM is then disabled and the processor executes out of this shadow RAM thus increasing performance because this RAM is both faster and wider.

Shared The state of a line of memory where the data represented in that line is valid and the same as main memory and other caches.

SIMM Single inline memory module. A small PCB with dynamic RAM chips on it.

Sink The destination of data or of a transfer.

Source
[NOUN] The originator of data or of a transfer.
[VERB] To originate information.

Snarf The ability of a device to absorb data which is being sunk by another device.

Snoop The process by which caches are kept coherent. In write-through systems snooping consists of vacating cache lines which are written to by other masters. In write-back snooping is more complex. See Ch. Lethe.

Snoop Window The period from the onset of the address (as indicated by the assertion of MADS~) to the point at which all slaves have deturmined the snoop status in their caches. Typically $\geq$ 2 clocks.

Storage IBM-ese for memory.

Stand-Alone Write-Back A write cycle type where the transfer is greater than one beat lone, and no allocation follows. These result from EISA write bursts, and processor cache expulsions.

Store-in cache A type of cache in which processor stores get written into the cache but not into main memory. The cache line becomes dirty. When this dirty line is replaced, it must be written back to main memory so that the dirty data is not lost.

Store-thru cache A type of cache in which processor stores get written into the cache and into main memory.

Syndrome A number which represents some function of another number. In the case of ECC a syndrome can be used to guarantee that relatively minor errors have not been injected in transmission.

T

Try Again Later Our protocol for splitting read transactions to secondary buses.

Third Party DMA A device that requires the assistance of a system owned DMA controller to perform DMA accesses. The device remains a slave during third party DMAs, the master is the system DMA controller.

TTL Transistor to transitor logic. A Bipolar logic family.

W

Write–Allocation The allocation of a cache line when a a write miss occurs.

Write–Allocation Cycle A special cycle where a write sourced by a mastering processor is sunk by the memory controller, where the memory controller first reads in the surrounding line, then writes the new data.

Write–Back Cache A cache which is capable of decoupling writes as well reads from its system bus.

Write–Merging A hardware capacity to combine a previously valid line with dirtying data within a buffer to create a new valid line. This capacity allows one to delay the writing of data on a cache miss until an allocation has completed.

Write–Through Cache A cache which is capable of decoupling reads from its system bus, but which passes writes through.

Index

Arbitration
  Hydra, 85
arbitration, 9
Asgard, 67
  Signals, 69
Attributes
  Memory, 29
Availability, 37

Bifrost, 40
  Interrupt Controller, 45
  Tag Organization, 53
Bifrost Store Queue, 43
Bifrost-A, 53
  Signals, 56
Bifrost-D, 63
  Cache Data Transfer Control, 63
  Signals, 65
Bus Bamping, 9
Bus Decoupling, 41

Cacheability Window, 13
cacheability window, 14
Chip Failure Modes, 39
Clocks, 18
Compatibility
  Hardware, 27
  Software, 35
Cycle Types, 14
  I/O Cycles, 15
  IACKs, 14
  Memory Reads, 16
  Memory Writes, 16
  Special Cycles, 14

Deadlocks, 46, 87
Descriptors
  Memory, 30
  Region, 31
  Static, 31
Diagnostics, 38

ECC, 37
Electrical Characteristics, 17
  Clocks, 18
Error Reporting, 38

Gryphon
  RCR, 75
    Way Mapping, 76

Halt Cycles, 89
Hydra, 85
  Periodic Interrupts, 87
  Registers, 91
  Signals, 94

I/O Cache
  Organization, 41
  Reload Policy, 43
  Scheduling Writebacks, 43
  Snooping, 42
I/O cache, 41
I/O Mapping, 32, 45
Incompatibilies
  Multiprocessor Specific, 23
Interrupts
  Periodic, 26
Interrupts, 26, 45
IPC, 24, 86

ISA Masters, 27

JTAG, 39, 88

Lethe, 7
- Cycle Types, 14
  - I/O Cycles, 15
  - IACKs, 14
  - Memory Reads, 16
  - Memory Writes, 16
  - Special Cycles, 14
- Electrical Characteristics, 17
  - Clocks, 18
- Pipelining, 10
- Signals, 19

Lock
- EISA, 46

M.E.S.I., 8
Memory
- Attributes, 43

Memory Attributes, 29
Memory Descriptors, 30
Memory Mapping, 30
Microcontroller, 88
MPIC, 26, 87
Multiple I/O Channels, 44
Multiprocessor Support, 23

NMI, 86

P.L.L., 18
P5, 2
Pipelining, 10
- Address, 11
- Data, 11
- Examples, 12

POST, 39
Power up, 26

RATS, 37
Read Snarfing, 10
Registers, 32
- Mapping, 32

Reliability, 37
Reset, 26
RISC Support, 33, 87

Servicability, 37
Shutdown Cycles, 89
Snoop Window, 13
Split Transactions, 10
Sub-Mastership, 9

Testability, 37
Timouts, 88

Chapter 1
Top Level
1.1 Overview
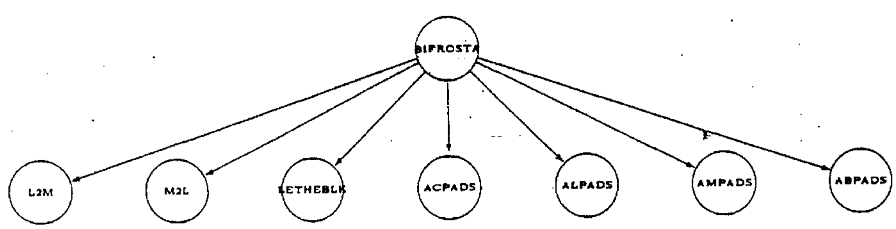

Chapter 2
Lethe 2 Midgard
2.1 L2M Subtree
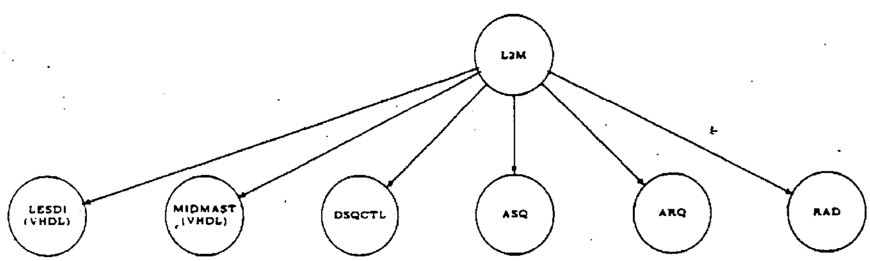
2.1.1 Lethe Slave Data Interface (LESDI)
This VHDL code controls Bifrost's data interactions with the Lethe bus. Specifically it is responsible for:

- Ready generation
- Enqueing data and address into the store queue
- Controlling the line address for Lethe slave cycles
- Controlling the writing and reading of the registers in both Bifrost-A and Bifrost-D
- OE-ing the data in Bifrost-A for most register read cycles and Bifrost-D for almost other reads

2.1.2 Midgard Master Logic (MIDMAST)

This VHDL code controls Bifrost's Midgard mastering interface. It is responsible for:

- Generating the MTAL~ signal
- Arbitrating for the Midgard bus
- Ordering the Lethe requests
- Queuing read requests
- Executing cycles on the Mifgard bus
- Dequeuing transfers from the store queue
- LOCK-ing the EISA and Midgard buses

2.1.3 Data Store Queue Control (DSQCTL)

The DSQCTL block maintains a copy of the data chip's store queue in and out pointers. This information is required in Bifrost-A to tell LESDI whether there is room in the store queue. and MIDMAST whether there is any data in the store queue.

2.1.3.1 DSQCTL Subtree
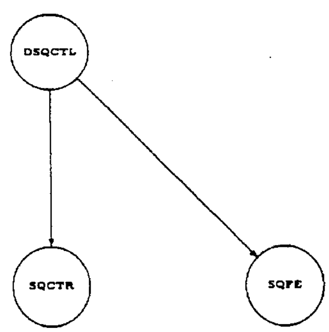
2.1.4 Address Store Queue (ASQ)
The ASQ block contains the address and control of the store queue. The store queue is a strict FIFO. It has eight entries, but one entry is constantly overwritten. The ASQ block takes NQ, DQ and the Lethe address and control signals as input and outputs the oldest store's address and control.

2.1.4.1 ASQ Subtree
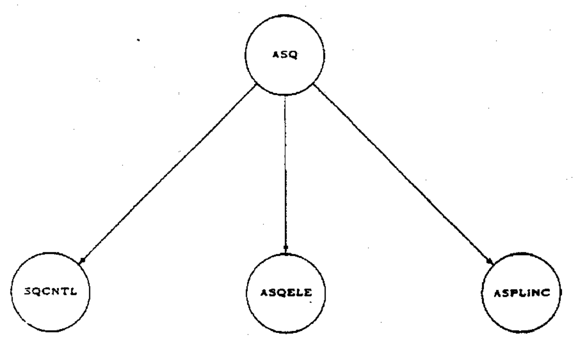
2.1.5 Address Read Queue (ARQ)
The ARQ block contains the one deep read queue. It also contains the muxing logic which MIDMAST uses to order the reads and writes.

2.1.5.1 ARQ Subtree
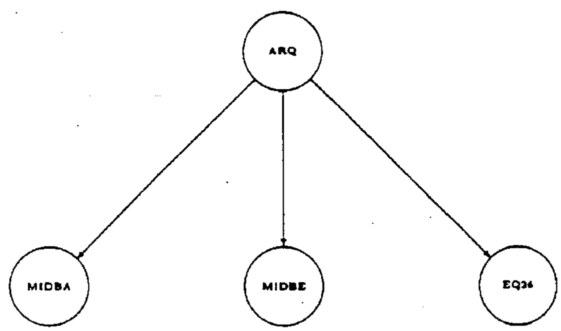
2.1.6 Registers and Attribute Descriptors (RAD)
The RAD block contains all the Bifrost-A registers. It also contains the register decode and read mux path. All Bifrost mapping is contained in RAD.

2.1.6.1 RAD Subtree
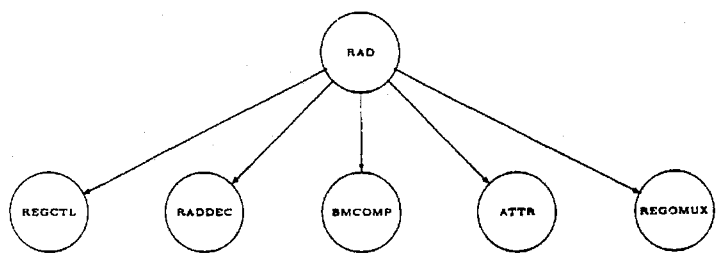
REGCTL: controls the index and input data bus
RADDEC: generates the decoded enables for the register latches
BMCOMP: implements the base/mask descriptors
ATTR: contains the majority of the descriptors and the combinatorial mapping logic
REGOMUX: register output data mux

*2.1. L2M SUBTREE* 9
2.1.6.2 ATTR Subtree
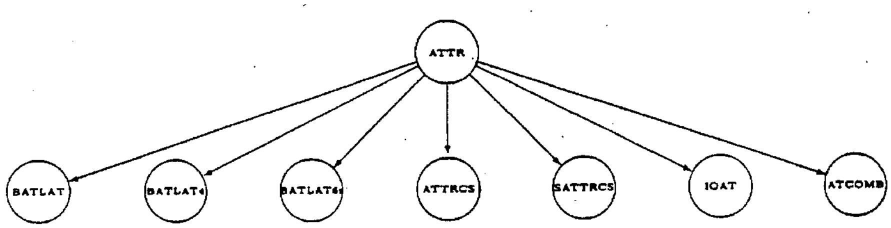

Chapter 3
Midgard 2 Lethe
3.1 M2L Subtree
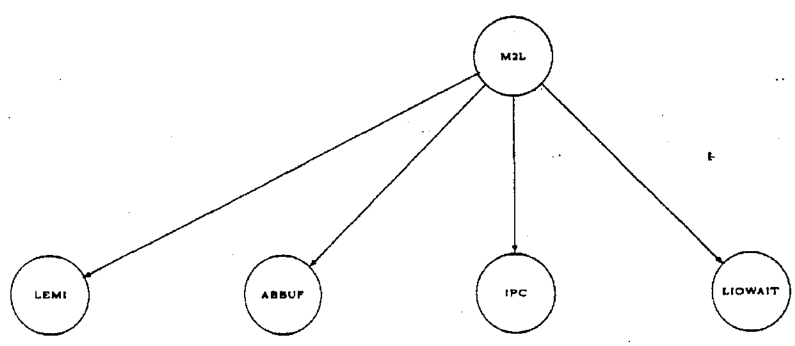
3.1.1 Lethe Master Interface (LEMI)
The LEMI block is responsible for Bifrost's mastering interface of the Lethe bus. It is resposible for:

- Lethe arbitration
- Cycle decomposition (splitting of non-burstable cycles)
- Lethe bus locking
- Lethe cycle control
  - Ready's
  - MBLAST
  - OE's
  - A/B buffer writing
- A/B buffer handshake

3.1.2 A/B Buffers and Control (ABBUF)

The ABBUF logic controls and stores two cache line length buffers. It maintains the current state of these buffers. The buffers are used as follows:

M2L Write: MIDSLV dumps write requests into ABBUF. LEMI services these requests

M2L Read: MIDSLV requests read data of LEMI. LEMI write the data into ABBUF. MIDSLV passes that data on to Midgard

L2M Read: MIDMAST reads data from Midgard. dumps the info into ABBUF. LESDI passes that data onto Lethe

3.1.3 IPC

The IPC block serves as a conduit between IPC requests from either MIDMAST for IAÇK IPC's or MIDSLV for FLUSH IPC's to the LEMI block.

3.1.4 LIOWAIT

The LIOWAIT block generates that LIOWAIT signal.

TP

Hydra
Dell P/N 24002
Specification Version 1.85

Joel Davidson Sid Shriver

April 14, 1992

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1991

*Hydra Specification*

Contents 1.1 Architecture . . . 1
1.1.1 Arbitration . . . 1
1.1.2 Slow Mode . . . 2
1.1.3 Interprocessor Communications . . . 2
1.1.4 NMI Handling . . . 5
1.1.5 Interrupts . . . 6
1.1.6 Programmable Timer/Periodic Interrupt Generation . . . 9
1.1.7 Reset and Power-up Sequencing . . . 9
1.1.8 Diagnostics Controller Port . . . 10
1.1.9 JTAG Slave Port . . . 11
1.1.10 Halt and Shutdown Handling . . . 11
1.1.11 Flush Handling . . . 12
1.2 Chimaera Register Cycle Completion . . . 12
1.3 System Considerations . . . 12
1.4 Limitations . . . 12
1.5 Registers . . . 15
1.5.1 Configuration Registers . . . 15
1.5.2 Interrupt Control . . . 19
1.5.3 Timer Control . . . 26
1.5.4 Slow Mode Configuration Registers . . . 27
1.5.5 Error Handling and Reporting . . . 29
1.5.6 Diagnostic Controller Interface . . . 30
1.5.7 Miscellaneous registers . . . 31
1.6 Address Map . . . 33
1.7 Signals . . . 37
1.7.1 Lethe Interface . . . 37
1.7.2 Arbitration . . . 38
1.7.3 Interrupt Control . . . 38
1.7.4 System Control . . . 38
1.7.5 Test/Boundary Scan Support . . . 39
1.7.6 Diagnostics Processor Interface . . . 39
1.7.7 Asgard Programming Bus . . . 39
1.7.8 Power . . . 39

1.8 Packaging and Pinout . . . . . 40

Hydra - *A mythical nine headed creature.*

1.1 Architecture

Hydra is the system controller for systems utilizing the Chimaera chip set. It integrates all the unique functionality of the system. This includes:

- Lethe system bus arbitration.
- Interprocessor communications (IPCs).
- Multiprocessor interrupt controller.
- Separate, programmable periodic interrupt for each processor in the system.
- Floating point error interrupt support.
- Error handling and reporting.
- PC compatible slow mode.
- Diagnostics controller port for communicating with dedicated diagnostics processor.
- JTAG slave port for I/O connectivity evaluation.
- Halt, Shutdown and Flush cycle support.
- Provides cycle control for all Chimaera chipset register reads and writes.

1.1.1 Arbitration

The Lethe bus can have from two to six masters. These masters arbitrate for the bus through the central arbiter, Hydra. Devices which desire the bus assert MREQn[i]. When the bus is available and there are no higher priority masters requesting the bus, the bus is granted with MGRn[i]. The following are the key features of the Lethe bus arbitration:

- Round robin is used for fairness between CPUs.
- I/O masters will bypass the round robin.
- If no request are present at the end of a transaction, the master is parked on the bus. (MGRn[i] stays asserted).
- If an I/O has a request pending, all masters are limited to one transaction. (MGRn[i] is deasserted).
- During a writeback, the bus will be temporarily granted to a slave without the use of the arbiter.[1]
- Programmable bus preemption is provided to prevent bus starvation if other processors are requesting the use of the bus.

[1] See Sub-Mastership in the Lethe Bus Specification.

1.1.2 Slow Mode

Hydra provides the capability for CPU0 to run in a degraded mode. This is done through the use of the two counters Slow Mode Counter (SMCNT) and Slow Mode Grant Enable Counter (SMGECNT), two registers Slow Mode Compare (SMCMP) and Slow Mode Grant Enable Compare (SMGECMP), and one status bit Slow Mode (SM). The slow mode compare register defines the length of time that the Lethe bus is blocked from CPU0. The SMGECNT defines the number of Lethe bus transactions that CPU0 will be allowed before having to wait another SMCNT period. Following is an overview of slow mode logic:

When the slow mode status bit is set, Grants to CPU0 are blocked and the sixteen bit counter SMCNT is allowed to increment on every Lethe clock. The value of this counter is compared to the sixteen bit SMCMP register. When SMCNT reaches the preprogrammed SMCMP value, grants are no longer blocked from CPU0, and the four bit counter SMGECNT is ollowed to increment on every transaction from CPU0. When the value of SMGECNT equals the four bit value of SMGECMP, grants to CPU0 are blocked, SMCNT is reset and allowed to increment on every clock once again.

1.1.3 Interprocessor Communications

Interprocessor communications are implemented as 16 bit I/O writes to I/O address X'00B0'.[2] The IPC mechanism allows four pending interrupts per processor. They are allocated to I/O channel 0, I/O channel 1, cpu explicit and cpu implicit interrupts.

| Programmer's Note |
|---|
| Processor initiated IPCs must be synchronized by software. If an IPC is issued to a processor which already has an IPC pending, the first IPC will be lost. |

The format of the IPC message is:

| 15 | 14 | 13-12 | 11-8 | 7-0 |
|---|---|---|---|---|
| IPC active | IPC type | Source ID | Destination ID | Type defined |

IPC Active Identifies if this cycle as a valid IPC.

B'0' –Ignore

B'1' –IPC is valid

IPC Type Indicates the type of IPC message:

B'0' – Interrupt Request

B'1' – Action Request

[2] This address is programmable. See the explanation of the IPCADR register on page 19.

Source ID Indicates the source of the IPC. (I/O0, I/O1, or CPUx). In the case of CPUx, this field defines the source of the vector (LSB of IPC or Hydra register).

B'00' I/O channel 0 - Use LS byte of IPC for interrupt vector.

B'01' I/O channel 1 - Use LS byte of IPC for interrupt vector.

B'10' CPUx - Use CPUx implicit interrupt vector in Hydra.

B'11' CPUx - Use LS byte of IPC for interrupt vector.

Destination ID Indicates the master(s) to whom this IPC message is addressed.

B'xxx1' CPU-0.

B'xx1x' CPU-1.

B'x1xx' CPU-2.

B'1xxx' CPU-3.

B'0000' CPU with the lowest priority as defined in the interrupt priority register (IPR).

Type Defined The format of this field is defined by the IPC type bit and the source ID bits.

If type = B'1', then this field contains a command.

If type = B'0' and source not = B'10', then field is a vector.

If type = B'0' and source = B'10', then field is undefined.

Programmer's Note

The IPCACTIVE bit of the IPC message must be asserted to generate an IPC. Hydra will return MBRDYn for either state of this bit.

Interrupt Request with explicit destination(s) and explicit vector

| Active | IPC Type | Source ID | Destination ID | Interrupt Vector |
|---|---|---|---|---|
| 15 | 14 | 13-12 | 11-8 | 7-0 |
| B'1' | B'0' | B'00',B'01',orB'11' | not = B'0000' | B'vector' |

This message generates an interrupt request to the processor(s) specified in destination ID. When that processor responds with the second interrupt acknowledge, it will be given the vector provided in the 8 bit vector field.

Interrupt Request with explicit destination(s) and implicit vector

| Active | IPC Type | Source ID | Destination ID | Interrupt Vector |
|---|---|---|---|---|
| 15 | 14 | 13-12 | 11-8 | 7-0 |
| B'1' | B'0' | B'10' | not = B'0000' | B'xxxxxxxx' |

This message generates an interrupt request to the processor(s) specified in destination ID.

When that processor responds with the second interrupt acknowledge, it will be given the vector that was loaded into the Hydra PxIPCvect register. This allows a distinct vector for each CPU when multiple CPUs are targeted.

Interrupt Request with implicit destination and implicit vector

| Active | IPC Type | Source ID | Destination ID | Interrupt Vector |
|---|---|---|---|---|
| 15 | 14 | 13-12 | 11-8 | 7-0 |
| B'1' | B'0' | B'10' | B'0000' | B'xxxxxxxx' |

This message generates an interrupt request to the processor that has the lowest priority process. When that processor responds with the second interrupt acknowledge, it will be given the vector that was loaded into the Hydra PxIPCvect register. This allows a distinct vector for each CPU when multiple CPUs are targeted.

Interrupt Request with implicit destination and explicit vector

| Active | IPC Type | Source ID | Destination ID | Interrupt Vector |
|---|---|---|---|---|
| 15 | 14 | 13-12 | 11-8 | 7-0 |
| B'1' | B'0' | B'11' | B'0000' | B'vector' |

This message generates an interrupt request to the processor that has the lowest priority process. When that processor responds with the second interrupt acknowledge, it will be given the vector provided in the vector field.

Action Request Action request use the same format as interrupt request except that the type defined field is used for a command field instead of a vector field and the valid source ID's are B'00', B'01, and B'11'.

| IPC active | IPC type | Source ID | Destination ID | Type defined |
|---|---|---|---|---|
| 15 | 14 | 13-12 | 11-8 | 7-0 |
| B'1' | B'1' | B'10' | not = B'0000' | command |

The actions commands are coded in the eight bit type field as follows:

| 7 | 6 | 5 | 4 | 3 | 2 | 1 | 0 |
|---|---|---|---|---|---|---|---|
| reserved | assert reset | deassert reset | reserved | flush | reserved | NMI | reserved |

Assert Reset Asserts reset to the processor specified in destination ID.

Deassert Reset Deasserts reset to the specified processor.

Flush Asserts Flush to all processors for 2 cycles.

NMI Assert a non maskable interrupt to the node in destination ID for 2 cycles.

Note: asserting reset to a processor causes a warm reset.

> Programmer's Note
> Performing an assert reset operation to all processors will obviously cause the system to hang.

1.1.4 NMI Handling

Hydra multiplexes the multiple sources of NMI into a single NMI for each processor. A status register indicates which source generated the NMI and other status related to that particular NMI. The sources and associated status are:

1. Double Bit ECC Errors/System Parity Errors – if the current master is a processor, it is interrupted. If the current master is an I/O channel, CPU 0 will be interrupted. The ID of the slave of the cycle which generated the error is available in the EFR register. The address which was being accessed, and information which can be used to identify the failing SIMM pair is also available in the last memory error address registers (LME[3-0]) in the memory controller.
2. IPC NMI Requests – the master specified in the IPC which is interrupted. The source of the NMI is available in the NMISR.
3. System Deadlock – The system master processor is interrupted.

> Programmer's Note
> An IPC NMI that is sent to processor which is either not installed or is in reset will not be serviced.

System Parity and Double Bit ECC Errors

The system architecture provides for parity and ECC errors.

- The parity error (8-bit or double bit memory ECC) are uncorrectable. Processor internal errors, secondary cache errors, Lethe bus, and Bifrost (I/O bus) parity errors are indicated by the assertion of the PERRn .
- Single bit memory ECC errors are corrected before the memory cycle is completed, and although no NMI is generated, the error is logged. Single bit ECC errors are indicated by the assertion of the SERRn signal on the Lethe bus.

ECC errors are logged by latching the address of the cycle in the memory controller's LME register, and setting the appropriate error bit in Hydra's error fault register (EFR). System parity error and double bit ECC error indications are or'ed together to generate the PARERRn output. This signal can be routed to the ISP on the primary I/O channel to generate EISA compatible parity error reporting. This can be disabled by clearing the ERRMODE bit (bit 4 of the CONFIG register) if the software desires to use Hydra's reporting scheme. The PARERRn output is cleared by the first memory write on the Lethe bus following the assertion of the signal.

Deadlock Detection and Correction

There is a deadlock condition in Bifrost which can not be prevented in hardware. Hydra will detect this deadlock and interrupt a processor with an NMI to have that processor handle the deadlock.

The deadlock is detected by noticing that both I/O channels are performing accesses and getting TALs. This condition can be detected through the use of the concensus TAL signal and the arbiter bus grants to determine which masters are getting TAL'ed. This is the symptom of two I/O channels attempting to simultaneously read each other. The system is still operational and so it seems reasonable to allow a processor to figure out how to fix the problem. [3]

1.1.5 Interrupts

There are two methods of generating interrupts. One method offers optimum performance, and the other optimum compatibility for DOS. The mode is selected by programming the INTMODE bit in the system configuration register (CONFIG).

In optimum performance mode, Hydra passes the interrupt from the ISP to Bifrost. Bifrost will then use the IPC interrupt request protocol. In addition to higher performance, this mode also provides increased functionality by allowing intelligent interrupt redirection. There are two optimum performance modes, parallel and serial. Parallel mode allows interrupts from both I/O channels to be processed by Hydra concurrently. Serial mode forces Hydra to process one interrupt at a time. For example, if both I/O channels 1 and 2 request an interrupt, interrupt I/O-1 will be on hold and interrupt I/O-2 will be serviced. Interrupt I/O-1 will remain on hold untill the service routine for the interupt on I/O-2 has signaled (IPC) that it's OK to service the next interrupt. (When running in this optimum performance serial mode, it is required that all I/O interrupt service routines signal with the IPC that enables the next inturrupt.)

The following lists the sequence of events for optimum performance parallel, and optimum performance serial modes.

1. Optimum Performance Parallel
   (a) The interrupt request runs from the 8259 in the ISP-A into Hydra.
   (b) If Hydra has completed processing the last interrupt from I/O channel-A, Hydra will activate Hydra Interrupt (HINT) to Bifrost-A. In parallel mode, the last interrupt is considered completed when the CPU issues the second interrupt acknowledge to the interrupt from I/O channel-A. Note that the interrupt status of channel-B was not evaluated in this mode.
   (c) When Bifrost-A sees an interrupt request, it flushes its store queue, and then generates the interrupt acknowledges to read the vector from the 8259.

[3] See the Deadlock section in the Bifrost specification for more details.

(d) Bifrost-A then translates the 8259 vector into a processor number and processor vector by performing a table lookup.

(e) The processor number and vector is then packaged into an interprocessor communication (IPC) message.

(f) Bifrost arbitrates for the Lethe bus, and writes this IPC message to Hydra.

(g) Hydra decodes the IPC, and interrupts the appropriate processor.

(h) When the processor responds with its second interrupt acknowledge, Hydra provides the vector specified for that processor in the IPC message, and is ready to process the next interrupt from I/O-A.

2. Optimum Performance Serial (a) The interrupt request runs from the 8259 in the ISP-A into Hydra.

(b) If Hydra has completed processing the last interrupt, Hydra will activate Hydra Interrupt (HINT) to Bifrost-A. In serial mode, the last interrupt is considered completed when the Interrupt Service Routine from the last interrupt serviced issues an end of interrupt IPC. Note that in this mode only one interrupt from either I/O channel is allowed active at a time.

(c) When Bifrost-A sees an interrupt request, it flushes its store queue, and then generates the interrupt acknowledges to read the vector from the 8259.

(d) Bifrost-A then translates the 8259 vector into a processor number and processor vector by performing a table lookup.

(e) The processor number and vector is then packaged into an interprocessor communication (IPC) message.

(f) Bifrost arbitrates for the Lethe bus, and writes this IPC message to Hydra.

(g) Hydra decodes the IPC, and interrupts the appropriate processor.

(h) When the processor responds with its second interrupt acknowledge, Hydra provides the vector specified for that processor in the IPC message.

(i) When the processor generates the end of interrupt IPC, Hydra has completed processing the interrupts.

The optimum performance mode creates a window between the time Bifrost acknowledges the interrupt from the ISP and the processor acknowledges the interrupt from Hydra. While not strictly DOS compatible, it is felt that this window is not a problem. Because one can not be absolutely certain, an optimum compatibility mode has also been incorporated into Hydra.

In optimum compatibility mode, Hydra passes the interrupt directly from the ISP to the CPU. The CPU then deals directly with the primary ISP to handle the interrupt.

3. Optimum compatibility with DOS (a) Bifrost must be programmed at power up to allow interrupt acknowledges to go out to the EISA bus if the HINT input to Bifrost is active. (Note that HINT has a different meaning in this mode).

(b) The Hydra is programmed at power up to pass 8259 interrupts to CPU 0 and the IMASK is set to 000. In addition, this mode sets up Hydra to drive HINT0 or HINT1 in order that each Bifrost can identify when it should respond to IACKs.

(c) The interrupts from the ISP are received by the Hydra, and passed to the CPU with the lowest priority process.

(d) When the interrupted CPU services the interrupt (IACKs), The Bifrost with the active HINT passes the IACK cycles to it's EISA bus. This allows the CPU to receive the interrupt vector directly from the ISP.

Floating point interrupts can be handled in one of three ways.

1. The first case, modern MP system:

(a) The CPUs are programmed to jump to vector 16 without reading the vector from the ISP or Hydra. The FERRs are masked in the Hydra.

2. The second case, 286 compatible, MP system:

(a) IGNNEn is held high after power up.

(b) When a FERRn is activated it is latched.

(c) Hydra will then interrupt the CPU that sourced the FERR. On the second INTACK cycle, Hydra will provide the interrupt vector from a preprogrammed Hydra register and reset the interrupt to the CPU.

(d) In the interrupt service routine, the CPU will do an I/O write to X'F0' (actually B'xxxx xx00 1111 0000'). The end of this write will cause Hydra to reset the latched FERRn and activate the IGNNEn.

(e) The activation of IGNNE will cause the CPU to deactivate FERRn.

(f) Upon the CPU's deactivation of FERRn, Hydra will deactivate IGNNEn.

3. The third case, 286 compatible, uniprocessor system:

(a) This is only valid for CPU0 (CPU[3:1] use 286 MP mode).

(b) IGNNEn is held high after power up.

(c) When a FERRn is activated it is latched and sent on to the ISP.

(d) In the optimum performance mode, Bifrost will send Hydra an IPC for the interrupt. Hydra will then interrupt the CPU. On the second INTACK cycle, Hydra will provide the interrupt vector.

(e) In the optimum compatibility mode, the ISP will activate the Hydra interrupt. Hydra will then interrupt the CPU. The interrupt vector is read directly from the ISP.

(f) In the interrupt service routine, the CPU will do an I/O write to X'F0' (actually B'xxxx xx00 1111 0000'). This write will cause Hydra to reset the latched FERRn and activate the IGNNE~.

(g) The activation of IGNNEn will cause the CPU to deactivate FERRn.

(h) Upon the CPU's deactivation of FERRn, Hydra will deactivate IGNNEn.

Programmer's Note

References to the *lowest priority processor* refer to the lowest priority processor that is running (as determined by the Master Task Priority registers), i.e., not in shutdown or being held in reset.

1.1.6 Programmable Timer/Periodic Interrupt Generation

The timer which generates the periodic interrupts and controls the various system timeouts is fully programmable. The Lethe bus clock is divided by the 13 bit value in the timer divisor register (TDR) to generate an intermediate clock.

The intermediate clock also drives a second counter/divider stage which is used to generate the periodic interrupts. The divisor for this stage is set in the timer period register (TIP). To generate skewed periodic interrupts to each of the processors, the interrupt timer count registers (TIC[3-0]) should be set to different values in the range of 0 to the value set in the TIP. These four count compare registers generate their interrupt when the count in the timer matches the count in the register.

The default values for all of these registers assume a 33 Mhz Lethe bus clock, and provides the skewed 60 Hz processor interrupts.

The 8 bit value of the second counter stage is available to the processors in the interrupt timer count register (TIC). This can be used for timing operations requiring finer granularity than is provided through the periodic interrupts.

1.1.7 Reset and Power-up Sequencing

On power-up or reset, Hydra asserts reset to all bus master slots and then waits for the RESETCPU signal from the primary EBC.

When RESETCPU is deasserted from the EBC, Hydra deasserts reset to the processor in slot 0. On a cold start, this will initiate BIST on the processor. When BIST completes, the result of the cache self test will be stored in the cache BIST result bit in the PST1 processor status register. Additionally, the processor is expected to set the processor BIST bit in its PST1 register to correspond to the results of the processor BIST, which is in register EAX after BIST completes. The POST can also use the value in the upper byte of the DX register to set the processor type field in the PST2 register. The post code can then configure the system as desired and perform an orderly bringup of the other processors.

A keyboard reset is detected by the assertion of RESETCPU from the EBC while the system is not in a cold boot sequence. If the KBDMODE bit (bit 7 of the CONFIG register) is asserted, all processors in the system will be reset upon detection of a keyboard reset. If the KBDMODE bit is deasserted, only the boot processor (processor 0) will be reset.

1.1.8 Diagnostics Controller Port

In order to provide for base systems diagnosis and system monitoring functions, Hydra has an 8 bit I/O port that provides a gateway between system processors and the diagnostics processor.

The diagnostics processor can provide system monitoring functions such as:

1. power warning
2. thermal warning
3. fan rotation monitoring
4. air filter monitoring
5. UPS interface
6. diagnostic panel interface
7. remote and local diagnostics controller The possibilities are endless, the designers using the chipset will have to decide which processor to use and what features the interface must support. The minimal feature set includes:

- Bidirectional communication with the diagnostics processor
- Ability of the diagnostics processor to send a message which Hydra interprets as an IPC
- Gateway lock register to provide a software lock capability for uninterrupted messages to the diagnostics processor.
- Diagnostics processor alive bit to indicate a functioning processor To the system processors, the gateway appears as two eight bit registers which can be used to pass commands and data between the system processors and the diagnostics processor.

To the diagnostics processor, Hydra appears as four eight bit i/o ports. The port is activated when the DCSELn input is asserted. The ports are mapped as follows:

| A1 | A0 | Port |
|---|---|---|
| 0 | 0 | Index Register |
| 0 | 1 | Data Register |
| 1 | 0 | Diagnostic controller command register |
| 1 | 1 | Diagnostic controller data register |

Since the diagnostics processor and Hydra are operating asynchronously, the DCSELn signal is used to indicate the initiation and termination of the cycle from the diagnostic processor side. After setting up the register address (on DCA[1:0]), the cycle type (on DCWR), and, for a write cycle, the data (on DCD[7:0], a diagnostic port cycle is initiated by asserting DCSELn. In the case of a write cycle, the port terminates the cycle by asserting DCRDYn. After DCRDYn is recognized asserted, the diagnostics processor can deassert DCSELn. If the cycle is a register read, the data will be valid on DCDAT[7:0] one clock before DCRDYn is asserted and will be deasserted one clock after DCSELn is deasserted or DCWR is driven high.

The index and data registers provide access to the entire Hydra register set. These work in a manner similar to the index registers provided for each of the processors. The other two ports are the bidirectional eight bit ports that provide a data communications gateway to the system processors. Since there is no hardware interlock in these ports, the diagnostic communications software must implement a handshaking protocol to provide reliable communications between the host processors and the diagnostics controller.

The DCLOCK register contains a semaphore bit that can be used by the system processors to 'lock' the access to the diagnostics port for multibyte messages. It also contains the SSP Alive bit, which can be used to indicated to the system processors that the diagnostics processor is running [4]

.

As the diagnostics controller has an eight bit interface to Hydra, the registers, as listed in section 1.6 on page 34, are accessible as bytes only. The index register is auto-incrementing to provide the ability to more quickly capture the state of the Hydra register set.

1.1.9 JTAG Slave Port

The JTAG slave port on Hydra will provide access to all inputs and outputs on the chip. This will provide the diagnostics processor with the ability to test the i/o drivers and receivers of the chip, as well as to verify the interconnections between the Hydra and the other members of the Chimæra chipset.

1.1.10 Halt and Shutdown Handling

On a halt, Hydra provides the MBRDYn and terminates a halt cycle. In addition, the HALT status bit (bit 1) in the PST1 register is set, signifying that the CPU is in the halt state. This bit will be reset when this particular CPU receives an interrupt, NMI, or a reset. A shutdown is handled in one of two ways depending upon whether the system is a uniprocessor or an MP system:

1. In a uniprocessor system, Hydra performs the following:
   (a) Generated MBRDYn to terminate the shutdown cycle.
   (b) Generates a reset pulse to the processor.
2. In a multiprocessor system, Hydra performs the following sequence:
   (a) Generated MBRDYn to terminate the shutdown cycle.
   (b) Interrupt the processor in slot 0 with the vector specified in the shutdown interrupt vector register (SIV) to inform it that a processor has gone down.
   (c) Sets the shutdown status bit (bit 0) in the PST1 status register.

[4] See page 30

1.1.11 Flush Handling

Flush cycles are initiated in response to an IPC flush action request or as the result of a write back invalidate special cycle. The write back invalidate cycle is always ignored, and simply terminated with a MBRDYn. This cycle is always followed by an invalidate cycle. If the SCFLUSHDIS bit (bit 5 of the CONFIG register) is set, the invalidate cycle will simply be completed with a MBRDYn. If the SCFLUSHDIS bit is not set, or an IPC flush request was received, Hydra asserts the FLUSHn output signal for two clocks, and sets the flush in progress bit (FLUSHIP) in the system status register (SYSSTAT). When all of the processors have completed the flush operation (signified by the respective FSIOUTn signals going high), the FLUSHIP bit will be cleared.

1.2 Chimaera Register Cycle Completion

Hydra will terminate all Chimaera chipset register cycles by driving MBRDYn.

1.3 System Considerations

Certain assumptions about the system design have been made during the architecting of Hydra.

In order to provide the correct level of control for bus masters and slaves, there are some limitations as to the capability of the slots on the Lethe bus. Lethe slots are expected to be utilized as follows:

slot 0 Boot processor, must be 80x86 series.

slot 1 CPU1 slot 2 CPU2 slot 3 CPU3 slot 4 Primary I/O channel slot 5 Secondary I/O channel or secondary memory card slot 6 Primary memory card

A system of limited capability could therefore omit any of slots 1 through 3, as well as slot 5.

All bus requests MREQn[i] will need to be pulled up to the inactive state on the planar.

1.4 Limitations

As currently defined, Hydra has the following system limitations:

1. A system running in full DOS compatibility mode will support only one processor. However, with the correct drivers and programming of the KBDMODE bit, the boot processor could possibly run DOS while the remaining processors in an MP system run another O/S.

2. Hydra will not support 2 I/O channels when running in a uni-processor fully DOS compatible mode.

> Programmer's Note
>
> Parity reporting should be turned off in the EBB since Bifrost will be generating parity for the Lethe bus.

14

*CONTENTS*

1.5 Registers

The registers in Hydra can be accessed through an interface similar to that which was developed for Shiva, i.e. data and auto-incrementing index registers. Because Hydra provides the interrupt vector to processors on interrupt acknowledge cycles (which must be on byte 0), all data communications with Hydra will be through bytes 0 and 1. There are six index registers, one for each processor, and one for each of the two possible I/O channels. The index registers always increment by words. Individual bytes are accessed via the appropriate byte enables.

Since Hydra is designed for a multiprocessor system, there are certain registers that are duplicated for each processor. In order to provide quick access to these registers without the requirement that a processor know its identity, the processor specific registers are multiplexed together via the bus grant bits, and are accessible at index locations 20h through 38h as the current processor register space. I/O masters cannot access the processor specific registers through the current processor space.

The ability to initiate an IPC cycle with a minimum of processor overhead is provided by the 16 bit IPC port. This port is located at I/O address H'0B0' after a POK. Bits 11 through 4 of this address can be changed by writing the desired address into the IPCADR register. Writing an IPC message to this location initiates the IPC process in Hydra. This operation can be performed by any of the system processors or an I/O bridge.

1.5.1 Configuration Registers

LMC - Lethe Master Configuration

| 15 | 14 | 13-12 | 11-10 | 9-8 | 7-6 | 5-4 | 3-2 | 1-0 |
|---|---|---|---|---|---|---|---|---|
| reserved | ASGEN | ASGARD[1:0] | M5 | M4 | M3 | M2 | M1 | M0 |

ASGEN This bit controls the tri-state drivers on the Asgard programming bits. When B'0' the outputs are tri-stated, allowing the cpu card pullup/pulldown resistors to control the default mode of Asgard.

ASGARD [1:0] These are the 2 control bits necessary to control the modes of Asgard.

ASGARD[1 ]WWORn .................... Weak write ordering

ASGARD[0 ]PLOCKEN .................... Pseudo lock enable

Mn Indicates what type of node is in each of the nodes of the system.

B'00' .................... Not present

B'01' ................ Lethe Bus Slave

B'10' .......... Lethe Bus I/O Bridge

B'11' ................ Processor Node

Programmer's Note

These bits must be set correctly for the processor slots M[3:0] in order for the flush status logic to function correctly.

This register defaults to H'0000' after POK is asserted.

CONFIG - System Configuration Register

| 7 | 6 | 5 | 4 | 3 | 2 | 1 | 0 |
|---|---|---|---|---|---|---|---|
| FLUSHIP | SLOW | SCFLUSHDIS | PAR | KBDMODE | MP | INTMODE | ERRMODE |

FLUSHIP When high, this bit indicates that a processor cache flush operation is in progress. This bit is read only.

SLOW A B'1' in this bit enables slow mode for maximum DOS compatibility.

SCFLUSHDIS When high, this bit disables the generation of flush cycles on special cycles.

PAR Parallel interrupt. When high, this bit allows both I/O channels to generate interrupts in parallel. When low, I/O channel interrupts can not be accepted simultaneously.

KBDMODE A B'1' in this bit will cause all processors to be reset if a keyboard reset is generated in the system. If this bit is cleared (B'0'), only the boot processor (in slot 0) will be reset.

MP A B'1' in this bit indicates that the system is operating in a multiprocessor mode.

Programmer's Note

Incorrect programming of this bit will result in improper handling of shutdown cycles.

INTMODE This bit selects the compatibility mode for interrupt handling.

B'0' .............................. Compatible

B'1' .................................. Modern

Programmer's Note

Care must be taken to make certain that Bifrost is programmed in the same mode.

ERRMODE A B'1' in this bit enables the PARERRn output to the ISP. This provides DOS compatibility by generating a parity interrupt to the ISP on all bus parity and double bit ECC errors.

This register defaults to H'01' after a system POK.

BMPC - Bus Master Preemption Count

| 7-4 | 3-0 |
|---|---|
| reserved | BMPC |

The bus master preemption count is a four bit value that specifies the maximum number of bus transactions that a bus master can own the Lethe bus if another master is requesting the bus. If a master exceeds this count, it will be pre-empted by removing its MGRn. This counter will not run if a processor is parked on the bus (i.e. with no other masters requesting). Setting this register to H'00' disables the timeout. The default value of this register is H'00' (timeout disabled).

MTP[3-0] - Master Task Priority Register

| 7-0 |
|---|
| MTP |

The master task priority register is an eight bit register. This register can be dynamically changed to indicate the priority of the task currently executing on a given processor. It is used for determining the target of an interrupt in the implicit destination mode. The default value of this register is H'00'.

ARBSTAT - Arbiter bus master status

| 7-6 | 5 | 4 | 3 | 2 | 1 | 0 |
|---|---|---|---|---|---|---|
| reserved | MGR5n | MGR4n | MGR3n | MGR2n | MGR1n | MGR0n |

A B'1' indicates that the slot is the bus master or that the master is currently parked on the bus. Only one bit will be asserted at any time.

PST1[3:0] - Processor status register 1

| 7 | 6 | 5 | 4 | 3 | 2 | 1 | 0 |
|---|---|---|---|---|---|---|---|
| reserved | FSIOUTn | Proc BIST | Cache BIST | Bus E | RESET | HALT | SHUTDOWN |

FSIOUTn This bit reflects the current state of the FSIOUTn pin from the processor/cache complex. An installed processor that is being held in reset will drive this line low.

Proc BIST This bit, when high, indicates that the corresponding processor has passed its internal BIST. This bit must be set by POST.

Cache BIST This bit, when high, indicates that the cache on the corresponding processor card has passed its internal BIST. This bit is read only.

Bus E A B'1' indicates that a bus cycle has completed since the last time processor reset was asserted or this bit was cleared.

RESET This bit indicates, when high, that the corresponding processor has its reset pin asserted. This bit is read only.

HALT This bit, when high, indicates that the corresponding processor is in the halt state. This bit is read only.

SHUTDOWN This bit indicates, when high, that the corresponding processor is in the shutdown state. This bit is read only.

There are four of these registers, one for each processor. This register defaults to H'04' after POK.

PST2[3:0] - Processor status register 2

| 7-6 | 5-2 | 1-0 |
|---|---|---|
| reserved | Processor Type | Slot |

Processor Type

B'0000' .......................... 486

B'0001' .......................... 586

B'0010'-B'1111' ............ undefined

Programmer's Note

This field must be set in POST after BIST completes.

Slot A 2 bit binary field that indicates which bus slot a processor is in. This field is used for 'Who Am I' indication and is 'hard wired' in logic.

There are four of these registers, one for each processor.

Except for the slot field, this register is cleared on POK.

1.5.2 Interrupt Control

IPCADR – IPC Register Base Address

| 7-0 |
|---|
| I/O A11-4 |

The IPCADR register contains bits 11 to 4 of the IPC register base address. This register can be changed if it is deemed necessary to move the IPC register in the I/O map.

This register defaults to H'0B' after a POK.

IPR – Interrupt Priority Register

| 7-6 | 5-4 | 3-2 | 1-0 |
|---|---|---|---|
| DIAG | IPC | PER | HARD |

The IPR specifies the priority of four classes of interrupts. These four classes and their fields are:

DIAG Relative priority of diagnostic processor interrupts.

IPC Relative priority of interprocessor communication interrupts. IPC interrupts are further broken down such that explicit IPC interrupts have higher priority than implicit IPC interrupts.

PER Relative priority of periodic interrupts.

HARD Relative priority of hardware interrupts. These are further broken down such that shutdown interrupts have a higher priority than soft ECC errors.

The priority of these interrupts can be changed by altering the appropriate two bit field in the IPR. This programmability allows each of six interrupts (SHUT, ECC, DIAG, IPCe, IPCi, and PI) to be programmed at one of four possible levels. It should be noted that one of these levels (field set to B'11') is higher than the four non-programmable interrupts (FERR, NMI, I/OIPC1, I/OIPC0). Note that the priority level of an interrupt is dependent on the value programmed for the other classes of interrupts as well as its own. If the value of the IPR is known, the list below can be used to determine the priority of every interrupt relative to each other.

To identify the priority of the ten possible interrupts, ignore all lines that do not have the correct IPR values listed at the right. Ten lines should remain for any particular setting of the IPR. These lines will be in the order from top to bottom of their relative priority.

- Interprocessor IPC's (explicit) .......................... IPR(5:4) = B11
- Interprocessor IPC's (implicit) .......................... IPR(5:4) = B11
- Hardware interrupts (shutdown) .......................... IPR(1:0) = B11
- Hardware interrupts (soft ECC) .......................... IPR(1:0) = B11
- Periodic interrupts .......................... IPR(3:2) = B11
- Diagnostic controller interrupts .......................... IPR(7:6) = B11

- FERR
- NMI
- I/O IPC's (I/O 1)
- I/O IPC's (I/O 0)
- Hardware interrupts (shutdown) .......................... IPR(1:0) = B10
- Hardware interrupts (soft ECC) .......................... IPR(1:0) = B10
- Diagnostic controller interrupts .......................... IPR(7:6) = B10
- Interprocessor IPC's (explicit) .......................... IPR(5:4) = B10
- Interprocessor IPC's (implicit) .......................... IPR(5:4) = B10
- Periodic interrupts .......................... IPR(3:2) = B10

- Interprocessor IPC's (explicit) .......................... IPR(5:4) = B01
- Interprocessor IPC's (implicit) .......................... IPR(5:4) = B01
- Hardware interrupts (shutdown) .......................... IPR(1:0) = B01
- Hardware interrupts (soft ECC) .......................... IPR(1:0) = B01
- Periodic interrupts .......................... IPR(3:2) = B01
- Diagnostic controller interrupts .......................... IPR(7:6) = B01

- Interprocessor IPC's (explicit) .......................... IPR(5:4) = B00
- Interprocessor IPC's (implicit) .......................... IPR(5:4) = B00
- Hardware interrupts (shutdown) .......................... IPR(1:0) = B00
- Hardware interrupts (soft ECC) .......................... IPR(1:0) = B00
- Periodic interrupts .......................... IPR(3:2) = B00
- Diagnostic controller interrupts .......................... IPR(7:6) = B00

Example: If the IPR is programmed with a value of X'39', the IPR would be as follows:

| 7-6 | 5-4 | 3-2 | 1-0 |
|---|---|---|---|
| DIAG | IPC | PER | HARD |
| B'00' | B'11' | B'10' | B'01' |

The priority of the interrupts will be as follows: (highest priority listed first)

- Interprocessor IPC's (explicit) .......................... IPR(5:4) = B11
- Interprocessor IPC's (implicit) .......................... IPR(5:4) = B11
- FERR
- Masked NMI's
- I/O IPC's (I/O 2)
- I/O IPC's (I/O 1)
- Periodic interrupts .......................... IPR(3:2) = B10
- Hardware interrupts (shutdown) .......................... IPR(1:0) = B01
- Hardware interrupts (soft ECC) .......................... IPR(1:0) = B01
- Diagnostic controller interrupts .......................... IPR(7:6) = B00

This register is cleared upon POK.

LIV[3:0] – Last Interrupt Vector Register

| 7-0 |
|---|
| LIV |

This 8 bit register contains the vector of the last interrupt generated to a particular processor. There are actually four of these registers, one for each processor node. This register is cleared upon POK.

LISR[3:0] – Last Interrupt Serviced Register

| 3-0 |
|---|
| LISR |

This 4 bit register contains in its binary encoded field, the interrupt that has been most recently serviced by a particular processor. Its value can be considered a pointer into the interrupt status register to indicate the interrupt source. There are four of these registers, one for each processor node. This register is cleared upon POK.

IMSK[3:0] – Interrupt Mask Register

| 15-10 | 9 | 8 | 7 | 6 | 5 | 4 | 3 | 2 | 1 | 0 |
|---|---|---|---|---|---|---|---|---|---|---|
| reserved | FERR | MNMI | DIAG | SHUT | ECC | PI | CPUI | CPUE | I/O 1 | I/O 0 |

FERR Floating point error interrupt enable

MNMI NMI to INT interrupt enable

DIAG Diagnostic processor interrupt enable

SHUT Shutdown interrupt enable

ECC Single bit ECC error interrupt enable

PI Periodic interrupt enable

CPUI Implicit CPU IPC interrupt enable

CPUE Explicit CPU IPC interrupt enable

I/O 1 I/O channel 1 IPC interrupt enable

I/O 0 I/O channel 0 IPC interrupt enable

A B'1' in a bit enables the corresponding interrupt. There are four of these registers, one for each processor node. These registers default to H'0000' after POK.

Programmer's Note

When operating in the DOS compatible mode (CONFIG register INTMODE=b'1'), the IMSK registers should be set to h'0000'.

MNMIMASK[3:0] – MNMI Mask Register

| 7 | 6 | 5 | 4 | 3 | 2 | 1 | 0 |
|---|---|---|---|---|---|---|---|
| reserved | DEADLOCK | PROC NMI | I/O 0 IPC | I/O 1 IPC | Reserved | ECC/PAR | Reserved |

DEADLOCK - System Deadlock interrupt enable

PROC NMI - CPU IPC interrupt enable

I/O 0 IPC - I/O Channel 0 interrupt enable

I/O 1 IPC - I/O Channel 1 interrupt enable

ECC/PAR - System parity error and double bit ECC error interrupt enable. This error is caused by the assertion of PERRn on the Lethe bus.

There are four of these registers, one for each processor node. A B'1' enables the respective interrupt. This register defaults to H'00' after POK (all NMI's disabled).

Programmer's Note

It is probable that when an event is programmed to cause an NMI, it should be masked from causing an interrupt.

ISR[3:0] – Interrupt Status Register

| 15-10 | 9 | 8 | 7 | 6 | 5 | 4 | 3 | 2 | 1 | 0 |
|---|---|---|---|---|---|---|---|---|---|---|
| reserved | FERR | MNMI | DIAG | SHUT | ECC | PI | CPUI | CPUE | I/O 1 | I/O 0 |

FERR Floating point error interrupt

MNMI NMI to INT interrupt

DIAG Diagnostic processor interrupt

SHUT Shutdown interrupt

ECC Single bit ECC error interrupt

PI Periodic interrupt

CPUI Implicit CPU IPC interrupt

CPUE Explicit CPU IPC interrupt

I/O 1 I/O channel 1 IPC interrupt

I/O 0 I/O channel 0 IPC interrupt

A B'1' in a bit indicates that the corresponding interrupt is pending. There are four of these registers, one for each processor node. The diagnostic processor can generate the DIAG interrupt by writing to this register with bit 7 high. The value of bits 6 through 0 during this write will have no effect on the contents of this register. The interrupts are cleared on the second interrupt acknowledge cycle. This register defaults to H'00' after POK.

NMIMASK[3:0] – NMI Mask Register

| 7 | 6 | 5 | 4 | 3 | 2 | 1 | 0 |
|---|---|---|---|---|---|---|---|
| NMI EN | DEADLOCK | PROC NMI | I/O 0 IPC | I/O 1 IPC | Reserved | ECC/PAR | Reserved |

NMI EN - Hydra NMI Enable.

DEADLOCK - System Deadlock interrupt enable

PROC NMI - CPU IPC NMI interrupt enable

I/O 0 IPC - I/O Channel 0 NMI interrupt enable

I/O 1 IPC - I/O Channel 1 NMI interrupt enable

ECC/PAR - System parity error and double bit ECC error interrupt enable

There are four of these registers, one for each processor node. A B'1' enables the respective interrupt. This register defaults to H'00' after POK (all NMI's disabled).

NMISR[3:0] – NMI Status Register

| 7 | 6 | 5 | 4 | 3 | 2 | 1 | 0 |
|---|---|---|---|---|---|---|---|
| NMI ACTIVE | DEADLOCK | PROC NMI | I/O 0 IPC | I/O 1 IPC | Reserved | ECC/PAR | Reserved |

NMI ACTIVE - Hydra NMI active

DEADLOCK - System Deadlock interrupt

PROC NMI - CPU IPC NMI interrupt

I/O 0 IPC - I/O Channel 0 NMI interrupt

I/O 1 IPC - I/O Channel 1 NMI interrupt

ECC/PAR - System parity and double bit ECC error interrupt

A B'1' indicates that the respective interrupt is active. This register is cleared upon POK. There are four of these registers, one for each processor node.

Interrupt Vector Registers

| 7-0 |
|---|
| Vector |

These eight bit registers contain the 8 bit interrupt vectors that are returned during the respective interrupt acknowledge cycles.

System interrupt vectors:

DCIV ........................ Diagnostics controller interrupt vector

SIV ........................ Shutdown interrupt vector

SECCIV ........................ Single bit ECC interrupt vector

PIV ........................ Periodic interrupt vector

FPEIV ........................ Floating point error interrupt vector

MNMIV ........................ Masked non-maskable interrupt vector

Processor specific interrupt vectors:

CPU[3 – 0]IMV ............ Processor implicit IPC interrupt vector

CPU[3 – 0]EMV ............ Processor explicit IPC interrupt vector

Note: This register is read only. It is loaded via the IPC mechanism.

IO0IPC[3 – 0]MV ........................ I/O 0 IPC interrupt vector

Note: This register is read only. It is loaded via the IPC mechanism.

IO1IPC[3 – 0]MV ........................ I/O 1 IPC interrupt vector

Note: This register is read only. It is loaded via the IPC mechanism.

These registers are cleared upon POK.

FPSTAT - Floating Point Status Register

| 7 | 6-5 | 4 | 3 | 2 | 1 | 0 |
|---|---|---|---|---|---|---|
| Reserved | FPMODE | INT 13 | FERR 3 | FERR 2 | FERR 1 | FERR 0 |

| | | |
|---|---|---|
| FPMODE | B'11' .................... modern MP | |
| | B'10' .................... undefined | |
| | B'01' .................... 286 MP | |
| | B'00' .................... 286 UP. | |

INT 13 A B'1' in this bit indicates that INT13 to the ISP is active.

FERR 3 A B'1' in this bit indicates that the floating point error from processor 3 is active.

FERR 2 A B'1' in this bit indicates that the floating point error from processor 2 is active.

FERR 1 A B'1' in this bit indicates that the floating point error from processor 1 is active.

FERR 0 A B'1' in this bit indicates that the floating point error from processor 0 is active.

This register is cleared upon POK. When a processor acknowledges the interrupt, the appropriate status bit in this register is cleared on the second interrupt acknowledge cycle.

1.5.3 Timer Control

TDR – Timer Divisor Register

| 15-13 | 12-0 |
|---|---|
| reserved | TDR |

This 13 bit register contains the divisor for the first stage of the periodic interval timer. This value can be changed to accommodate different bus speeds.

This register defaults to H'97F' (2431, appropriate for a 33 Mhz bus) upon POK.

TIP – Timer Period

| 7-0 |
|---|
| TIP |

This eight bit value sets the period of the periodic interrupt timer. The period of this counter can be determined by dividing the bus speed by the value in the TDR register, i.e. 33333333/2431=72.93 $\mu$seconds for the default, a 33 Mhz bus system. This value will closely approximate the desired 60 and 100 hz interrupt periods.

Possible frequencies (assuming 33Mhz system bus) include:

| Period | Count | Error |
|---|---|---|
| 53 hz | 255 (H'FF') | 0 |
| 60 hz | 228 (H'E4') | .0001% |
| 100hz | 137 (H'89') | .0001% |
| 13711hz | 1 (H'01') | 0 |

This register is set to H'E4' (60 Hz interval) upon POK.

TIC - Interrupt Timer Count Register

| 7-0 |
|---|
| TIC |

The 8 eight bit interrupt timer count register contains the present count value of the periodic interrupt counter. It can be used by the operating system to provide finer granularity timing functions than the periodic interrupt timers.

TCC[3:0] – Timer Count Compare Registers

| 7-0 |
|---|
| TCC |

The eight bit timer count compare register contains the value that is compared to the timer count register to generate the periodic processor interrupt. There are four of these registers, one for each possible processor. They are used to skew in time the periodic interrupts to the different processors so that they are not all entering their timer service routine at the same time. Registers TCC0 through TCC3 are set to H'00', H'39', H'72', and H'AB' respectively upon POK, to provide an evenly skewed 60 Hz interrupt.

1.5.4 Slow Mode Configuration Registers

SMCMP - Slow Mode Compare Register

| 15-0 |
|---|
| SMCMP |

This register is loaded with the number of clocks that the grants are blocked from cpu0.

SMGECMP - Slow Mode Grant Enable Compare Register

| 7-4 | 3-0 |
|---|---|
| reserved | SMGECMP |

This register is loaded with the number of MADSn's that processor 0 will be allowed to perform when in slow mode and the SMCMP register matches the SMCNT register.

SMCNT - Slow Mode Count Register

| 15-0 |
|---|
| SMCNT |

This counter counts the number of MADSn's that cpu0 has been blocked from receiving bus grants.

Note: This register is for diagnostic purposes only. It should not be written to in normal operation.

SMGECNT - Slow Mode Grant Enable Count Register

| 7-4 | 3-0 |
|---|---|
| reserved | SMGECNT |

This counter counts the number of MADSn's that cpu 0 has generated when in slow mode.

Note: This register is for diagnostic purposes only. It should not be written to in normal operation.

PCNT[3:0] - Processor Preemption Counters

| 7-4 | 3-0 |
|---|---|
| reserved | PCNT |

These registers count the number of MADSn's that the respective masters have performed on the bus. They are used for camping preemption.

Note: These registers are for diagnostic purposes only. They should not be written to in normal operation.

PCNT54 - I/O Channel Preemption Counters

| 7-4 | 3-0 |
|---|---|
| PCNT I/O 1 | PCNT I/O 0 |

This register counts the number of MADSn~'s that I/O channels 1 and 0 have performed on the bus. They are used for camping preemption.

Note: These registers are for diagnostic purposes only. They should not be written to in normal operation.

1.5.5 Error Handling and Reporting

EFR - Error fault register

| 15 | 14 | 13 | 12 | 11 | 10 | 9 | 8 |
|---|---|---|---|---|---|---|---|
| IERR3 | IERR2 | IERR1 | IERR0 | VALID | R/W | M/IO | D/C |

| 7-5 | 4 | 3 | 2 | 1 | 0 |
|---|---|---|---|---|---|
| SOURCE ID | Reserved | SHUTDOWN | ECC/PAR | CPUPAR | SOFT |

The error fault register indicates the source and type of the last system error that has occurred.

IERR[3 – 0] A B'1' in this bit indicates that an internal processor error has occurred in the respective processor.

VALID A B'1' in this bit indicates that the EFR contains valid error information. When the valid bit is set, additional errors will not be logged in this register. It is expected that the error service routine will clear this bit after the error has been logged. This is the only writable bit in this register.

R/W M/IO D/C These bits indicate the type of cycle that caused the error indicated in the EFR.

SOURCE ID These 3 bits contain the slot number of the device that caused the error.

SHUTDOWN A B'1' in this bit indicates that a shutdown error has occurred.

ECC/PAR A B'1' in this bit indicates that a double bit ECC or Lethe bus parity error has occurred.

CPUPAR A B'1' in this bit indicates that a cpu subsystem or I/O bus parity error has occurred.

SOFT A B'1' in this bit indicates that a single bit (correctable) ECC error has occurred.

This register is cleared upon POK.

1.5.6 Diagnostic Controller Interface

DCCMD - Diagnostic Controller Command Register

| 7-0 |
|---|
| Command |

This register is used to pass commands between the host processors and the diagnostics processor. Since both sides have read/write access, the software protocol to pass messages between processors must be rigidly adhered to.

This register is cleared upon POK.

DCDAT - Diagnostic Controller Data Register

| 7-0 |
|---|
| Data |

This register is used to pass data between the host processors and the diagnostic controller.

This register is cleared upon POK.

DCLOCK - Diagnostics Controller Port Lock Bit

| 7-2 | 1 | 0 |
|---|---|---|
| reserved | SSP Alive | LOCK |

The SSP Alive bit indicates that the SSP is alive. It is set by the diagnostic controller. When set, it initializes a counter with a period of x mS. At the end of this period the alive bit will be cleared if the SSP has not written to the alive bit to reset the counter.

The diagnostics controller port lock bit is used to provide a semaphore mechanism for multibyte message transfers to the diagnostic controller. When B'0', a read by a processor returns a B'0' and causes it to be set. If a process, processor or device reads a B'0' in the lock bit that processor will own the gateway to the diagnostics processor. If it reads a B'1' then the gateway is presently in use and it must keep trying until is reads a B'0'. This bit is read/write by both the diagnostics controller and the system processors and devices. This bit is set upon POK. It will be cleared by the SSP when it is ready to begin communications with the system processors.

DCRSTCR - Diagnostics Controller Reset Control Register

| 7-4 | 3 | 2 | 1 | 0 |
|---|---|---|---|---|
| reserved | Processor 3 Reset Override | Processor 2 Reset Override | Processor 1 Reset Override | Processor 0 Reset Override |

This register provides the diagnostics processor with the ability to override the reset control of any of the host processors. The diagnostics processor can put any of the host processors into reset by writing a B'1' into the respective bit in this register.

This register is cleared upon assertion of POK, and can only be written to by the diagnostics processor.

1.5.7 Miscellaneous registers

HID - Hydra Identification Register

| 15-3 | 2-0 |
|---|---|
| Diagnostic controller type | Hydra Revision |
| r/w | r/o |

The Hydra identification register provides a method for the diagnostics and host processors to determine the revision level of the Hydra in the system. The remaining 13 bits will be cleared upon POK, and can be used by the diagnostics processor to indicate to the host processors what type of diagnostics processor is installed and what its capabilities are. The initial version of Hydra will contain B'000' in the revision field.

SCR[3:0][3:0] - Processor Scratch Registers

| 15-0 |
|---|
| Scratch register |

The scratch registers consist of four sets of four sixteen bit read/write registers, one for each processor. They are available for any purpose desired by the systems programmer. The scratch registers are cleared upon POK.

Reserved registers

The reserved registers are r/w registers that are available for use by BIOS. There is no guarantee that these registers will be available for general use in future revisions of Hydra.

32

*CONTENTS*

1.6 Address Map

| I/O Address | Size | Register |
|---|---|---|
| 00e0h | 8 | Hydra Index Register |
| 00e1h | 8 | DCLOCK - Diagnostic Controller Lock Register |
| 00e8h | 16 | Hydra Data Register |
| 00b0h | 16 | Hydra IPC Register |

| System Registers | | | | | | |
|---|---|---|---|---|---|---|
| Index | BEn[1:0] | Type | Size | Default | Register | Page |
| 00h | 00 | r/w | 16 | 097fh | TDR Interrupt timer divisor | 26 |
| 02h | 10 | r/w | 8 | 0e4h | TIP Interrupt timer period | 26 |
| 02h | 01 | r/o | 8 | - | TIC Interrupt timer count | 27 |
| 04h | 10 | r/w | 8 | 00h | DCIV Diagnostics ctrlr interrupt vector | 25 |
| 04h | 01 | r/w | 8 | 00h | SIV Shutdown interrupt vector | 25 |
| 06h | 10 | r/w | 8 | 00h | SECCIV Hardware interrupt vector | 25 |
| 06h | 01 | r/w | 8 | 00h | PIV Periodic interrupt vector | 25 |
| 08h | 10 | r/o | 8 | 00h | DCRSTCR diagnostic proc. reset control reg | 30 |
| 08h | 01 | r/w | 8 | 00h | BMPC Bus master preemption count | 17 |
| 0ah | 00 | r/w | 16 | 0000h | Reserved 0 | 31 |
| 0ch | 00 | r/w | 16 | 0000h | Reserved 1 | 31 |
| 0eh | 00 | r/m | 16 | 0000h | EFR Error fault type register | 29 |
| 10h | 10 | r/w | 8 | 00h | DCCMD Diag controller command register | 30 |
| 10h | 01 | r/w | 8 | 00h | DCDAT Diag controller data register | 30 |
| 12h | 10 | r/w | 8 | 01h | DCLOCK Diag controller lock register* | 30 |
| 12h | 01 | r/o | 8 | 00h | ARBSTAT arbiter bus master status | 17 |
| 14h | 10 | r/w | 8 | 00h | Reserved 2 | 31 |
| 14h | 01 | r/w | 8 | 00h | FPSTAT Floating point status register | 25 |
| 16h | 00 | r/w | 16 | 0000h | LMC Lethe master configuration | 15 |
| 18h | 10 | r/w | 8 | 00h | CONFIG System configuration register | 16 |
| 18h | 01 | r/w | 8 | 00h | Reserved 3 | 31 |
| 1ah | 00 | r/w | 16 | 0000h | HID Hydra identification register | 31 |
| 1ch | 10 | r/w | 8 | 00h | IPR Interrupt priority register | 19 |
| 1ch | 01 | r/w | 8 | 0bh | IPCADR IPC register base address | 19 |
| 1eh | 10 | r/w | 8 | 00h | FPEIV Floating point error interrupt vector | 25 |
| 1eh | 01 | r/w | 8 | 00h | MNMIV Masked NMI interrupt vector | 25 |
| Current Processor Registers | | | | | | |
| Index | BEn[1:0] | Type | Size | Default | Register | Page |
| 20h | 10 | r/w | 8 | - | TCC Timer count compare register | 27 |
| 20h | 01 | r/w | 8 | - | MTP Master task priority | 17 |
| 22h | 10 | r/o | 8 | - | LIV Last interrupt vector register | 21 |
| 22h | 01 | r/o | 8 | - | LISR Last interrupt serviced register | 22 |
| 24h | 00 | r/w | 16 | - | IMSK Interrupt mask reg | 22 |
| 26h | 00 | r/o | 16 | - | ISR Interrupt status register | 23 |
| 28h | 10 | r/w | 8 | - | NMIMASK NMI source mask register | 24 |
| 28h | 01 | r/w | 8 | - | NMISR NMI status register | 24 |
| 2ah | 10 | r/w | 8 | - | MNMIMASK Masked NMI mask register | 23 |
| 2ah | 01 | r/w | 8 | - | PST1 Processor Status register 1 | 18 |
| 2ch | 10 | r/w | 8 | - | PST2 Processor Status register 2 | 18 |
| 2ch | 01 | r/w | 8 | - | IO0IPCMV I/O 0 IPC message interrupt vector | 25 |
| 2eh | 10 | r/w | 8 | - | IO1IPCMV I/O 1 IPC message interrupt vector | 25 |
| 2eh | 01 | r/w | 8 | - | CPUxIMV CPU Implicit IPC interrupt vector | 25 |
| 30h | 10 | r/w | 8 | - | CPUxEMV CPU Explicit IPC interrupt vector | 25 |
| 30h | 01 | r/w | 8 | - | PCNTx Preemption counter | 28 |
| 32h | 00 | r/w | 16 | - | SCR0 Scratch register 0 | 31 |
| 34h | 00 | r/w | 16 | - | SCR1 Scratch register 1 | 31 |
| 36h | 00 | r/w | 16 | - | SCR2 Scratch register 2 | 31 |
| 38h | 00 | r/w | 16 | - | SCR3 Scratch register 3 | 31 |

* Note: The diagnostic controller has r/w access to this register.

| Index | BEn[1:0] | Type | Size | Default | Register | Page |
|---|---|---|---|---|---|---|
| **Processor 0 Registers** | | | | | | |
| 40h | 10 | r/w | 8 | 00h | TCC0 Timer count compare register | 27 |
| 40h | 01 | r/w | 8 | 00h | MTP Master task priority | 17 |
| 42h | 10 | r/o | 8 | 00h | LIV Last interrupt vector register | 21 |
| 42h | 01 | r/o | 8 | 00h | LISR Last interrupt serviced register | 22 |
| 44h | 00 | r/w | 16 | 0000h | IMSK Interrupt mask reg | 22 |
| 46h | 00 | r/o | 16 | 0000h | ISR Interrupt status register | 23 |
| 48h | 10 | r/w | 8 | 00h | NMIMASK NMI source mask register | 24 |
| 48h | 01 | r/w | 8 | 00h | NMISR NMI status register | 24 |
| 4ah | 10 | r/w | 8 | 00h | MNMIMASK Masked NMI mask register | 23 |
| 4ah | 01 | r/w | 8 | 00h | PST1 Processor Status register 1 | 18 |
| 4ch | 10 | r/w | 8 | 00h | PST2 Processor Status register 2 | 18 |
| 4ch | 01 | r/w | 8 | 00h | IO0IPCMV I/O 0 IPC message interrupt vector | 25 |
| 4eh | 10 | r/w | 8 | 00h | IO1IPCMV I/O 1 IPC message interrupt vector | 25 |
| 4eh | 01 | r/w | 8 | 00h | CPU0IMV CPU Implicit IPC interrupt vector | 25 |
| 50h | 10 | r/w | 8 | 00h | CPU0EMV CPU Explicit IPC interrupt vector | 25 |
| 50h | 01 | r/w | 8 | - | PCNT0 Preemption counter | 28 |
| 52h | 00 | r/w | 16 | 0000h | SCR0 Scratch register 0 | 31 |
| 54h | 00 | r/w | 16 | 0000h | SCR1 Scratch register 1 | 31 |
| 56h | 00 | r/w | 16 | 0000h | SCR2 Scratch register 2 | 31 |
| 58h | 00 | r/w | 16 | 0000h | SCR3 Scratch register 3 | 31 |
| **Processor 1 Registers** | | | | | | |
| **Index** | **BEn[1:0]** | **Type** | **Size** | **Default** | **Register** | **Page** |
| 60h | 10 | r/w | 8 | 39h | TCC1 Timer count compare register | 27 |
| 60h | 01 | r/w | 8 | 00h | MTP Master task priority | 17 |
| 62h | 10 | r/o | 8 | 00h | LIV Last interrupt vector register | 21 |
| 62h | 01 | r/o | 8 | 00h | LISR Last interrupt serviced register | 22 |
| 64h | 00 | r/w | 16 | 0000h | IMSK Interrupt mask reg | 22 |
| 66h | 00 | r/o | 16 | 0000h | ISR Interrupt status register | 23 |
| 68h | 10 | r/w | 8 | 00h | NMIMASK NMI source mask register | 24 |
| 68h | 01 | r/w | 8 | 00h | NMISR NMI status register | 24 |
| 6ah | 10 | r/w | 8 | 00h | MNMIMASK Masked NMI mask register | 23 |
| 6ah | 01 | r/w | 8 | 04h | PST1 Processor Status register 1 | 18 |
| 6ch | 10 | r/w | 8 | 01h | PST2 Processor Status register 2 | 18 |
| 6ch | 01 | r/w | 8 | 00h | IO0IPCMV I/O 0 IPC message interrupt vector | 25 |
| 6eh | 10 | r/w | 8 | 00h | IO1IPCMV I/O 1 IPC message interrupt vector | 25 |
| 6eh | 01 | r/w | 8 | 00h | CPU1IMV CPU Implicit IPC interrupt vector | 25 |
| 70h | 10 | r/w | 8 | 00h | CPU1EMV CPU Explicit IPC interrupt vector | 25 |
| 70h | 01 | r/w | 8 | - | PCNT1 Preemption counter | 28 |
| 72h | 00 | r/w | 16 | 0000h | SCR0 Scratch register 0 | 31 |
| 74h | 00 | r/w | 16 | 0000h | SCR1 Scratch register 1 | 31 |
| 76h | 00 | r/w | 16 | 0000h | SCR2 Scratch register 2 | 31 |
| 78h | 00 | r/w | 16 | 0000h | SCR3 Scratch register 3 | 31 |

Note: all registers are accessible as words

| Index | BEn[1:0] | Type | Size | Default | Register | Page |
|---|---|---|---|---|---|---|
| **Processor 2 Registers** | | | | | | |
| 80h | 10 | r/w | 8 | 72h | TCC2 Timer count compare register | 27 |
| 80h | 01 | r/w | 8 | 00h | MTP Master task priority | 17 |
| 82h | 10 | r/o | 8 | 00h | LIV Last interrupt vector register | 21 |
| 82h | 01 | r/o | 8 | 00h | LISR Last interrupt serviced register | 22 |
| 84h | 00 | r/w | 16 | 0000h | IMSK Interrupt mask reg | 22 |
| 86h | 00 | r/o | 16 | 0000h | ISR Interrupt status register | 23 |
| 88h | 10 | r/w | 8 | 00h | NMIMASK NMI source mask register | 24 |
| 88h | 01 | r/w | 8 | 00h | NMISR NMI status register | 24 |
| 8ah | 10 | r/w | 8 | 00h | MNMIMASK Masked NMI mask register | 23 |
| 8ah | 01 | r/w | 8 | 04h | PST1 Processor Status register 1 | 18 |
| 8ch | 10 | r/w | 8 | 02h | PST2 Processor Status register 2 | 18 |
| 8ch | 01 | r/w | 8 | 00h | IO0IPCMV I/O 0 IPC message interrupt vector | 25 |
| 8eh | 10 | r/w | 8 | 00h | IO1IPCMV I/O 1 IPC message interrupt vector | 25 |
| 8eh | 01 | r/w | 8 | 00h | CPU2IMV CPU Implicit IPC interrupt vector | 25 |
| 90h | 10 | r/w | 8 | 00h | CPU2EMV CPU Explicit IPC interrupt vector | 25 |
| 90h | 01 | r/w | 8 | - | PCNT2 Preemption counter | 28 |
| 92h | 00 | r/w | 16 | 0000h | SCR0 Scratch register 0 | 31 |
| 94h | 00 | r/w | 16 | 0000h | SCR1 Scratch register 1 | 31 |
| 96h | 00 | r/w | 16 | 0000h | SCR2 Scratch register 2 | 31 |
| 98h | 00 | r/w | 16 | 0000h | SCR3 Scratch register 3 | 31 |
| **Processor 3 Registers** | | | | | | |
| Index | BEn[1:0] | Type | Size | Default | Register | Page |
| a0h | 10 | r/w | 8 | 0abh | TCC3 Timer count compare register | 27 |
| a0h | 01 | r/w | 8 | 00h | MTP Master task priority | 17 |
| a2h | 10 | r/o | 8 | 00h | LIV Last interrupt vector register | 21 |
| a2h | 01 | r/o | 8 | 00h | LISR Last interrupt serviced register | 22 |
| a4h | 00 | r/w | 16 | 0000h | IMSK Interrupt mask reg | 22 |
| a6h | 00 | r/o | 16 | 0000h | ISR Interrupt status register | 23 |
| a8h | 10 | r/w | 8 | 00h | NMIMASK NMI source mask register | 24 |
| a8h | 01 | r/w | 8 | 00h | NMISR NMI status register | 24 |
| aah | 10 | r/w | 8 | 00h | MNMIMASK Masked NMI mask register | 23 |
| aah | 01 | r/w | 8 | 04h | PST1 Processor Status register 1 | 18 |
| ach | 10 | r/w | 8 | 03h | PST2 Processor Status register 2 | 18 |
| ach | 01 | r/w | 8 | 00h | IO0IPCMV I/O 0 IPC message interrupt vector | 25 |
| aeh | 10 | r/w | 8 | 00h | IO1IPCMV I/O 1 IPC message interrupt vector | 25 |
| aeh | 01 | r/w | 8 | 00h | CPU3IMV CPU Implicit IPC interrupt vector | 25 |
| b0h | 10 | r/w | 8 | 00h | CPU3EMV CPU Explicit IPC interrupt vector | 25 |
| b0h | 01 | r/w | 8 | - | PCNT3 Preemption counter | 28 |
| b2h | 00 | r/w | 16 | 0000h | SCR0 Scratch register 0 | 31 |
| b4h | 00 | r/w | 16 | 0000h | SCR1 Scratch register 1 | 31 |
| b6h | 00 | r/w | 16 | 0000h | SCR2 Scratch register 2 | 31 |
| b8h | 00 | r/w | 16 | 0000h | SCR3 Scratch register 3 | 31 |
| **System Registers** | | | | | | |
| Index | BEn[1:0] | Type | Size | Default | Register | Page |
| c0h | 00 | r/w | 16 | - | SMCNT Slow mode counter | 28 |
| c2h | 10 | r/w | 8 | - | SMGECNT Slow mode grant enable counter | 28 |
| c2h | 01 | r/w | 8 | - | PCNT54 I/O channel preemption counters | 29 |
| c4h | 00 | r/w | 16 | 0000h | SMCMP Slow mode compare register | 27 |
| c6h | 10 | r/w | 8 | 00h | SMGECMP Slow mode grant enable compare register | 28 |

Note: all registers are accessible as words

1.7 Signals

1.7.1 Lethe Interface

| Name | Type | Description | Clock | Drive Strength |
|---|---|---|---|---|
| MA[15:3] | I | Lethe address bus | MCLK | - |
| MD[15:0] | I/O | Lethe data bus | MCLK | 16mA |
| MBEn[5:0] | I | Byte enables indicate which bytes of the data bus have or are requesting data. Also indicates special cycle types. | MCLK | - |
| MP[1:0] | I/O | Lethe data parity bus | MCLK | 16mA |
| MADSn | I | Lethe bus address strobe. | MCLK | - |
| MWR | I | Write or read cycle indication | MCLK | - |
| MDC | I | Data or code cycle indication | MCLK | - |
| MMIO | I | Memory or I/O cycle indication | MCLK | - |
| MLOCKn | I | Locked cycle indication | MCLK | - |
| MPALLn | I | Potential allocate indication | MCLK | - |
| MDBBn | I/O | Data bus busy signal | | 16mA |
| MBRDYn | O | Burst ready indication | MCLK | 16mA |
| MBRDYcn | I | Consensus burst ready indication | MCLK | - |
| MERDYn | I | Early ready indication | MCLK | 16mA |
| MBLASTn | I | Burst last indication | MCLK | - |
| MSERRn | I | Single bit memory error indication. | MCLK | - |
| MPERRn | I | Lethe data bus error. Also indicates memory multiple bit errors. | MCLK | - |
| MSID[2:0] | I | Slave ID | MCLK | - |
| MCLK | I | Lethe bus clock | - | - |

1.7.2 Arbitration

| Name | Type | Description | Clock | Drive Strength |
|---|---|---|---|---|
| MREQn[5:0] | I | M Bus Request. Each system node has an individual version of this pin. | MCLK | - |
| MGRn[5:0] | O | M Bus Grant. Each system node has an individual version of this pin. | MCLK | 16mA |
| MTALcn | I | Consensus secondary channel try again later signal. Assertion indicates that the current read cycle should be decoupled. Sampled at the end of the cacheablity window. | MCLK | - |
| MKWENDcn | I | Consensus cache window end signal. | MCLK | - |
| MSWENDcn | I | Consensus snoop window end signal. | MCLK | - |
| MKENcn | I | Consensus cacheability signal. | MCLK | - |
| MWTcn | I | Consensus write through signal. | MCLK | - |
| MHITMcn | I | Consensus hit to modified signal. | MCLK | - |

1.7.3 Interrupt Control

| Name | Type | Description | Clock | Drive Strength |
|---|---|---|---|---|
| INT[3:0] | O | Interrupt request to CPU | MCLK | 8mA |
| NMI[3:0] | O | Non maskable interrupt request to CPU | MCLK | 8mA |
| FERRn[3:0] | I | Floating point error from CPU | Async | - |
| IGNNEn[3:0] | O | Ignore numerical error to CPUs | MCLK | 8mA |
| ISPNMI[1:0] | I | Non-maskable interrupt request from ISPs | Async | - |
| ISPINT[1:0] | I | Interrupt request from ISPs | Async | - |
| PARERRn | O | Parity error interrupt to ISP | MCLK | 8mA |
| INT13 | O | Floating pointer error interrupt to ISP | MCLK | 8mA |
| HINT[1:0] | O | Interrupt control signal to Bifrost. | MCLK | 8mA |

1.7.4 System Control

| Name | Type | Description | Clock | Drive Strength |
|---|---|---|---|---|
| FLUSHn | O | Cache flush command | MCLK | 16mA |
| FSIOUTn[3:0] | I | Flush/Sync/Init complete signal from CPU | MCLK | - |
| IERRn[3:0] | I | Processor internal error | Async | - |
| RESETn[3:0] | O | Processor reset | MCLK | 8mA |
| RESETCPU | I | CPU reset from primary EBC | MCLK | - |
| POK | I | Conditioned Power OK | Async | - |

1.7.5 Test/Boundary Scan Support

| Name | Type | Description | Clock | Drive Strength |
|---|---|---|---|---|
| TESTEN | I | Output driver disable | - | - |
| TCK | I | Test Clock | - | - |
| TMS | I | Test Mode Select | TCLK | - |
| TDI | I | Test Data In | TCLK | 16mA |
| TDO | O | Test Data Out | TCLK | 16mA |

1.7.6 Diagnostics Processor Interface

| Name | Type | Description | Clock | Drive Strength |
|---|---|---|---|---|
| DCD[7:0] | I/O | Data bus | Async | 8mA |
| DCA[1:0] | I | Address bus | Async | - |
| DCSELn | I | Diagnostics processor port select | Async | - |
| DCWR | I | Write or Read Cycle Indication | Async | - |
| DCRDYn | O | Ready Indication | Async | 8mA |

1.7.7 Asgard Programming Bus

| Name | Type | Description | Clock | Drive Strength |
|---|---|---|---|---|
| ASGARD[1:0] | O | Asgard control bits | MCLK | 4mA |

1.7.8 Power

| Name | Type | Description | Clock | Drive Strength |
|---|---|---|---|---|
| VDD | I | Hydra power pins | - | - |
| GND | I | Hydra ground pins | - | - |

1.8 Packaging and Pinout

Hydra is packaged in a 160 pin PLCC package.

| Pin | Signal | Pin | Signal | Pin | Signal | Pin | Signal |
|---|---|---|---|---|---|---|---|
| 1 | | 41 | | 81 | | 121 | |
| 2 | | 42 | | 82 | | 122 | |
| 3 | | 43 | | 83 | | 123 | |
| 4 | | 44 | | 84 | | 124 | |
| 5 | | 45 | | 85 | | 125 | |
| 6 | | 46 | | 86 | | 126 | |
| 7 | | 47 | | 87 | | 127 | |
| 8 | | 48 | | 88 | | 128 | |
| 9 | | 49 | | 89 | | 129 | |
| 10 | | 50 | | 90 | | 130 | |
| 11 | | 51 | | 91 | | 131 | |
| 12 | | 52 | | 92 | | 132 | |
| 13 | | 53 | | 93 | | 133 | |
| 14 | | 54 | | 94 | | 134 | |
| 15 | | 55 | | 95 | | 135 | |
| 16 | | 56 | | 96 | | 136 | |
| 17 | | 57 | | 97 | | 137 | |
| 18 | | 58 | | 98 | | 138 | |
| 19 | | 59 | | 99 | | 139 | |
| 20 | | 60 | | 100 | | 140 | |
| 21 | | 61 | | 101 | | 141 | |
| 22 | | 62 | | 102 | | 142 | |
| 23 | | 63 | | 103 | | 143 | |
| 24 | | 64 | | 104 | | 144 | |
| 25 | | 65 | | 105 | | 145 | |
| 26 | | 66 | | 106 | | 146 | |
| 27 | | 67 | | 107 | | 147 | |
| 28 | | 68 | | 108 | | 148 | |
| 29 | | 69 | | 109 | | 149 | |
| 30 | | 70 | | 110 | | 150 | |
| 31 | | 71 | | 111 | | 151 | |
| 32 | | 72 | | 112 | | 152 | |
| 33 | | 73 | | 113 | | 153 | |
| 34 | | 74 | | 114 | | 154 | |
| 35 | | 75 | | 115 | | 155 | |
| 36 | | 76 | | 116 | | 156 | |
| 37 | | 77 | | 117 | | 157 | |
| 38 | | 78 | | 118 | | 158 | |
| 39 | | 79 | | 119 | | 159 | |
| 40 | | 80 | | 120 | | 160 | |

Index

Arbitration
    Hydra, 1

Deadlocks, 6
Diagnostics Processor, 10
Double Bit ECC Errors, 5

Floating point interrupts, 8
Flush Cycles, 12

Halt Cycles, 11
Hydra, 1
    Packaging, 40
    Periodic Interrupts, 9
    Pinout, 40
    Programmable Timer, 9
    Registers, 15
    Signals, 37
Hydra Limitations, 12
Hydra System Considerations, 12

IPC, 2

JTAG, 11

MPIC, 6

NMI, 5

Registers
    ARBSTAT, 17
    BMPC, 17
    CONFIG, 16
    CPU0EMV, 25
    CPU0IMV, 25
    CPU1EMV, 25
    CPU1IMV, 25
    CPU2EMV, 25
    CPU2IMV, 25
    CPU3EMV, 25
    CPU3IMV, 25
    CPUEMV, 25
    CPUIMV, 25
    DCCMD, 30
    DCDAT, 30
    DCIV, 25
    DCLOCK, 30
    DCRSTCR, 30
    EFR, 29
    FPEIV, 25
    FPSTAT, 25
    HID, 31
    IMSK, 22
    IO0IPCMV, 25
    IO1IPCMV, 25
    IPCADR, 19
    IPR, 19
    ISR, 23
    LISR, 22
    LIV, 21
    LMC, 15
    MNMIMASK, 23
    MNMIV, 25
    MTP, 17
    NMIMASK, 24
    NMISR, 24
    PCNT0, 28
    PCNT1, 28
    PCNT2, 28
    PCNT3, 28
    PCNT54, 29

PIV, 25
PST1, 18
PST2, 18
Reserved, 31
SCR0, 31
SCR1, 31
SCR2, 31
SCR3, 31
SECCIV, 25
SIV, 25
SMCMP, 27
SMCNT, 28
SMGECMP, 28
SMGECNT, 28
TCC, 27
TCC0, 27
TCC1, 27
TCC2, 27
TCC3, 27
TDR, 26
TIC, 27
TIP, 26

Shutdown Cycles, 11
Soft ECC Errors, 5
SSP, 10
System Parity Errors, 5

Bifrost Specification
Version 1.2

Bifrost–A (Dell PN 23999)
Bifrost–D (Dell PN 23997)

May 8, 1992

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1991

Contents

I Architecture 1

1 Macro Architecture 3
- 1.1 General 3
- 1.2 I/O Bus Decoupling 4
  - 1.2.1 Transfer Queueing 4
- 1.3 Coherent Memory Model 4
  - 1.3.1 MEI Memory Write–Through 5
  - 1.3.2 Lethe → MEI Transfer Ordering 5
  - 1.3.3 MEI → Lethe Transfer Ordering 5
  - 1.3.4 MEI ↔ Lethe Coupling 5
  - 1.3.5 MEI → MEI Snoops 5
  - 1.3.6 Prefetch Buffer Invalidation 6
- 1.4 Region Attribute Descriptors 6
  - 1.4.1 Memory Mapping 6
  - 1.4.2 I/O Mapping 6
- 1.5 Multiple I/O Channels 7
  - 1.5.1 Limitations 7
  - 1.5.2 I/O Accesses 7
- 1.6 Interrupts 9
  - 1.6.1 Interrupt Classic 9
  - 1.6.2 Compatible Interrupts 9

2 Hardware Architecture 11
- 2.1 Overview 11
  - 2.1.1 Lethe Interface 11
  - 2.1.2 MEI Interface 11
  - 2.1.3 Bifrost–A → Bifrost–D Interface 11
- 2.2 Dataflow 13
  - 2.2.1 Lethe → MEI Reads 13
  - 2.2.2 MEI → Lethe Reads 14
  - 2.2.3 MEI → Lethe Writes 14
  - 2.2.4 Lethe → MEI Writes 14

18

2.3 Address Flow . . . . . . . . . . 15

3 Midgard 17
3.1 Bifrost Support . . . . . . . . . . 17
3.2 Mastership . . . . . . . . . . 17
3.3 Connectivity . . . . . . . . . . 17
3.4 Interfaces . . . . . . . . . . 17
3.5 Mapping . . . . . . . . . . 18
3.6 Arbitration . . . . . . . . . . 18
3.6.1 Daisy Chaining . . . . . . . . . . 18
3.7 Signals . . . . . . . . . . 18

4 Registers 19
4.1 Register Accessibility . . . . . . . . . . 19
4.1.1 Register Locality . . . . . . . . . . 19
4.1.2 Register Defaults . . . . . . . . . . 19
4.2 Register Groups . . . . . . . . . . 19
4.3 Register Index Map . . . . . . . . . . 20
4.4 Registers . . . . . . . . . . 20
4.4.1 General Registers . . . . . . . . . . 20
4.4.2 Memory Mapping Registers . . . . . . . . . . 23
4.4.3 I/O Mapping Registers . . . . . . . . . . 27
4.4.4 Interrupt Mapping Registers . . . . . . . . . . 29
4.5 Expected System Configurations . . . . . . . . . . 30
4.5.1 Standard Customizing . . . . . . . . . . 30
4.5.2 Multiple Processor Customization . . . . . . . . . . 30
4.5.3 Multiple I/O Subsystem Customization . . . . . . . . . . 30

II Bifrost–A 33

5 Bifrost-A μArchitecture 35
5.1 Overview . . . . . . . . . . 35
5.2 Lethe Interface . . . . . . . . . . 35
5.2.1 Lethe Functional Subset . . . . . . . . . . 35
5.2.2 Bifrost–A Lethe Master Interface (LEMI) . . . . . . . . . . 38
5.2.3 Bifrost–A Lethe Slave Interface (LESDI) . . . . . . . . . . 39
5.3 ABCTL . . . . . . . . . . 39
5.4 MEI Interface . . . . . . . . . . 39
5.4.1 Bifrost–A MEI Master . . . . . . . . . . 39
5.4.2 Bifrost–A MEI Slave . . . . . . . . . . 39
5.5 Design Characteristics . . . . . . . . . . 40
5.5.1 Mechanical Characteristics . . . . . . . . . . 40
5.5.2 SSO's . . . . . . . . . . 40

5.5.3 Powers and Grounds . . . 41

6 Bifrost-A Signals 43
6.1 Total Pins (208) . . . 43
6.1.1 I/O Signals (163) . . . 43
6.1.2 Power and Ground (45) . . . 48

7 Bifrost–A Mechanical Specification 49

III Bifrost–D 51

8 Bifrost-D μArchitecture 53
8.1 Bifrost–A Interface . . . 53
8.2 Lethe Interface . . . 53
8.2.1 MEI Master Read . . . 53
8.2.2 MEI Master Write . . . 55
8.2.3 Lethe Master Reads . . . 55
8.2.4 Lethe Master Writes . . . 55
8.3 Midgard Interface . . . 55
8.3.1 MEI Master Reads . . . 55
8.3.2 MEI Master Writes . . . 55
8.3.3 Lethe Master Reads . . . 55
8.3.4 Lethe Master Writes . . . 55
8.4 Mechanical Specifications . . . 56

9 Bifrost-D Signals 57
9.1 Total Pins (160) . . . 57
9.1.1 I/O Signals . . . 57
9.1.2 Power and Ground (59) . . . 60

10 Bifrost-D Mechanical Specification 61

A Waveforms 63

Summary of Ammendments

- Version 1.0 – December 10, 1991
  - Created
- Version 1.01 – January 7, 1992
  - Improved Pinouts
  - Added Lock Couple Register
  - Added Summary of Ammendments Chapter
- Version 1.02 – January 22, 1992
  - Removed Line Buffer–C
  - Replaced TAL decriptor bit with global analog
  - Corrected Coherency Rhetoric
  - Improved Bifrost–A pinout
  - Removed I/O Recovery Count
  - Fixed BCR0
- Version 1.03 – February 5, 1992
  - Add TALio to allow I/O reads to be split.
  - Tweaked Bifrost-A Pinout
  - Tweaked Bifrost-B Pinout
  - Added 4 Bifrost–A → Bifrost–D signals
  - Changed the sense of Bifrost–A → Bifrost–D signals to active low
  - Added I/O Recovery Count
  - Moved BSMD in register map
  - Added KReads register option
  - Changed Packaging

- Version 1.04 – February 29, 1992
  - Changed Bifrost–A to 0.8 micron
  - Changed Bifrost–A Die to VGT400210
  - Added Description of MSID Register
  - Added Midgard Control Pins
  - Added Waveform Appendix
- Version 1.05 – March 13, 1992
  - Fixed Sequential Write Waveform
  - Renamed PBMSel to ABOSel
  - Changes ABI and ABO to have indices [5 : 2]
- Version 1.06 – March 25, 1992
  - Removed INT pin
  - Replaced MPICBSY with HINT
  - Added LSHORT pin (Bif–D)
  - Added I/O remap nibble to RCV register
  - Changed default to cacheable
  - Changed default to non–postable
  - Added Pipelining Off Mode
- Version 1.07 – March 7, 1992
  - Removed ArbLock and ArbHold
  - Added MERDY~ pin
  - Changed SPMX mapping
  - Fixed consensus signals
  - Removed region–based I/O recovery
  - Moved I/O Posting and locality registers
  - Removed MRBE~ signal (Bifrost–A)
- Version 1.08 – April 15, 1992
  - Added MBE~ signals to Bifrost–D
  - Added Register Defaults
  - Added IPC Base Register
  - Rewrote Chapters 1 and 2

- Version 1.1 – April 21, 1992
  - Added Index Entries
  - Added Prefetch Programmability
  - Added Test Pin
  - Added PRIME pin to Bifrost–D
- Version 1.11 – April 28, 1992
  - Changed BCR0 Field Nomenclature
  - Modified Classic Interrupt Mode's Interrupt Vector Architecture
    - Removed Interrupt Vector remapping
    - Added MBASE and SBASE
    - Changed Vector Destination Stuff
  - Added BIOSADR~ and DIAGADR~ pins
  - Removed MKWEND pin
  - Corrected Typo's
  - Renamed IOSQE Registers to IOPW for consistancy
  - Removed MROc signal
- Version 1.2 – May 8, 1992
  - Re–partitioned Spec
  - Added driver strengths
  - Removed TEST pin from both chips
  - Removed MP pin from Bifrost–A
  - Removed PRIME pin from both chips
  - Removed VRDYI~ pin from Bifrost–A
  - Removed VLD~ pin from both chips
  - Added MOCLK, BELAT~, and VDATE~ signals to Bifrost–A
  - Added VMIO, VDC, VERYO~, BELAT~, VDATE~ and VRDYI pins to Bifrost–D
  - Removed JTAG support
  - Added Power and Ground Initial Estimates
  - Added Pinouts viii SUMMARY OF AMMENDMENTS

Part I

Architecture

Chapter 1

Macro Architecture

Bifrost– *the heavenly rainbow built by the Aesir for use as a bridge between Asgard and Midgard.*

1.1 General

Bifrost is the bridge between the Lethe system bus and the Midgard[1] I/O bus. Here, it is described as a subsystem. Subsequent chapters describe the address and data chips in detail. The main features of Bifrost are:

- I/O Bus Decoupling
  - Bi-directional Transfer Queueing
  - Direct Interface to the Lethe system bus
  - Direct Interface to the Midgard bus which interfaces to EISA/ISA through the Intel 82350 Chipset
- Coherent Memory Model
- Distributed Mapping Support
- Multiple I/O Subsystem Support
- Interrupt Virtualization

[1]Midgard is the host style interface between Bifrost and the EISA bus. MEI implies the Midgard, EISA, or ISA buses.

1.2 I/O Bus Decoupling

The primary motivation for Bifrost is to decouple slower Midgard and EISA transfers from the high bandwidth Lethe bus. The need for this is suggested by the peak bandwidths masters on these buses can achieve:

Lethe: $266\frac{2}{3}$ MBytes/Second

Midgard: $133\frac{1}{3}$ MBytes/Second

EISA: $33\frac{1}{3}$ MBytes/Second

ISA: $8\frac{1}{3}$ MBytes/Second

Current EISA systems couple the processor bus to the memory bus to the EISA bus. This wastes bandwidth.

1.2.1 Transfer Queueing

To compensate for the disparity between master's bandwidths, Bifrost queues writes and prefetches reads. Address and cycle information are queued in Bifrost–A. Data is queued in Bifrost–D. Architecturally, there are three cache–line length buffers within the Bifrost chipset. These are described in more detail in Sections 2.2 and 2.3.

1.3 Coherent Memory Model

Decoupling the Lethe and MEI buses is very valuable for Lethe bus performance. However, this cannot be done without regard for memory coherency. It is unacceptable for software's image of memory to become corrupted. It is also unacceptable for memory to be detectably updated out of order.

At any given time Lethe nodes' image of Lethe–based memory can be different from MEI nodes' image of Lethe–based memory. Likewise, MEI nodes' image of MEI–based memory may differ from Lethe nodes' image of the same memory. This reflects the queueing nature of Bifrost. Bifrost employs the following to ensure correct memory image:

- MEI Memory is Write–Through
- Lethe → MEI cycles are ordered.
- MEI → Lethe cycles are ordered.
- Interrupt IPC cycles are ordered with respect to other MEI → Lethe cycles.
- Lethe → MEI traffic couples the Lethe and MEI buses
- MEI → Lethe traffic partially couples[2] the MEI and Lethe buses.

[2] Once an MEI has gained mastership of MEI, any Lethe → MEI cycles are TAL–ed until the final MEI cycle has initiated its data phase on the Lethe bus or otherwise terminated. The MEI master does not retain the Lethe bus throughout his tenure on the MEI bus. He shares the Lethe bus with other masters.

- MEI → MEI memory writes cause Lethe bus snoops.

1.3.1 MEI Memory Write–Through

All memory beyond Bifrost is write–through. This simplifies the design of Bifrost. Further, it is required to ensure that writes to MEI are not re–ordered. It should have little real impact on system performance.

1.3.2 Lethe → MEI Transfer Ordering

All Lethe transfers through Bifrost are correctly time sequenced with respect to other Lethe transfers through Bifrost. This implies that, even when writes are posted within Bifrost's store queue, cycles which have a nominal execution ordering on the Lethe bus will always have the same ordering on the MEI side.

1.3.3 MEI → Lethe Transfer Ordering

MEI–side cycles are always correctly ordered with respect to other MEI–side cycles. IPC cycles will always occur after any dirtied buffers have been flushed.

1.3.4 MEI ↔ Lethe Coupling

The decoupling of the Lethe and MEI buses makes it difficult to sequence cycles correctly across masters when the masters are on opposite sides of Bifrost. Masters must not be able to detect that the MEI and Lethe buses are not coupled and owned by the same master. The decoupling is masked by proper ordering of masterships on Bifrost's two ports.

1.3.4.1 Lethe Master Accesses

Lethe master accesses[3] are always TAL–ed until Bifrost has ownership of the Midgard bus.

1.3.4.2 MEI Master Accesses

MEI master accesses are allowed only limited access to Bifrost. Access is restricted during Lethe to MEI cycles from the issuance of MKWENDc~ without MTALc~ asserted, until the cycle is issued on the MEI bus. For Lethe locked cycles MEI devices are denied access until the final data phase of the last MLOCK~–ed cycle.

1.3.5 MEI → MEI Snoops

Bifrost forwards the address and control information of MEI → MEI write cycles to the Lethe bus. This affords Lethe caches the opportunity to invalidate the appropriate cache lines. The Lethe transfer is sunk, with no consequence, by Bifrost. Bifrost cannot hold off MEI side writes for which it is not the active slave. Consequently, Bifrost may become saturated if many such writes occur

[3] Posted writes are a special case.

within a short period. If Bifrost becomes saturated, it replaces the pending writes with a single Flush IPC. This 'last resort' ensures coherency.

1.3.6 Prefetch Buffer Invalidation

Bifrost's prefetch buffers are freed after every MEI transfer.

1.4 Region Attribute Descriptors

Chimæra devices map and characterize memory with distributed mapping. Bifrost is responsible for mapping and characterizing memory and I/O on the MEI buses.

1.4.1 Memory Mapping

Memory is mapped and characterized by three groups of descriptors:

Dynamic Descriptors: Bifrost has sixteen Base/Mask Descriptors. The functionality is summarized by the following VHDL code:

```
Hit <= ((Address(31 downto 16) xor Base) and Mask) = X'0000' ;
```

Static Descriptors: Bifrost has thirteen special memory regions which map and characterize arbitrarily. These are shown in Section 4.4.2.1.

Base System Memory Descriptor: The Gryphon memory controller is a Lethe device which controls DRAM mapped by $00000000_{16} \leq$GRYPHON$\leq$BSMD. In the simplest Chimæra systems there will only be two Lethe slaves: Gryphon and Bifrost. Consequently, memory above BSMD will be required to default to Bifrost. This mapping could be done with Dynamic descriptors, but this would be wastefull. Instead, Bifrost has a single eight-bit register which BIOS sets as the highest location mapped to Gryphon memory. Accesses outside this region default to Bifrost.

1.4.1.1 Memory Attributes

Cachability Whether a Lethe master can cache the region.

Post Writes Whether writes to the region may be posted into the store queue.

RO Whether writes to the region are actually performed by the hardware.

1.4.2 I/O Mapping

I/O accesses are mapped and characterized with static descriptors. Sixteen descriptors represent the 64K of I/O address space in 4K increments. Accesses to I/O space outside the 0–64K range are hashed to the 0–64K locations.

1.4.2.1 I/O Attributes

The I/O descriptors are split into three fields characterizing the address space they represent:

Domain Whether accesses to this region are mapped to the MEI bus or other Lethe devices.

Post Writes Whether writes to the region may be posted into the store queue.

I/O Recovery Whether back-to-back accesses to the region have hardware recovery time inserted between them.

1.5 Multiple I/O Channels

One or two Bifrost-based I/O channels may exist in Chimæra systems. This potentially doubles Chimæra system's I/O throughput. However, the improved throughput does not come without cost.

1.5.1 Limitations

Because of the architecture of the EISA channel, multiple channels cannot be entirely symmetric. This causes certain limitations:

- There is a maximum of fourteen EISA slots available if two channels are used.
- There is a specific default EISA bus. All accesses which are not known to go to another channel or main memory go to the default channel.
- All ISA adapter cards must go in the default channel.
- EISA channel to channel operations which transfer to other channels are not supported, as this introduces a deadlock situation which can not be handled.

1.5.2 I/O Accesses

Bifrost's I/O mapping flexibility is curbed by EISA ad ISA compatibility issues.

All ISA I/O accesses get sent to the default EISA channel. EISA masters on the secondary I/O channel should not access ISA space[4].

Slot specific EISA I/O accesses are under the control of each Bifrost's GIOAM descriptors. These descriptors indicate which slot is mapped behind which Bifrost.

> Programmer's Note
>
> Each bitfield of the GIOAM bitmaps must be mapped to one and only one slave in the system–a problem for EISA Config.

The I/O mapping is shown below:

[4] Accessing ISA space may result in both buses timing out if the primary Bifrost has any mastering activity.

| I/O Range | Reserved For: | Locality |
|---|---|---|
| $0000_{16}$—$00FF_{16}$ | ISA System Peripherals | Primary[5] |
| $0100_{16}$—$03FF_{16}$ | ISA Expansion Boards | Primary |
| $0400_{16}$—$04FF_{16}$ | System Board Controllers | Primary[5] |
| $0500_{16}$—$07FF_{16}$ | Alias of $0100_{16}$—$03FF_{16}$ | Primary |
| $0800_{16}$—$08FF_{16}$ | System Board Controllers | Primary[5] |
| $0900_{16}$—$0BFF_{16}$ | Alias of $0100_{16}$—$03FF_{16}$ | Primary |
| $0C00_{16}$—$0CFF_{16}$ | System Board Controllers | Primary[5] |
| $0D00_{16}$—$0FFF_{16}$ | Alias of $0100_{16}$—$03FF_{16}$ | Primary |
| $1000_{16}$—$10FF_{16}$ | ISA System Peripherals | *per* GIOAM[1] |
| $1100_{16}$—$13FF_{16}$ | ISA Expansion Boards | Primary |
| $1400_{16}$—$14FF_{16}$ | System Board Controllers | *per* GIOAM[1] |
| $1500_{16}$—$17FF_{16}$ | Alias of $0100_{16}$—$03FF_{16}$ | Primary |
| $1800_{16}$—$18FF_{16}$ | System Board Controllers | *per* GIOAM[1] |
| $1900_{16}$—$1BFF_{16}$ | Alias of $0100_{16}$—$03FF_{16}$ | Primary |
| $1C00_{16}$—$1CFF_{16}$ | System Board Controllers | *per* GIOAM[1] |
| $1D00_{16}$—$1FFF_{16}$ | Alias of $0100_{16}$—$03FF_{16}$ | Primary |
| ⋮ | ⋮ | ⋮ |
| $F000_{16}$—$F0FF_{16}$ | ISA System Peripherals | *per* GIOAM[F] |
| $F100_{16}$—$F3FF_{16}$ | ISA Expansion Boards | Primary |
| $F400_{16}$—$F4FF_{16}$ | System Board Controllers | *per* GIOAM[F] |
| $F500_{16}$—$F7FF_{16}$ | Alias of $0100_{16}$—$03FF_{16}$ | Primary |
| $F800_{16}$—$F8FF_{16}$ | System Board Controllers | *per* GIOAM[F] |
| $F900_{16}$—$FBFF_{16}$ | Alias of $0100_{16}$—$03FF_{16}$ | Primary |
| $FC00_{16}$—$FCFF_{16}$ | System Board Controllers | *per* GIOAM[F] |
| $FD00_{16}$—$FFFF_{16}$ | Alias of $0100_{16}$—$03FF_{16}$ | Primary |

1.5.2.1 Channel Hardware Resources

Each channel has the standard EISA hardware resources:

- DMA Channels
- Interrupt Controller
- Timer / Counters

These are all fully supported and are available for system use. The base I/O addesses of these devices on each channel are:

Channel 0 (default) $0000_{16}$ — $00FF_{16}$ and $0400_{16}$ — $04FF_{16}$.

Channel 1 $n000_{16}$ — $n0FF_{16}$ and $n400_{16}$ — $n4FF_{16}$ ($n$ is a hex digit between 0 and F)

[5] Devices on the secondary Bifrost address the Secondary boards System Peripherals in this range. Other Lethe node must use the I/O remap function to access the secondary Bifrost's System Peripherals

1.6 Interrupts

Bifrost has two modes for handling interrupts: Interrupt Classic and Compatible Interrupts.

1.6.1 Interrupt Classic

Under the Interrupt Classic mode of operation, Bifrost responds to its channel's interrupts providing the interrupt acknowledges and reading the vector from the PIC. It then does a table look up to determine which processor to send the interrupt to and which vector to give that processor. With this information it creates an interprocessor communication message to instruct Hydra to interrupt the appropriate processor. The processor responds to the interupt with IACK cycles. Hydra responds to the IACK's with the the vector that it got from the IPC. All other PIC accesses are handled by the processor.

1.6.2 Compatible Interrupts

To ensure full compatibility[6] Bifrost also supports a simplified, compatible mode of interrupts. Under compatible mode, Hydra passes the ISP's INT directly to a processor[7]. That processor issues its IACK's onto the Lethe bus. Hydra ignores the IACK's. Bifrost ignores the initial INT from the ISP, passes the IACK's through to the ISP and returns the ISP's vector.

[6] Under classic mode there exists a window in the ISP's 8259 where software could detect an interrupts completion prior to its servicing at the processor.

[7] See the Hydra Spec. for details.

Chapter 2

Hardware Architecture

2.1 Overview

The Bifrost hardware is composed of two ASIC's: Bifrost–A and Bifrost–D. Bifrost–A is responsible for all address and control transfer. Bifrost–D is responsible for data only. Bifrost–D is a drone receiving nearly all its functionality from its 'smarter' brother, Bifrost–A. A high level diagram follows in Figure 2.1.

2.1.1 Lethe Interface

The Lethe side of the Bifrost subsystem connects directly to the Lethe bus. Bifrost–A connects to Lethe's control (MC[1]), address (MA), and part of its data bus (MD). Bifrost–D connects to Lethe's data (MD) and parity (MP) buses.

2.1.2 MEI Interface

The MEI side of the Bifrost subsystem connects to the Midgard bus and parts of the EISA bus. Intel's EBC, ISP, and two EBB's isolate the EISA and Midgard buses. Bifrost-A connects to Midgard's address (VA) and control (VC[2]) buses. Bifrost also connects to a variety of EISA control signals, and ISA's SA[9 : 6]. Bifrost–D connects to Midgard's data (HD) bus.

2.1.3 Bifrost–A → Bifrost–D Interface

Bifrost–A controls two Bifrost–D's via the Bifrost interface bus (BIB). This interface is described in Section 8.1.

[1] MC is composed of many signals described in the Chimæra Architectural Spec.
[2] VC is an amalgam of signals described in Section 3.7.

Figure 2.1: Chimaera Architecture

Figure 2.2: Bifrost–D Dataflow

2.2 Dataflow

Bifrost–D's dataflow is shown in Fig. 2.2. Bifrost–D has two bi-directional cache–line length buffers (A and B) and a Lethe to Midgard store queue. The store queue is allocated exclusively as a repository for Lethe stores to Midgard/EISA/ISA (MEI). Buffers A and B are allocated as the immediate repository for Midgard data for MEI mastered cycles or for Lethe to MEI reads. The usage of the buffers is clarified by cycle:

2.2.1 Lethe → MEI Reads

There are several forms a Lethe mastered read may take. Depending on the configuration and the cacheability characteristics of the address in question, the read will be executed as follows:

Cacheable TAL Read The Lethe cycle is negatively acknowledged with MTAL~. A cache line length transfer is performed on the MEI bus. The data is held in buffer A or B[3]. When the transfer is complete, and the requestor reissues the cycle, the cycle is positively acknowledged, and the read is sourced from the selected prefetch buffers.

Non–Cacheable TAL Read The Lethe cycle is negatively acknowledged with MTAL~. A single beat transfer is performed on the MEI bus. The data is held in buffer A or B. When the transfer is complete, and the requestor reissues the cycle, the cycle is positively acknowledged,

[3] See Figure 2.2.

and the read is sourced from the selected buffer. If more than one beat is required, the transfer continues with data streaming[4] through the prefet.

Cacheable Non–TAL Read A cache line length transfer is performed on the MEI bus. The data is streamed through buffer A or B.

Non–Cacheable Non–TAL Read Single beat transfers are performed on the MEI bus with the returned data streamed through line buffer A or B to the Lethe bus until the transfer is complete.

2.2.2 MEI → Lethe Reads

EISA, ISA, and Midgard based reads are fed by line buffers A and B. These are fed by the Lethe bus. Lethe bus fetches are cache–line length for memory cycles and 64 bits wide for I/O cycles. Bursted cycles result in prefetches of at least one cache line. Non–burst cycles fetch one line.

2.2.2.1 Data Transfer

An MEI read that misses buffers A and B causes a Lethe read. The Lethe data is streamed into either A or B. The data is streamed directly from the Lethe bus. Burst transfers typically result in extended prefetches.

2.2.2.2 MEI Write to Lethe

2.2.3 MEI → Lethe Writes

MEI writes are transferred to the Lethe bus through either of the two EISA side line buffers (A and B). MEI writes which miss buffers A and B or are non–sequencial result in the resource allocation of either A or B. Writes that hit the current buffer do not require a new allocation. The data is placed into the current buffer as soon as possible. Buffers which contain 'dirty' write data are written to Lethe bus when either of the following occurs:

1. the current MEI cycles completes
2. the current MEI cycle misses the current buffer .

2.2.4 Lethe → MEI Writes

Lethe mastered write transfers are queued into an eight–deep sixty–four bit wide memory or I/O store queue. If the write is directed to a postable[5] region, the write will be acknowledged as soon as it is queued in to Bifrost. Otherwise, the write will only be acknowledged when Bifrost is able to obtain mastership of the Midgard bus. Further, if the write is not postable and Bifrost cannot get access to the MEI bus without first giving up the Lethe bus, Bifrost forces the current master to try again later.

In either case, Bifrost will attempt to complete the write on the MEI buses as soon as possible.

[4] See glossary.

[5] See Section 1.4 on 6.

Figure 2.3: Bifrost–A Address Flow

2.3 Address Flow

Bifrost–A's address flow is shown in Figure 2.3. At a high level, each element in Bifrost–D has an analog in Bifrost–A. Bifrost–A's A and B buffers and store queue represent the address of the data which resides in Bifrost–D's buffers. The remainder of Bifrost–A enables Bifrost to pipeline Lethe cycles, implement TAL[6] cycles, and prefetch MEI transfers.

[6] See Section 5.2.1.1 on 37.

Chapter 3

Midgard

The Midgard bus is a high bandwidth[1] bus between Bifrost and EISA. It is very much like the H–bus in Dell's Hammerhead, Mako, Barracuda, Shark, Moray, and Honeymooners.

3.1 Bifrost Support

Currently, Bifrost does not support other Midgard masters. Further it has only marginal support for additional Midgard slaves. This may change.

3.2 Mastership

Mastership of the Midgard bus is shared by EISA/ISA masters, Lethe bus masters, and Local Midgard peripherals. At any given time there can only be one master on either the Midgard, EISA, or ISA buses.

3.3 Connectivity

The Bifrost↔Midgard↔EISA connectivity is shown in Figure 2.1.

3.4 Interfaces

The Midgard bus is composed of two control buses, one address and one data bus. The two control buses are the EISA bus, and the 486–style EBC front end. The two are mutually exclusive within masterships. The relationship between the two follows:

[1] Max. $133\frac{1}{3}$ MByte/Sec..

| Master | Slave | Bus Style |
|---|---|---|
| Bifrost | Midgard | 486 |
| Bifrost | EISA/ISA | 486 |
| Midgard | Bifrost | 486 |
| Midgard | EISA/ISA | 486 |
| EISA/ISA | Midgard | EISA |
| EISA/ISA | Bifrost | EISA |

Midgard devices access EISA, ISA, and Lethe slaves in the same manner that Bifrost accesses EISA and ISA slaves— as a 486. Midgard devices may be accessed by Bifrost as a 486–style slave. Midgard devices may be accessed by EISA and ISA masters as an EISA–style slave.

3.5 Mapping

Bifrost does not distinguish between Midgard, EISA, or ISA devices from a mapping point of view. Bifrost knows only whether memory exists to its Lethe side or its MEI side. This knowledge is reflected in the the VLOCMEM~ and VLOCIO~ signals. When EISA and ISA devices access Midgard slaves Bifrost knows only that the memory does not exist on Lethe. Consequently, if EISA or ISA devices are to be able to access Midgard slaves, the VLOCMEM~ and VLOCIO~ signals must be conditioned by the Midgard devices[2]. The same can be said for Lethe master accesses of Midgard slaves.

3.6 Arbitration

Bifrost will support arbitration between itself and the '350 chipset. Bifrost has three pins allocated to arbitration: VHOLD, VHLDA, and CPUMISS~. This does not provide for additional Midgard masters.

3.6.1 Daisy Chaining

Midgard incarnations with Midgard masters can be handled by gating the two devices requests into VHOLD and passing the VHLDA signal on to the first requesting device. CPUMISS~ should also be conditioned.

3.7 Signals

T.B.D.

[2] These signals are driven by Bifrost simultaneously with VADS~

Chapter 4

Registers

4.1 Register Accessibility

Bifrost's internal registers are accessible via Lethe I/O cycles. This accessibility is described in detail in the Chimæra Architectural Spec. in the Global Memory Mapping Chapter.

4.1.1 Register Locality

Bifrost's interrupt mapping registers are located in Bifrost–D. All other Bifrost registers are located in Bifrost–A. The registers are read and written on byte four or five of each 64 bit register register location. The primary Bifrost lies on byte four while the secondary lies on byte five.

4.1.2 Register Defaults

Bifrost registers default as noted. The default value is typically the most DOS–compatible value. However, performance enhancement may be achievable by straying from the default.

4.2 Register Groups

Bifrost's registers are conceptually partioned into three groups: mapping, general and interrupt mapping.

4.3 Register Index Map

| | 7/F | 6/E | 5/D | 4/C | 3/B | 2/A | 1/9 | 0/8 |
|---|---|---|---|---|---|---|---|---|
| $00_{16}$ | | | | | | | | |
| $08_{16}$ | | | | | | | | |
| $10_{16}$ | | | | | | | | |
| $18_{16}$ | | | | | | | | |
| $20_{16}$ | | | | | | | | |
| $28_{16}$ | | | | | | | | |
| $30_{16}$ | | | | | | | | |
| $38_{16}$ | | | | | | | | |
| $40_{16}$ | | | | | | | | |
| $48_{16}$ | | | | | | | | |
| $50_{16}$ | | | | | | | | |
| $58_{16}$ | | | | | | | | |
| $60_{16}$ | MIV7D | MIV6D | MIV5D | MIV4D | MIV3D | MIV2D | MIV1D | MIV0D |
| $68_{16}$ | SIV7D | SIV6D | SIV5D | SIV4D | SIV3D | SIV2D | SIV1D | SI1V0D |
| $70_{16}$ | | | | | | | SBASE | MBASE |
| $78_{16}$ | | | | | | | | |
| $80_{16}$ | MRM1H | MRM1L | MRB1H | MRB1L | MRM0H | MRM0L | MRB0H | MRB0L |
| $88_{16}$ | MRM3H | MRM3L | MRB3H | MRB3L | MRM2H | MRM2L | MRB2H | MRB2L |
| $90_{16}$ | MRM5H | MRM5L | MRB5H | MRB5L | MRM4H | MRM4L | MRB4H | MRB4L |
| $98_{16}$ | MRM7H | MRM7L | MRB7H | MRB7L | MRM6H | MRM6L | MRB6H | MRB6L |
| $A0_{16}$ | MRM9H | MRM9L | MRB9H | MRB9L | MRM8H | MRM8L | MRB8H | MRB8L |
| $A8_{16}$ | MRMbH | MRMbL | MRBbH | MRBbL | MRMaH | MRMaL | MRBaH | MRBaL |
| $B0_{16}$ | MRMdH | MRMdL | MRBdH | MRBdL | MRMcH | MRMcL | MRBcH | MRBcL |
| $B8_{16}$ | MRMfH | MRMfL | MRBfH | MRBfL | MRMeH | MRMeL | MRBeH | MRBeL |
| $C0_{16}$ | MRA7 | MRA6 | MRA5 | MRA4 | MRA3 | MRA2 | MRA1 | MRA0 |
| $C8_{16}$ | MRAf | MRAe | MRAd | MRAc | MRAb | MRAa | MRA9 | MRA8 |
| $D0_{16}$ | ABLKE0 | ABlkD8 | ABlkD0 | ABlkC8 | ABlkC0 | ABlkB | ABlkA | ABlk89 |
| $D8_{16}$ | | | BSMD | ABlk16M64K | ABlk14-16M | ABLKF8 | ABLKF0 | ABLKE8 |
| $E0_{16}$ | | | | | GIOAMH | GIOAML | GIOPWH | GIOPWL |
| $E8_{16}$ | | | IPCA | RCV | MSID | BCR2 | BCR1 | BCR0 |
| $F0_{16}$ | | | | | | | | |
| $F8_{16}$ | | | | | | | | |

4.4 Registers

4.4.1 General Registers $E8_{16}$ BCR0– Bifrost Configuration Register 0

| BCR0 | | | | | | | | |
|---|---|---|---|---|---|---|---|---|
| Bit # | 7 | 6 | 5 | 4 | 3 | 2 | 1 | 0 |
| Field | TALall | TALpm | TALpio | LC | PA | KReads | – | – |
| Default | 0 | 0 | 0 | 0 | 0 | 0 | 0 | 0 |

TALall TAL All

0 ........................... Bifrost TAL's only when necesary.

1 ... Bifrost TAL's when necesary, and on memory data or code reads.

TALpm TAL Post Memory

0 . Bifrost never posts memory read requests that were TAL–ed to MEI (Don't use this with TALall=1)

1 Bifrost posts to MEI memory read requests that were TAL–ed

TALpio TAL Post I/O's

0 ... Bifrost never posts I/O read requests that were TAL–ed to MEI

1 ... Bifrost posts to MEI I/O read requests that were TAL–ed

LC Lock Couple.

0 ... Bifrost TAL's LOCK's to other Lethe devices if it does not own MEI. If this occurs Bifrost attempts to get MEI.

1 ....... Bifrost does not TAL LOCK's to other Lethe Devices.

PA Processor Arbitration.

0 Bifrost is included in MEI arbitration only when it has a cycle pending to MEI.

1 ... Bifrost is always included in MEI arbitration. This may be unwise.

KReads Cache Reads

0 .................. Bifrost reads only necesary data from MEI

1 ................. Bifrost reads cache lines from MEI memory $\boxed{E9_{16}}$ BCR1– Bifrost Configuration Register

| BCR1 | | | | | | | | |
|---|---|---|---|---|---|---|---|---|
| Bit # | 7 | 6 | 5 | 4 | 3 | 2 | 1 | 0 |
| Field | Native | BLK16M | BLK1M | – | – | PREFETCH | PIPE | IMODE |
| Default | 0 | 0 | 0 | 0 | 0 | 0 | 0 | 0 |

Native Native Mode Select.

0 .......... DIAGADR~ is disabled
1 .......... DIAGADR~ is enabled

BLK16M~ Block 16 Meg Region.

0 ........ Bifrost decodes the 16M space as part of BIOSADR~
1 ... Bifrost ignores the 16M space when decoding BIOSADR~

BLK1M Block 1 Meg Region.

0 ......... Bifrost decodes the 1M space as part of BIOSADR~
1 .... Bifrost ignores the 1M space when decoding BIOSADR~

PREFETCH Prefetching Mode.

0 .... Bifrost never prefetches extra cache lines on EISA master reads of Lethe
1 .......... Bifrost prefetches when appropriate

PIPE Pipelining Mode.

0 ........... Bifrost mastered cycles are not pipelined on Lethe
1 ............... Bifrost mastered cycles are pipelined on Lethe

IMODE Interrupt Mode.

0 .............. Bifrost operates in 'compatible' interrupt mode
1 ................... Bifrost operates in 'classic' interrupt mode $EA_{16}$ BCR2– Bifrost Configuration Register

| BCR2 | | | | | | |
|---|---|---|---|---|---|---|
| Bit # | 7 | 6 | 5 | 4 | 3 | 2–0 |
| Field | – | – | – | – | – | RdCount |
| Default | 0 | 0 | 0 | 0 | 0 | 0 |

RdCount RdCount.

0 ........... Bifrost couples TAL–ed reads immediately [Illegal]
1 .................. Bifrost couples TAL–ed reads after 1 beat.

⋮

7 .................. Bifrost couples TAL–ed reads after 7 beats.

$ED_{16}$ IPCA– Interprocessor Communications Address

| IPCA | |
|---|---|
| Bit # | 7–0 |
| Field | IPCAddress |
| Default | $000B_{16}$ |

IPCAddress Corresponds to the base address for IPC cycles. This value is used for bits 11 through 4 of the IPC address. Address bits 15 through 12 and 3 are assumed to be zero. (IPC Address $\equiv 0nm0_{16}$, where n and m are the two nibbles described in IPCA.)

$EB_{16}$ MSID– Slave ID

| MSID | | |
|---|---|---|
| Bit # | 7–3 | 2–0 |
| Field | – | MSID |
| Default | $00000_2$ | $000_2$ |

4.4.2 Memory Mapping Registers

4.4.2.1 Static Region Descriptors

Bifrost's static memory regions are defined as follows:

| REGION | LOW-HIGH |
|---|---|
| ABlk89 | $00080000_{16}$–$0009FFFF_{16}$ |
| ABlkA | $000A0000_{16}$–$000AFFFF_{16}$ |
| ABlkB | $000B0000_{16}$–$000BFFFF_{16}$ |
| ABlkC0 | $000C0000_{16}$–$000C7FFF_{16}$ |
| ABlkC8 | $000C8000_{16}$–$000CFFFF_{16}$ |
| ABlkD0 | $000D0000_{16}$–$000D7FFF_{16}$ |
| ABlkD8 | $000D8000_{16}$–$000DFFFF_{16}$ |
| ABlkE0 | $000E0000_{16}$–$000E7FFF_{16}$ |
| ABlkE8 | $000E8000_{16}$–$000EFFFF_{16}$ |
| ABlkF0 | $000F0000_{16}$–$000F7FFF_{16}$ |
| ABlkF8 | $000F8000_{16}$–$000FFFFF_{16}$ |
| ABlk1416M | $00E00000_{16}$–$00FFFFFF_{16}$ |
| ABlk16M16K | $00FF0000_{16}$–$00FFFFFF_{16}$ |

$D0\text{–}DC_{16}$ ABlk*xx*– Static Memory Region Attributes

| ABlk*xx* | | | | | | | | |
|---|---|---|---|---|---|---|---|---|
| Bit # | 7 | 6 | 5 | 4 | 3 | 2 | 1 | 0 |
| Field | KEN | PW | RO | – | – | – | DOMAIN | – |
| 1[ary] Default | 0 | 0 | 0 | 0 | 0 | 0 | 0 | 0 |
| 2[ary] Default | 0 | 0 | 0 | 0 | 0 | 0 | 1 | 1 |

KEN Indicates whether the region is cacheable to a Lethe master.

0 ........................................ Cacheable
1 ........................................ Not Cacheable

PW Indicates whether the Bifrost can post writes to the region.

0 ........................................ Writes are not posted
1 ........................................ Writes can be posted[1]

RO Indicates whether the address can be written to.

0 ........................................ Read or Write
1 ........................................ Read Only

DOMAIN Location

0 ........................................ MEI
1 ........................................ Lethe

4.4.2.2 Dynamic Region Descriptors

The sixteen bit registers in the memory region descriptors must be written atomically. The low byte must be written immediately followed by the high byte. The index register auto-increments in this order to facilitate this.

Programmer's Note

Failure to program the registers in this order can cause erroneous values to be written into the registers.

There is no constraint on the order in which these registers can be read.

$10xxxx00_2$ MRB$n$H– Memory Region Base Address (High Byte)
[$n = 0, 1, \ldots, f$ ≡Descriptor Number]

$10xxxx01_2$ MRB$n$L– Memory Region Base Address (Low Byte)
[$n = 0, 1, \ldots, f$ ≡Descriptor Number]

| MRBnH‖MRB$n$L | |
|---|---|
| Bit # | 15 – 0 |
| Field | Descriptor Base Address |
| Default | $00_{16}$ |

See section 1.4.1 on page 6 for a description on the function of these descriptors.

$10xxxx10_2$ MRM$n$H– Memory Region Mask (High Byte)
[$n = 0, 1, \ldots, f$ ≡Descriptor Number]

$10xxxx11_2$ MRM$n$H– Memory Region Mask (Low Byte)
[$n = 0, 1, \ldots, f$ ≡Descriptor Number]

| MRM$xx$ | |
|---|---|
| Bit # | 15 – 0 |
| Field | Descriptor Mask |
| Default | $00_{16}$ |

See section 1.4.1 on page 6 for a description on the function of these descriptors.

$\boxed{10xxxx0x_2}$ MRA$n$– Memory Region Attributes
[$n = 0, 1, \ldots, f$ ≡Descriptor Number]

| MRA$n$ | | | | | | | | |
|---|---|---|---|---|---|---|---|---|
| Bit # | 7 | 6 | 5 | 4 | 3 | 2 | 1 | 0 |
| Field | KEN | PW | RO | – | – | – | DOMAIN | DE |
| 1$^{ary}$ Default | 0 | 0 | 0 | 0 | 0 | 0 | 0 | 0 |
| 2$^{ary}$ Default | 0 | 0 | 0 | 0 | 0 | 0 | 1 | 1 |

KEN Indicates whether the region is cacheable to a Lethe master.

0 .................................................. Cacheable
1 .............................................. Not Cacheable

PW Indicates whether the Bifrost can post writes to the region.

0 ...................................... Writes are not posted
1 ...................................... Writes can be posted[1]

RO Indicates whether the address can be written to.

0 ............................................. Read or Write
1 ................................................. Read Only

DOMAIN Location

0 ...................................................... MEI
1 ...................................................... Lethe

DE Descriptor enable.

0 .................................................. Disabled
1 .................................................. Enabled

4.4.2.3 Base System Memory Descriptor $\boxed{DD_{16}}$ BSMD– Base System Memory Descriptor

| BSMD | |
|---|---|
| | 7 – 0 |
| Field | BSMD[29:22] |
| Default | $00_{16}$ |

Memory accesses with A[31 : 22] > 0||0||BSMD[29 : 22] default to the MEI side of Bifrost. For example, if Gryphon has 16 MB of memory, the BSMD should be set to $03_{16}$.

4.4.3 I/O Mapping Registers $E3_{16}$ GIOAMH– Geographic I/O Address Map (High Byte)

$E2_{16}$ GIOAML– Geographic I/O Address Map (Low Byte)

| GIOAMH\|\|GIOAML | | | | | | | | | | | | | | | | |
|---|---|---|---|---|---|---|---|---|---|---|---|---|---|---|---|---|
| Bit # | 15 | 14 | 13 | 12 | 11 | 10 | 9 | 8 | 7 | 6 | 5 | 4 | 3 | 2 | 1 | 0 |
| Field | S15 | S14 | S13 | S12 | S11 | S10 | S9 | S8 | S7 | S6 | S5 | S4 | S3 | S2 | S1 | S0 |
| 1ary Default | 0 | 0 | 0 | 0 | 0 | 0 | 0 | 0 | 0 | 0 | 0 | 0 | 0 | 0 | 0 | 0 |
| 2ary Default | 1 | 1 | 1 | 1 | 1 | 1 | 1 | 1 | 1 | 1 | 1 | 1 | 1 | 1 | 1 | 1 |

**S*n* Indicates which geographically addressed I/O ranges are serviced by this EISA channel. See Section 1.5.2 on page 7 for details. It is basically a bit map. The union of the GIOAMs in all Bifrosts must have all bits set. Bifrost 0 must have bit S0 set, and Bifrosts 1 must have bit S15 set. The intersection of the GIOAMs in all Bifrosts in the system must be zero.**

- 0 ................ I/O slot n is on this particular EISA channel.
- 1 ........... I/O slot n is not on this particular EISA channel.

$E1_{16}$ GIOPWH– Geographic I/O Store Queue Enable (High Byte)

$E0_{16}$ GIOPWL– Geographic I/O Store Queue Enable (Low Byte)

| GIOPWH\|\|GIOPWL | | | | | | | | | | | | | | | | |
|---|---|---|---|---|---|---|---|---|---|---|---|---|---|---|---|---|
| Bit # | 15 | 14 | 13 | 12 | 11 | 10 | 9 | 8 | 7 | 6 | 5 | 4 | 3 | 2 | 1 | 0 |
| Field | Q15 | Q14 | Q13 | Q12 | Q11 | Q10 | Q9 | Q8 | Q7 | Q6 | Q5 | Q4 | Q3 | Q2 | Q1 | Q0 |
| 1ary Default | 0 | 0 | 0 | 0 | 0 | 0 | 0 | 0 | 0 | 0 | 0 | 0 | 0 | 0 | 0 | 0 |
| 2ary Default | 1 | 1 | 1 | 1 | 1 | 1 | 1 | 1 | 1 | 1 | 1 | 1 | 1 | 1 | 1 | 1 |

Q*n* Indicates whether accesses to geographically addressed I/O ranges can be posted[1] into the store queue. Unlike the GIOAM registers, these bits represent a strict hash of the I/O address. (Q*n* maps I/O address $xxxxnxxx_{16}$)
0 .................... Accesses to I/O slot n can not be posted.
1 ........................ Accesses to I/O slot n can be posted.

$EC_{16}$ RCV– I/O Recovery / I/O Remapping

| RCV | | |
|---|---|---|
| Bit # | 7–4 | 3–0 |
| Field | I/O Remap | I/O Recovery Time |
| Default | $0_{16}$ | $0_{16}$ |

I/O Remap Indicates which I/O address to remap. This I/O range is "portal" through which Lethe masters can speak to the secondary Bifrost's zero I/O block. This portal also allows masters on MEI of the secondary Bifrost to access the primary Bifrost's zero I/O block. The implementation is such that accesses to this I/O range originating on either side of the secondary Bifrost always map through Bifrost and are always remapped to the zero I/O block.
0 ........................... Remap $00000xxx_{16} \rightarrow 00000xxx_{16}$
1 ........................... Remap $00001xxx_{16} \rightarrow 00000xxx_{16}$

⋮ f ........................... Remap $0000fxxx_{16} \rightarrow 00000xxx_{16}$

I/O Recovery Indicates the number of clocks between successive I/O cycles.

[1] This is somewhat of a misnomer. All writes in the Lethe to Midgard direction are posted in the store queue. The question is really whether writes are TAL-ed when Bifrost does not have the Midgard bus. For example, when Q*n* is 0 Bifrost TAL's writes to the *n* region if it does not own Midgard. In general, it is required that Bifrost TAL writes when it does not own the Midgard bus.

| LIOWAIT | | |
|---|---|---|
| LIOWAIT | 16 Bit ISA I/O | 8 Bit ISA I/O |
| 0000 | 2.5 | 2.5 |
| 0001 | 3.5 | 3.5 |
| 0010 | 4.5 | 4.5 |
| 0011 | 4.5 | 5.5 |
| 0100 | 4.5 | 6.5 |
| 0101 | 4.5 | 7.5 |
| 0110 | 4.5 | 8.5 |
| 0111 | 4.5 | 9.5 |
| 1000 | 4.5 | 10.5 |
| 1001+ | 4.5 | 12.5 |

4.4.4 Interrupt Mapping Registers $01100xxx_2$ MIV$n$D– Master 8259 Interrupt Vector Destination
[$n = 0, 1, \ldots, 7$ ≡Interrupt Vector number]

$01101xxx_2$ SIV$n$D– Slave 8259 Interrupt Vector Destination
[$n = 0, 1, \ldots, 7$ ≡Interrupt Vector number]

| MIVnD,SIVnD | | |
|---|---|---|
| Bit # | 7–4 | 3–0 |
| Field | – | Destination |
| Default | 0 | $0_{16}$ |

Destination Site of interrupt disposal.
0000 .................... Undirected
$xxx1$ .................... Processor 0
$xx1x$ .................... Processor 1
$x1xx$ .................... Processor 2
$1xxx$ .................... Processor 3

$70_{16}$ MBASE– Master 8259 Interrupt Vector Base

$71_{16}$ SBASE– Slave 8259 Interrupt Vector Base

| MBASE,SBASE | | |
|---|---|---|
| Bit # | 7–2 | 1–0 |
| Field | BASE[7:3] | - |
| Default | $00000_2$ | $000_2$ |

BASE: These values are compared with incoming interrupt vector's higher 5 bits to deturmine which of the two interrupt controllers originates the IACK. This information tells Bifrost which vector destination table to use when the vector is passed onto Lethe.

4.5 Expected System Configurations

The default register values bring any Chimæra based system out of reset functionally. The defaults are aimed at the simplest, most generic system: one processor, one memory controller, and one Bifrost.

4.5.1 Standard Customizing

Even the simplest systems require a fair degree of customization. All systems must be customized to deal with the locality of main memory and EISA peripherals. This is described in greater detail in the Chimæra Software Spec..

In addition there are several Bifrost configuration registers which should be changed:

Pipelining: this defaults off, but should almost always be turned on

LC: this defaults on, but should almost always be turned off

TALpm: this defaults off, but should almost always be turned on

TALpio: this defaults off, but should almost always be turned on

Prefetch: this defaults off, but should almost always be turned on

RdCount: this should always be greater than zero

Non standard systems will benefit from addition customization.

4.5.2 Multiple Processor Customization

Systems with more than one processor may benefit from splitting read requests to Bifrost from the ransfer data phase. This can be mandated by setting the TALall bit[2].

4.5.3 Multiple I/O Subsystem Customization

Systems with more than one Bifrost face more stringent customization. With two Bifrost's, a second Bifrost may require the Lethe bus in less than 2.5 μSeconds. If the first Bifrost is in the midst of a locked transfer or an extended line–fill, he may not get off the bus within this

[2]Remember that when TALall is set, TALpm must also be set.

period. To ensure that this problem never occurs, the TALall, KReads and LC bits should be set. In addition, the RdCOUNT register should be set to seven. This will ensure that for non-locked cycles neither Bifrost will be able to monopolize the bus. The LC bit ensures that the Lethe and Midgard buses are coupled during locked cycles (which prevents the second bus's master from getting the bus, thus eliminating the possibility of a timeout).

Part II

Bifrost–A

Chapter 5

Bifrost-A μArchitecture

5.1 Overview

Bifrost–A is the address path chip of the Bifrost subsystem. Bifrost–A is responsible for all address and control transactions between the Lethe and MEI buses. The chip has three major blocks:

Lethe Interface: master, slave and arbitraton of Lethe bus
ABCTL: control of the A and B buffers
MEI Interface: master, slave and arbitraton of Midgard, EISA, and ISA buses These are shown in Fig 5.1.

5.2 Lethe Interface

The Lethe interface implements a proper subset of the Lethe bus architecture described in detail in the Chimæra Architecture Spec..

5.2.1 Lethe Functional Subset

Bifrost's Lethe subset has the following omissions:

- No Write–Allocation Cycles (Master or Slave)
- Slave Cycles are Write–Through
- Snooping *always* results in misses While these omissions are major, Bifrost also exersizes some of Lethe's higher order functionality.

Figure 5.1: Bifrost–A Control Flow

5.2.1.1 TAL Cycles

Bifrost employs the Lethe bus TAL[1] functionality to eliminate deadlocks and minimize Lethe bus bandwidth requirements.

5.2.1.2 Deadlocks

Any time a Lethe node issues a cycle which cannot terminate without access to MEI and a MEI cycle is pending which cannot terminate without access to Lethe[2] Bifrost must cause the Lethe master to relinquish the bus and Try Again Later. Bifrost–A uses the MTAL~ signal to do this.

5.2.1.3 Split Transactions

Lethe reads of MEI data can be very slow. In MP configurations it can be very advantageous for Lethe masters to relinquish the Lethe bus after they have made a MEI request. While Bifrost completes the read, other Lethe nodes are free to use the Lethe bus. Bifrost can be configured to force the current Lethe master off the Lethe bus and Try Again Later.

5.2.1.4 Lethe LOCKed Cycles

Locked cycles are inherently dangerous in systems with decoupled buses. Our system is no exception. The C5 cache controller is incapable of snooping from the initiation of a LOCK–ed transaction until the final LOCK–ed transfer's completion. As a result, it is not possible to preempt a master once his first LOCK–ed transfer has begun[3].

This means that if a LOCK–ed master meanders[4] the master must have exclusive access to all buses. The only way to ensure this is to couple the buses when the LOCK–ing master initiates the LOCK. The LOCK inititation can be postponed with MTAL~ is necesary.

Bifrost has two modes for handling LOCKs: STRONG and WEAK. STRONG LOCK–ing couples all buses. This ensures that, should a master meander, the LOCK will be inviolate. WEAK LOCK–ing does not couple the buses. This guarantees that if the the master keeps to the same slave his LOCK will be inviolate.

5.2.1.5 Sub–Line Writes

MEI bursts are not guaranteed to begin or end on Lethe cache line boundaries. When they don't Bifrost–A bursts them onto Lethe as long as they do not have sparce byte enables.

---

[1] See the Chimaera Architecture Spec..

[2] e.g. When Lethe nodes desire to read MEI data it is possible that there is a MEI–based read. MEI–based cycles cannot be preempted. Consequently, if the Lethe read is not forced to relinquish the bus, the two cycles will wait indefinately.

[3] Once his cacheability window has closed without a MTAL~.

[4] Accesses multiple slaves within a single LOCK–ed mastership.

5.2.1.6 Sequential Writes

EISA bursts are nominally sequential. Many sub-line transfers will not begin on Lethe cache-line boundaries. These are usually not in bank-interleaved order. Bifrost bursts them sequentially on the Lethe bus with the MSEQ~ pin.

5.2.1.7 MSNPWB Writes

Most MEI bursted writes will be accumulated into complete cache lines. These transfers may hit dirty lines in Lethe caches. The dirty lines should be preempted by the new data. The MSNPWB pin tells Lethe nodes to invalidate their cache hits but to swallow[5] any write-backs.

5.2.2 Bifrost–A Lethe Master Interface (LEMI)

Bifrost's Lethe mastering interface is used to pass MEI traffic onto the Lethe bus. The Lethe mastering logic is responsible for the Lethe interaction when the following events occur:

MEI Prefetches: When an MEI device attempts to read Lethe resident memory.

MEI Writes: When an MEI device attempts to write to Lethe resident memory.

MEI Write Snoops: When an MEI device attempts to write to MEI resident memory.

IPC Cycles: When Interrupts are passed to Hydra, and when EISA snooping is overrun.

5.2.2.1 Lethe Master Request Tracker (LEMRT)

The bus requesting and cycle control is handled directly by the LEMRT vhdl. When any of the above–mentioned events occurs LEMRT recieves a request from ABCTL. LEMRT passes this request onto the Lethe bus. When the bus is granted to this node, LEMRT controls the execution of the appropriate logic. Once the control portion of the cycle has completed normally (not TAL–ed), LEMRT acknowledges the original request.

5.2.2.2 Lethe Master Data Tracker (LEMDT)

Meanwhile the LEMDT block fields data requests from ABCTL. LEMDT passively waits for LEMRT to gain the Lethe bus. When the Lethe bus is granted and LEMRT has started the cycle, LEMDT transfers the data to or from the appropriate buffer. Once the tranfer has completed normally, LEMDT acknowledges the original data request.

[5]Swallow implies that the dirty status should not be asserted on MHITM~ and that the dirty data should be discarded without being written to the Lethe bus.

5.2.3 Bifrost–A Lethe Slave Interface (LESDI)

Bifrost–A's Lethe slave logic controls Bifrost–A and –D Lethe slave activities. These include:

Lethe Reads: all Lethe mastered reads of Bifrost

Lethe Writes: all Lethe mastered writes to Bifrost

Hydra Interrupts: support for the classic mode of interrupts

5.2.3.1 MIDMAST Lethe TAL support

The MIDMAST block is primarily responsible for the arbitration for, and the execution of cycles on the Midgard bus. However, it also contains the following Lethe slave logic:

TAL Support

Read Request Handshake

Store Queue Dequeueing

5.3 ABCTL

ABCTL is Bifrost–A's A and B buffer controller. It maintains the state of the A and B buffers.

ABCTL fields requests from Bifrost's four interfaces: Lethe Slave, Midgard Master, Midgard Slave, and Lethe Master. It serves as a conduit through which two of these interfaces can pass data and control information.

5.4 MEI Interface

Bifrost's MEI Interface is composed of a master and a slave.

5.4.1 Bifrost–A MEI Master

Bifrost's MEI master is in the i486 style. Bifrost appears to MEI devices (e.g. the EBC, various proprietary periphereals...) as a $33\frac{1}{3}$ MHz. i486.

5.4.2 Bifrost–A MEI Slave

Bifrost's MEI slave interface is a 32–bit EISA slave. All MEI mastered cycles must be translated to EISA format.

5.4.2.1 Normal EISA Cycles

Bifrost does a combinatorial decode on the EISA address (as it sees it on the VA bus) and asserts VLOCMEM~ or VLOCIO~ (and EX32~) if appropriate.

5.4.2.2 EISA Burst Cycles

Bifrost always attempts to burst EISA memory reads and writes. Bifrost indicates this with the assertion of SLBURST~. If the master also asserts MSBURST~ EISA burst protocol will be used.

EXRDY When EISA burst's are non-sequential, or Bifrost is slow, the burst may require wait states. Bifrost adds wait states by de-asserting EXRDY glitch-free[6] during a burst.

5.4.2.3 ISA Cycles

ISA cycles are translated to EISA cycles if the Bifrost is intended to be the slave of the cycle. This is deturmined by the EBC through the level of the EX32~ signal.

5.5 Design Characteristics

5.5.1 Mechanical Characteristics

Bifrost-A will be packaged in a 208 pin PQFP. It will be implemented in VLSI Technology's 0.8 micron gate array process. It is expected that the die will be the VGT400210, a double layer metal die with roughly 36K usable gates.

5.5.2 SSO's

Bifrost-A has 136 I/O pins. Bifrost is capable of sourcing cycles on both the Lethe and Midgard buses during the same clock. At first glance this presents a bleak SSO (simultaneously switching output) picture. However, since the vast majority of the Lethe signals switch on the falling edge, the actual number of SSO's is roughly half of total I/O's. The worst case SSO picture is as follows:

↑MCLK[7]

2 mA: 66

[6] Bifrost must de-assert EXRDY glitch-free to meet bf EXRDY's 10nS. set-up time. This is done by gating a combinatorial decode of the desired state of EXRDY with BCLK and quarranteeing that the former is stable throughout the first phase of the latter.

4 mA.: 1
8 mA: 1
8 mA Slew: 2

↓MCLK[8]

2 mA: 60
8 mA Slew: 2

5.5.3 Powers and Grounds

We do not yet have the design characeristics for the 0.8 micron family. All of our P & G estimates are extrapolations from the VGT Design Guide. We assume an average of 18 nH inductance for each power and ground pin.

5.5.3.1 Internal Core P & G

Extrapolating from the VGT300 design guide we believe Bifrost–A will require 6 power and ground pairs for internal core noise immunity.

5.5.3.2 External SSO P & G

Our worst case SSO's occur when MCLK rises. From the VGT300 design quide on 3-17, we require roughly 1 VSSE pin per 5 2mA SSO[9]. We require roughly 1 VSSE pin per 3.5 4 mA SSO. We require 1 VSSE per 8 mA SSO. From 3-18 we require roughly 1 VSSE per four 8mA slew SSO. This results in roughly 14 VSSE pins. For SSO analysis, VTI requires 3 VSSE per 2 VDDE. Consequently we also need 10 VDDE

5.5.3.3 Internal SSO P & G

VTI's predrivers are powered by the core power buses. Since they are large transisters, they are succeptable to SSO noise. From the table on 3-20 we need roughly one additional VSSI per 10 SSO's. This means we need 7 more VSSI and four more VDDI.

5.5.3.4 P & G Summary

| | | | |
|---|---|---|---|
| VSSI (Core): | 6 | VDDI (Core): | 5 |
| VSSE: | 14 | VDDE: | 9 |
| VSSI (Predrivers): | + 7 | VDDI (Predrivers): | + 4 |
| TOTAL VSS: | 27 | TOTAL VDD: | 20 |

[9]Per VTI we double the current drive on each output when correlating to 1.0 micron

Chapter 6

Bifrost-A Signals

6.1 Total Pins (208)

6.1.1 I/O Signals (163)

6.1.1.1 General (3)

| NAME | TYPE | DESCRIPTION | CLOCK |
|---|---|---|---|
| MCLK | I | Lethe Bus Clock. Input through monolithic clock driver. Requires three pads. | – |
| MOCLK | I | Lethe Bus Output Clock. Input through generic TTL level shifter. | – |
| POK | I | Power OK. Also tristates all outputs | Async |

6.1.1.2 Lethe Address Group (46)

| NAME | TYPE | DESCRIPTION | CLOCK |
|---|---|---|---|
| MADS~ | I/O (4mA) | Lethe bus address strobe. | ↑ MCLK† |
| MSNPSTB~ | I/O (2mA) | Snoop strobe indication. Driven by current bus master during the address phase when snooping is required. | ↑ MCLK† |
| MSNPWB | I/O (2mA) | Snoop write-back indication. Driven by current bus master during the address phase when the write-backs should be suppressed. | ↓ MCLK* |
| MA[31:3] | I/O (2mA) | Lethe Address Bus | ↓ MCLK* |
| MBE[7:0] | I/O (2mA) | Byte enables indicate which bytes of the data bus have or are requesting data | ↓ MCLK* |
| MMIO | I/O (2mA) | Memory or I/O Cycle Indication | ↓ MCLK* |
| MDC | I/O (2mA) | Data or Code Cycle Indication | ↓ MCLK* |
| MWR | I/O (2mA) | Write or Read Cycle Indication | ↓ MCLK* |
| MLOCK~ | I/O (2mA) | Lock Cycle Indication | ↑ MCLK† |
| MPALL~ | I/O (2mA) | Potential Allocation Cycle Indication | ↓ MCLK* |
| MSEQ~ | I/O (2mA) | Sequencial Write Cycle Indication | ↓ MCLK* |

6.1.1.3 Lethe Data Group (13)

| NAME | TYPE | DESCRIPTION | CLOCK |
|---|---|---|---|
| MDBB~ | I/O (2mA) | Data Strobe. This signal is driven by the device currently driving the data bus. For write cycles this means that as soon as the write data is available if the previous cycle's data phase is over, the mastering Asgard drives data and asserts the MDBB~. For read cycles MDBB~ is asserted by the active slave when the data is available and the snoop window is over. | ↑ MCLK† |
| MD[$n+7:n$] | I/O (2mA) | Lethe data bus. Used for register accesses. Primary Bifrost sits on byte 4 ($n = 32$). Secondary bifrost sits on byte 5 ($n = 40$). | ↑ MCLK |
| MBLAST~ | I/O (2mA) | Burst Last Indication | ↑ MCLK† |
| MBRDY~ | O (2mA) | Burst Ready Indication | ↑ MCLK† |
| MERDY~ | O (2mA) | Early Ready Indication | ↑ MCLK† |
| MBRDYc~ | I | Consensus Burst Ready Indication | ↑ MCLK |

6.1.1.4 Lethe Arbitration / General (3)

| NAME | TYPE | DESCRIPTION | CLOCK |
|---|---|---|---|
| MREQ~ | O (8mA) | M Bus Request. Each system node has an individual version of this pin. | ↑ MCLK† |
| MGR~ | I | M Bus Grant. Each system node has an individual version of this pin. | ↑MCLK |
| HINT | I | Hydra interrupt pin. Strobe in classic mode indicates that Bifrost must do an IACK cycle and pass the IPC to Hydra. High level in compatible mode indicates that Bifrost should accept interrupt acknowledge cycles from the Lethe bus. | ↑MCLK |

6.1.1.5 Lethe Cacheability Group (8)

| NAME | TYPE | DESCRIPTION | CLOCK |
|---|---|---|---|
| MKWENDc~ | I | Cacheability window end indication. The logical NAND of the MKWEND~ signals. | ↑MCLK |
| MWT~ | O (2mA) | Write through indication. Bifrost always drives this asserted when it is the active slave. | ↑ MCLK†* |
| MWTc | I | Cacheability type. Indicates that the current cycle is write through. Sampled at the end of the cachebility window by the current master. | ↑ MCLK |
| MRO~ | O (2mA) | Read only indication. Active slave drives valid level, others drive asserted. | ↑ MCLK†* |
| MKENc~ | I | Cacheability indication. Sampled at the end of the cachebility window by the current master. | ↑MCLK |
| MKEN | O (2mA) | Cacheability indication. Indicates that the current cycle is cacheable. Active slave drives valid level, others drive asserted. | ↑ MCLK†* |
| MTALc | I | Try Again Later indication. Sampled at the end of the cachebility window by the current master. | ↑MCLK |
| MTAL~ | O (12mA) | Try Again Later indication. Indicates that the current cycle should be restarted. Driven active by any slave which requires that the current master not be allowed to keep the bus. Bifrost uses this pin for two purposes: to decouple slow bus reads, and to prevent deadlocks. | ↑ MCLK |

6.1.1.6 Lethe Snooping Group (2)

| NAME | TYPE | DESCRIPTION | CLOCK |
|---|---|---|---|
| MSWENDc~ | I | Snoop window end indication. The logical NAND of the **MSWEND~** signals. Bifrost's node specific **MSWEND** signal is tied to its **MKWEND** signal. | ↑MCLK |
| MHITMc | I | Consensus snoop hit to modified status. Indicates that data for the current Lethe cycle is dirty in Lethe node's cache. Bifrost never has dirty information with respect to the Lethe bus, so its node specific **MHITMc~** signal is pulled high. | ↑MCLK |

6.1.1.7 MEI Shared Address Group (46)

| NAME | TYPE | DESCRIPTION | CLOCK |
|---|---|---|---|
| VA[31:2] | I/O (2mA) | Virtual host address bus. | ↑ MCLK[†] |
| LA[9:3] | I | EISA bus line addresses | BCLK |
| VBE~[3:0] | I/O (2mA) | Byte enables indicate which bytes of the data bus have or are requesting data. | ↑ MCLK[†] |
| VM/IO~ | I/O (2mA) | Memory / IO | ↑ MCLK[†] |
| VW/R~ | I/O (2mA) | Write / Read | ↑ MCLK[†] |
| VD/C~ | O (2mA) | Data / Control | ↑ MCLK[†] |
| BIOSADR~ | O (2mA) | BIOS Address Chip Select | ↑ MCLK[†*] |
| DIAGADR~ | O (2mA) | Diagnostic Chip Select | ↑ MCLK[†*] |

6.1.1.8 MEI Shared Arbitration Group (7)

| NAME | TYPE | DESCRIPTION | CLOCK |
|---|---|---|---|
| VLOCK~ | O (2mA) | Midgard Lock | ↑ MCLK[†] |
| LOCK~ | I | EISA Lock | ↑BCLK |
| VHOLD | I | Hold Request | ↑MCLK |
| VHLDA | O (2mA) | Hold Acknowledge | ↑ MCLK[†] |
| VLOCMEM~ | O (2mA) | System Local Memory – Indicates that the the current memory cycle will be serviced from somewhere other than the EISA bus. | [†*] |
| VLOCIO~ | O (2mA) | System Local I/O – Indicates that the the current I/O cycle will be serviced from somewhere other than the EISA bus. | [†*] |
| CPUMISS~ | O (2mA) | Active low indicates that Bifrost has a cycle it desires to run and the EISA bus owns Midgard. | ↑ MCLK[†] |

6.1.1.9 MEI 486–Style Control Group (2)

| NAME | TYPE | DESCRIPTION | CLOCK |
|---|---|---|---|
| VADS~ | I/O (2mA) | System Address Strobe | ↑ MCLK† |
| VERDYO~ | I | EBC's Early Ready Indicator | ↑MCLK |

6.1.1.10 MEI EISA and ISA Control Group (10)

| NAME | TYPE | DESCRIPTION | CLOCK |
|---|---|---|---|
| BCLK | I | Bus Clock | – |
| START~ | I | Provides timing control at the start of an EISA cycle | ↑BCLK |
| CMD~ | I | Provices timing control within an EISA cycle | ↑BCLK |
| MSBURST~ | I | Indicates that the current EISA master desires to use burst timings on subsequent cycles. | ↑BCLK |
| SLBURST~ | O (8 Slew) | Indicates that the current EISA slave is capable of bursting subsequent EISA cycles. | ↑ BCLK†* |
| REFRESH~ | I | Refresh in progress – indicates the current EISA cycle is a refresh and the cycle need not be refected onto the system bus. | – |
| EXRDY | O (8 Slew) | EISA extend ready signal | BCLK* |
| EX32~ | O (8 Slew) | Thirty-two bit master indication | †* |
| QHSSTRB~ | I | Qualified Host Snoop Strobe from the EBC | ↑MCLK |
| LIOWAIT~ | O (2mA) | Long I/O Wait – controls the delay between back to back I/O cycles to 8 and 16 bit ISA slaves. | ↑BCLK |

6.1.1.11 Bifrost-D Interface (23)

| NAME | TYPE | DESCRIPTION | SOURCE |
|---|---|---|---|
| DNQ~ | O (2mA) | Indicates that valid data has been queued into the data queue. (Increments the store queue's in-address pointer.) | ↓ MCLK* |
| DDQ~ | O (2mA) | Indicates that data has been dequeued from the data queue. (Increments the store queue's out-address pointer.) | ↓ MCLK* |
| MDOE~ | O (2mA) | Lethe data output enable. Indicates that the current MDBB~ is being driven by Bifrost-A. This implies that Bifrost-D should supply data to the lethe bus. | ↑ MCLK† |
| ABI[5:2] | O (2mA) | A and B Buffer In Select. | ↑ MCLK† |
| ABDir | O (2mA) | Direction of A and Buffers. [1] ≡ L←M, [0] ≡M←L. This pin is sampled at the assertion of POK. If the sampled value is high, Bifrost assumes that it is the primary Bifrost. Otherwise, Bifrost assumes that it is the secondary Bifrost. | ↑ MCLK† |
| ABO[5:2] | O (2mA) | A and B Buffer Out Select. | ↑ MCLK† |
| ABOSel | O (2mA) | AB Buffer Output Mux Select. [0] ≡ $A$, [1] ≡ $B$ | ↑ MCLK† |
| AWE~ | O (2mA) | Buffer A Write Enable | ↓ MCLK* |
| BWE~ | O (2mA) | Buffer B Write Enable | ↓ MCLK* |
| VDOE~ | O (2mA) | MEI Bus Data Output Enable | ↓ MCLK* |
| DATCS~ | O (2mA) | Data Register Chip Select. | ↓ MCLK* |
| NDXCS~ | O (2mA) | Index Register Chip Select | ↓ MCLK* |
| SPMX[2:0] | O (2mA) | Mux select for the special mux.[7 : 4] ≡A/B Buffers, [3] ≡ IACK Registers, [2] ≡Mini-ROM, [1] ≡IACK IPC, [0] ≡Flush IPC | ↓ MCLK* |
| BELAT~ | O (2mA) | Byte Enable Latching signal | ↓ MCLK* |
| VDATE~ | O (2mA) | VD latch enabling signl | ↓ MCLK* |

6.1.2 Power and Ground (45)

| NAME | TYPE | DESCRIPTION | CLOCK |
|---|---|---|---|
| VDDE[8:0] | – | External Power Pins | – |
| VSSE[13:0] | – | External Ground Pins | – |
| VDDI[4:0] | – | Internal Core Power Pins | – |
| VSSI[5:0] | – | Internal Core Power Pins | – |
| VDDI[3:0] | – | Internal Predriver Power Pins | – |
| VSSI[6:0] | – | Internal Predriver Power Pins | – |

Chapter 7

Bifrost–A Mechanical Specification

| 1–52 | 53–104 | 105–156 | 157–208 | |
|---|---|---|---|---|
| VLOCIO# (OUT) | MD5 (INOUT) | MBE#3 (INOUT) | VA21 (INOUT) | |
| CPUMISS# (OUT) | MD4 (INOUT) | MBE#7 (INOUT) | VA2 (INOUT) | |
| VADS# (OUT) | MD3 (INOUT) | MRO# (INOUT) | VA5 (INOUT) | |
| VERDYO# (IN) | MD2 (INOUT) | MSWENDC# (INOUT) | VA29 (INOUT) | |
| BCLK (IN) | MD1 (INOUT) | MTAL# (INOUT) | VA12 (INOUT) | |
| START# (IN) | MD0 (INOUT) | MHITC# (INOUT) | VA4 (INOUT) | |
| CMD# (IN) | MA16 (INOUT) | MKWENDC# (INOUT) | VA28 (INOUT) | |
| MSBURST# (IN) | MA24 (INOUT) | MWT# (INOUT) | VA20 (INOUT) | |
| REFRESH# (IN) | MA8 (INOUT) | MKEN (INOUT) | VA11 (INOUT) | |
| QHSSTRB# (IN) | MA17 (INOUT) | MTALC (INOUT) | VA3 (INOUT) | ← 10,62,114,166 |
| SLBURST# (INOUT) | VDDE (INOUT) | VSSI | VA27 (INOUT) | |
| VSSE | MA9 (INOUT) | MWTc (INOUT) | VA19 (INOUT) | |
| EXRDY (INOUT) | VSSI (INOUT) | VDDI | VA26 (INOUT) | |
| VDDI | MA18 (INOUT) | MKENc (INOUT) | VSSE | |
| EX32# (OUT) | VSSE (INOUT) | VSSE | VA10 (INOUT) | |
| VSSI | VSSE (INOUT) | MADS# (INOUT) | VA25 (INOUT) | |
| LIOWAIT# (OUT) | MA25 (INOUT) | VSSI | VSSI | |
| VDDE | MA10 (INOUT) | MGR# (INOUT) | VA18 (INOUT) | |
| BELAT# (INOUT) | MA26 (INOUT) | MDBB# (INOUT) | VDDE (INOUT) | |
| SPMX0 (OUT) | MA19 (INOUT) | MREQ# (INOUT) | VA9 (INOUT) | ← 20,62,124,176 |
| NDXCS# (OUT) | MA27 (INOUT) | MOCLK (IN) | VA17 (INOUT) | |
| VDDI | MA3 (INOUT) | VDDE | VA8 (INOUT) | |
| SPMX1 (OUT) | MA11 (INOUT) | MERDYO# (INOUT) | VA24 (INOUT) | |
| VSSI | VDDI (INOUT) | MBRDYc# (INOUT) | VSSE | |
| DATCS# (OUT) | MA20 (INOUT) | VSSI | VA16 (INOUT) | |
| VSSE | MA28 (INOUT) | MBRDY# (INOUT) | HINT (IN) | |
| SPMX2 (OUT) | MCLK (INOUT) | VDDI | LA9 (IN) | |
| VDATE# (OUT) | MA4 (INOUT) | MLOCK# (INOUT) | VDDI | |
| VDOE# (OUT) | VDDE (INOUT) | MBLAST# (INOUT) | LA8 (IN) | |
| ABO2 (OUT) | MA12 (INOUT) | VSSE | LA7 (IN) | ← 30,72,134,186 |
| VSSI | MA29 (INOUT) | MWR (INOUT) | LA6 (IN) | |
| BWE# (OUT) | VSSI (INOUT) | MDC (INOUT) | LA5 (IN) | |
| ABO3 (OUT) | MA5 (INOUT) | MMIO (INOUT) | VSSE | |
| VDDE | MA21 (INOUT) | MPALL# (INOUT) | LA4 (IN) | |
| AWE# (OUT) | VSSE (INOUT) | VSSI | VDDE | |
| ABO4 (OUT) | VSSE (INOUT) | MSEQ# (INOUT) | LA3 (IN) | |
| VSSE | MA30 (INOUT) | VDDE | VBE#3 3 (INOUT) | |
| ABOSEL (OUT) | MA6 (INOUT) | MSNPWB (INOUT) | VSSI | |
| VDDI | MA13 (INOUT) | VDDI | VBE#2 2 (INOUT) | |
| ABO5 (OUT) | MA22 (INOUT) | MSNPSTB# (INOUT) | VSSE | ← 40,82,144,196 |
| VSSI | MA14 (INOUT) | VA15 (INOUT) | VBE#1 1 (INOUT) | |
| ABDIR (INOUT) | MA23 (INOUT) | VA7 (INOUT) | VBE#0 0 (INOUT) | |
| ABI2 (OUT) | VDDE (INOUT) | VSSI | VMIO (INOUT) | |
| MDOE# (OUT) | MA31 (INOUT) | VA31 (INOUT) | VDC (OUT) | |
| ABI3 (OUT) | MA7 (INOUT) | VSSE | VWR (INOUT) | |
| DDQ# (OUT) | MA15 (INOUT) | VA23 (INOUT) | VLOCK# (OUT) | |
| ABI4 (OUT) | MBE#0 (INOUT) | VDDI | LOCK (IN) | |
| DNQ# (OUT) | MBE#4 (INOUT) | VA14 (INOUT) | BIOSADR# (OUT) | |
| ABI5 (OUT) | MBE#5 (INOUT) | VA22 (INOUT) | DIAGADR# (OUT) | |
| POK (IN) | MBE#1 (INOUT) | VA13 (INOUT) | VHOLD (IN) | ← 50,92,154,206 |
| MD7 (INOUT) | MBE#6 (INOUT) | VA6 (INOUT) | VHLDA (OUT) | |
| MD6 (INOUT) | MBE#2 (INOUT) | VA30 (INOUT) | VLOCMEM# (OUT) | |

Part III

Bifrost–D

Chapter 8

Bifrost-D $\mu$Architecture

Bifrost-D is the data path chip of the Bifrost Lethe system bus to EISA I/O channel bridge. The system requires two Bifrost-D's for the complete data path. Each Bifrost-D connects to 32 Lethe data bits and 16 EISA data bits.

Bifrost-D has three cache line size buffers:

[A] Bidirectional buffer used for MEI mastered reads and writes.

[B] Bidirectional buffer used for MEI mastered reads and writes.

[SQ] Unidirectional Store Queue for Lethe mastered writes to MEI devices.

8.1 Bifrost–A Interface

Bifrost–A directs almost all of Bifrost–D's activities. The signals are described in Section 9.1.1.4. The function of these signals is shown in Fig 8.1.

8.2 Lethe Interface

Bifrost–D is capable of bidirectional data transfer between the Lethe bus and buffers A & B. Data can flow unidirectionally into SQ.

8.2.1 MEI Master Read

MEI mastered read cycles cause line prefetches from the Lethe bus into the A and B buffers. The extent of the prefetch depends on the master type and read type.

Figure 8.1: Bifrost-D μArchitecture

8.2.2 MEI Master Write

MEI mastered writes are accumulated into the A and B line buffers. The first write within a line allocates either A or B. Subsequent writes to the same line are accumulated. Line misses result in the allocation of the other line buffer. Line buffers are flushed[1] as described in Section ??

8.2.3 Lethe Master Reads

Lethe mastered reads result in MEI data streamed through one of the two bidirectional buffers (A or B).

8.2.4 Lethe Master Writes

Lethe mastered writes are queued into the store queue. See Section ?? on page ?? for details.

8.3 Midgard Interface

Midgard has bidirectional access to line buffers A & B and unidirectional access to the store queue.

8.3.1 MEI Master Reads

Data for MEI reads is always supplied through either the A or B line buffer.

8.3.2 MEI Master Writes

Data for MEI Writes is always sunk by either the A or B line buffer.

8.3.3 Lethe Master Reads

Lethe read data is fed into the A or B buffer.

8.3.4 Lethe Master Writes

Lethe write data is fed from the store queue.

[1] The dirtied locations are written to Lethe.

8.4 Mechanical Specifications

Bifrost-D will be a 160 PQFP. It will be implemented in VLSI Technology's 0.8 micron process. The die will probably be the VGT400162— a double-layer metal device with roughly 18K usable gates.

Chapter 9

Bifrost-D Signals

9.1 Total Pins (160)

9.1.1 I/O Signals

9.1.1.1 Lethe General (5)

| NAME | TYPE | DESCRIPTION | CLOCK |
|---|---|---|---|
| MCLK | I | Lethe Bus Clock | – |
| MOCLK | I | Lethe Bus output clock | – |
| LSHORT~ | I | Low Short indication. Indicates that this instantiation of the data chip is connected to the te low short of each D–word. | – |
| POK | I | Power OK signal. Also tri–states all drivers. | – |
| BCLK | I | EISA Bus Clock. Input through a TTL level shifter. | |

9.1.1.2 Lethe Data Group (43)

| NAME | TYPE | DESCRIPTION | CLOCK |
|---|---|---|---|
| MDL[15:0] | I/O (4mA) | Lethe Low DWord Data Bus Short Word | MCLK |
| MBE~L[1:0] | I | Lethe Low DWord Data Bus Short's Byte Enables | MCLK |
| MPL[1:0] | I/O (4mA) | Lethe Low DWord Data Bus Short's Parity | MCLK |
| MDH[15:0] | I/O (4mA) | Lethe High DWord Data Bus Short Word | MCLK |
| MBE~H[1:0] | I | Lethe High DWord Data Bus Short's Byte Enables | MCLK |
| MPH[1:0] | I/O (4mA) | Lethe High DWord Data Bus Short's Parity | MCLK |
| MDBB~ | I | Lethe Data Bus Busy Signal | MCLK |
| MBRDYc~ | I | Lethe Consensus Burst Ready Indication. | MCLK |
| MPERR~ | I/O (2mA) | Lethe Data Bus Parity Error. Driven two clocks after data transfered. | MCLK |

9.1.1.3 Midgard Data Group (16)

| NAME | TYPE | DESCRIPTION | CLOCK |
|---|---|---|---|
| VD[15:0] | I/O (2mA) | Midgard Data Bus Short. | MCLK |

9.1.1.4 Bifrost-A Interface (24)

| NAME | TYPE | DESCRIPTION | CLOCK |
|---|---|---|---|
| DNQ~ | I | Indicates that valid data has been queued into the data queue. (Increments the store queue's in-data pointer.) | ↓MCLK |
| DDQ~ | I | Indicates that data has been dequeued from the data queue. (Increments the store queue's out-data pointer.) | ↓MCLK |
| MDOE~ | I | Lethe data output enable. Indicates that the current MDBB~ is being driven by Bifrost-A. This implies that Bifrost-D should supply data to the lethe bus. | MCLK |
| ABI[5:2] | I | Prefetch Buffer In Select. | MCLK |
| ABDir | I | Direction of A and Buffers. [1] ≡ L←M, [0] ≡M←L. The value on this pin is latched by the rising edge of POK. If the latched value is one this is the primary bridge. Otherwise this is the secondary bridge. | MCLK |
| ABO[5:2] | I | Prefetch Buffer Out Select. | MCLK |
| ABOSel | I | Prefetch Buffer Output Mux Select. [0] ≡ $A$, [1] ≡ $B$ | MCLK |
| AWE~ | I | Prefetch Buffer A Write Enable | ↓MCLK |
| BWE~ | I | Prefetch Buffer A Write Enable | ↓MCLK |
| VDOE~ | I | MEI Bus Data Output Enable | ↓MCLK |
| DATCS~ | I | Data Register Chip Select. | ↓MCLK |
| NDXCS~ | I | Index Register Chip Select | ↓MCLK |
| SPMX[2:0] | I | Mux select for the special mux.[7 : 4] ≡A/B Buffers, [3] ≡ IACK Registers, [2] ≡Mini-ROM, [1] ≡IACK IPC, [0] ≡Flush IPC | ↓MCLK |
| BELAT~ | I | Byte Enable Latch Signal | ↓MCLK |
| VDATE~ | I | VD latch enabling signal. | ↓MCLK |
| VA2 | I | Virtual host bus address bit 2. Indicates which short of data should be directed to the Midgard bus. | ↓MCLK |

9.1.1.5 Virtual Host Bus (5)

| NAME | TYPE | DESCRIPTION | CLOCK |
|---|---|---|---|
| VHLDA | I | Virtual Host Bus Hold Acknowledge. (Controls Midgard out mux.) | |
| VERDO~ | I | Virtual Host Bus early ready indication. | MCLK |
| VRDYI~ | O (2mA) | Virtual Host Bus ready indication. | MCLK |
| VDC | I | Virtual Host Bus write(1) read(0) indication. | MCLK |
| VMIO | I | Virtual Host Bus memory(1) I/O(0) indication. | MCLK |

9.1.2 Power and Ground (59)

| NAME | TYPE | DESCRIPTION | CLOCK |
|---|---|---|---|
| VDDE[15:0] | – | External Power Pins | – |
| VSSE[22:0] | – | External Ground Pins | – |
| VDDI[3:0] | – | Internal Core Power Pins | – |
| VSSI[3:0] | – | Internal Core Power Pins | – |
| VDDI[4:0] | – | Internal Predriver Power Pins | – |
| VSSI[6:0] | – | Internal Predriver Power Pins | – |

Chapter 10

Bifrost-D Mechanical Specification

| 1–40 | 41–80 | 81–120 | 121–160 | |
|---|---|---|---|---|
| VLOCIO# (OUT) | MD5 (INOUT) | MBE#3 (INOUT) | VA21 (INOUT) | |
| CPUMISS# (OUT) | MD4 (INOUT) | MBE#7 (INOUT) | VA2 (INOUT) | |
| VADS# (OUT) | MD3 (INOUT) | MRO# (INOUT) | VA5 (INOUT) | |
| VERDYO# (IN) | MD2 (INOUT) | MSWENDC# (INOUT) | VA29 (INOUT) | |
| BCLK (IN) | MD1 (INOUT) | MTAL# (INOUT) | VA12 (INOUT) | |
| START# (IN) | MD0 (INOUT) | MHITC# (INOUT) | VA4 (INOUT) | |
| CMD# (IN) | MA16 (INOUT) | MKWENDC# (INOUT) | VA28 (INOUT) | |
| MSBURST# (IN) | MA24 (INOUT) | MWT# (INOUT) | VA20 (INOUT) | |
| REFRESH# (IN) | MA8 (INOUT) | MKEN (INOUT) | VA11 (INOUT) | |
| QHSSTRB# (IN) | MA17 (INOUT) | MTALC (INOUT) | VA3 (INOUT) | ← 10,62,114,166 |
| SLBURST# (INOUT) | VDDE (INOUT) | VSSI | VA27 (INOUT) | |
| VSSE | MA9 (INOUT) | MWTc (INOUT) | VA19 (INOUT) | |
| EXRDY (INOUT) | VSSI (INOUT) | VDDI | VA26 (INOUT) | |
| VDDI | MA18 (INOUT) | MKENc (INOUT) | VSSE | |
| EX32# (OUT) | VSSE (INOUT) | VSSE | VA10 (INOUT) | |
| VSSI | VSSE (INOUT) | MADS# (INOUT) | VA25 (INOUT) | |
| LIOWAIT# (OUT) | MA25 (INOUT) | VSSI | VA18 (INOUT) | |
| VDDE | MA10 (INOUT) | MGR# (INOUT) | VSSI | |
| BELAT# (INOUT) | MA26 (INOUT) | MDBB# (INOUT) | VDDE (INOUT) | |
| SPMX0 (OUT) | MA19 (INOUT) | MREQ# (INOUT) | VA9 (INOUT) | ← 20,62,124,176 |
| NDXCS# (OUT) | MA27 (INOUT) | MOCLK (IN) | VA17 (INOUT) | |
| VDDI | MA3 (INOUT) | VDDE | VA8 (INOUT) | |
| SPMX1 (OUT) | MA11 (INOUT) | MERDYO# (INOUT) | VA24 (INOUT) | |
| VSSI | MA20 (INOUT) | MBRDYc# (INOUT) | VSSE | |
| DATCS# (OUT) | MA28 (INOUT) | VSSI | VA16 (INOUT) | |
| VSSE | VDDI (INOUT) | MBRDY# (INOUT) | HINT (IN) | |
| SPMX2 (OUT) | MCLK (INOUT) | VDDI | LA9 (IN) | |
| VDATE# (OUT) | MA4 (INOUT) | MLOCK# (INOUT) | VDDI | |
| VDOE# (OUT) | VDDE (INOUT) | MBLAST# (INOUT) | LA8 (IN) | |
| ABO2 (OUT) | MA12 (INOUT) | VSSE | LA7 (IN) | ← 30,72,134,186 |
| VSSI | MA29 (INOUT) | MWR (INOUT) | LA6 (IN) | |
| BWE# (OUT) | VSSI (INOUT) | MDC (INOUT) | LA5 (IN) | |
| ABO3 (OUT) | MA5 (INOUT) | MMIO (INOUT) | VSSE | |
| VDDE | MA21 (INOUT) | MPALL# (INOUT) | LA4 (IN) | |
| AWE# (OUT) | VSSE (INOUT) | VSSI | VDDE | |
| ABO4 (OUT) | VSSE (INOUT) | MSEQ# (INOUT) | LA3 (IN) | |
| VSSE | MA30 (INOUT) | VDDE | VBE#3 3 (INOUT) | |
| ABOSEL (OUT) | MA6 (INOUT) | MSNPWB (INOUT) | VSSI | |
| VDDI | MA13 (INOUT) | VDDI | VBE#2 2 (INOUT) | |
| ABO5 (OUT) | MA22 (INOUT) | MSNPSTB# (INOUT) | VSSE | ← 40,82,144,196 |

Appendix A

Waveforms

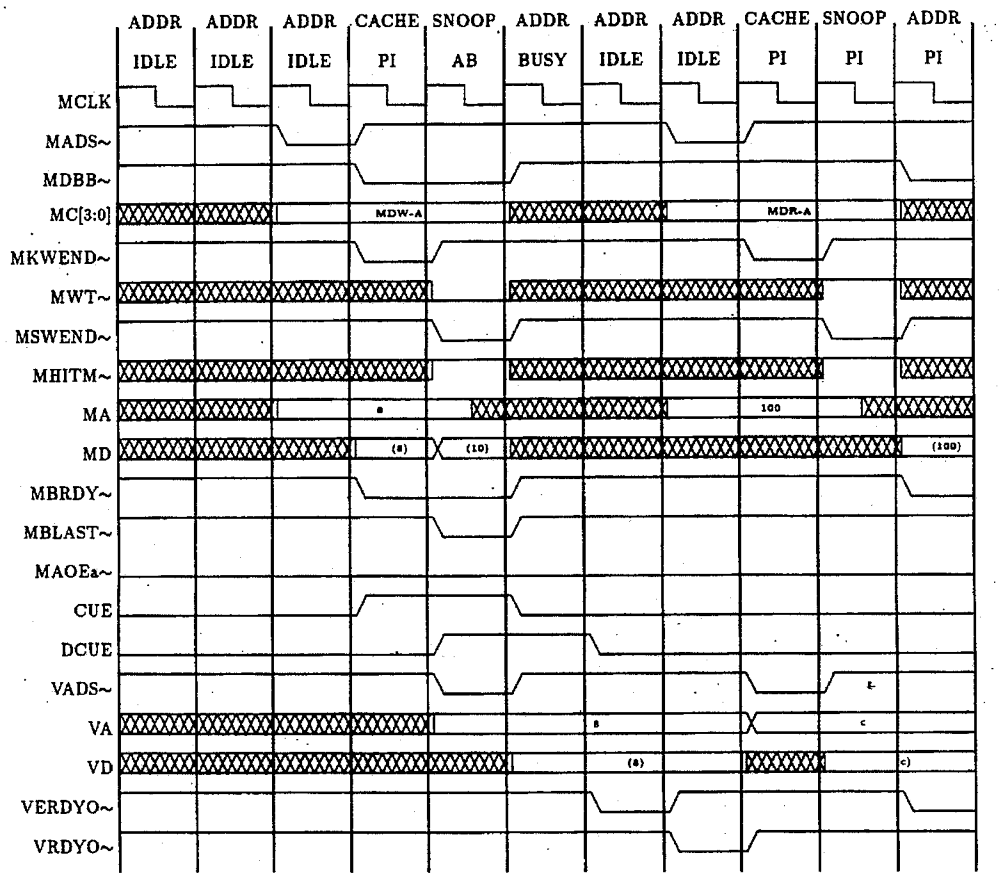
Figure A.1: Lethe Sequencial Writes to Bifrost

List of Figures 2.1 Chimaera Architecture . . . . . . . . . . . . . . . . . . . . . . . . . . . . . . . . . . 12
2.2 Bifrost–D Dataflow . . . . . . . . . . . . . . . . . . . . . . . . . . . . . . . . . . . 13
2.3 Bifrost–A Address Flow . . . . . . . . . . . . . . . . . . . . . . . . . . . . . . . . 15

5.1 Bifrost–A Control Flow . . . . . . . . . . . . . . . . . . . . . . . . . . . . . . . . 36

8.1 Bifrost-D $\mu$Architecture . . . . . . . . . . . . . . . . . . . . . . . . . . . . . . . 54

A.1 Lethe Sequencial Writes to Bifrost . . . . . . . . . . . . . . . . . . . . . . . . 65

Index

ABlk*xx*, 24

BCR0, 20
BCR1, 21
BCR2, 22
Bifrost, 3
    Interrupt Controller, 9
Bifrost-A
    Signals, 43
Bifrost-D, 53
    Signals, 57
BSMD, 26

Deadlocks, 37
Dynamic Region Descriptors, 25

GIOAM, 27
GIOPW, 27

Hit , 6

I/O Mapping, 7
I/O Recovery, 28
I/O Remapping, 28
Index Map, 20
Interprocessor Communications Address, 23
Interrupts, 9
IPCA, 23

Lethe, 35
LOCKed Cycles, 37

MBASE, 29
MEI Interface, 39
Memory
    Attributes, 6
MIV*n*D, 29
MRA*n*, 26
MRB*n*, 25
MRM*n*, 25
MSID, 23
MSNPWB Writes, 38
Multiple I/O Channels, 7

Queue, 4

RCV, 28
Registers
    ABlk*xx*, 24
    BCR0, 20
    BCR1, 21
    BCR2, 22
    BSMD, 26
    Dynamic Region Descriptors, 25
    GIOPW, 27
    Index Map, 20
    IPCA, 23
    MBASE, 29
    MIV*n*D, 29
    MRA*n*, 26
    MRB*n*, 25
    MRM*n*, 25
    MSID, 23
    RCV, 28
    SBASE, 29
    SIV*n*D, 29
    Static Region Descriptors, 23

SBASE, 29
Sequential Writes, 38
SIV*n*D, 29

Slave ID, 23
Static Region Descriptors, 23

TAL Cycles, 37
Deadlocks, 37

Glossary

A

Active Slave The active slave is the slave to whom the current master's address is mapped.

Address Phase An address phase encompasses the address and control portion of a cycle. The address phase with the one clock assertion of MADS~ and terminated with the one clock assertion of MSWEND~. The current cycles address, byte enables, and control signals are valid from the begining of the address phase to the end of the cacheability window.

Alias When a particular memory location or I/O device can be accessed at different addresses. This can be caused by incompletely decoding the address.

Asgard The C5/C8 interface to the Lethe system bus.
[Mythology] The home of the gods.

Assert To bring a signal to its active level.

B

Bandwidth The amount of data that can be communicated over a wire in a particular amount of time. Usually measured in bytes per second.

Bank The smallest identifiable portion of the memory subsystem that gets a unique combination of RAS's and CAS's. Single sided SIMM's contain one bank, double sided SIMM's contain two banks.

Beat A single data transfer. On Lethe this is a piece of data $\leq$ 64 bits wide. On Midgard this is a piece of data $\leq$ 32 bits wide.

BIDI An abbreviation for bidirectional.

Bifrost The interface between the Lethe system bus and the Midgard, EISA, and ISA buses.
[Mythology] The heavenly rainbow built by the Aesir for use as a bridge between Asgard and Midgard.

Bifrostian Snob.

BIOS Basic input output system.

Block The unit of addressability of a cache. There is a seperate tag entry for each block in the cache. There may be multiple lines per block in which case each line has a seperate valid bit in the tags.

Boundary Scan A technique which allows testers to check connectivity between IC's.

Burst Transfer A bus cycle which consists of multiple data states. The duration of the burst can be controlled by either the master or the slave.

Bus Arbitration The period when potential bus masters are contending for bus access and one device is given bus ownership.

Bus Master The device which instigates the cycle.

Bus Slave Any device which is not currently the master.

Bus Tenure The period when a master owns the bus.

C

CAS Column Address Strobe.

Cacheability Window The period from the onset of the address (as indicated by the assertion of MADS~ to the point at which all slaves have deturmined cacheablity. Typically one clock.

Chimæra The name of this system's architecture. [Mythology] A mythical animal with the head and body of a lion an additional head of a goat and the tail of a serpant.

Coherency An adjective describing a system that will always produce the correct data whether that data is in main storage or some processors local cache.

CMOS Complementary metal oxide semiconductor. A FET logic family.

D

Data Phase A data phase is a line or sub-line transfer. It is initiated synchronously at the assertion of MDBB~ and terminated synchronously at the de-assertion of MDBB~. During a data phase, data is transferred in 64 or sub-64 bit 'beats' synchronously at the rising edge of each MCLK when the MBRDY~ signal is asserted.

Deassert To bring a signal to its inactive level.

Dirty When a cache line is in the Modified state.

DMA Direct memory access.

Dot-or Wired or. A connection between two signals whose electrical characteristics are such that the signals act as if they are logically ored together.

E

ECC Error correcting code. A memory system which has or supports ECC requires 7 bits of syndrome for 32 bits of data, and 8 bits of syndrome for 64 bits of data. These will allow detection and correction of any single bit errors and detection of two bit errors.

EDC Error Detection and Correction.

Even Parity An error checking scheme in which an extra bit is added for each byte of the memory subsystems word. This bit is set so that each byte has an even number of bits set.

Expulsion When a dirty line is forced out of a cache. Typically the result of another line being allocated.

Exclusive The state of a line of memory where the data represented in that line is valid and identical to that represented in memory, but no other cache has the line.

F

Fast Page Miss A page miss where the RAS of the block to which the cycle is mapped is de-asserted. This does not require a RAS precharge.

File IBM-ese for hard disk.

First Party DMA An I/O device that becomes bus master when it wants to Access memory. It does not require a DMA controller. It generates the addresses on its own.

FIT rate Failure in time rate. A measure of the number of bit failures per second per bit a dynamic RAM will have.

FRU Field Replacable Unit.

G

Gryphon The name of the memory controller in the Chimæra system. [Mythology] A fabulous animal with the body of a lion and the head and wings of an eagle.

H

Hit Rate The percentage of accesses which reside in a given device.

Hydra The name of the system controller in the Chimæra system. [Mythology] A nine-headed creature.

I

I486 Intel's current state-of-the-art microprocessor.

I586 Intel's next state-of-the-art microprocessor. A superscalar version of the i486 with other enhancements and higher operating frequency. Available mid-'92.

Interigation Tantamount to snooping.

Interleave An adjective describing a memory subsystem in which the memory is organized as a multiple ( greater than 1 ) of the system data bus size. When the memory is accessed, it returns more than one word of data. This data is latched and then muxed onto the system data bus on subsequent clocks, thus dramatically increasing the memory bandwidth.

Invalid The state of a line of memory where the data represented in that line is invalid. The correct data may be in main memory or another cache.

IPL Initial program load. IBM–ese for boot.

L

Lethe The main system bus in the Chimæra system. [Mythology] A river in hell.

Line The unit of transfer from memory subsystem to cache.

LRU Least recently used. A cache line replacement strategy where the least recently used line is replaced with the new line coming in from a cache line reload.

M

M.B.C. Memory Bus Controller. Though somewhat of misnomer, this is what Intel calls the C5/C8 — Lethe bus interface.

M.E.S.I. An acronym for write–back caches whose lines reside in one of the four M.E.S.I. states: Modified, Exclusive, Shared, or Invalid.

Miss Rate The percentage of accesses which are not in a given device.

Modified The state of a line where the data represented in that line is valid, but different from that represented in main memory.

MTBF Mean time between failures.

O

Odd Parity An error checking scheme in which an extra bit is added for each byte of the memory subsystems word. This bit is set so that each byte has an odd number of bits set.

Open Collector A TTL bus driver that drives a line low or does not drive it at all.

Open Drain A CMOS bus driver that drives a line low or does not drive it at all.

Orthogonality The condition when two bus drivers are attempting to drive the same line to different levels.

P

P5 The name of i586 prototypes.

Page Hit A cycle which is within the current page. That is, one where the current row address is the same as the previous memory cycle's.

Page Mode A mode of dynamic RAMs in which RAS stays asserted and subsequent cycles need only assert CAS. This is usually much faster than full RAS cycles.

Page Miss A cycle which is not within the current page. In other words, the current row address is not the same as the previous memory cycle's.

PCB Printed circuit board.

PIO Programmed I/O. I/O device accesses that require the assistance of the processor. The original IBM PC-AT used PIO to control the disks instead of DMA.

R

RAS Row Address Strobe.

RAS Precharge A delay period required between successive assertions of RAS.

RATS Dell acronym for Reliabilty, Assessability, Testability, and Serviceabilty.

Read Snarf The act of capturing data from a write–back.

Refresh A type of cycle to dynamic RAM's in which the capacitors on which the data is stored are recharged. If refresh does not occur at the correct time, data may be lost.

ROS IBM-ese for ROM.

Row Page Interleaving The concept isolating the row address of multiple blocks of DRAM. This allows a memory controller to have multiple active pages or to have high fast page miss rates. Fine grain in this context indicates that the banks are mapped such that they are differentiated at with relatively low order address bits (say 13 and 14) such that page misses are distributed fairly evenly across the blocks.

S

Secondary Bus A bus which is not necesarily tied directly to the Lethe bus, but which has access to Lethe's memory through Bifrost. Typically this is synonymous with the EISA bus.

Shadow RAM RAM that resides in the BIOS ROM address space into which the BIOS is copied. The BIOS ROM is then disabled and the processor executes out of this shadow RAM thus increasing performance because this RAM is both faster and wider.

Shared The state of a line of memory where the data represented in that line is valid and the same as main memory and other caches.

SIMM Single inline memory module. A small PCB with dynamic RAM chips on it.

Sink
[NOUN] The destination of data or of a transfer.
[VERB] To sample data or information.

Slow Page Miss A page miss where the RAS of the block to which the cycle is mapped is asserted. This requires a RAS precharge, which adds latency.

Source
[NOUN] The originator of data or of a transfer.
[VERB] To originate information.

Snarf The ability of a device to absorb data which is being sunk by another device.

Snoop The process by which caches are kept coherent. In write-through systems snooping consists of vacating cache lines which are written to by other masters. In write-back snooping is more complex. See Ch. Lethe.

Snoop Window The period from the onset of the address (as indicated by the assertion of MADS~ to the point at which all slaves have deturmined the snoop status in their caches. Typically $\geq 2$ clocks.

Storage IBM-ese for memory.

Stand-Alone Write-Back A write cycle type where the transfer is greater than one beat lone, and no allocation follows. These result from EISA write bursts, and processor cache expulsions.

Store-in cache A type of cache in which processor stores get written into the cache but not into main memory. The cache line becomes dirty. When this dirty line is replaced, it must be written back to main memory so that the dirty data is not lost.

Store-thru cache A type of cache in which processor stores get written into the cache and into main memory.

Stream [VERB] To pass data beat by beat from source to destination.

Syndrome A number which represents some function of another number. In the case of ECC a syndrome can be used to guarantee that relatively minor errors have not been injected in transmission.

T

Try Again Later Our protocol for splitting read transactions to secondary buses.

Third Party DMA A device that requires the assistance of a system owned DMA controller to perform DMA accesses. The device remains a slave during third party DMAs, the master is the system DMA controller.

TTL Transistor to transitor logic. A Bipolar logic family.

W

Write-Allocation The allocation of a cache line when a a write miss occurs.

*GLOSSARY*

Write–Allocation Cycle A special cycle where a write sourced by a mastering processor is sunk by the memory controller, where the memory controller first reads in the surrounding line, then writes the new data.

Write–Back Cache A cache which is capable of decoupling writes as well reads from its system bus.

Write–Merging A hardware capacity to combine a previously valid line with dirtying data within a buffer to create a new valid line. This capacity allows one to delay the writing of data on a cache miss until an allocation has completed.

Write–Through Cache A cache which is capable of decoupling reads from its system bus, but which passes writes through.

Lethe Bus VHDL Model

Darius Gaskins

April 8, 1992

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1991

*Lethe Bus VHDL Model*

Contents

1 Lethe Tracking Guidelines 1
- 1.1 Overview 1
- 1.2 I/O Requirements 1
  - 1.2.1 Address/Control 1
  - 1.2.2 Cacheability Control 2
  - 1.2.3 Snooping Control 2
  - 1.2.4 Data Control 2

I Lethe Bus Tracker 5

2 Lethe Arbitration 7
- 2.1 Overview 7
- 2.2 Arbitration States 7
- 2.3 State Diagram 8
- 2.4 VHDL Code 8
  - 2.4.1 Entity Declaration 8
  - 2.4.2 Raw Arbitration Inputs 9
  - 2.4.3 Architectural Declaration 9
  - 2.4.4 Transition Equations 9
  - 2.4.5 Next State Equations 10
  - 2.4.6 Next State Flip-Flops 10

3 Lethe Address Tracker 11
- 3.1 Scope 11
- 3.2 States 11
- 3.3 State Transitions 12
- 3.4 VHDL Code 12
  - 3.4.1 Entity Declaration 12
  - 3.4.2 Architectural Declaration 13

4 Lethe Data Tracker 15
4.1 Scope . . . . . . . . . . 15
4.2 States . . . . . . . . . . 15
4.3 State Diagram . . . . . . . . . . 16
4.4 VHDL Code . . . . . . . . . . 16
4.4.1 Entity Declaration . . . . . . . . . . 16
4.4.2 Architectural Behavior . . . . . . . . . . 17

Chapter 1

Lethe Tracking Guidelines

1.1 Overview

The state machines that follow are a synopsis of the Lethe bus state. The composite state— that is the state of the arbitration, address, and data trackers— indicates the cycle's progress. Lethe nodes act according to this progress. According to this progress, nodes are able to generate their outputs and sample their inputs.

1.2 I/O Requirements

The Lethe I/O's may be divided into four categories: Address/Control, Cacheability Control, Snoop Control, and Data/Control. Signals within each group are sampled or generated at the same time.

1.2.1 Address/Control

The address phase of a cycle is initiated with the assertion of the MADS~ signal. Simultaniously, the new cycle's address is asserted along with the various master-deterministic control signals. These are those signals that the master has full control of, and knowledge of at the onset of the address phase:

- MLOCK~ (MC[4])
- MPALL~ (MC[3])
- MMIO~ (MC[2])
- MDC~ (MC[1])
- MWR~ (MC[0])

1.2.1.1 Address Phase Initiation

The address phase may be initiated when the composite Lethe state is:

| | Arbitration | Address | Data |
|---|---|---|---|
| Composite | TGR or TParks | ADDR | IDLE or BUSY |

1.2.2 Cacheability Control

Lethe bus slaves respond to the initiation of a cycle's address phase by driving their version of the cycles cacheability on their individual cacheability signals[1]. In addition, slaves indicate that their version of the cycle's cacheability is accurate by asserting the MKWEND~ signal.

1.2.2.1 Cacheability Assertion

These cachability signals may be asserted by all slaves when the address tracker enters the CACHE state. The MKWEND~ signal can be de-asserted as soon as the address tracker leaves the CACHE state, but the other signals should retain their correct value until the address tracker returns to the ADDR state.

1.2.3 Snooping Control

Snooping Lethe bus slaves respond to the initiation of a cycle's address phase by snooping their cache(s). The results of these snoops are then reported on their individual snooping status signals[2]. In addition, slaves indicate that their snoop status is available with the assertion of the MSWEND~ signal.

1.2.3.1 Snooping Status Assertion

These snooping status signals may be asserted by all slaves when the address tracker enters the CACHE state. The MSWEND~ signal can be de-asserted as soon as the address tracker returns to the ADDR state.

1.2.4 Data Control

Lethe slaves respond to cycles according to their responsibility. Snooping slaves issue write-backs when snoops hit dirty lines. The active slave sources or sinks data.

1.2.4.1 Snooping Slaves

Snooping slaves only respond with data on cycles whic are directed to dirty lines in their cache. When this condition occurs the snooping slave should start the write-back cycle as soon as the dirty data is available, and the Lethe Data Tracker is in the AI state. When these conditions are met the snooping slave should assert the MDBB~ signal along with the dirty data. The write-back always

[1] These are: MWT~, MKEN~, MTAL~ and MRO~.

[2] These are: MHITM~ and MTHIT~.

progresses from the critical word first at the pace of the the active slave. The active slave sets the pace by asserting the MBRDY~ signal. Each successive piece of valid data is is latched into the active slave and the masters cache on the rising edge of MCLK when MBRDY~ and MDBB~ are sampled asserted.

1.2.4.2 Active Slaves

Active slaves sink data on all write cycles. The source data on all read cycles unless there is a dirty line in another slaves cache as above.

When sinking data the active slave should respond to the master or sub-master's MDBB~ assertion with the assertion of MBRDY~. When the cycle which requires the data to be sunk is a write, MDBB~ should be ignored until the Lethe Data Tracker reaches the PI state. When the cycle which requires data to be sinked is a write-back, MDBB~ should be ignored until the Lethe Data Tracker reaches the AI state. In either case once the transfer has begun it should complete regardless of state.

The active slave can only begin to sink a transfer in the AI or PI states. However, the master or sub-master who is supplying the data may not be ready when the bus enters either of these states. Consequently, MBRDY~'s assertion may preclude MDBB~'s assertion.

Part I

Lethe Bus Tracker

Chapter 2

Lethe Arbitration

2.1 Overview

This is a VHDL description of the behavior of the Lethe Arbitration State Tracker. The LAST is designed to be integrated into all Lethe interfaces[1]. It is passive. It monitors Lethe's arbitration signals and the Lethe node's activity. It follows this activity to track the state of the bus relative to this node.

2.2 Arbitration States

The state of the Lethe bus is described by four states.

These are:

TIDLE: This state indicates that there is not request pending from this node.

TDEL: This state indicates that the bus has been granted, but the cycle has not yet begun. Midway through this state the Address/Control OE is asserted.

TGRANT: This state indicates that this node has been granted mastership of the Lethe bus.

TParks: This state indicates that this node is currently parked on the Lethe bus, i.e. there is no pending request, but if one should occur while in this state, the grant can be assumed.

[1] Except possibly Hydra.

2.3 State Diagram
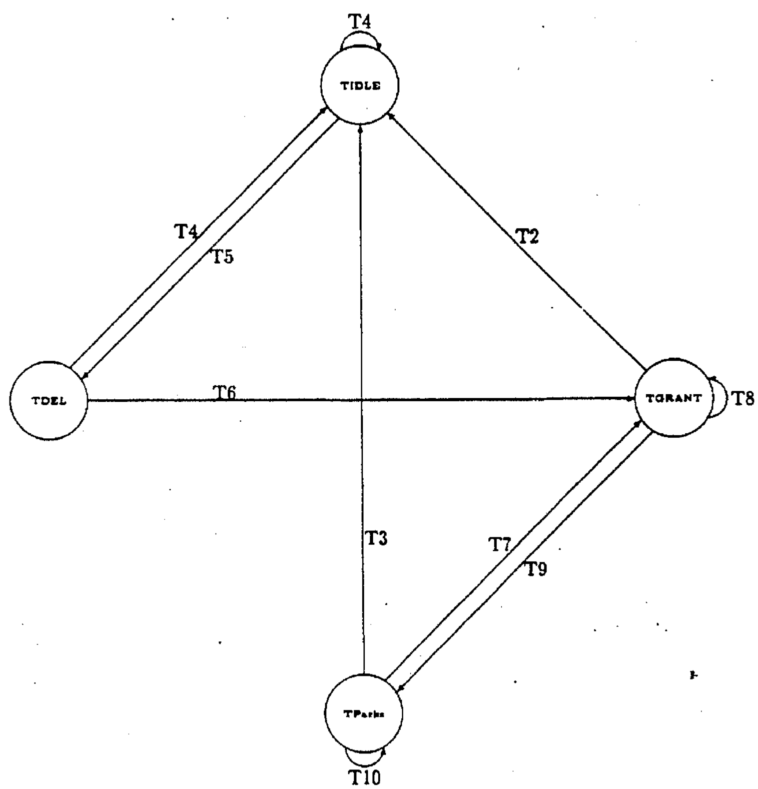
2.4 VHDL Code
2.4.1 Entity Declaration
```
library vti;
use vti.vtipack.all;
entity learb is
```

2.4.2 Raw Arbitration Inputs

```
port(iMGRn: in vlbit;
iMCLK: in vlbit;
iRESETn: in vlbit;
oMREQn: in vlbit;
TIDLE: inout vlbit;
TDEL: inout vlbit;
TGR: inout vlbit;
TParks: inout vlbit);
end learb;
```

2.4.3 Architectural Declaration

```
architecture behavior of learb is
```

2.4.3.1 Next State Signals

```
signal nxtTIDLE: vlbit;
signal nxtTDEL: vlbit;
signal nxtTGR: vlbit;
signal nxtTParks: vlbit;
signal T1,T2,T3,T4,T5,T6,T7,T8,T9,T10,T11: vlbit;
begin
```

2.4.4 Transition Equations

2.4.4.1 Into TIDLE

```
T1 <= TIDLE and not(T5);
T2 <= TGR and iMGRn and oMREQn;
T3 <= TParks and iMGRn and oMREQn;
T4 <= TDEL and iMGRn and oMREQn;
```

2.4.4.2 Into TDEL

```
T5 <= TIDLE and not(oMREQn) and not(iMGRn);
```

2.4.4.3 Into TGR

```
T6 <= TDEL and not(T4);
T7 <= TParks and not(oMREQn);
T8 <= TGR and not(oMREQn);
```

2.4.4.4 Into TParks

```
T9 <= TGR and (T2 nor T8);
T10 <= TParks and (T3 nor T7);
```

2.4.5 Next State Equations

```
nxtTIDLE <= T1 or T2 or T3 or T4 or not(iRESETn);
nxtTDEL <= T5 and iRESETn;
nxtTGR <= (T6 or T7 or T8) and iRESETn;
nxtTParks <= (T9 or T10) and iRESETn;
```

2.4.6 Next State Flip–Flops

```
uTIDLE: dfntnh
port map(
d => nxtTIDLE,
cp => iMCLK,
q => TIDLE,
qn => OPEN);

uTDEL: dfntnh
port map(
d => nxtTDEL,
cp => iMCLK,
q => TDEL,
qn => OPEN);

uTGR: dfntnh
port map(
d => nxtTGR,
cp => iMCLK,
q => TGR,
qn => OPEN);

uTParks: dfntnh
port map(
d => nxtTParks,
cp => iMCLK,
q => TParks,
qn => OPEN);
end behavior;
```

Chapter 3

Lethe Address Tracker

3.1 Scope

The address phase state tracker monitors the progression of and pipelining of address mastership. It's inputs are Lethe signals. Consequently, all Lethe nodes see the same state information.

3.2 States

The progression is described by four states:

ADDR: The ADDR state indicates that the previous address phase has completed, and that the new address should be latched pending an MADS~ assertion.

CACHE: The CACHE state indicates that the address phase is occurring, and that the cacheability information is required.

SNOOP: The SNOOP state indicates that the address phase is continueing, and that the snoop results are still pending.

3.3 State Transitions
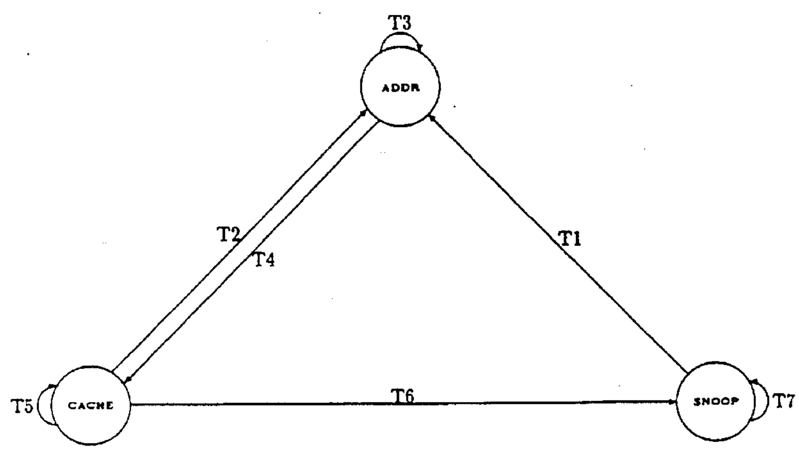
3.4 VHDL Code
3.4.1 Entity Declaration
```
library vti;
use vti.vtipack.all;
entity leadd is
port(
```
3.4.1.1 Global Signals
```
iMCLK: in vlbit;
iRESETn: in vlbit;
```
3.4.1.2 Address/Cacheing/Snooping Control
```
iMADSn: in vlbit;
iMKWENDcn: in vlbit;
iMSWENDcn: in vlbit;
```
3.4.1.3 State Outputs
```
ADDR: inout vlbit;
CACHE: inout vlbit;
SNOOP: inout vlbit);
```

```
end leadd;
```

3.4.2 Architectural Declaration

```
architecture behavior of leadd is
```

3.4.2.1 Next State Declarations

```
signal nxtADDR,nxtCACHE,nxtSNOOP: vlbit;
signal T1,T2,T3,T4,T5,T6,T7: vlbit;
begin
```

3.4.2.2 State Transition Equations

3.4.2.3 Into ADDR

```
T1 <= SNOOP and not(iMSWENDcn);
T2 <= CACHE and not(iMSWENDcn);
T3 <= ADDR and iMADSn;
```

3.4.2.4 Into CACHE

```
T4 <= ADDR and not(iMADSn);
T5 <= CACHE and iMKWENDcn;
```

3.4.2.5 Into SNOOP

```
T6 <= CACHE and not(iMKWENDcn) and iMSWENDcn;
T7 <= SNOOP and iMSWENDcn;
```

3.4.2.6 Next State Equations

```
nxtADDR <= T1 or T2 or T3 or not(iRESETn);
nxtCACHE <= (T4 or T5) and iRESETn;
nxtSNOOP <= (T6 or T7) and iRESETn;
```

3.4.2.7 Next State Flip–Flops

```
uADDR: dfntnh
port map(

d => nxtADDR,
cp => iMCLK,
q => ADDR,
qn => OPEN);

uCACHE: dfntnh
port map(
```

```
d => nxtCACHE,
cp => iMCLK,
q => CACHE,
qn => OPEN);
uSNOOP: dfntnh
port map(
d => nxtSNOOP,
cp => iMCLK,
q => SNOOP,
qn => OPEN);
end behavior;
```

Chapter 4

Lethe Data Tracker

4.1 Scope

The data phase state tracker monitors the progression of and pipelining of data mastership. It's inputs are Lethe signals. Consequently, all Lethe nodes see the same state information.

4.2 States

The progression is described by six states:

IDLE: The IDLE state indicates that the previous cycle's address and data phases have completed.

BUSY: The BUSY state indicates that the previous cycle's final data phase is still active.

PI: The Pending Idle state indicates that the new cycle's address phase has begun, but its data phase has not begun.

PB: The Pending Busy state indicates that the new cycle's address phase has begun, but the previous cycle's data phase has not completed.

AI: The Active Idle state indicates that the new cycle's address phase has begun, and all that remains is the final data phase.

AB: The Active Busy state indicates that the new cycle's address phase has begun, and that its first data phase is active.

4.3 State Diagram
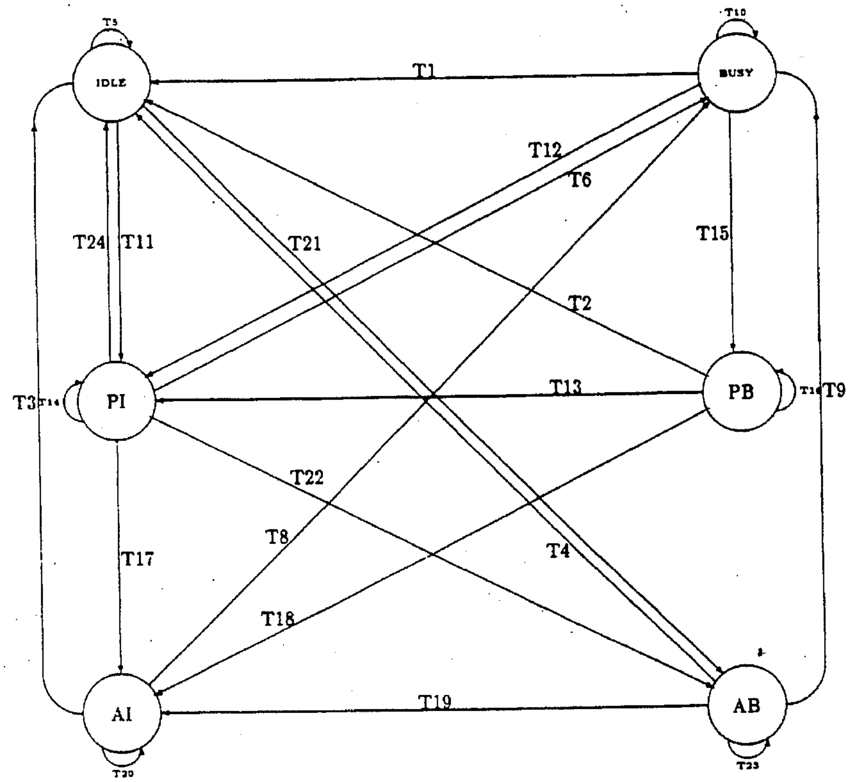
4.4 VHDL Code
4.4.1 Entity Declaration
```
library vti;
use vti.vtipack.all;
entity ledat is
port(
```

4.4.1.1 Global Inputs

```
iMCLK: in vlbit;
iRESETn: in vlbit;
```

4.4.1.2 Chip Inputs

```
iMADSn: in vlbit;
iMDBBn: in vlbit;
iMTALcn: in vlbit;
iMWTcn: in vlbit;
iMC: in vlbit_1d(4 downto 0);
iMHITMcn: in vlbit;
iMKENcn: in vlbit;
iMKWENDcn: in vlbit;
iMSWENDcn: in vlbit;
```

4.4.1.3 Cycle Type

```
LC: in vlbit_1d(4 downto 0);
```

4.4.1.4 Piped Cycle Type

```
PC: in vlbit_1d(4 downto 0);
```

4.4.1.5 Cacheability Type

```
LTALcn: in vlbit;
LKENcn: in vlbit;
LWTcn: in vlbit;
```

4.4.1.6 Snoop Type

```
LHITMcn: in vlbit;
```

4.4.1.7 Address States

```
ADDR: in vlbit;
CACHE: in vlbit;
```

4.4.1.8 Data Tracker States

```
IDLE: inout vlbit;
BUSY: inout vlbit;
PI: inout vlbit;
PB: inout vlbit;
AI: inout vlbit;
AB: inout vlbit);
end ledat;
```

4.4.2 Architectural Behavior

```
architecture behavior of ledat is

signal nxtIDLE,nxtBUSY,nxtPI,nxtPB,nxtAI,nxtAB: vlbit;
signal PotALLOC,SnpPend,SnpMiss,SnpHit,TALcyc: vlbit;
```

signal T1,T2,T3,T4,T5,T6,T8,T9,T10,T11,T12,T13: vlbit;
signal T14,T15,T16,T17,T18,T19,T20,T21,T22,T23,T24: vlbit;

begin

4.4.2.1 Signal Declarations

PotALLOC ⇐ (CACHE and not(LC(3)) and LC(2) and LC(1) and LC(0) and (iMKWENDcn or (iMKENcn nor not(iMWTcn)))) or (not(CACHE) and not(LC(3)) and LC(2) and LC(1) and LC(0) and (LKENcn nor not(LWTcn)));
SnpPend ⇐ not(ADDR) and iMSWENDcn;
SnpMiss ⇐ (ADDR and LHITMcn) or (not(iMSWENDcn) and iMHITMcn);
SnpHit ⇐ (ADDR and not(LHITMcn)) or (not(iMSWENDcn) and not(iMHITMcn));
TALcyc ⇐ (CACHE or LTALcn) nand (iMKWENDcn or iMTALcn);

4.4.2.2 State Transition Equations

4.4.2.3 From IDLE

T1 ⇐ BUSY and iMDBBn and iMADSn;
T24 ⇐ PI and iMDBBn and not(LC(0)) and TALcyc and SnpMiss;
T2 ⇐ PB and iMDBBn and not(LC(0)) and TALcyc and SnpMiss;
T3 ⇐ AI and iMDBBn and ((not(PotALLOC) and SnpMiss and LC(0)) or (TALcyc and SnpMiss));
T4 ⇐ AB and iMDBBn and (not(PotALLOC) or TALcyc) and SnpMiss;
T5 ⇐ IDLE and iMADSn;

4.4.2.4 Into BUSY

T6 ⇐ PI and not(iMDBBn) and not(PotALLOC) and (SnpMiss or not(LC(0)));
T8 ⇐ AI and not(iMDBBn);
T9 ⇐ AB and not(iMDBBn) and (not(PotALLOC) or TALcyc) and SnpMiss;
T10 ⇐ BUSY and not(iMDBBn) and iMADSn;

4.4.2.5 Into PI

T11 ⇐ IDLE and iMDBBn and not(iMADSn);
T12 ⇐ BUSY and iMDBBn and not(iMADSn);
T13 ⇐ PB and iMDBBn and (T2 nor T18);
T14 ⇐ PI and iMDBBn and (T24 nor T17);

4.4.2.6 Into PB

T15 ⇐ BUSY and (iMDBBn nor iMADSn);
T16 ⇐ PB and not(iMDBBn);

4.4.2.7 Into AI

```
T17 <= PI and iMDBBn and not(LC(0)) and not(SnpPEND) and not(T24);
T18 <= PB and iMDBBn and not(LC(0)) and not(SnpPEND) and not(T2);
T19 <= AB and iMDBBn and not(T4);
T20 <= AI and iMDBBn and not(T3);
```

4.4.2.8 Into AB

```
T21 <= IDLE and not(iMDBBn) and not(iMADSn);
T22 <= PI and not(iMDBBn) and not(T6);
T23 <= AB and not(iMDBBn) and not(T9);
```

4.4.2.9 Next State Equations

```
nxtIDLE <=  T1 or T2 or T3 or T4 or T5 or T24 or not(iRESETn);
nxtBUSY <=  (T6 or T8 or T9 or T10) and iRESETn;
nxtPI <= (T11 or T12 or T13 or T14) and iRESETn;
nxtPB <= (T15 or T16) and iRESETn;
nxtAI <= (T17 or T18 or T19 or T20) and iRESETn;
nxtAB <= (T21 or T22 or T23) and iRESETn;
```

4.4.2.10 State Flip-Flops

```
uIDLE: dfntnh
port map(

d => nxtIDLE,
cp => iMCLK,
q => IDLE,
qn => OPEN);

uBUSY: dfntnh
port map(

d => nxtBUSY,
cp => iMCLK,
q => BUSY,
qn => OPEN);

uPI: dfntnh
port map(

d => nxtPI,
cp => iMCLK,
q => PI,
qn => OPEN);

uPB: dfntnh
port map(
```

```
d => nxtPB,
cp => iMCLK,
q => PB,
qn => OPEN);

uAI: dfntnh
port map(

d => nxtAI,
cp => iMCLK,
q => AI,
qn => OPEN);

uAB: dfntnh
port map(

d => nxtAB,
cp => iMCLK,
q => AB,
qn => OPEN);
end behavior;
```

Index nxtAB, 19
nxtADDR, 13
nxtAI, 19
nxtBUSY, 19
nxtCACHE, 13
nxtIDLE, 19
nxtPB, 19
nxtPI, 19
nxtSNOOP, 13
nxtTDEL, 10
nxtTGR, 10
nxtTIDLE, 10
nxtTParks, 10

PotALLOC, 18

SnpHit, 18
SnpMiss, 18
SnpPend, 18

T1, 13, 18
T1, 9
T10, 18
T10, 9
T11, 18
T12, 18
T13, 18
T14, 18
T15, 18
T16, 18
T17, 19
T18, 19
T19, 19
T2, 13, 18
T2, 9
T20, 19
T21, 19
T22, 19
T23, 19
T24, 18
T3, 13, 18
T3, 9
T4, 13, 18
T4, 9
T5, 13, 18
T5, 9
T6, 13, 18
T6, 9
T7, 13
T7, 9
T8, 18
T8, 9
T9, 18
T9, 9
TALcyc, 18

Bifrost-A VHDL Gorp

Working Version

April 17, 1992

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1991

*Bifrost-A*

Contents

I Lethe → Midgard 1

1 Lethe Slave Data Interface 3
1.1 Lethe Slave Data Interface Unit 3
1.1.1 Writes 3
1.1.2 Reads 3
1.1.3 Bifrost-D Interface 4
1.2 VHDL Code 4
1.2.1 Entity Declaration 4
1.2.2 Architectural Structure 5
1.3 DBB Tracker 6
1.4 DBB Tracker 6
1.4.1 Transitions 6
1.5 Post Machine 7
1.5.1 Transitions 7
1.5.2 nxtWKWEND 7
1.6 Read MDBB Machine 8
1.6.1 Transitions 8
1.6.2 nxtSDBB 8
1.7 Reg MDBB Machine 8
1.7.1 Transitions 9
1.7.2 nxtRegDBB 9
1.8 Slave Data Transfer Done Gorp 9
1.8.1 General 9
1.9 Read Communication 10
1.10 Register Stuff 10
1.10.1 Register Write Chip Selects 10
1.11 MBRDY~ Components 10
1.11.1 OE Generation 10
1.12 SQ Data NQ Generation 11
1.13 Address Enqueing Logics 11
1.13.1 Transitions 11
1.13.2 nxtNQwait 11

1.13.3 NQ . . . . . . 12
1.14 Data Select Control . . . . . . 12

2 Midgard Bus Master Logic 13
2.0.1 Lethe2Heimdall Raw Gorp . . . . . . 14
2.0.2 Bif-A 2 Bif-D Gorp . . . . . . 14
2.0.3 Lethe2Heimdall Control Flow . . . . . . 14
2.1 Internal Signals . . . . . . 15
2.1.1 Midgard Bus Machine . . . . . . 15
2.2 Aliasing . . . . . . 16
2.3 TAL Output Logics . . . . . . 16
2.4 Cycle Immanent Queue . . . . . . 17
2.5 LHPipe Control Logics . . . . . . 17
2.6 DQ Logics . . . . . . 17
2.7 Read Dirtiness . . . . . . 17
2.7.1 State Transitions . . . . . . 18
2.7.2 Next State Equations . . . . . . 18
2.8 Read Coupler . . . . . . 18
2.8.1 State Transitions . . . . . . 19
2.8.2 Next State Equations . . . . . . 19
2.9 Read Cycle Queue . . . . . . 19
2.9.1 Combi-Gorp . . . . . . 20
2.9.2 Buffer Control Sludge . . . . . . 20
2.9.3 State Transitions . . . . . . 21
2.9.4 Next State Equations . . . . . . 21
2.9.5 IACK Machine . . . . . . 22
2.10 IACK Request Queue . . . . . . 23
2.10.1 State Transitions . . . . . . 23
2.10.2 Next State Equations . . . . . . 24
2.10.3 Data Chip Logic . . . . . . 24
2.11 Cycle Arbiter . . . . . . 24
2.11.1 Into ArbIdle . . . . . . 24
2.11.2 Into Arbed . . . . . . 24
2.11.3 State Flops . . . . . . 25
2.11.4 State Flops . . . . . . 25
2.12 Path Selection . . . . . . 25
2.13 Virtual Host Bus State Machine . . . . . . 25
2.13.1 oVADSn . . . . . . 26
2.13.2 State Transitions . . . . . . 26
2.13.3 Next State Equations . . . . . . 26
2.13.4 State Flops . . . . . . 27
2.14 Virtual Host Bus Lock Machine . . . . . . 27
2.14.1 State Transitions . . . . . . 27
2.14.2 Next State Equations . . . . . . 28

2.14.3 State Flops . . . 28
2.14.4 Request Pending Flop . . . 28
2.15 Virtual Host Bus Address Control . . . 28
2.15.1 Split (XTRA) Logics . . . 28
2.15.2 Extension (MAS) Logics . . . 29
2.15.3 A/B Buffers Logics . . . 29
2.16 CPUMISS~ Logic . . . 29
2.17 Lock Stuff . . . 29

II Midgard → Lethe 31

3 Lethe Master Pipe Coupler 33
3.1 Lethe Master Pipeline Coupler (LEMPC) . . . 33
3.2 States . . . 33
3.3 State Transitions . . . 34
3.4 VHDL Code . . . 34
3.4.1 Entity Declaration . . . 34
3.4.2 Architectural Declaration . . . 35

4 Lethe Master Requester 37
4.1 Lethe Slave Request Tracking Unit . . . 37
4.2 VHDL Code . . . 37
4.2.1 Entity Declaration . . . 37
4.2.2 Architectural Structure . . . 38
4.3 Request Machine . . . 39
4.3.1 Into MWAIT . . . 39
4.3.2 Into MBUSY . . . 39
4.3.3 Into MTAL . . . 39
4.3.4 Next State Equations . . . 39
4.3.5 State Flops . . . 39
4.3.6 Combi Gorp . . . 40
4.4 oMREQn . . . 40
4.5 Sparsity . . . 40
4.6 Lethe Bus Lock Machine . . . 40
4.6.1 State Transitions . . . 40
4.6.2 Next State Equations . . . 41
4.6.3 State Flops . . . 41
4.7 Snoop Control . . . 41

5 Lethe Master Data Interface 43
5.1 Lethe Master Data Tracking Unit . . . 43
5.1.1 B Pipe . . . 43
5.1.2 LD Pipe . . . 43

5.2 VHDL Code . . . . . 43
5.2.1 Entity Declaration . . . . . 43
5.2.2 Architectural Structure . . . . . 44
5.3 Data Transfer Tracker . . . . . 45
5.3.1 Transitions . . . . . 45
5.3.2 DBBok Flop . . . . . 45
5.3.3 Write DBB . . . . . 45
5.3.4 Write Bifrost-D Data OE . . . . . 45
5.4 Post Machine . . . . . 45
5.4.1 Transitions . . . . . 46
5.4.2 nxtWKWEND . . . . . 46
5.4.3 Pipe Control . . . . . 46
5.5 Sparsity . . . . . 47
5.6 WE . . . . . 47
5.7 IPC Stuff . . . . . 47

Part I

Lethe → Midgard

Chapter 1

Lethe Slave Data Interface

1.1 Lethe Slave Data Interface Unit

The Lethe Data Interface Unit handles all data transfers between another Lethe node and this slave.

1.1.1 Writes

1.1.1.1 Ready Generation

This block returns readys for all write type cycles. Writes are always posted. They can, however, be postponed or TAL-ed if they need be.

1.1.1.2 Store Queue Enqueing

This block also handles the queueing of data into the store queue. The queueing takes place when the ready is asserted along with the masters assertion of MDBBn.

1.1.1.3 Register Writes

This block generates the write chip selects (NDXCS and DATCS) for register write cycles. DATCS is asserted at during reset to facilitate the clearing of the registers.

1.1.2 Reads

1.1.2.1 Ready Generation

This block returns ready's for read cycles. The MBRDYn signal is asserted when LHRDYn is driven asserted. This action also causes the assertion of MDBBn.

1.1.2.2 Register Reads

Register reads are tracked. Data is supplied in the REGRDY state. This is indicated by the RDCS signal.

1.1.3 Bifrost–D Interface

The vast majority of control logic resides in Bifrost–A. However, most of the data[1] resides in the two Bifrost–D's. Consequently, there is a great deal of communication which passes from Bifrost–A to Bifrost–D.

1.2 VHDL Code

1.2.1 Entity Declaration

```
library vti;
library lethe;
use vti.vtipack.all;
use lethe.lepack.all;
entity lesdi is
port(
```

1.2.1.1 Global Inputs

```
iMCLK: in vlbit;
iMRESETn: in vlbit;
```

1.2.1.2 Data Tracker States

```
PB: in vlbit;
```

1.2.1.3 Data Tracker Control Signals

```
DA3: in vlbit;
DC: in vlbit_1d(4 downto 0);
DREGCS: in vlbit;
DL2E: in vlbit;
DSWENDn: in vlbit;
DKWENDn: in vlbit;
DCZero: in vlbit;
DTALen: in vlbit;
DDone: inout vlbit;
DCHCS: in vlbit;
DMast: in vlbit;
DPend: in vlbit;
```

1.2.1.4 Register Interface

```
NDXCS: inout vlbit;
```

[1] excepting only the register skoad.

```
DATCS: inout vlbit;
INCNDX: out vlbit;
DRBEN: in vlbit;
RDOEn: out vlbit;
RDMSel: out vlbit;
```

1.2.1.5 AB Buffer Interface .

```
DAC: in vlbit_1d(5 downto 3);
LSEV: in vlbit;
LSAct: out vlbit;
RDone: out vlbit;
```

1.2.1.6 MidMast Interface

```
BifMAST: in vlbit;
```

1.2.1.7 SQ Signals

```
SQFULLn: in vlbit;
DSQFULLn: in vlbit;
NQ: inout vlbit;
oDNQn: inout vlbit;
DAInc: inout vlbit;
DACLRn: inout vlbit;
```

1.2.1.8 General Signals

```
SMDBB: inout vlbit;
RMORE: out vlbit;
RMDOEn: out vlbit;
LstRDY: in vlbit;
imdbbn: in vlbit;
SMDBBn: inout vlbit;
oMERDYn: inout vlbit;
oMBRDYn: inout vlbit;
iMBLASTn: in vlbit);
end lesdi;
```

1.2.2 Architectural Structure

```
architecture structure of lesdi is

signal nxtWKWEND.nxtDBBok.nxtSMDBB:vlbit;
signal preDBBok.DBBok.WKWEND:vlbit;
signal WaitDBB.DPostSt:vlbit;
signal DT3.DT4.RT3.RT4,PT3.PT4:vlbit;
signal RegT3,RegT4:vlbit;
signal nxtRegDBB.RegDBB.RegDBBn:vlbit;
signal PostRDY.nxtRdRDY.RdRDY:vlbit;
signal TALWrRDY:vlbit;
```

```
signal DWrDone:vlbit;
signal DRdDone:vlbit;
signal nxtDATCS,nxtNDXCS,nxtDATRD:vlbit;
signal DATRD:vlbit;
signal nxtDNQ,oDNQ:vlbit;
signal NT3,NT4:vlbit;
signal nxtNQwait,NQwait:vlbit;
signal NQok:vlbit;
signal DLocDone:vlbit;
signal DQPend:vlbit;
signal DBRDY:vlbit;

begin
```

1.3 DBB Tracker

DQPend ⇐ DPend and (DREGCS or DL2E);

1.4 DBB Tracker

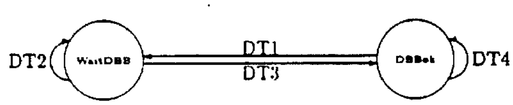

WaitDBB: the previous cycle's data phase has yet to complete, or the current cycle is not yet pending.

DBBok: the previous cycle's data phase is complete, and a cycle is pending to this node.

1.4.1 Transitions

1.4.1.1 Into WaitDBB

*Note:* these are for symmetry only

DT1 ⇐ DBBok and DDone;
DT2 ⇐ WaitDBB and (DQPEND nand (PB nor DDone));

1.4.1.2 Into DBBok

DT3 ⇐ WaitDBB and DQPEND and (PB nor DDone);
DT4 ⇐ DBBok and not DDone;

preDBBok ⇐ WaitDBB and DQPend and not PB;
nxtDBBok ⇐ (DT3 or DT4) and iMRESETn;

uDBBok: dfntnb port map( d ⇒ nxtDBBok, cp ⇒ iMCLK, q ⇒ DBBok, qn ⇒ WaitDBB);

1.5 Post Machine

*This state bit enables Bifrost to post a write without knowledge of the cacheability window.*

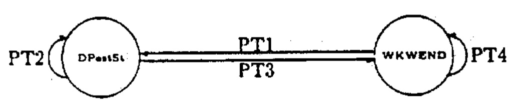

DPOSTSt: Data may be posted if the previous data phase has concluded.
WKWEND: A data beat has been posted, but the cacheabilty window has not closed, so the posting has hung until the cache window closes.

1.5.1 Transitions

1.5.1.1 Into DPostSt

*Note:* these are for symmetry only

PT1 ⇐ WKWEND and not DKWENDn;
PT2 ⇐ DPostSt and not PT3;

1.5.1.2 Into WKWEND

PT3 ⇐ DPostSt and PostRDY and DKWENDn;
PT4 ⇐ WKWEND and DKWENDn;

1.5.2 nxtWKWEND nxtWKWEND ⇐ (PT3 or PT4) and iMRESETn;

uWKWEND: dfntnb port map( d ⇒ nxtWKWEND, cp ⇒ iMCLK, q ⇒ WKWEND, qn ⇒ DPostSt);

1.6 Read MDBB Machine

*This state bit determines whether Bifrost should drive* MDBB~ *as the slave. This only occurs on non-register reads.*

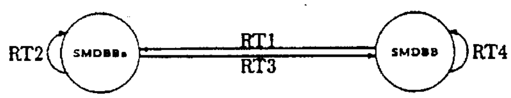

SMDBBn: The data bus is not ready for slave read data or the snoop window has not yet closed.
SMDBB: The snoop window and the data bus are ready for slave data transfer.

1.6.1 Transitions

1.6.1.1 Into SMDBBn

*Note:* these are for symmetry only

```
RT1 <= SMDBB and DDone;
RT2 <= SMDBBn and not RT3;
```

1.6.1.2 Into SMDBB

```
RT3 <= SMDBBn and not(DC(0)) and DTALcn and (DSWENDn nor (DBBok nor
       preDBBok)) and not DREGCS;
RT4 <= SMDBB and not DDone;
```

1.6.2 nxtSDBB

```
nxtSMDBB <= (RT3 or RT4) and iMRESETn;

uSMDBB: dfntnb

port map( d => nxtSMDBB, cp => iMCLK, q => SMDBB, qn => SMDBBn);
```

1.7 Reg MDBB Machine

*This state bit determines whether Hydra might drive* MDBB~ *as the slave. This only occurs for register reads.*

RegDBBn: The data bus is not ready for slave read data or the snoop window has not yet closed.
RegDBB: The snoop window and the data bus are ready for slave data transfer.

1.7.1 Transitions

1.7.1.1 Into RegDBBn

*Note:* these are for symmetry only

RegT1 ⇐ RegDBB and DDone;
RegT2 ⇐ RegDBBn and not RT3;

1.7.1.2 Into RegDBBn

RegT3 ⇐ RegDBBn and not(DC(0)) and DTALcn and (DSWENDn nor (DBBok nor preDBBok)) and DREGCS;
RegT4 ⇐ RegDBB and not DDone;

1.7.2 nxtRegDBB nxtRegDBB ⇐ (RegT3 or RegT4) and iMRESETn;

uRegDBB: dfntnb port map( d ⇒ nxtRegDBB, cp ⇒ iMCLK, q ⇒ RegDBB, qn ⇒ RegDBBn);

1.8 Slave Data Transfer Done Gorp

1.8.1 General

RDMSel ⇐ LstRDY;
DWrDone ⇐ (LstRDY and DC(0) and (DBBok or preDBBok) and (not DKWENDn or DREGCS)) or (WKWEND and iMDBBn and not DKWENDn);
DRdDone ⇐ (not DKWENDn and not DTALcn and DQPEND and not DC(0)) or (LstRDY and (SMDBB or RegDBB));
RDone ⇐ SMDBB and LstRDY and not DCHCS;
DLocDone ⇐ DPend and (DL2E nor DREGCS);
DDone ⇐ DRdDone or DWrDone or DLocDone;

1.9 Read Communication

```
uDBRDY: dfntnb

port map( d ⇒ oMBRDYn, cp ⇒ iMCLK, q ⇒ OPEN, qn ⇒ DBRDY);
RMORE ⇐ SMDBB and DBRDY and iMBLASTn and not DCHCS;
```

1.10 Register Stuff

1.10.1 Register Write Chip Selects

```
nxtNDXCS ⇐ (LstRDY and DREGCS and not DRBEn and DC(0) and ((preDBBok or
            DBBok) and not DA3)) or not iMRESETn;

uNDXCS: dfntnb

port map( d ⇒ nxtNDXCS, cp ⇒ iMCLK, q ⇒ NDXCS, qn ⇒ OPEN);
nxtDATCS ⇐ LstRDY and DREGCS and not DRBEn and DC(0) and ((preDBBok or
            DBBok) and DA3);

uDATCS: dfntnb

port map( d ⇒ nxtDATCS, cp ⇒ iMCLK, q ⇒ DATCS, qn ⇒ OPEN);
nxtDATRD ⇐ LstRDY and DREGCS and not DRBEn and SMDBB and DA3;

uDATRD: dfntnb

port map( d ⇒ nxtDATRD, cp ⇒ iMCLK, q ⇒ DATRD, qn ⇒ OPEN);
INCNDX ⇐ DATCS or DATRD;
```

1.11 MBRDY~ Components

```
nxtRdRDY ⇐ SMDBB and (LSEV or DCHCS) and not LstRDY;
oMERDYn ⇐ not(SMDBB and LSEV and DAC(5) and DAC(4) and DAC(3));
```

1.11.0.1 Read Ready Delay Flop

```
uRdRDY: dfntnb

port map( d ⇒ nxtRdRDY, cp ⇒ iMCLK, q ⇒ RdRDY, qn ⇒ OPEN);
PostRDY ⇐ (preDBBok or DBBok) and DPostSt and DC(0) and (DSQFULLn or DMast)
          and not DREGCS;
TALWrRDY ⇐ DBBok and DC(0) and (DTALcn nor DCZero);
```

1.11.1 OE Generation

```
RDOEn ⇐ not(RegDBB);
RMDOEn ⇐ SMDBBn;
```

1.11.1.1 MBRDY~ Generation oMBRDYn ⇐ not(RdRDY or PostRDY or TALWrRDY);

1.12 SQ Data NQ Generation

*Note:* oDNQn NQs data into the data chip. It is held off if the cacheability window is dilatory.

nxtDNQ ⇐ (PostRDY and DTALcn and not DKWENDn and not iMDBBn and not DMAST) or (WKWEND and DTALcn and not DKWENDn and not DMAST);

uDNQ: dfntnb port map( d ⇒ nxtDNQ, cp ⇒ iMCLK, q ⇒ oDNQ, qn ⇒ oDNQn);

1.13 Address Enqueing Logics

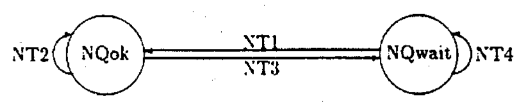

*This state bit tracks the lag in data NQing. When the data has not yet been enque-ed into the store queue, but the address has, the NQWait bit is set. This prevents more addresses from being enque-ed..*

1.13.1 Transitions

1.13.1.1 Into NQok

*Note:* these are for symmetry only

NT1 ⇐ NQwait and oDNQ;
NT2 ⇐ NQok and (not NQ or oDNQ);

1.13.1.2 Into NQwait

NT3 ⇐ NQok and NQ and not oDNQ;
NT4 ⇐ NQwait and not oDNQ;

1.13.2 nxtNQwait nxtNQwait ⇐ (NT3 or NT4) and iMRESETn;

```
uNQwait: dfntnb
port map(
d => nxtNQwait, cp => iMCLK, q => NQwait, qn => NQok);
```

1.13.3 NQ

*Note:* The addresses are enque–ed with the closure of the cacheability window when data queue–ing is not behind.

```
NQ <= not DMast and SQFULLn and DQPend and DC(0) and not DREGCS and
    DTALcn and (DKWENDn nor NQwait);
```

1.14 Data Select Control

```
DACLRn <= not imdbbn;
DAInc <= NQ or nxtRdRDY;
LSAct <= nxtRdRDY;

end structure;
```

Chapter 2

Midgard Bus Master Logic

```
library synth;
library vti;
library bifrosta;
use bifrosta.bifpack.all;
use vti.vtipack.all;
use synth.stdsynth.all;
entity midmast is
port(

iMCLK: in vlbit;
iMRESET: in vlbit;
iMRESETn: in vlbit;
BCR0: in vlbit_1d(7 downto 0);
BCR1: in vlbit_1d(7 downto 0);
SQMT: in vlbit;
SQFULLn: in vlbit;
DSQMT: in vlbit;
DQ: out vlbit;
oDDQn: out vlbit;
RHIT: in vlbit;
RDone: in vlbit;
RSame: in vlbit;
RMore: in vlbit;
RBEGaten: inout vlbit;
FULL: in vlbit;
DIRT: in vlbit;
MMAlloc: inout vlbit;
MMWE: inout vlbit;
MMEVal: inout vlbit;
MMFree: inout vlbit;
```

2.0.1 Lethe2Heimdall Raw Gorp iMC: in vlbit_1d(4 downto 0);
iMTALcn: in vlbit;
iMKWENDcn: in vlbit;
iHINT: in vlbit;
MAOEn: in vlbit;
L2E: in vlbit;
POSTok: in vlbit;
oMTALn: out vlbit;
REGCS: in vlbit;
CHCS: in vlbit;

2.0.2 Bif–A 2 Bif–D Gorp

WVDOEn: inout vlbit;
oVLDn: inout vlbit;

2.0.3 Lethe2Heimdall Control Flow

LHC: in vlbit_1d(4 downto 0);
LHPend: in vlbit;
LHCHCS: in vlbit;
LHDone: inout vlbit;
LHREGCS: in vlbit;
LHL2E: in vlbit;
LHTALcn: in vlbit;
LHKWENDn: in vlbit;
RLd: out vlbit;
RTALcn: in vlbit;
RKENcn: in vlbit;
LCKActn: inout vlbit;
VSEL: inout vlbit_1d(1 downto 0);
oVADSn: inout vlbit;
iVHOLD: in vlbit;
oVHLDA: inout vlbit;
iVERDYOn: in vlbit;
oVRDYIn: inout vlbit;
oVCPUMISSn: out vlbit;
INTReq: inout vlbit;
INTAck: in vlbit;
V2DW: in vlbit;
XTRA: inout vlbit;
RAInc: out vlbit;
BifMAST: inout vlbit;
MidReqPD: inout vlbit;
RdGE: in vlbit;

```
FullLine: in vlbit);
end midmast;
```

2.1 Internal Signals

```
architecture behavior of midmast is
```

2.1.1 Midgard Bus Machine

```
signal MT1,MT2,MT3,MT4,MT5,MT6,MT7,MT8: vlbit;
signal VT1ol,VT1oln,VT2: vlbit;
signal nxtVHLDA,nxtVT1ol,nxtVT2: vlbit;
signal VRDYI: vlbit;
signal Ack,LstAck,VTI: vlbit;
signal nxtXTRA,XTRAn: vlbit;
signal nxtMAS,MAS,MASn: vlbit;
signal BLASTSt,More: vlbit;
signal RdPd,SQRq: vlbit;
signal L2ETALn: vlbit;
signal LetheTALn: vlbit;
signal LHRdDone: vlbit;
signal T1,T2,T3,T4,T5,T6,T7,T8,T9,T10: vlbit;
signal T11,T12,T13,T14,T15,T16,T17,T18: vlbit;
signal nxtRdIdle,RdIdle,RdIdlen: vlbit;
signal nxtRdWait,RdWait: vlbit;
signal nxtRdRqSt,RdRqSt: vlbit;
signal nxtRdMore,RdMore: vlbit;
signal nxtRdLess,RdLess: vlbit;
signal RdNQ,RdRqStn,RdQueued: vlbit;
signal nxtMMWE,nxtMMFree: vlbit;
signal TALall,TALpm,TALpio,LOCKcpl: vlbit;
signal IMODE: vlbit;
signal oVSEL1,oVSEL0: vlbit;
signal HMSEL1,HMSEL0: vlbit;
signal SQADSn,IACKADSn,RdADSn: vlbit;
signal nxtArbIdle, ArbIdle: vlbit;
signal nxtArbed, Arbed: vlbit;
signal RT1,RT2,RT3,RT4: vlbit;
signal Rdcpld: vlbit;
signal MidReqPdn: vlbit;
signal RdTALn,WrTALn: vlbit;
signal IACKNQ: vlbit;
signal IT1,IT2,IT3,IT4,IT5,IT6,IT7: vlbit;
signal nxtIACKIdle,IACKIdle,IACKIdlen: vlbit;
signal nxtIACKWait,IACKWait: vlbit;
```

```
signal nxtIACKRq,IACKRq,IACKRqn: vlbit;
signal DT1,DT2,DT3,DT4: vlbit;
signal nxtRdDirt,RdDirt,RdOK: vlbit;
signal CT1,CT2,CT3,CT4: vlbit;
signal nxtTalACT,NoTAL,TalACT: vlbit;
signal CNQ,CDQ,CPend,CZERO: vlbit;
signal IRT1,IRT2,IRT3,IRT4: vlbit;
signal nxtIntRqPd,IntRqPd,NOReq: vlbit;
signal nxtLckAct: vlbit;
signal LckIdle,LckAct: vlbit;
signal LT1,LT2,LT3,LT4: vlbit;
begin
```

2.2 Aliasing

```
IMODE <= BCR1(0);
TALall <= BCR0(7);
TALpm <= BCR0(6);
TALpio <= BCR0(5);
LOCKcpl <= BCR0(4);
```

2.3 TAL Output Logics

MKWEND is not driven by Bifrost. Bifrost has no opinion about the timeliness of MKWEND. It remains asserted until the consensus cacheability window closes.

WrTALn: write cycles are allowed (not TAL–ed) when they are postable and the store queue is not full and they are not LOCK–ed. They are also not TAL–ed when there are no dirty writes in the A/B buffers. there are no TAL–ed reads pending, Bifrost owns the Midgard bus. and either VHOLD is not asserted or the current Lethe cycle is LOCK–ed.

RdTALn: read cycles are not TAL–ed if they hit an adequately complete previously TAL–ed address. if there is a read cycle pending that was not TAL–ed and either the VHOLD pin is not asserted or the current request is LOCK–ed. or there are no reads pending and the Midgard bus is owned and either the VHOLD or the iMC(4) pins are low.

```
WrTALn <= ((iMC(2) and POSTok and SQFULLn and iMC(4) and NoTAL and (MidReqPd
           nand BifMast)) or ((not MidReqPd or (not iMC(4) and LckAct)) and Bif-
           MAST and not DIRT and NoTAL) or not MAOEn or REGCS);
RdTALn <= (RdIdlen and ((NoTAL and (not MidReqPd or (not iMC(4) and LckAct))
           and BifMAST and not DIRT and not(TALall and iMC(2) and iMC(4))) or
           (TalACT and RHit and RdOK and RdGE))) or (RdIdle and (not MidReqPd
           or (not iMC(4) and LckAct)) and BifMAST and not DIRT and not (TA-
           Lall and iMC(2) and iMC(4))) or REGCS;
L2ETALn <= (iMC(0) and WrTALn) or (not iMC(0) and RdTALn);
```

LetheTALn: Tal if Locked and LckIdle and MEI not owned.

```
LetheTALn <= iMC(4) or LckAct or BifMast;

umx21d2: mx21d2

port map(i0 => LetheTALn, i1 => L2ETALn, s => L2E, z => oMTALn);
```

2.4 Cycle Immanent Queue

```
CNQ <= not iMKWENDcn and iMTALcn;
CDQ <= LHDONE and LHTALcn;

uleapc: leapc
port map(

iMCLK => iMCLK,
iRESETn => iMRESETn,
NQ => CNQ,
DQ => CDQ,
Pend => CPend,
ZERO => CZERO,
ONE => OPEN);
```

2.5 LHPipe Control Logics

Ack the LH request on data write transaction. Midgard read initiated. RHIT acknowledged. TAL-ed cycle, or REG cycle.

```
LHRdDone <= ((LHTALcn nor LHKWENDn) or (RHIT and RdOK and RdGE and Ta-
            lACT) or RdNQ);
LHDone <= (LHRdDone or LHC(0) or LHREGCS or LHCHCS or not LHL2E) and
          LHPend;
```

2.6 DQ Logics

Validate LH address in TAL Latch on TalACKn, i.e. when the TAL-ed read is ack-ed by MidMast.

```
DQ <= LstAck and (VSEL(1) nor VSEL(0));
oDDQn <= not(LstAck and (VSEL(1) nor VSEL(0)));
```

2.7 Read Dirtiness

Holds TAL-ed Read status Dirty. RdOK indicates that the TAL-ed read can be coupled. RdDirt indicates that the A/B buffers must be cleared first. Midgard cannot be relinquished until RdOK.

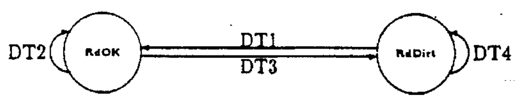

RdOK: There are no pending cycles which await cleansing of the A/B buffers.

RdDirt: Read cycle pending which await cleansing of A/B buffers.

2.7.1 State Transitions

2.7.1.1 Into RdOK

DT1 ⇐ RdDirt and not DT4;
DT2 ⇐ RdOK and not DT3;

2.7.1.2 Into RdDirt

DT3 ⇐ RdOK and not oVADSn and DIRT;
DT4 ⇐ RdDirt and DIRT;

2.7.2 Next State Equations nxtRdDirt ⇐ (DT3 or DT4) and iMRESETn;

uRdDirt: dfntnb port map( d ⇒ nxtRdDirt, cp ⇒ iMCLK, q ⇒ RdDirt, qn ⇒ RdOK);

2.8 Read Coupler

Holds TAL-ed Read Coupling Status. NoTAL indicates that no uncoupled reads are pending TaIACT indicates that a read cycle is pending which has not been coupled.

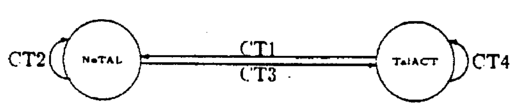

NoTAL: There are no pending cycles which await coupling

TalAct: Uncoupled read cycle pending which awaits coupling

2.8.1 State Transitions

2.8.1.1 Into NoTAL

CT1 ⇐ TalACT and not CT4;
CT2 ⇐ NoTAL and not CT3;

2.8.1.2 Into TalACT

CT3 ⇐ NoTAL and RdNQ and not LHTALcn;
CT4 ⇐ TalACT and not(LHDONE and not LHC(0) and LHL2E and LHTALcn
and (LHREGCS nor LHCHCS));

2.8.2 Next State Equations nxtTalACT ⇐ (CT3 or CT4) and iMRESETn;

uTalACT: dfntnb port map( d ⇒ nxtTalACT. cp ⇒ iMCLK. q ⇒ TalACT. qn ⇒ NoTAL);

2.9 Read Cycle Queue

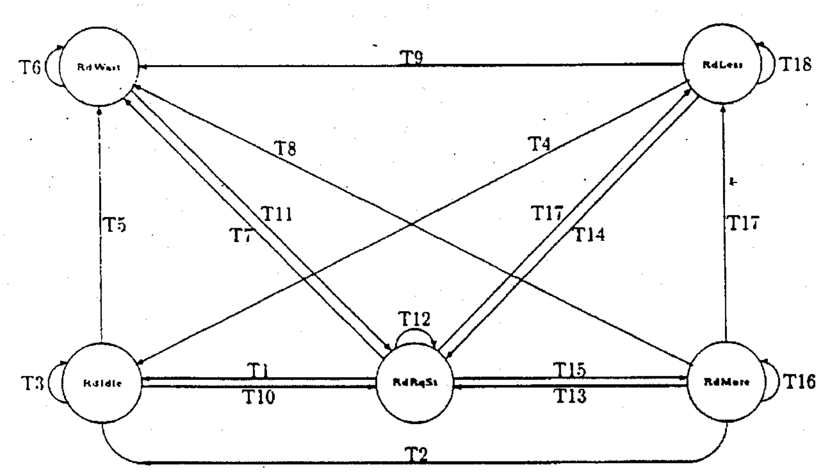

RdIdle: No read cycles pending

RdWait: Read cycle pending, but no free buffers

RdReqPd: Read cycle waiting for Midgard

RdMore: Read Cycle Acknowledged, but more transfers possible

RdLess: Read Transfers done, but cycle not yet acknowledged

2.9.1 Combi–Gorp

RdPend LHPend and pointed towards MEI and not Tal–ed or TAL–ed and and postable and not in arbitration hiatus

RdNQ LHPend and enqueued

MMAlloc RdNQ unless FULL where it occurs when FULL goes away

RLd RdNQ

```
RdPd ⇐ LHPend and LHL2E and not LHC(0) and not LHREGCS and not LHCHCS
       and ((LHTALcn nor ((not LHTALcn and (MidReqPd nand BifMast) and
       ((TALpm and LHC(2) and LHC(4)) or (TALpio and not LHC(2) and
       LHC(4))))) nor LHKWENDn);
RdNQ ⇐ T5 or T7 or T8 or T9 or T10 or (T12 and RSame and RDone and Ack)
       or (T13 and RDone) or T14;
MMAlloc ⇐ T10 or T11 or (T12 and RSame and RDone and Ack) or (T13 and RDone)
       or T14;
RLd ⇐ RdNQ;
```

2.9.2 Buffer Control Sludge

MMEVal Only on second beat

MMWE All beats unless necesary transfers already done (RdLess)

MMFree All activities done (≥ final MMWE)

RBEGaten Byte Enable Gate disfunctional for non-cacheable extended cycles.

```
MMEVal ⇐ not nxtXTRA;
MMWE ⇐ Ack and VSEL(0) and not RDLess;
MMFree ⇐ T1 or T2 or T4 or T7 or T8 or T9 or T14 or ((T12 or T13) and RdNQ);
RBEGaten ⇐ RKENcn;
```

2.9.3 State Transitions

2.9.3.1 Into RdIdle

T1 ⇐ RdRqSt and (LstAck or (Ack and RDone and RSame)) and VSEL(0) and (not RTALcn nor RKENcn);
T2 ⇐ RdMore and RSame and RDone and not RdPd;
T3 ⇐ RdIdle and not RdPd;
T4 ⇐ RdLess and not RdPd and Ack;

2.9.3.2 Into RdWait

T5 ⇐ RdIdle and RdPd and (FULL or oVHLDA);
T6 ⇐ RdWait and (FULL or oVHLDA);
T7 ⇐ RdRqSt and ((LstAck and RTALcn and not RKENcn) or (Ack and RDone and RSame)) and VSEL(0) and FULL;
T8 ⇐ RdMore and RSame and RDone and RdPd and FULL;
T9 ⇐ RdLess and RdPd and Ack and FULL;

2.9.3.3 Into RdRqSt

T10 ⇐ RdIdle and RdPd and not FULL and BifMAST;
T11 ⇐ RdWait and not FULL and BifMast;
T12 ⇐ RdRqSt and not(T1 or T7 or T15 or T17)
T13 ⇐ RdMore and not(T2 or T8 or T16);
T14 ⇐ RdLess and not(T4 or T9 or T18);

2.9.3.4 Into RdMore

T15 ⇐ RdRqSt and LstAck and VSEL(0) and (not RTALcn or RKENcn) and (RDone nand RSame);
T16 ⇐ RdMore and not((RDone or RMore) and RSame);

2.9.3.5 Into RdLess

T17 ⇐ RdRqSt and RDone and RSame and not Ack;
T18 ⇐ RdLess and not Ack;

2.9.4 Next State Equations nxtRdIdle ⇐ T1 or T2 or T3 or T4 or iMRESET;
nxtRdWait ⇐ (T5 or T6 or T7 or T8 or T9) and iMRESETn;
nxtRdRqSt ⇐ (T10 or T11 or T12 or T13 or T14) and iMRESETn;
nxtRdMore ⇐ (T15 or T16) and iMRESETn;
nxtRdLess ⇐ (T17 or T18) and iMRESETn;

uRdIdle: dfntnb

```
port map( d => nxtRdIdle, cp => iMCLK, q => RdIdle, qn => RdIdlen);
uRdWait: dfntnb
port map( d => nxtRdWait, cp => iMCLK, q => RdWait, qn => OPEN);
uRdRqSt: dfntnb
port map( d => nxtRdRqSt, cp => iMCLK, q => RdRqSt, qn => RdRqStn);
uRdMore: dfntnb
port map( d => nxtRdMore, cp => iMCLK, q => RdMore, qn => OPEN);
uRdLess: dfntnb
port map( d => nxtRdLess, cp => iMCLK, q => RdLess, qn => OPEN);
```

2.9.5 IACK Machine

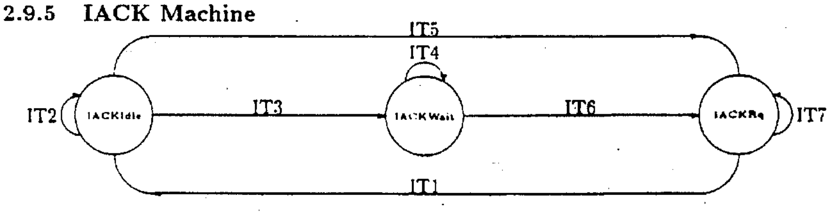

IACKIdle: No read cycles pending

IACKWait: Cycle Pending but INT IPC pending

IACKRq: One or more IACK cycles pending

```
IACKNQ <= iHINT and IMODE;
```

2.9.5.1 Into IACKIdle

```
IT1 <= IACKRq and not IT7;
IT2 <= IACKIdle and (IT3 nor IT5);
```

2.9.5.2 Into IACKWait

```
IT3 <= IACKIdle and IACKNQ and INTReq;
IT4 <= IACKWait and INTReq;
```

2.9.5.3 Into IACKRq

IT5 ⇐ IACKIdle and IACKNQ and not INTReq;
IT6 ⇐ IACKWait and not IT4;
IT7 ⇐ IACKRq and not(LstAck and not oVSEL0 and oVSEL1);

2.9.5.4 Next State Equations nxtIACKIdle ⇐ IT1 or IT2 or iMRESET;
nxtIACKWait ⇐ (IT3 or IT4) and iMRESETn;
nxtIACKRq ⇐ (IT5 or IT6 or IT7) and iMRESETn;

2.9.5.5 State Flop uIACKIdle: dfntnb port map( d ⇒ nxtIACKIdle, cp ⇒ iMCLK, q ⇒ IACKIdle, qn ⇒ IACKIdlen);

uIACKWait: dfntnb port map( d ⇒ nxtIACKWait, cp ⇒ iMCLK, q ⇒ IACKWait, qn ⇒ OPEN);

uIACKRq: dfntnb port map( d ⇒ nxtIACKRq, cp ⇒ iMCLK, q ⇒ IACKRq, qn ⇒ IACKRqn);

2.10 IACK Request Queue

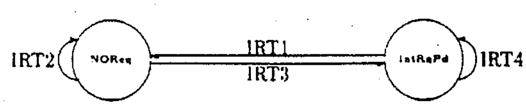

NOReq: There are no interrupts waiting for IPC's

IntRqPd: Interrupt complete pending IPC cycle

2.10.1 State Transitions

2.10.1.1 Into NOReq

IRT1 ⇐ IntRqPd and not DT4;
IRT2 ⇐ NOReq and not DT3;

2.10.1.2 Into IntRqPd

IRT3 ⇐ NOReq and (LstAck and not oVSEL0 and oVSEL1) and not INTAck;
IRT4 ⇐ INTRqPd and not INTAck;

2.10.2 Next State Equations nxtIntRqPd ⇐ (IRT3 or IRT4) and iMRESETn;

uINTRqPd: dfntnb port map( d ⇒ nxtINTRqPd, cp ⇒ iMCLK, q ⇒ INTRqPd, qn ⇒ NOReq);
IntReq ⇐ IntRqPd or (LstAck and not oVSEL0 and oVSEL1);

2.10.3 Data Chip Logic

Latches vector into data chip after second IACK cycle
oVLDn ⇐ not(LstAck and oVSEL1 and not oVSEL0);

2.11 Cycle Arbiter

ArbIdle: Arbitration is open

Arbed: Arbitration is locked

2.11.1 Into ArbIdle

ArbIdle occurs when the current cycle has completed. RT1 is questionable.
RT1 ⇐ Arbed and ((LstAck and not oVSEL0) or (MMFree and not RdNQ));
RT2 ⇐ ArbIdle and oVADSn;

2.11.2 Into Arbed

*Note:* the Arbed state transitions are shown for symmetry.
RT3 ⇐ ArbIdle and not RT2;
RT4 ⇐ Arbed and not RT1;

2.11.3 State Flops

```
nxtArbIdle <= RT1 or RT2 or iMRESET;
nxtArbed <= (RT3 or RT4) and iMRESETn;
```

2.11.4 State Flops

```
uArbIdle: dfntnb
port map(
d => nxtArbIdle,
cp => iMCLK,
q => ArbIdle,
qn => Arbed);
```

2.12 Path Selection

HMSel=00≡ SQ (Middle)

HMSel=01≡ Nada

HMSel=10≡ IACK (High)

HMSel=11≡ Read (Low)

```
HMSel1 <= SQMT or nxtIACKRq;
HMSEL0 <= (SQMT and not nxtIACKRq);
VSEL <= oVSEL1 & oVSEL0;

uVSEL1: mfntnh
port map(
da => HMSEL1, db => oVSEL1, cp => iMCLK, sa => nxtArbIdle, q => oVSEL1, qn => OPEN);

uVSEL0: mfntnh
port map(
da => HMSEL0, db => oVSEL0, cp => iMCLK, sa => nxtArbIdle, q => oVSEL0, qn => OPEN);
```

2.13 Virtual Host Bus State Machine

*Note:* Add LOCK gating of VTxxx to oVHLDA.

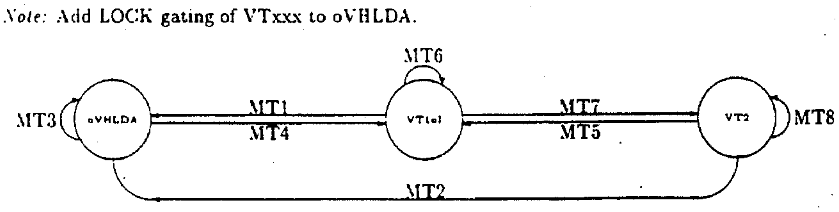

oVHLDA: Midgard bus owned elsewhere

VT1oI: Midgard bus ready for Bifrost transfer

VT2: Midgard bus waiting for VERDYI~ acknowledge

2.13.1 oVADSn

VADS sources are: both store queues not empty, RdRqSt, and IACKRQ

```
SQADSn <= VT1oIn or SQMT or DSQMT;
IACKADSn <= VT1oIn or IACKRqn;
RdADSn <= VT1oIn or RdRqStn;

uVADS: mx41d2

port map( i0 => SQADSn, i1 => OPEN, i2 => IACKADSn, i3 => RdADSn, s0 => oVSEL0, s1 => oVSEL1, z => oVADSn);
```

2.13.2 State Transitions

2.13.2.1 Into oVHLDA

*Note:* MT1 and MT2 work only because an arbitration hiatus is quaranteed when a Midgard request is pending (i.e. posted writes are disallowed, and TAL–ed reads are not posted). CZERO bridges the gap between the cacheability window end and LHDone (which guarantees no change in arbitration during this period).

```
MT1 <= VT1oI and MidReqPD and oVADSn and SQMT and RdIdle and CZERO
       and LckIdle and RdOK;
MT2 <= VT2 and VRDYI and MidReqPD and SQMT and RdIdle and CZERO and
       LckIdle and RdOK;
MT3 <= oVHLDA and not MT4;
```

2.13.2.2 Into VT1oI

```
MT4 <= oVHLDA and not iVHOLD;
MT5 <= VT2 and (MT2 nor MT8);
MT6 <= VT1oI and (MT1 nor MT7);
```

2.13.2.3 Into VT2

```
MT7 <= VT1oI and not(oVADSn);
MT8 <= VT2 and (oVRDYIn);
```

2.13.3 Next State Equations

```
nxtVHLDA <= (MT1 or MT2 or MT3) and iMRESETn;
nxtVT1oI <= MT4 or MT5 or MT6 or iMRESET;
nxtVT2 <= (MT7 or MT8) and iMRESETn;
```

2.13.4 State Flops

```
uVHLDA: dfntnb
port map(

d => nxtVHLDA,
cp => iMCLK,
q => oVHLDA,
qn => BifMAST);

uVT1ol: dfntnb
port map(

d => nxtVT1ol,
cp => iMCLK,
q => VT1ol,
qn => VT1oln);

uVT2: dfntnb
port map(

d => nxtVT2,
cp => iMCLK,
q => VT2,
qn => OPEN);
```

2.14 Virtual Host Bus Lock Machine

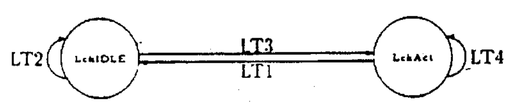

LckIdle: Midgard is not locked by Bifrost (Tal if MidReqPd or VHLDA)

LckAct: The Midgard bus is locked by Bifrost (Never TAL if Locked)

2.14.1 State Transitions

2.14.1.1 Into LckIdle

*Note:* VT1 and VT2 are not used

LT1 ⇐ LckAct and not LT4;
LT2 ⇐ LckIdle and not LT3;

2.14.1.2 Into LckAct

LT3 ⇐ LckIdle and iMTALcn and (iMKWENDcn nor iMC(4)) and (L2E or LOCK-cpl);
LT4 ⇐ LckAct and not iMC(4);

2.14.2 Next State Equations

*Note:* nxtLckIdle is not used nxtLckIdle ⇐ LT1 or LT2 or iMRESET;
nxtLckAct ⇐ (LT3 or LT4) and iMRESETn;

2.14.3 State Flops uLckAct: dfntnb
port map( d ⇒ nxtLckAct,
cp ⇒ iMCLK,
q ⇒ LckAct,
qn ⇒ LckIdle);

2.14.4 Request Pending Flop uMRP: dfntnb port map( d ⇒ iVHOLD, cp ⇒ iMCLK, q ⇒ MidReqPD, qn ⇒ MidReqPDn);

2.15 Virtual Host Bus Address Control

Controls the incrementing and pipelining of addresses for the Midgard master machine.

RAInc ⇐ Ack and MAS and XTRA;
VTI ⇐ VT1ol and oVADSn;

uVRDYI: dfntnb port map( d ⇒ iVERDYOn, cp ⇒ iMCLK, q ⇒ oVRDYIn, qn ⇒ VRDYI);

2.15.1 Split (XTRA) Logics

XTRA: indicates that the current Lethe beat will require two Midgard beats nxtXTRA ⇐ ((not XTRA and Ack and (V2DW or MORE)) or (XTRA and not Ack and not T17)) and not iMRESET;

uXTRA: dfntnh port map( d ⇒ nxtXTRA, cp ⇒ iMCLK, q ⇒ XTRA, qn ⇒ XTRAn);

2.15.2 Extension (MAS) Logics

MAS: indicates that the current Lethe request is for an entire line

This bursts all memory reads regardless of BLAST. LOCK. cacheability...

```
MORE <= (not RKENcn and VSEL(0) and not RdLess);
nxtMAS <= ((Ack and MORE and not MAS) or (MAS and not T17 and not(Ack and
        FullLine and XTRA))) and not iMRESET;

uMAS: dfntnb

port map( d => nxtMAS, cp => iMCLK, q => MAS, qn => MASn);
```

2.15.3 A/B Buffers Logics

Ack: Final VT2 of any transfer

LstAck: The final VT2 of the current hachi-beat.

```
Ack <= VRDYI;
LstAck <= VRDYI and (nxtXTRA nor nxtMAS);
WVDOEn <= not(((VT1oI and not oVADSn) or VT2) and (VSEL(1) nor VSEL(0)));
```

2.16 CPUMISS~ Logic

*Note:* Could use some tweaking.

```
oVCPUMISSn <= not((BCR0(5) and oVHLDA) or not(SQMT or RdIdlen or IACKIdlen));
```

2.17 Lock Stuff

```
LCKActn <= LCKIdle;
end behavior;
```

Chapter 3

Lethe Master Pipe Coupler

3.1 Lethe Master Pipeline Coupler (LEMPC)

The Master pipeline coupler maintains the state of the pipeline between the Lethe bus and the data transfer. This pipeline is similar to the Lethe to Bifrost request pipeline.

3.2 States

The progression is described by three states:

ZERO: The ZERO state indicates that there are no master requests pending.

ONE: The ONE state indicates that there is one master request pending. the cacheability information is required.

TWO: The TWO state indicates that there are two master requests pending.

3.3 State Transitions
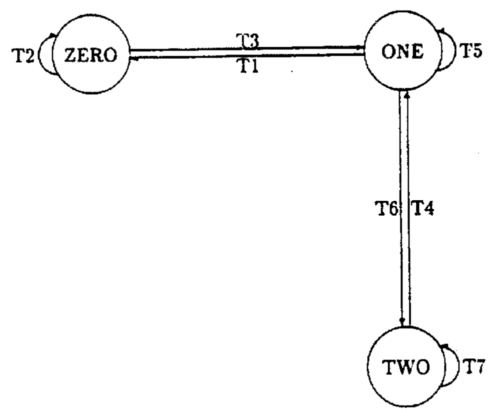
3.4 VHDL Code
3.4.1 Entity Declaration
```
library vti;
use vti.vtipack.all;
entity lempc is
port(
```
3.4.1.1 Global Signals
```
iMCLK: in vlbit;
iRESETn: in vlbit;
```
3.4.1.2 Address/Cacheing/Snooping Control
```
NQ: in vlbit;
DQ: in vlbit;
Pend: out vlbit;
ZERO: inout vlbit;
ONE: inout vlbit;
TWO: inout vlbit;
AP: out vlbit);
```

```
end lempc;
```

3.4.2 Architectural Declaration

```
architecture behavior of lempc is
```

3.4.2.1 Next State Declarations

```
signal nxtZERO,nxtONE,nxtTWO: vlbit;
signal T1,T2,T3,T4,T5,T6,T7: vlbit;
begin
```

3.4.2.2 State Transition Equations

3.4.2.3 Into ZERO

```
T1 <= ONE and DQ and not(NQ);
T2 <= ZERO and not(NQ xor DQ);
```

3.4.2.4 Into ONE

```
T3 <= ZERO and NQ and not(DQ);
T4 <= TWO and DQ and not(NQ);
T5 <= ONE and not(NQ xor DQ);
```

3.4.2.5 Into TWO

```
T6 <= ONE and NQ and not(DQ);
T7 <= TWO and not(DQ xor NQ);
```

3.4.2.6 Next State Equations

```
nxtZERO <= T1 or T2 or not(iRESETn);
nxtONE <= (T3 or T4 or T5) and iRESETn;
nxtTWO <= (T6 or T7) and iRESETn;
```

3.4.2.7 Next State Flip-Flops

```
uZERO: dfntnh
port map(

d => nxtZERO,
cp => iMCLK,
q => ZERO,
qn => OPEN);

uONE: dfntnh
port map(
```

```
d => nxtONE,
cp => iMCLK,
q => ONE,
qn => OPEN);

uTWO: dfntnh
port map(

d => nxtTWO,
cp => iMCLK,
q => TWO,
qn => OPEN);
```

3.4.2.8 Next State Equations

```
Pend <= NQ or ONE or TWO;
AP <= (TWO nor (ONE and NQ));
end behavior;
```

Chapter 4

Lethe Master Requester

4.1 Lethe Slave Request Tracking Unit

The Lethe Master Request / Address Tracking Unit handles the arbitration and address control for all Lethe cycles mastered by this device.

4.2 VHDL Code

4.2.1 Entity Declaration

```
library vti;
library lethe;
use vti.vtipack.all;
use lethe.lepack.all;
entity lemrt is
port(
```

4.2.1.1 Global Inputs

```
iMCLK: in vlbit;
iMRESETn: in vlbit;
BCR1: in vlbit_1d(7 downto 0);
```

4.2.1.2 Lethe State Tracker States

```
IDLE: in vlbit;
BUSY: in vlbit;
TIDLE: in vlbit;
ADDR: in vlbit;
```

4.2.1.3 Lethe Outputs

```
oMADSn: inout vlbit;
oMSNPSTBn: out vlbit;
```

```
oMREQn: inout vlbit;
SP: inout vlbit;
SPn: inout vlbit;
```

4.2.1.4 Lethe Outputs

```
iMSWENDcn: in vlbit;
iMKWENDcn: in vlbit;
iMTALcn: in vlbit;
```

4.2.1.5 HL Signals

```
LRIPCReq: in vlbit;
LRIPCAck: inout vlbit;
LRPend: in vlbit;
LRAck: inout vlbit;
LRHeadLockn: in vlbit;
LRLockn: in vlbit;
ABLOCKn: in vlbit;
ELOCKn: in vlbit;
LRDir: in vlbit;
LRBVGATE: out vlbit;
LckIdle: inout vlbit;
LRXTRA: inout vlbit;
LRTWOn: in vlbit);
end lemrt;
```

4.2.2 Architectural Structure

```
architecture structure of lemrt is


signal nxtMWAIT,nxtMBUSY,nxtMTAL:vlbit;
signal MWAIT,MBUSY,MTAL:vlbit;
signal T1,T2,T3,T4,T5,T6:vlbit;
signal GenAck:vlbit;
signal nxtLRXTRA:vlbit;
signal LRXTRAn:vlbit;
signal nxtMREQn: vlbit;
signal nxtLckAct,LckAct: vlbit;
signal LT3,LT4:vlbit;


begin
```

4.3 Request Machine

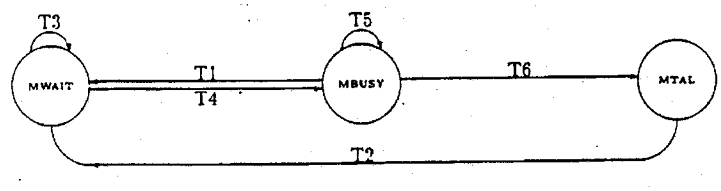

4.3.1 Into MWAIT

T1 ⇐ MBUSY and (iMKWENDcn nor not iMTALcn);
T2 ⇐ MTAL;
T3 ⇐ MWAIT and not T4;

4.3.2 Into MBUSY

*Note:* enter on request from current source and not TIDLE.
T4 ⇐ MWAIT and not(TIDLE) and ((SPn and LRPend and (LRHeadLockn or LckIdle)) or (SP and LRIPCReq)) and (ADDR or iMSWENDcn);
T5 ⇐ MBUSY and iMKWENDcn;

4.3.3 Into MTAL

T6 ⇐ MBUSY and (iMKWENDcn nor iMTALcn);

4.3.4 Next State Equations nxtMWAIT ⇐ T1 or T2 or T3 or not(iMRESETn);
nxtMBUSY ⇐ (T4 or T5) and iMRESETn;
nxtMTAL ⇐ T6 and iMRESETn;

4.3.5 State Flops

```
uMWAIT: dfntnb

port map( d => nxtMWAIT, cp => iMCLK, q => MWAIT, qn => OPEN);

uMBUSY: dfntnb

port map( d => nxtMBUSY, cp => iMCLK, q => MBUSY, qn => OPEN);

uMTAL: dfntnb

port map( d => nxtMTAL, cp => iMCLK, q => MTAL, qn => OPEN);
```

4.3.6 Combi Gorp oMADSn ⇐ not(MBusy and ADDR and (IDLE or (BUSY and BCR1(1))));
GenAck ⇐ MBusy and (iMKWENDcn nor not iMTALcn);
LRAck ⇐ GenAck and (LRTWOn or LRXTRA) and SPn;
LRIPCAck ⇐ GenAck and SP;
LRBVGATE ⇐ (LRTWOn or LRXTRA) nand LRDIR;

4.4 oMREQn nxtMREQn ⇐ nxtMTAL or (LRPend nor LRIPCReq);

uMREQ: dfntnh port map( d ⇒ nxtMREQn, cp ⇒ iMCLK, q ⇒ oMREQn, qn ⇒ OPEN);

4.5 Sparsity nxtLRXTRA ⇐ ((GenAck and SPn and not LRTWOn and LRXTRAn) or (GenAck nor LRXTRAn)) and iMRESETn;

uLRXTRA: dfntnb port map( d ⇒ nxtLRXTRA, cp ⇒ iMCLK, q ⇒ LRXTRA, qn ⇒ LRXTRAn);

4.6 Lethe Bus Lock Machine

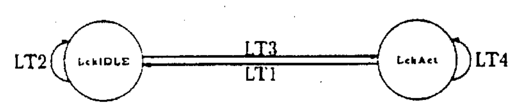

LckIdle: Midgard is not locked by Bifrost (Tal if MidReqPd or VHLDA)

LckAct: The Midgard bus is locked by Bifrost (Never TAL if Locked)

4.6.1 State Transitions

4.6.1.1 Into LckIdle

*Note:* VT1 and VT2 are not used

LT1 ⇐ LckAct and not LT4;
LT2 ⇐ LckIdle and not LT3;

4.6.1.2 Into LckAct

*Note:* this might be gated with SPn, but this is not safe.

```
LT3 <= LckIdle and MWAIT and not(TIDLE) and ((SPn and LRPend and (LR-
        HeadLockn or LckIdle)) or (SP and LRIPCReq)) and (ADDR or iMSWENDcn)
        and not LRLockn;
LT4 <= LckAct and not(((LRPend and not LRHeadLockn) or ((LRPEND and
        LRLOCKn) and ABLOCKn and ELOCKn)) and MWAIT);
```

4.6.2 Next State Equations

*Note:* nxtLckIdle is not used

```
nxtLckIdle <= LT1 or LT2 or iMRESET;
nxtLckAct <= (LT3 or LT4) and iMRESETn;
```

4.6.3 State Flops

```
uLckAct: dfntnb
port map(

d => nxtLckAct,
cp => iMCLK,
q => LckAct,
qn => LckIdle);
```

4.7 Snoop Control

```
oMSNPSTBn <= oMADSn;

umfntnb: mfntnh
port map(

da => LRPend, db => SPn, cp => iMCLK, sa => nxtMWAIT, q => SPn, qn => SP);

end structure;
```

Chapter 5

Lethe Master Data Interface

5.1 Lethe Master Data Tracking Unit

The Lethe Master Data Tracking Unit handles all data transfers between another Lethe node and this slave. It uses the LD pipe from the AB buffers and the B pipe on the Lethe bus.

5.1.1 B Pipe

The B pipe only occurs when a Lethe cycle becomes pending when Bifrost is master of the Lethe bus.

5.1.2 LD Pipe

LD pipe events occur when the the AB buffer controller needs a line fetched or to dump a write buffer.

5.2 VHDL Code

5.2.1 Entity Declaration

```
library vti;
library lethe;
use vti.vtipack.all;
use lethe.lepack.all;
entity lemdt is
port(
```

5.2.1.1 Global Inputs

```
iMCLK: in vlbit;
iMRESETn: in vlbit;
```

5.2.1.2 Data Tracker Control Signals

```
BMAST: in vlbit;
BSP: in vlbit;
BC: in vlbit_1d(4 downto 0);
BKWENDn: in vlbit;
BTALcn: in vlbit;
```

5.2.1.3 Lethe B Pipe Interface

```
BDone: inout vlbit;
BPend: in vlbit;
```

5.2.1.4 AB DM Pipe Interface

```
LDIPCReq: in vlbit;
LDIPCAck: inout vlbit;
LDAck: inout vlbit;
LDWE: inout vlbit;
LDPend: in vlbit;
LDTWOn: in vlbit;
```

5.2.1.5 Raw Lethe Signals

```
IPCSeln: inout vlbit;
XTRAn: inout vlbit;
eDBBokn: out vlbit;
GDBBn: in vlbit;
iMBRDYcn: in vlbit;
LstRDY: in vlbit;
WDBBn: out vlbit;
WDOEn: out vlbit);
end lemdt;
```

5.2.2 Architectural Structure

```
architecture structure of lemdt is

signal nxtDBBok,DBBok,DBBwait: vlbit;
signal T3,T4:vlbit;
signal GenAck:vlbit;
signal nxtLDWE:vlbit;
signal nxtLDAck:vlbit;
signal nxtXTRA,XTRA:vlbit;
signal PT3,PT4:vlbit;
signal nxtWKWEND,WKWEND,HAPPY:vlbit;

begin
```

5.3 Data Transfer Tracker

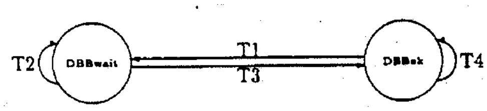

MDBBok is set when a master cycle is pending and the data bus is no longer busy. This is true if MDBBn is de–asserted or the last ready has been sampled.

5.3.1 Transitions

*Note:* T1 and T2 are for documentation purposes only.

```
T1 <= DBBok and BDone;
T2 <= DBBwait and not T3;
T3 <= DBBwait and GDBBn and BPend and BMAST;
T4 <= DBBok and not BDone;
nxtDBBok <= (T3 or T4) and iMRESETn;
eDBBokn <= not(nxtDBBok);
```

5.3.2 DBBok Flop

```
uDBBok: dfntnb

port map ( d => nxtDBBok, cp => iMCLK, q => DBBok, qn => DBBwait);
```

5.3.3 Write DBB

```
WDBBn <= not(BC(0) and DBBok);
```

5.3.4 Write Bifrost–D Data OE

WDOEn, on assertion, causes the data chip to drive data starting in the next MCLK. Data continues to be driven until the clock after MBRDYcn, MDBBn, and MLASTn are sampled de–asserted.

```
WDOEn <= not((T3 or DBBok) and BC(0));
```

5.4 Post Machine

*This state bit enables Bifrost to post a write without knowledge of the cacheability window.*

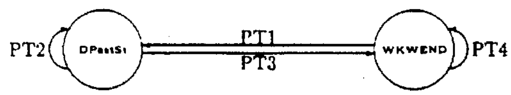

WKWEND: Data has already been written, but the cacheability window had not closed, so the transfer was not ack-ed.
HAPPY: The cacheability window is not being waited for.

5.4.1 Transitions

5.4.1.1 Into DPostSt

*Note:* these are for symmetry only

PT1 ⇐ WKWEND and not BKWENDn;
PT2 ⇐ HAPPY and not PT3;

5.4.1.2 Into WKWEND

PT3 ⇐ HAPPY and DBBok and LstRDY and BKWENDn;
PT4 ⇐ WKWEND and BKWENDn;

5.4.2 nxtWKWEND nxtWKWEND ⇐ (PT3 or PT4) and iMRESETn;

uWKWEND: dfntnb port map( d ⇒ nxtWKWEND, cp ⇒ iMCLK, q ⇒ WKWEND, qn ⇒ HAPPY);

5.4.3 Pipe Control

BDone ⇐ BPend and ((LstRDY and DBBok and not BKWENDn) or ((HAPPY and (BC(0) or BTALcn)) nor BKWENDn) or not BMAST);
GenAck ⇐ BDone and BMAST and BTALcn;
nxtLDAck ⇐ GenAck and (LDTWOn or XTRA) and not BSP;
LDIPCAck ⇐ GenAck and BSP;

uLDAck: dfntnb port map( d ⇒ nxtLDAck, cp ⇒ iMCLK, q ⇒ LDAck, qn ⇒ OPEN);

5.5 Sparsity

```
nxtXTRA <= ((GenAck and not BSP and not LDTWOn and XTRAn) or (GenAck nor
            XTRAn)) and iMRESETn;

uXTRA: dfntnb

port map( d => nxtXTRA, cp => iMCLK, q => XTRA, qn => XTRAn);
```

5.6 WE

```
nxtLDWE <= not(BC(0)) and not(iMBRDYcn) and not(GDBBn) and DBBok;

uLDWE: dfntnb

port map( d => nxtLDWE, cp => iMCLK, q => LDWE, qn => OPEN);
```

5.7 IPC Stuff

*Note:* data is never available until DBBok

```
IPCSeln <= BSP nand nxtDBBok;

end structure;
```

Index

Ack . 29
AP . 36

BDone . 46

CDQ . 17
CNQ . 17
CT1 . 19
CT2 . 19
CT3 . 19
CT4 . 19

DACLRn . 12
DAInc . 12
DDone . 9
DLocDone . 9
DQ . 17
DQPend . 6
DRdDone . 9
DT1 . 6. 18
DT2 . 6. 18
DT3 . 6. 18
DT4 . 6. 18
DWrDone . 9 eDBBokn . 45

GenAck . 40. 46

HMSEL0 . 25
HMSel1 . 25

IACKADSn . 26
IACKNQ . 22
IMODE . 16
INCNDX . 10
IntReq . 24
IPCSeln . 47
IRT1 . 23
IRT2 . 23
IRT3 . 24
IRT4 . 24
IT1 . 22
IT2 . 22
IT3 . 22
IT4 . 22
IT5 . 23
IT6 . 23
IT7 . 23

L2ETALn . 16
LCKActn . 29
LDIPCAck . 46
LetheTALn . 17
LHDone . 17
LHRdDone . 17
LOCKcpl . 16
LRAck . 40
LRBVGATE . 40
LRIPCAck . 40
LSAct . 12
LstAck . 29
LT1 . 27. 40
LT2 . 27. 40
LT3 . 28. 41
LT4 . 28. 41

MMAlloc . 20
MMEVal . 20
MMFree . 20
MMWE . 20

MORE , 29
MT1 , 26
MT2 , 26
MT3 , 26
MT4 , 26
MT5 , 26
MT6 , 26
MT7 , 26
MT8 , 26

NQ , 12
NT1 , 11
NT2 , 11
NT3 , 11
NT4 , 11
nxtArbed , 25
nxtArbIdle , 25
nxtDATCS , 10
nxtDATRD , 10
nxtDBBok , 7, 45
nxtDNQ , 11
nxtIACKIdle , 23
nxtIACKRq , 23
nxtIACKWait , 23
nxtIntRqPd , 24
nxtLckAct , 28, 41
nxtLckIdle , 28, 41
nxtLDAck , 46
nxtLDWE , 47
nxtLRXTRA , 40
nxtMAS , 29
nxtMBUSY , 39
nxtMREQn , 40
nxtMTAL , 39
nxtMWAIT , 39
nxtNDXCS , 10
nxtNQwait , 11
nxtONE , 35
nxtRdDirt , 18
nxtRdIdle , 21
nxtRdLess , 21
nxtRdMore , 21
nxtRdRDY , 10
nxtRdRqSt , 21
nxtRdWait , 21
nxtRegDBB , 9
nxtSMDBB , 8
nxtTalACT , 19
nxtTWO , 35
nxtVHLDA , 26
nxtVT1ol , 26
nxtVT2 , 26
nxtWKWEND , 7, 46
nxtXTRA , 28, 47
nxtZERO , 35 oDDQn , 17
oMADSn , 40
oMBRDYn , 11
oMERDYn , 10
oMSNPSTBn , 41
oVCPUMISSn , 29
oVLDn , 24

Pend , 36
PostRDY , 10
preDBBok , 6
PT1 , 7, 46
PT2 , 7, 46
PT3 , 7, 46
PT4 , 7, 46

RAInc , 28
RBEGaten , 20
RdADSn , 26
RDMSel , 9
RdNQ , 20
RDOEn , 10
RDone , 9
RdPd , 20
RdTALn , 16
RegT1 , 9
RegT2 , 9
RegT3 , 9
RegT4 , 9
RLd , 20
RMDOEn , 10
RMORE , 10

RT1 . 8. 24
RT2 . 8. 24
RT3 . 8. 24
RT4 . 8. 24

SQADSn . 26

T1 . 21. 35. 39. 45
T10. 21
T11. 21
T12 . 21
T13 . 21
T14 . 21
T15 . 21
T16 . 21
T17 . 21
T18 . 21
T2 . 21. 35. 39. 45
T3 . 21. 35. 39. 45
T4 . 21. 35. 39. 45
T5 . 21. 35. 39
T6 . 21. 35. 39
T7 . 21. 35
T8 . 21
T9 . 21
TALall . 16
TALpio . 16
TALpm . 16
TALWrRDY . 10

VSEL . 25
VT1 . 28

WDBBn . 45
WDOEn . 45
WrTALn . 16
WVDOEn . 29

Bifrost Hierarchy
Version 1.1

Team Bifrost

April 20, 1992

This document contains information of a proprietary nature. ALL INFORMATION CONTAINED HEREIN SHALL BE KEPT IN CONFIDENCE. None of this information shall be divulged to persons other than DELL employees authorized by the nature of their duties to receive such information, or individuals or organizations authorized by DELL research and development in accordance with existing policy regarding the release of company information.

©DELL Computer Corporation 1991

Chapter 4
Lethe Interface Block
4.1 Overview
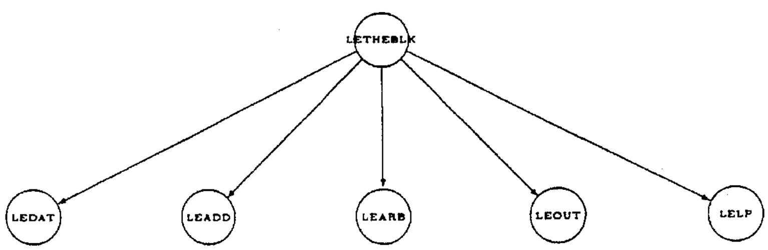

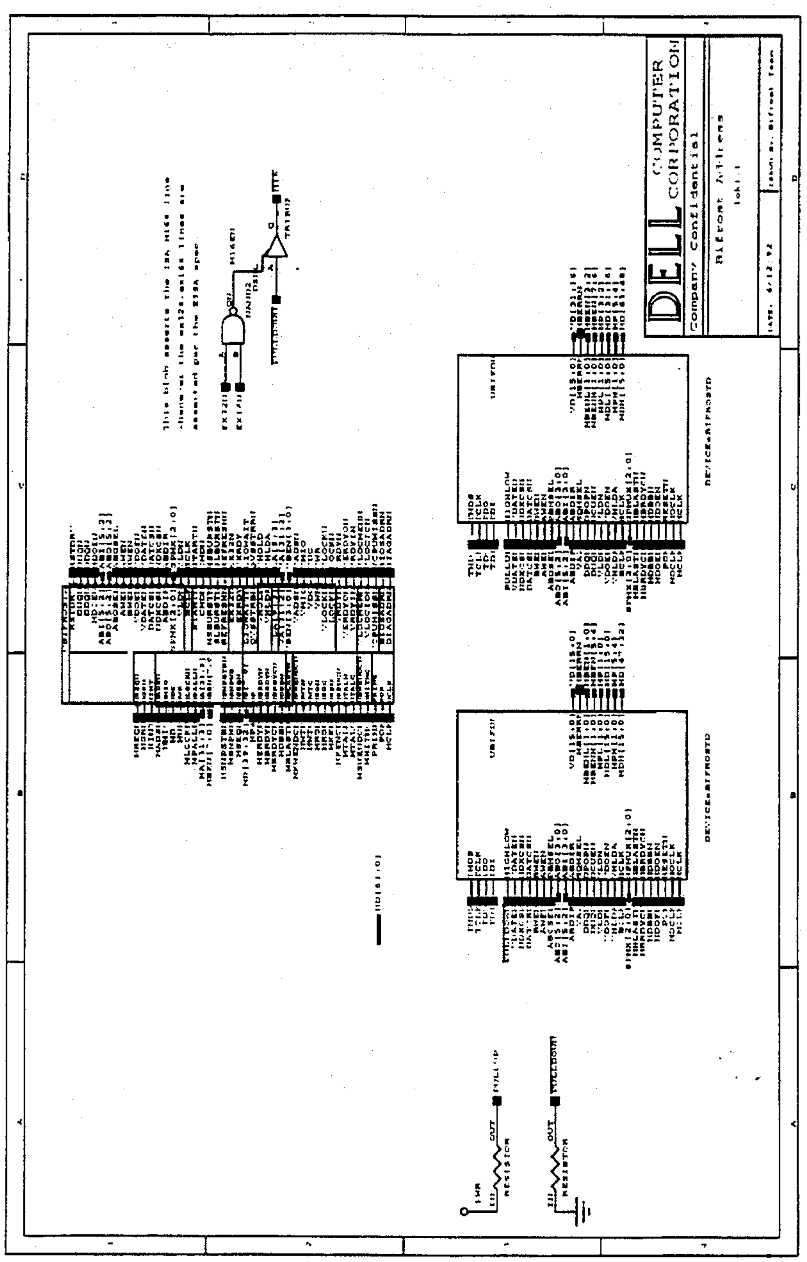
DELL COMPUTER CORPORATION
Company Confidential

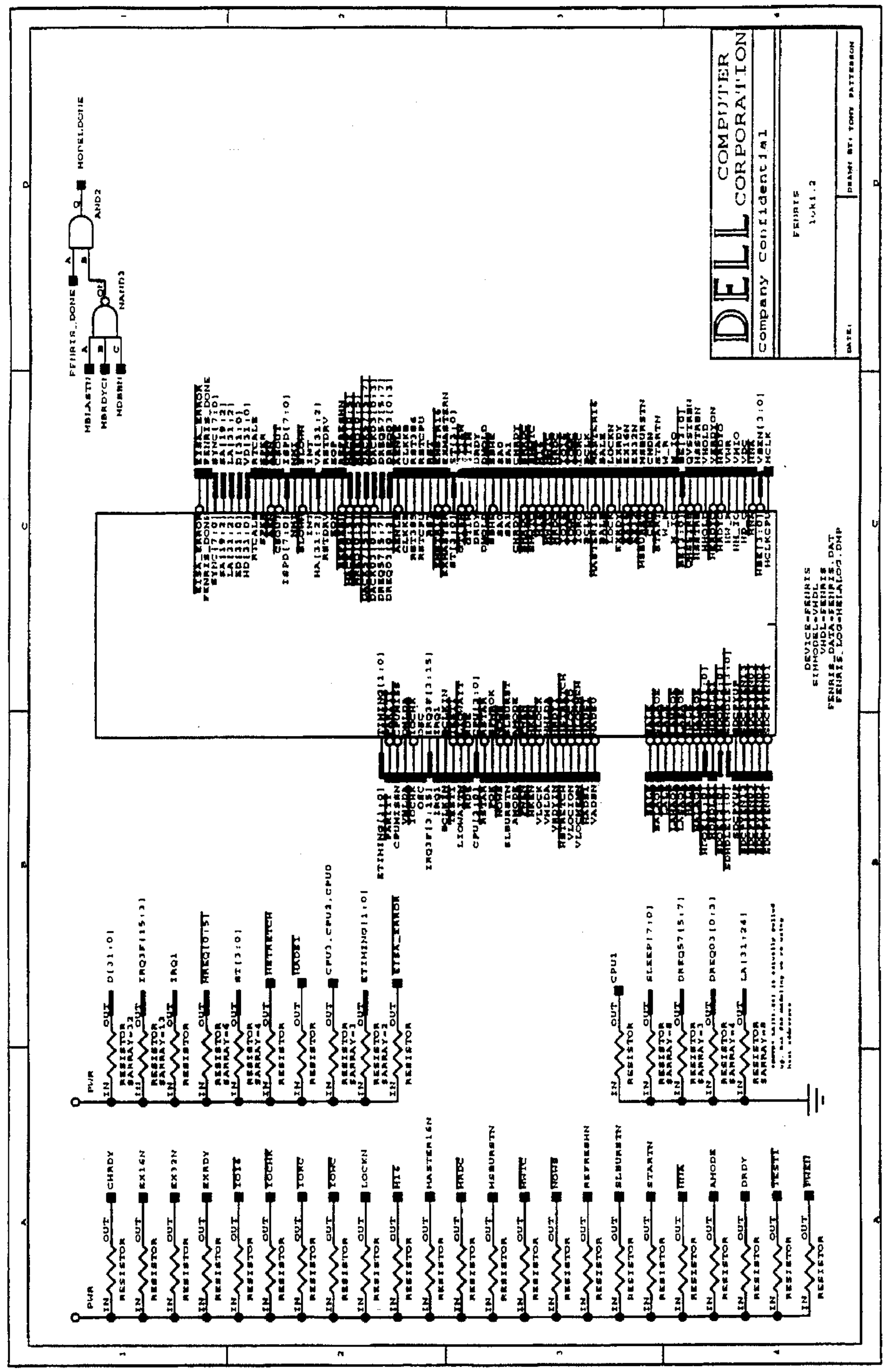
DELL COMPUTER CORPORATION
Company Confidential

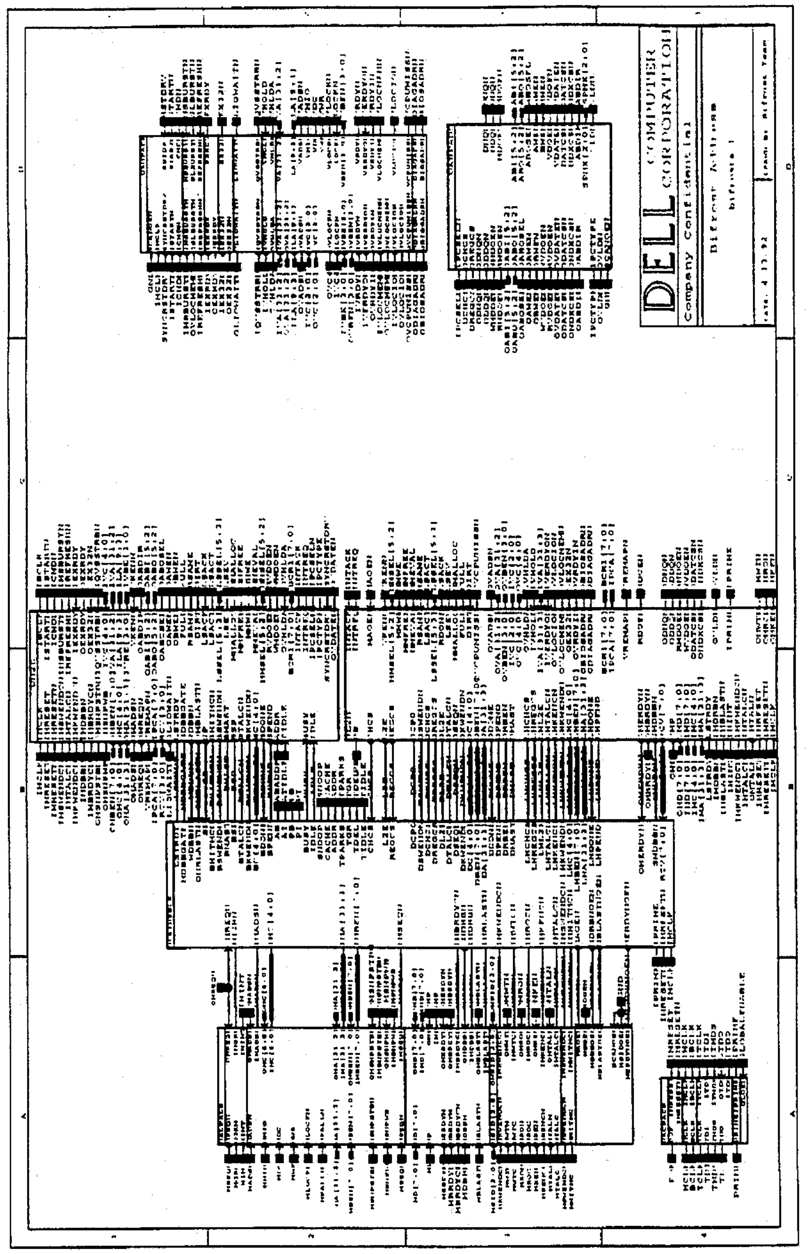
DELL COMPUTER CORPORATION
Company Confidential

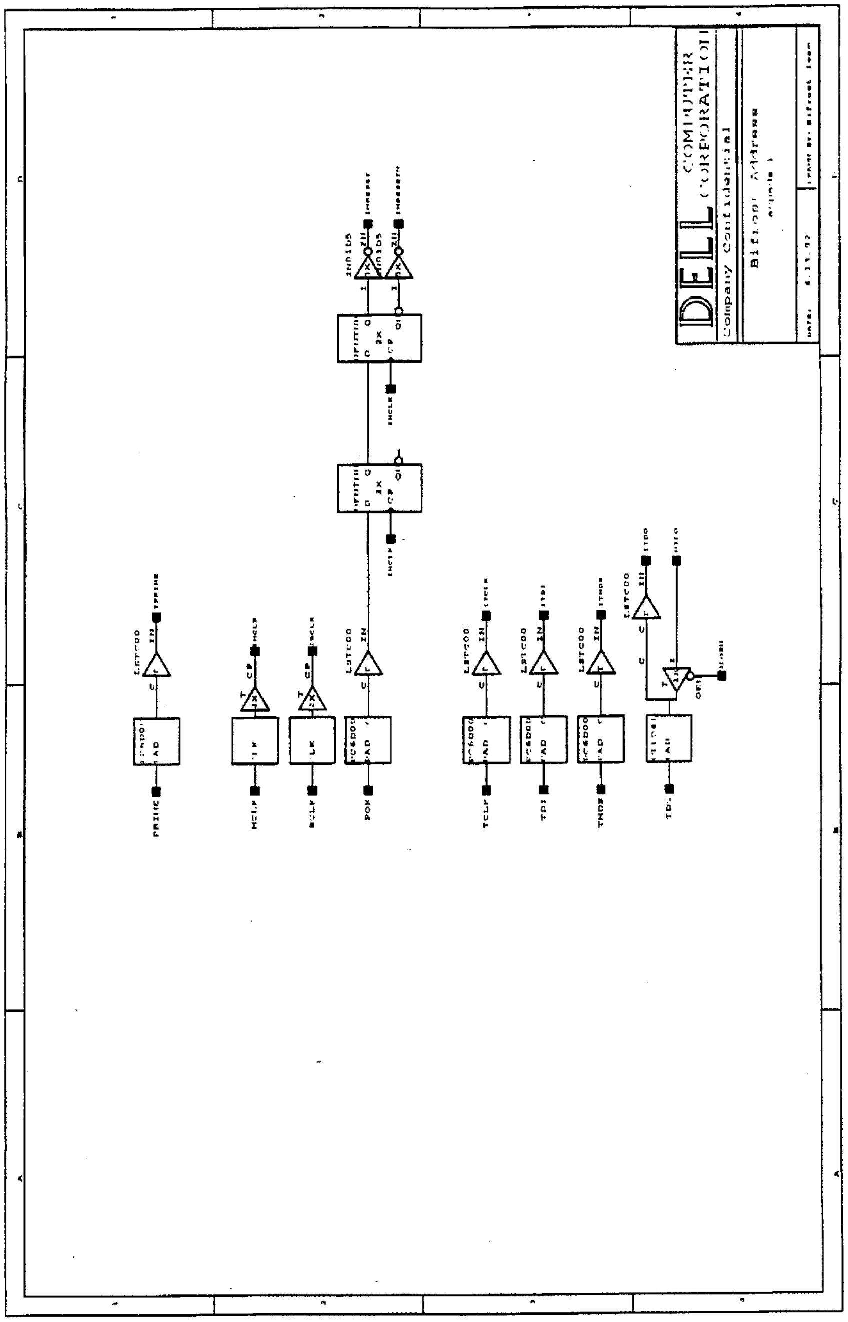
DELL
COMPUTER CORPORATION
Company Confidential

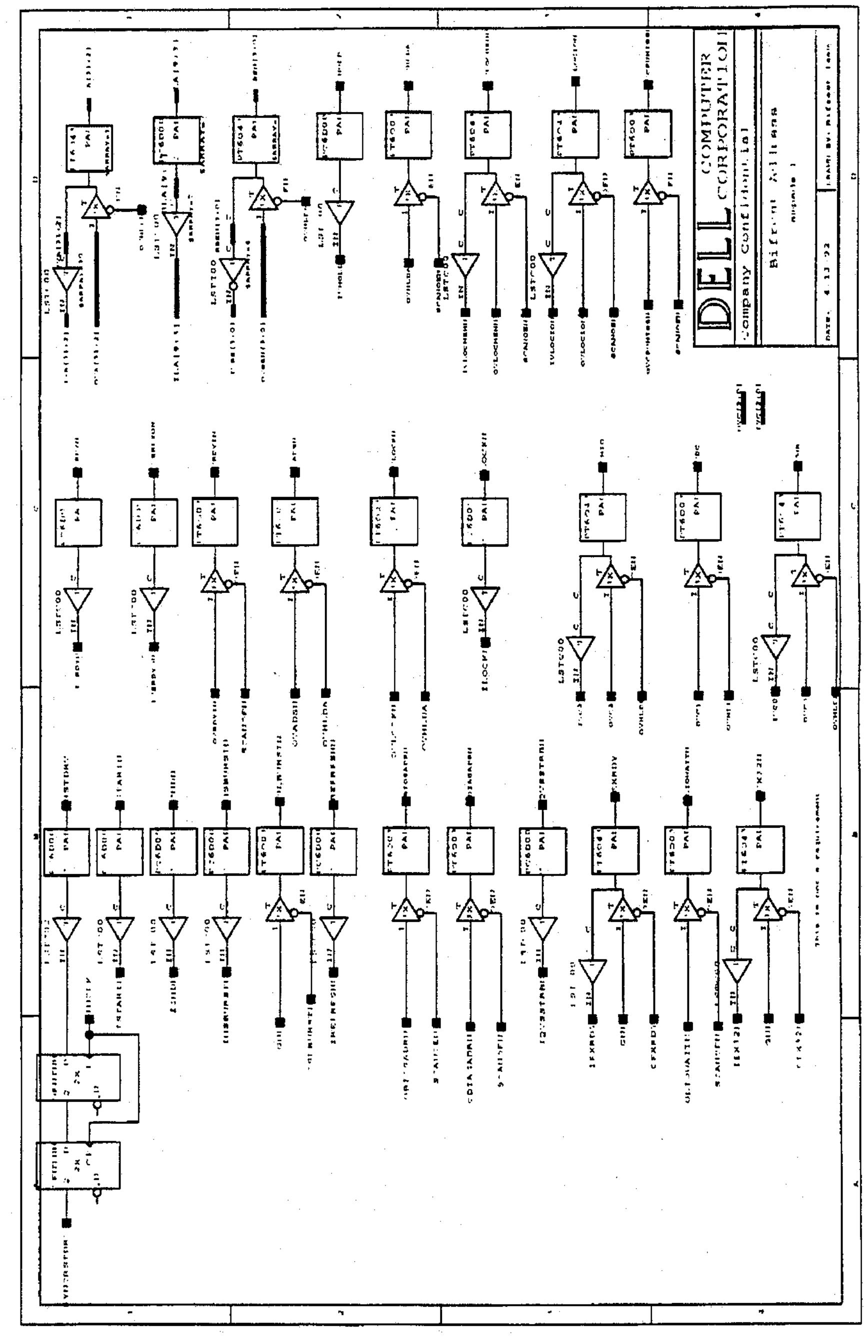
DELL
COMPUTER CORPORATION
Company Confidential

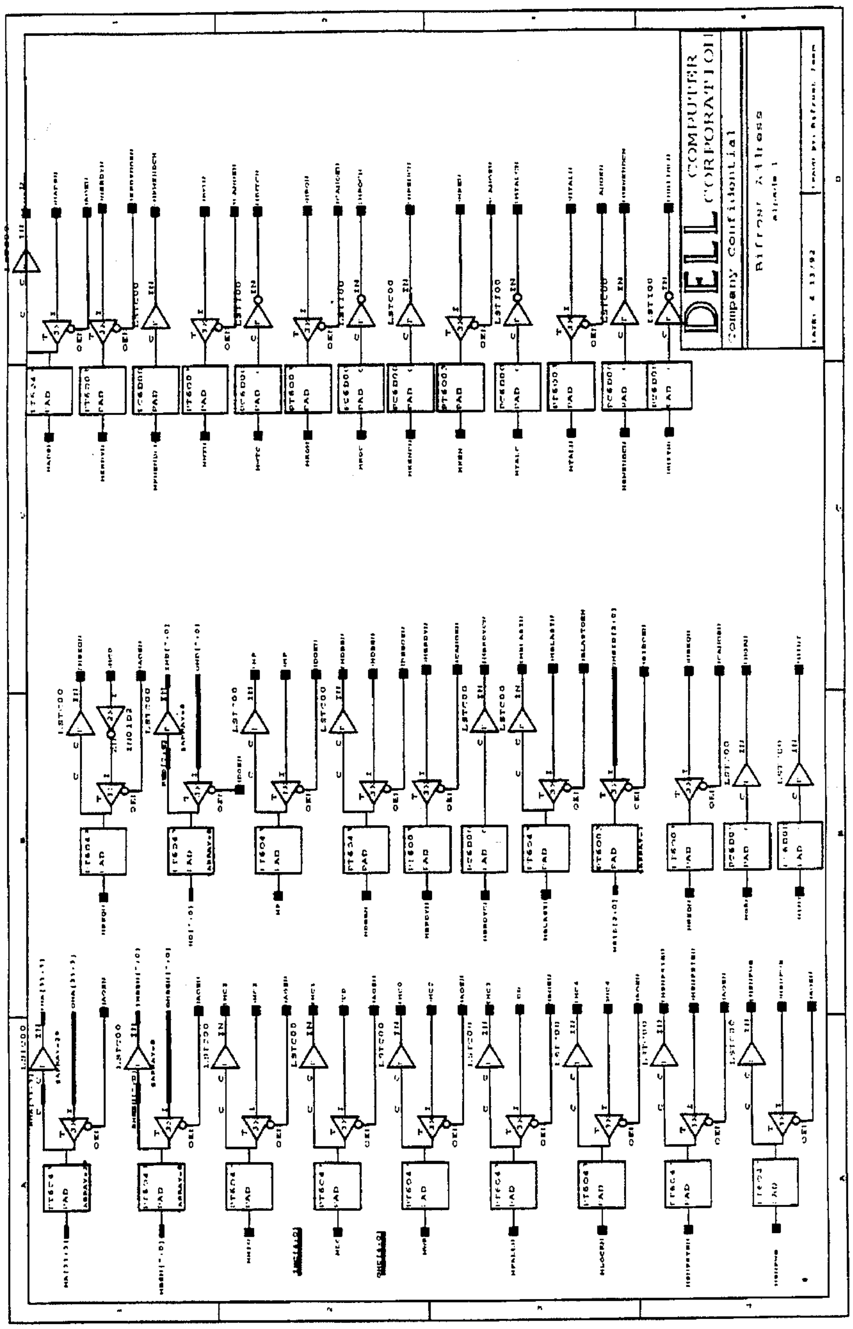
DELL
COMPUTER CORPORATION
Company Confidential

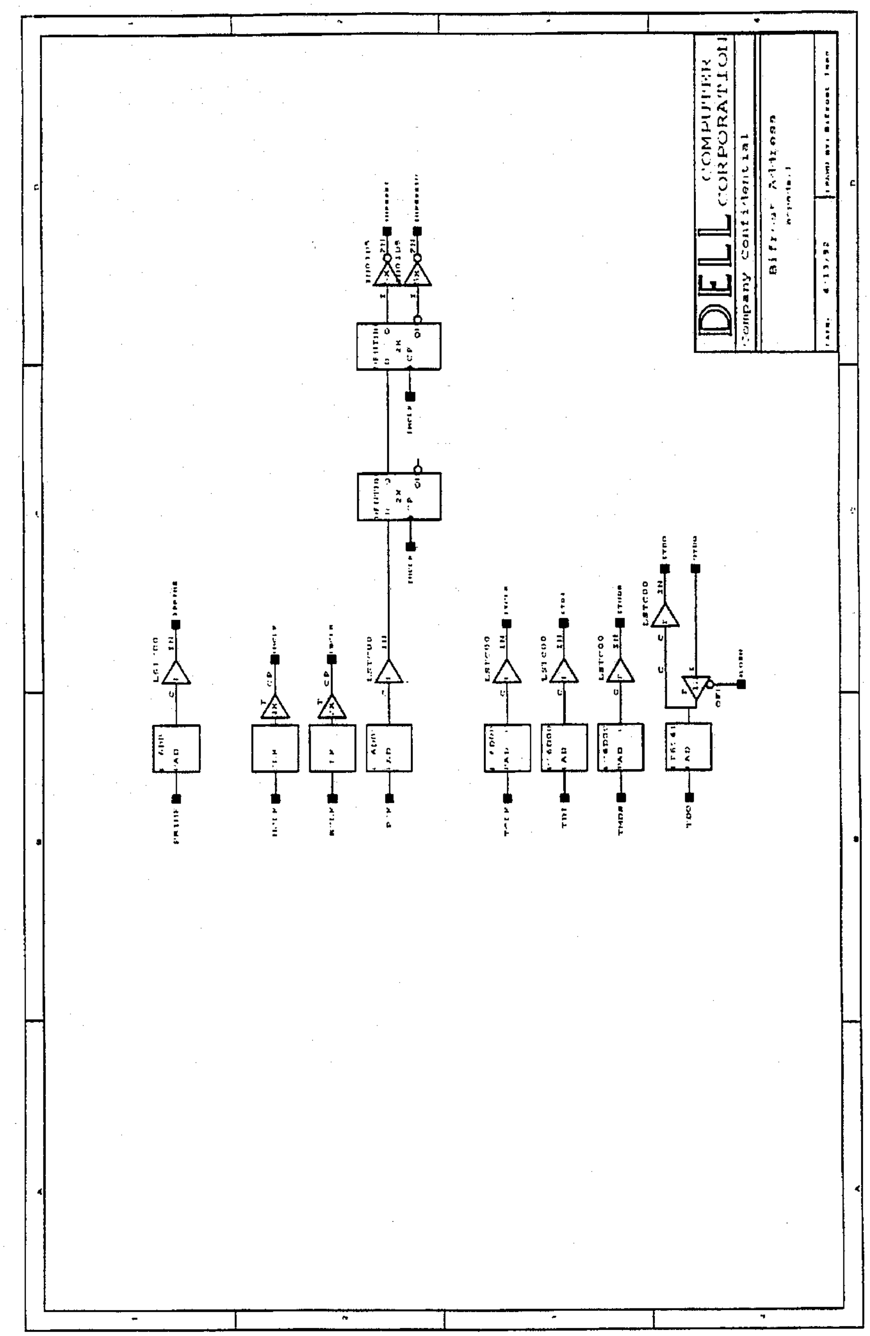
DELL
COMPUTER
CORPORATION
Company Confidential

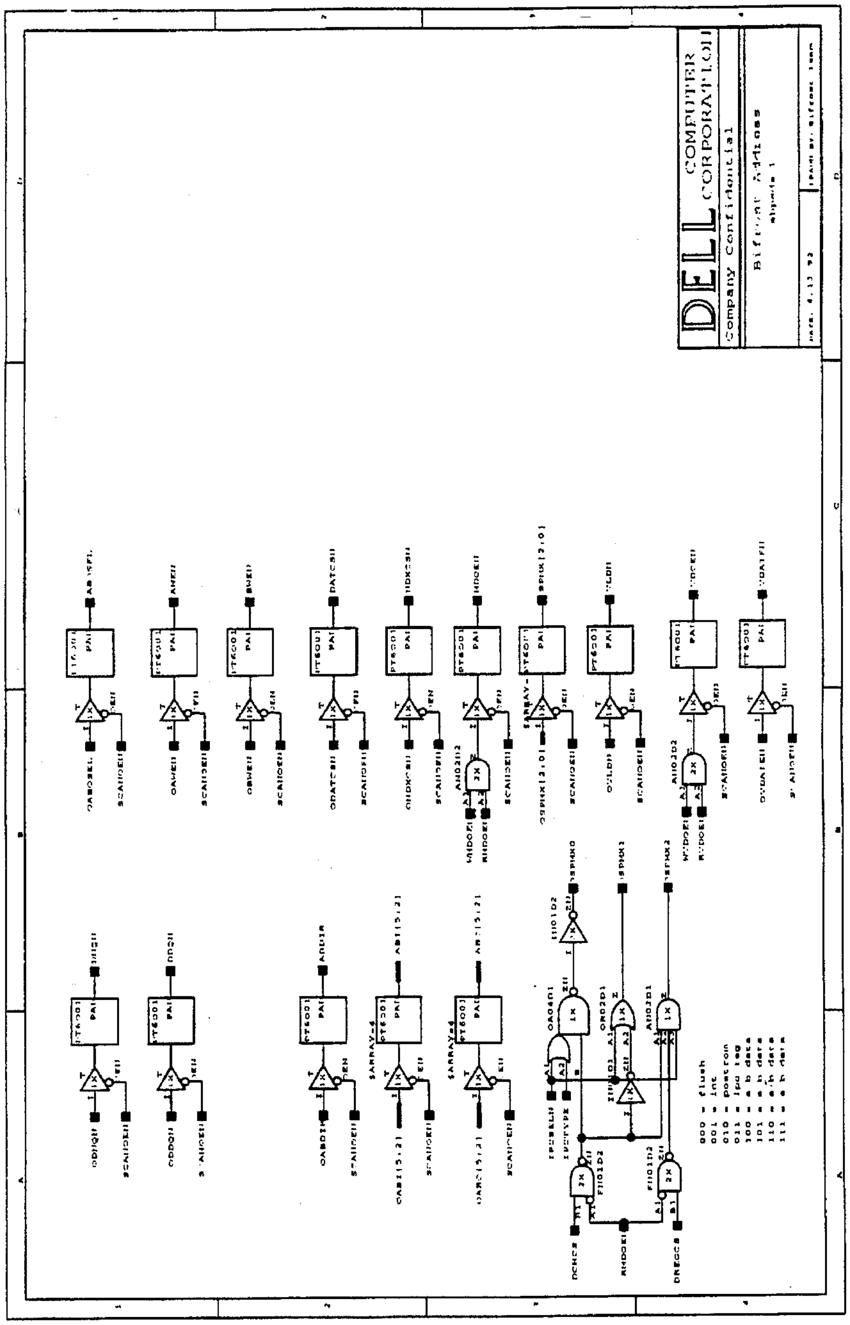
DELL
COMPUTER
CORPORATION
Company Confidential

DELL COMPUTER CORPORATION
Company Confidential

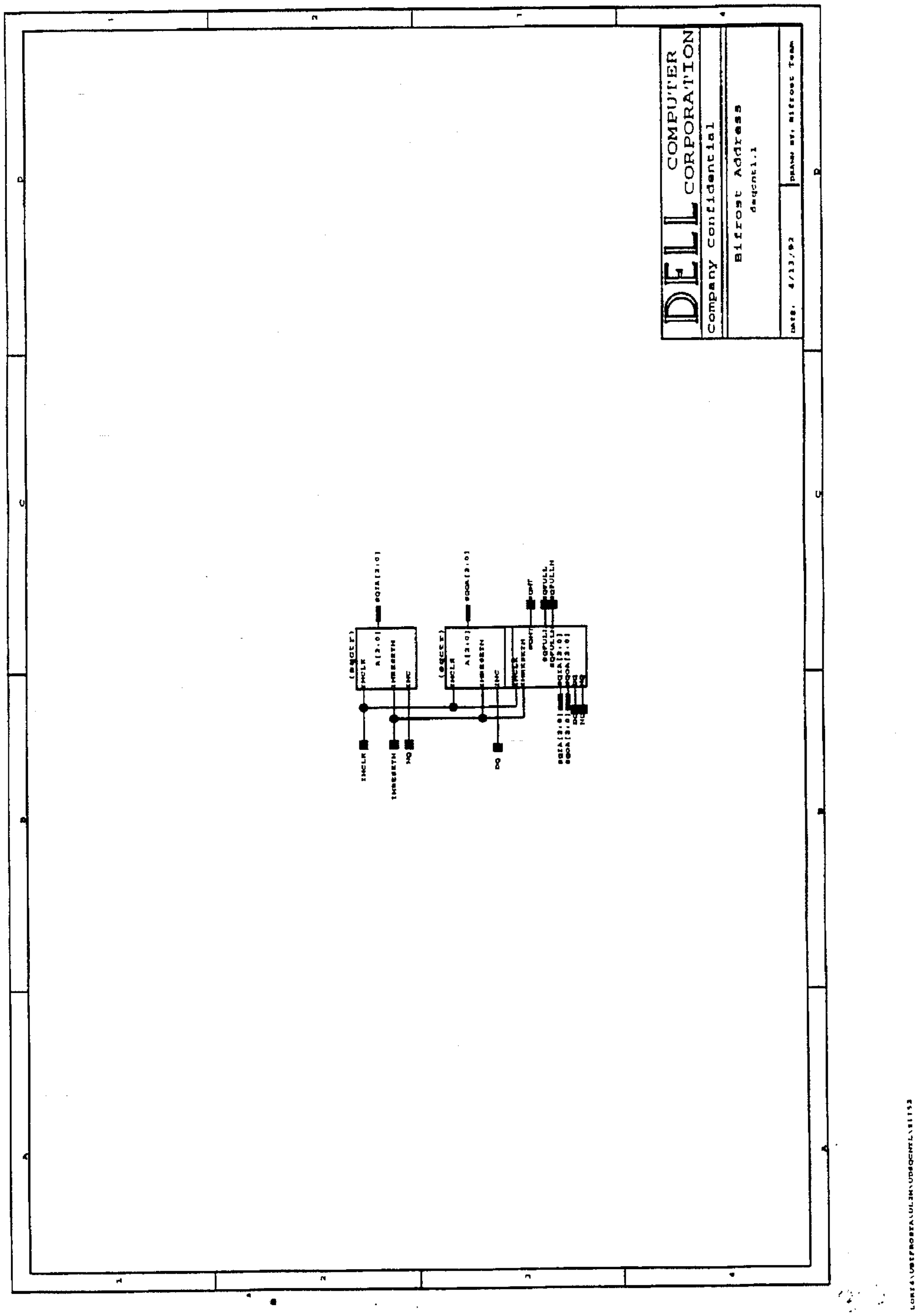
DELL COMPUTER CORPORATION
Company Confidential
Bifrost Address

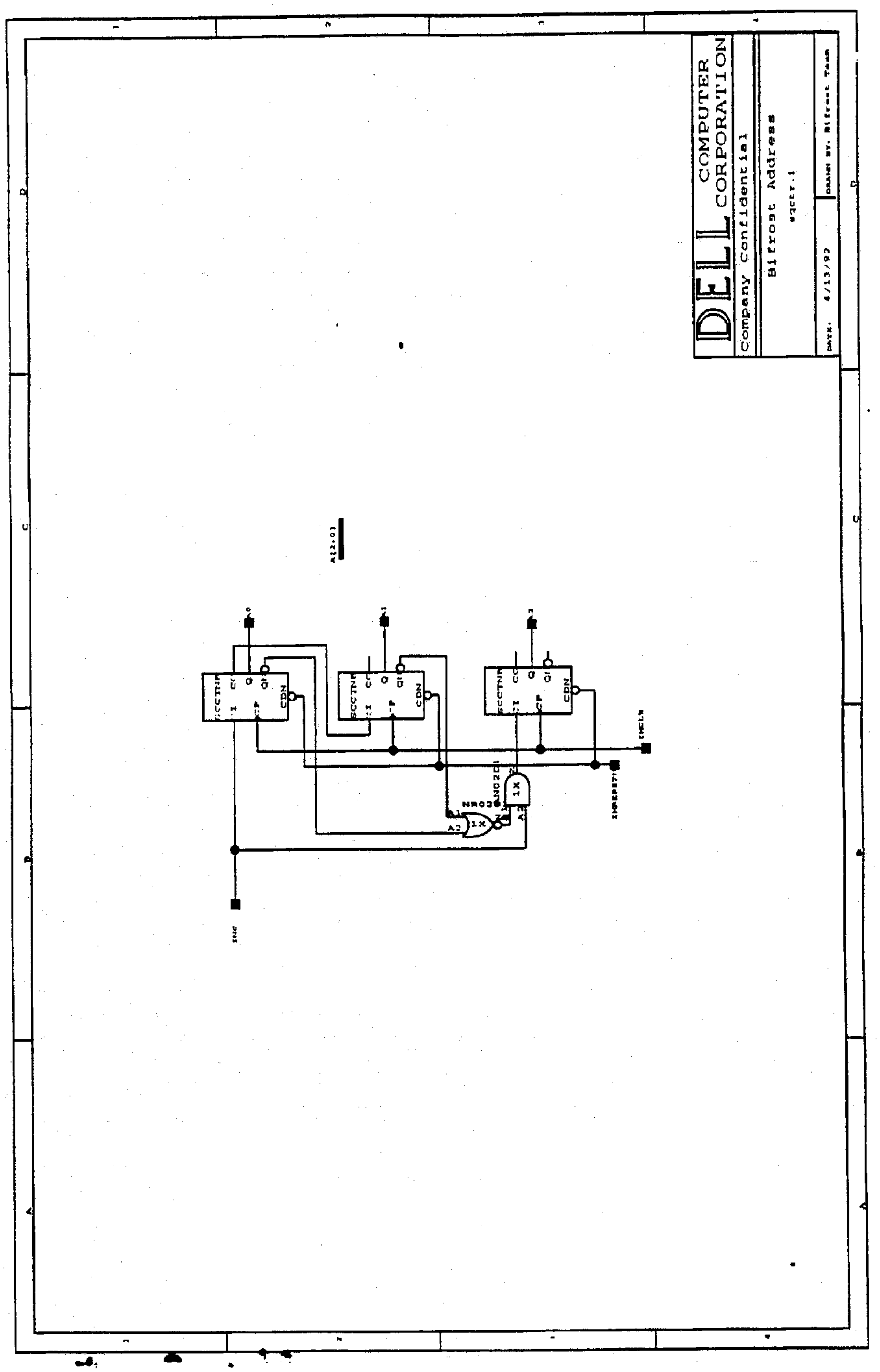
DELL COMPUTER CORPORATION
Company Confidential
Bifrost Address
DATE: 4/13/92
DRAWN BY: Bifrost Team
INC
NR02
AND2
1X

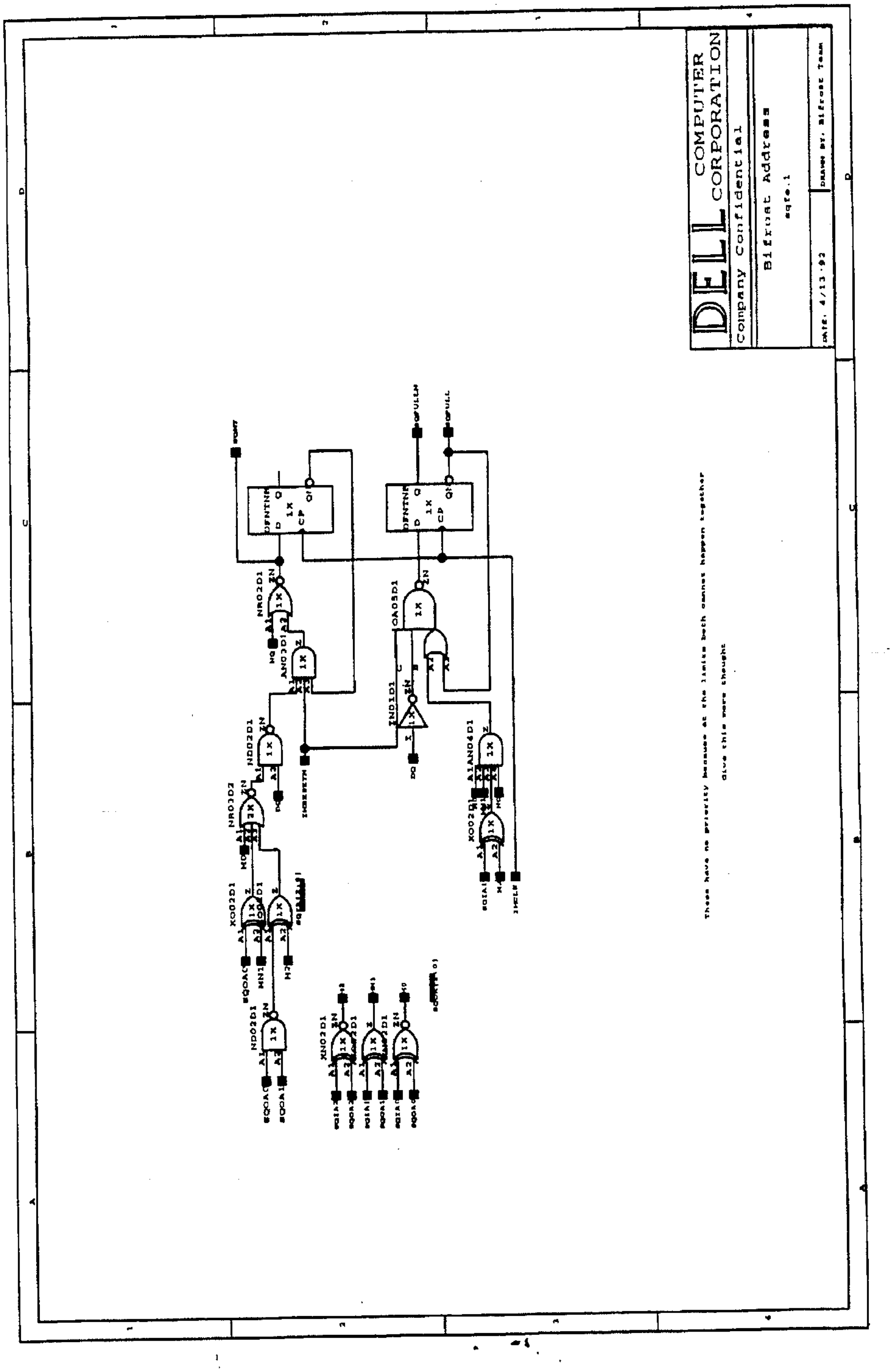
DELL COMPUTER CORPORATION
Company Confidential
Bifrost Address
sqfe.1
DATE: 4/13/92
DRAWN BY: Bifrost Team

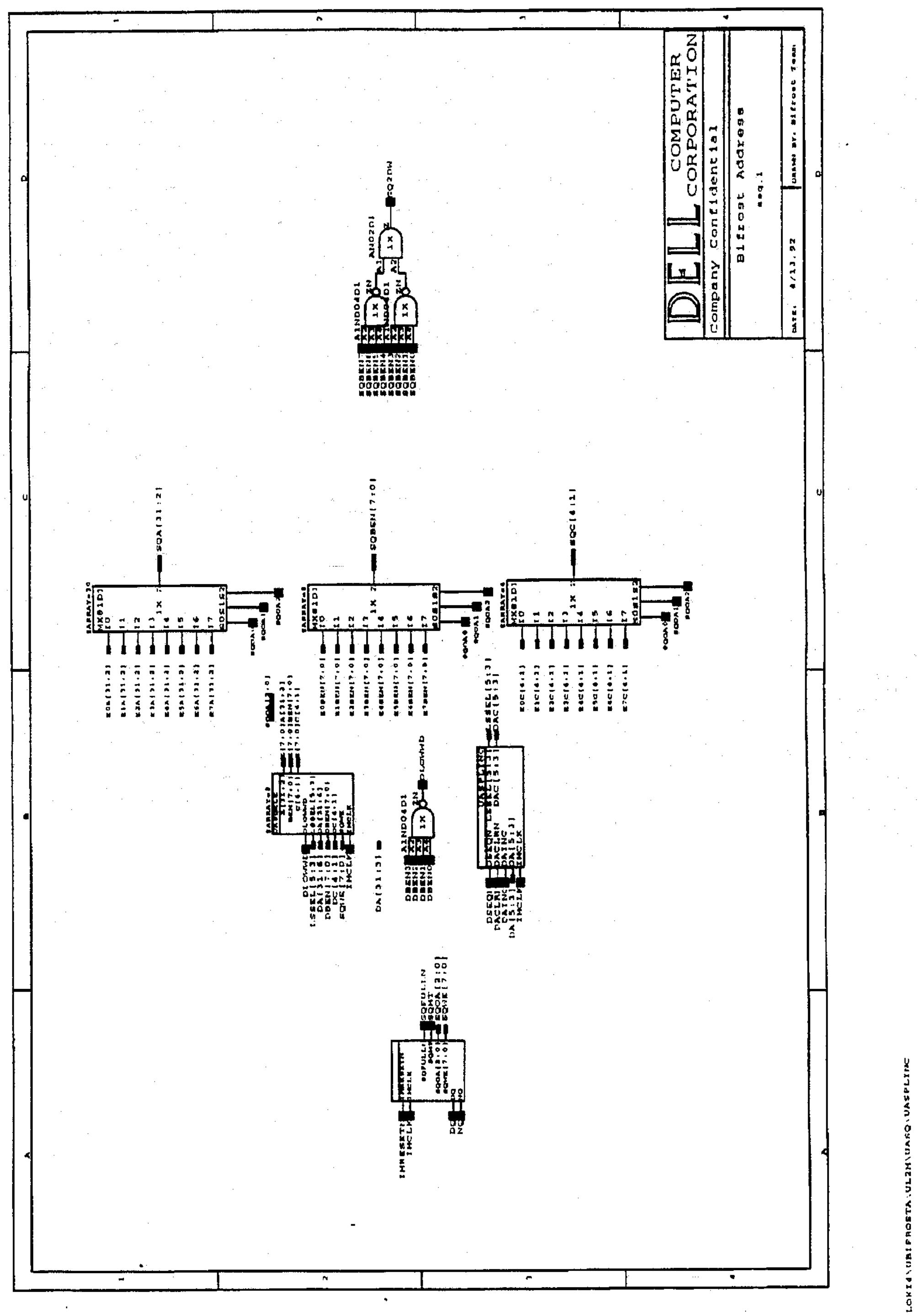
DELL COMPUTER CORPORATION
Company Confidential
Bifrost Address

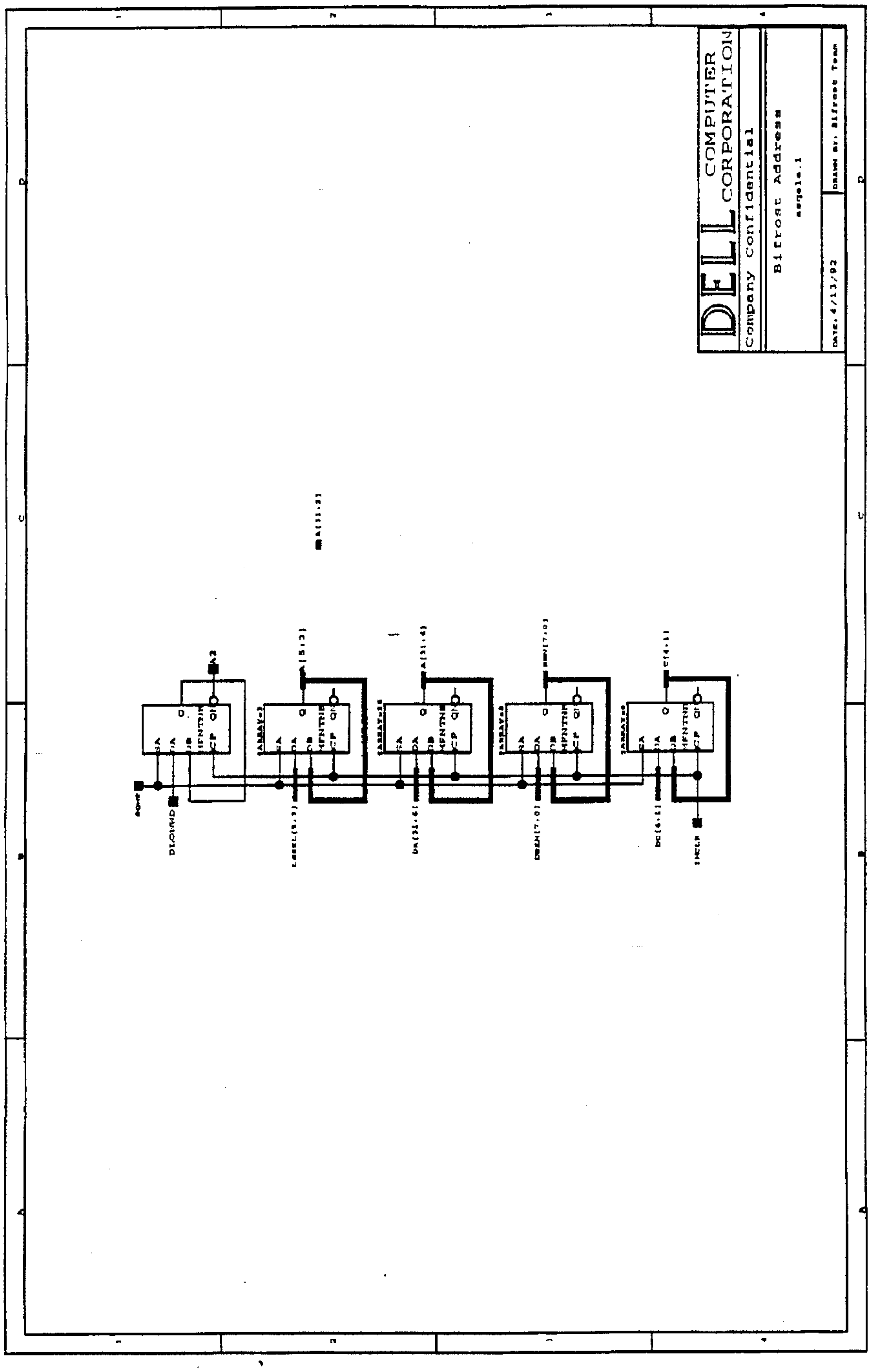
DELL COMPUTER CORPORATION
Company Confidential
Bifrost Address
DATE: 4/13/92
DRAWN BY: Bifrost Team

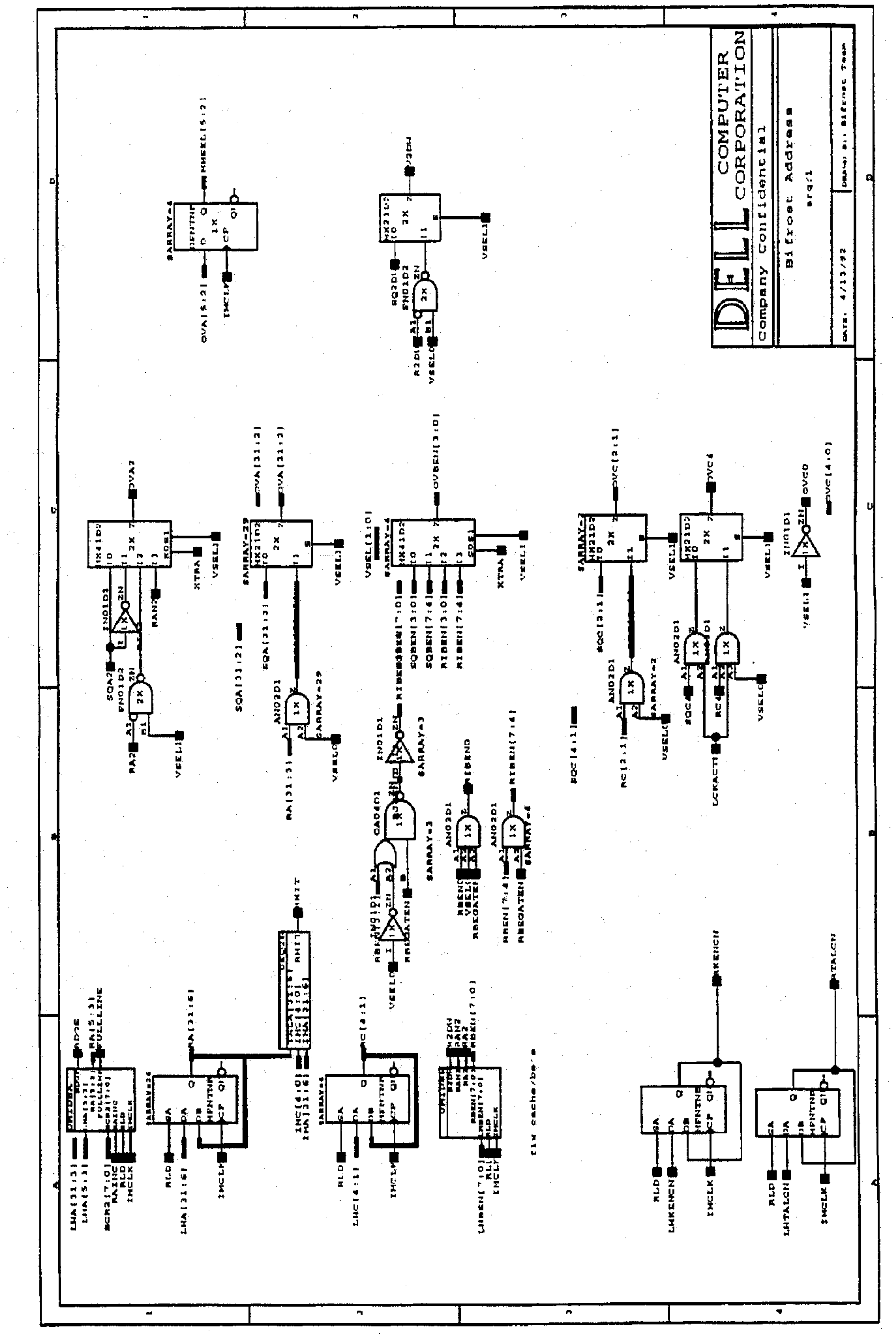
DELL
COMPUTER CORPORATION
Company Confidential
Bifrost Address

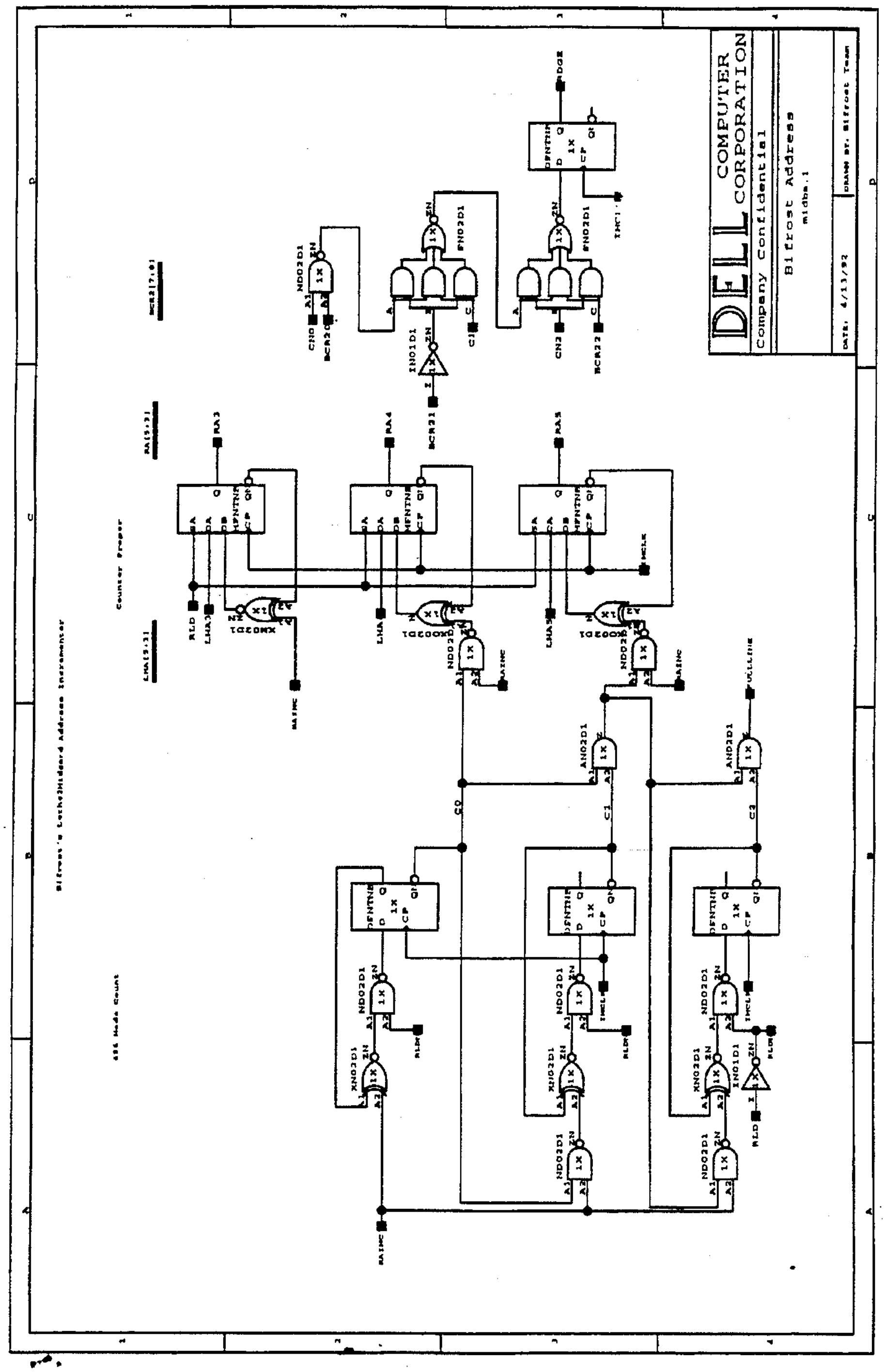
DELL COMPUTER CORPORATION
Company Confidential
Bifrost Address
DRAWN BY: Bifrost Team

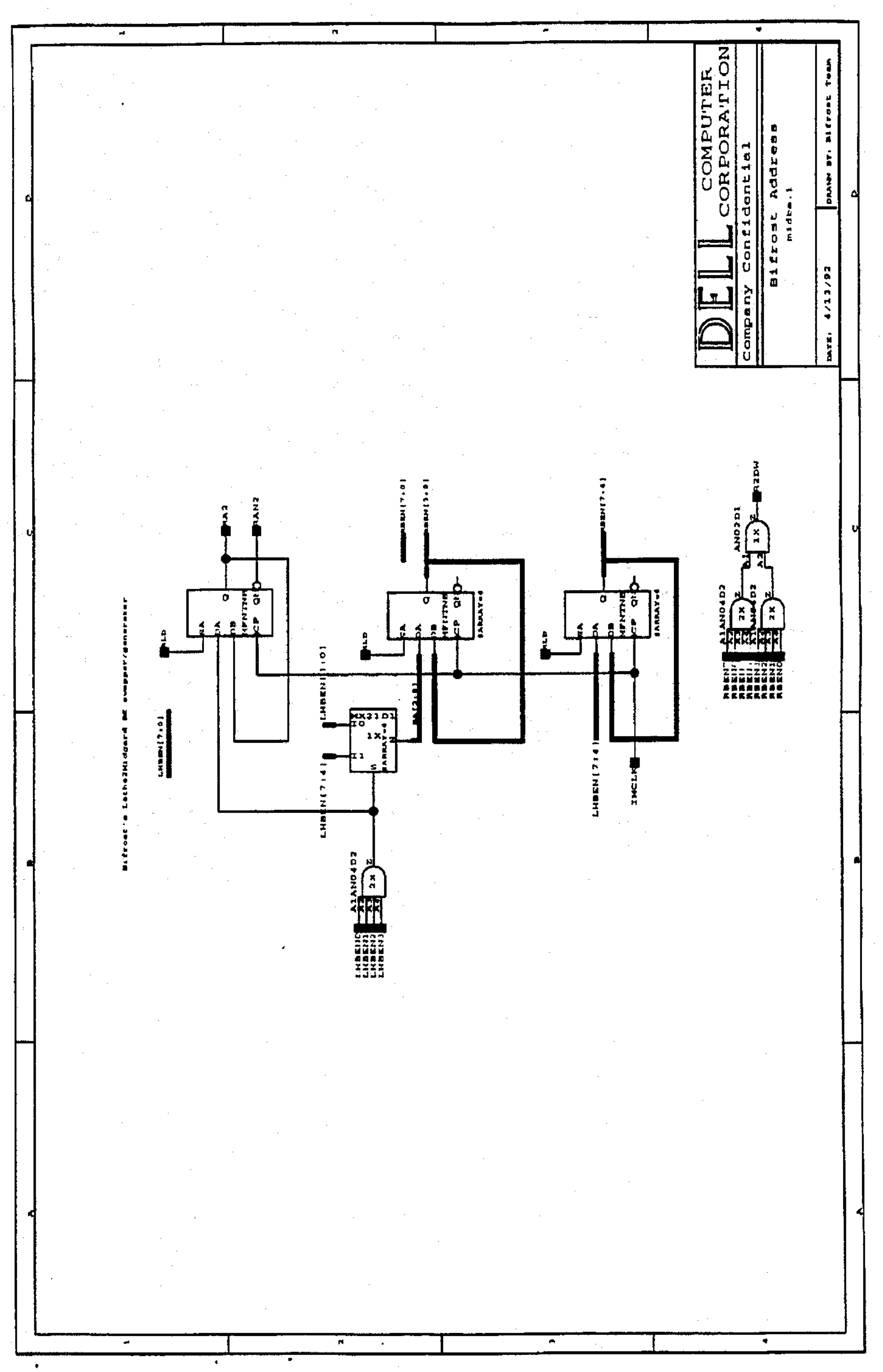
DELL COMPUTER CORPORATION
Company Confidential
Bifrost Address
DATE: 4/13/92
DRAWN BY: Bifrost Team

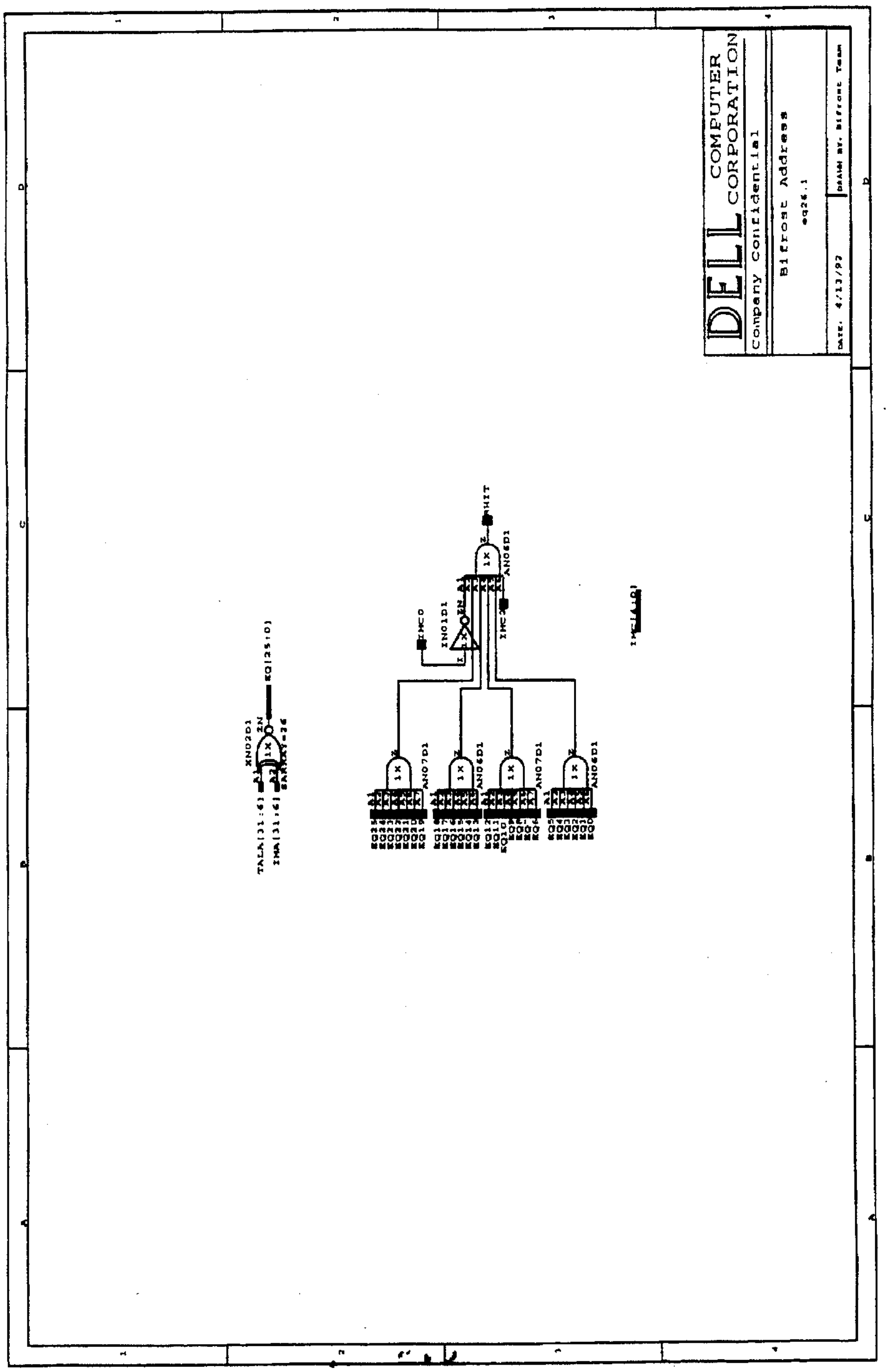
DELL COMPUTER CORPORATION
Company Confidential
Bifrost Address
eq26.1
DATE: 4/13/92
DRAWN BY: Bifrost Team

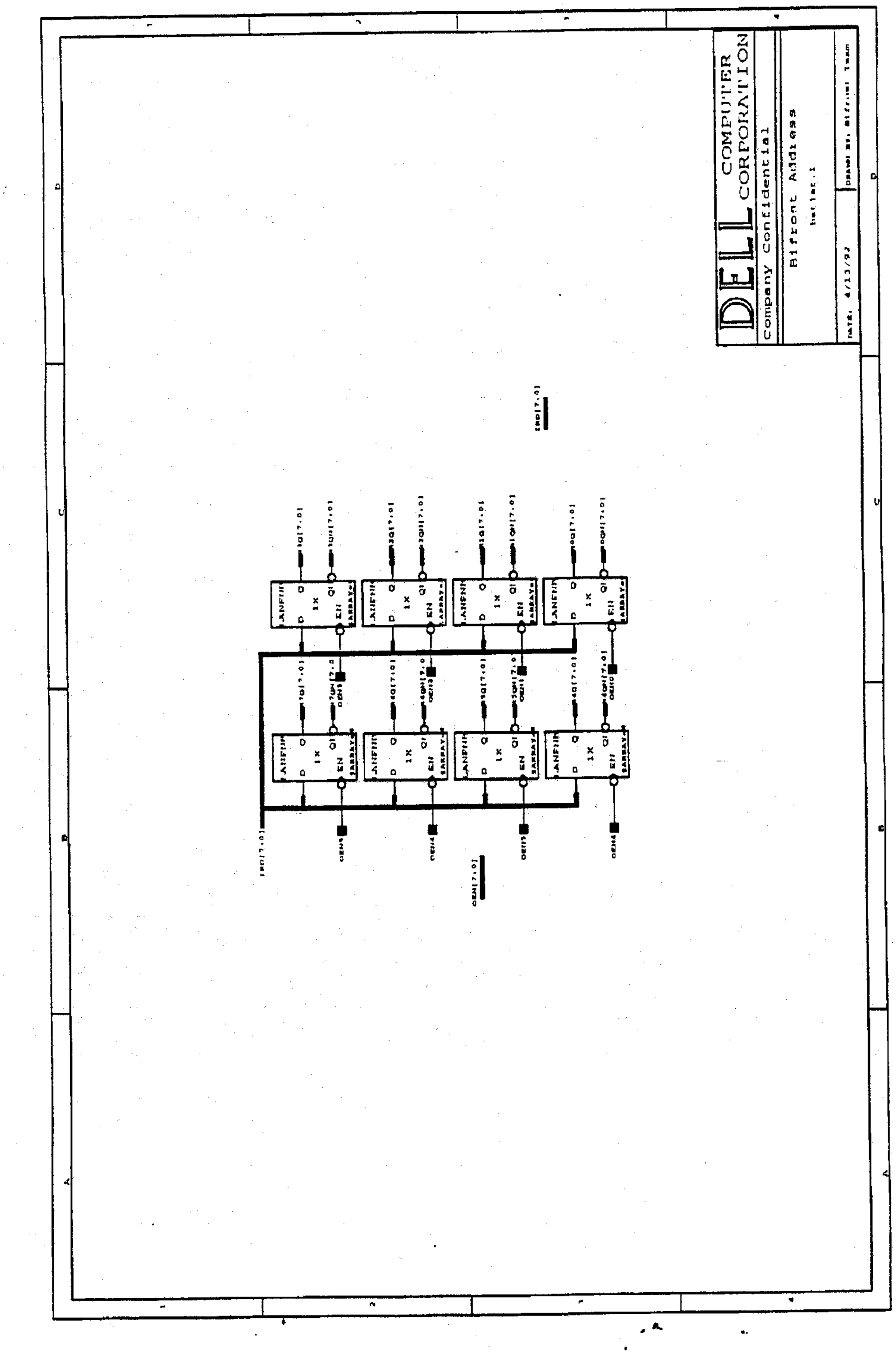
DELL COMPUTER CORPORATION
Company Confidential
Bifront Address
DATE: 4/13/92

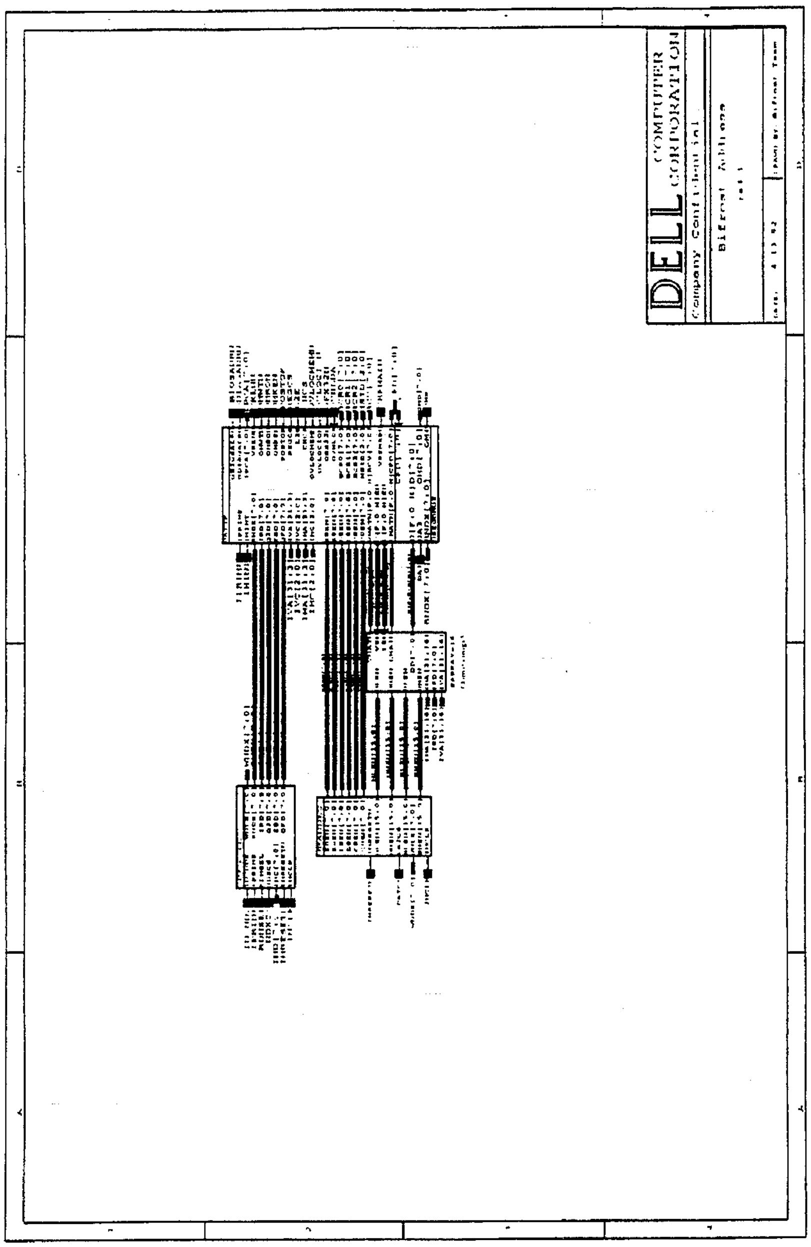
DELL COMPUTER CORPORATION
Company Confidential

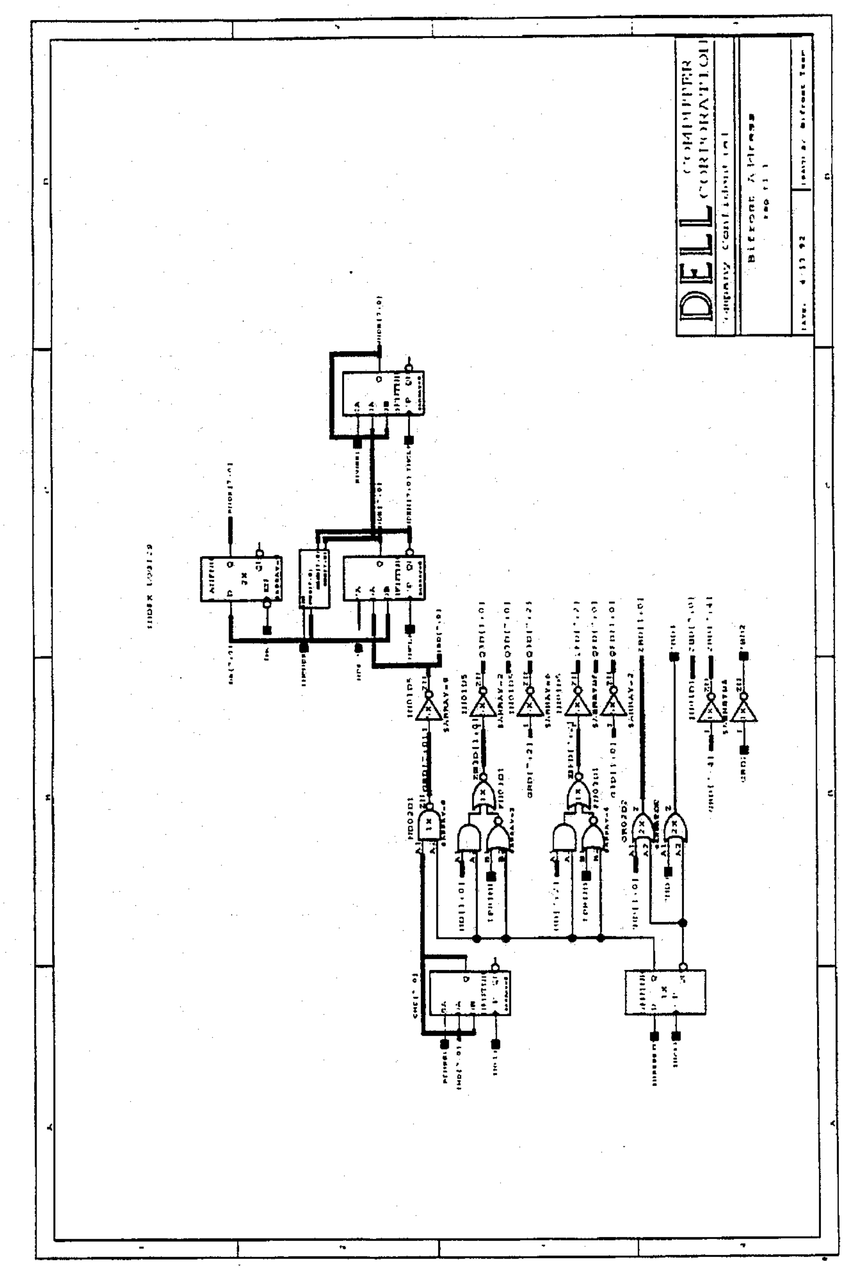
DELL
COMPUTER CORPORATION

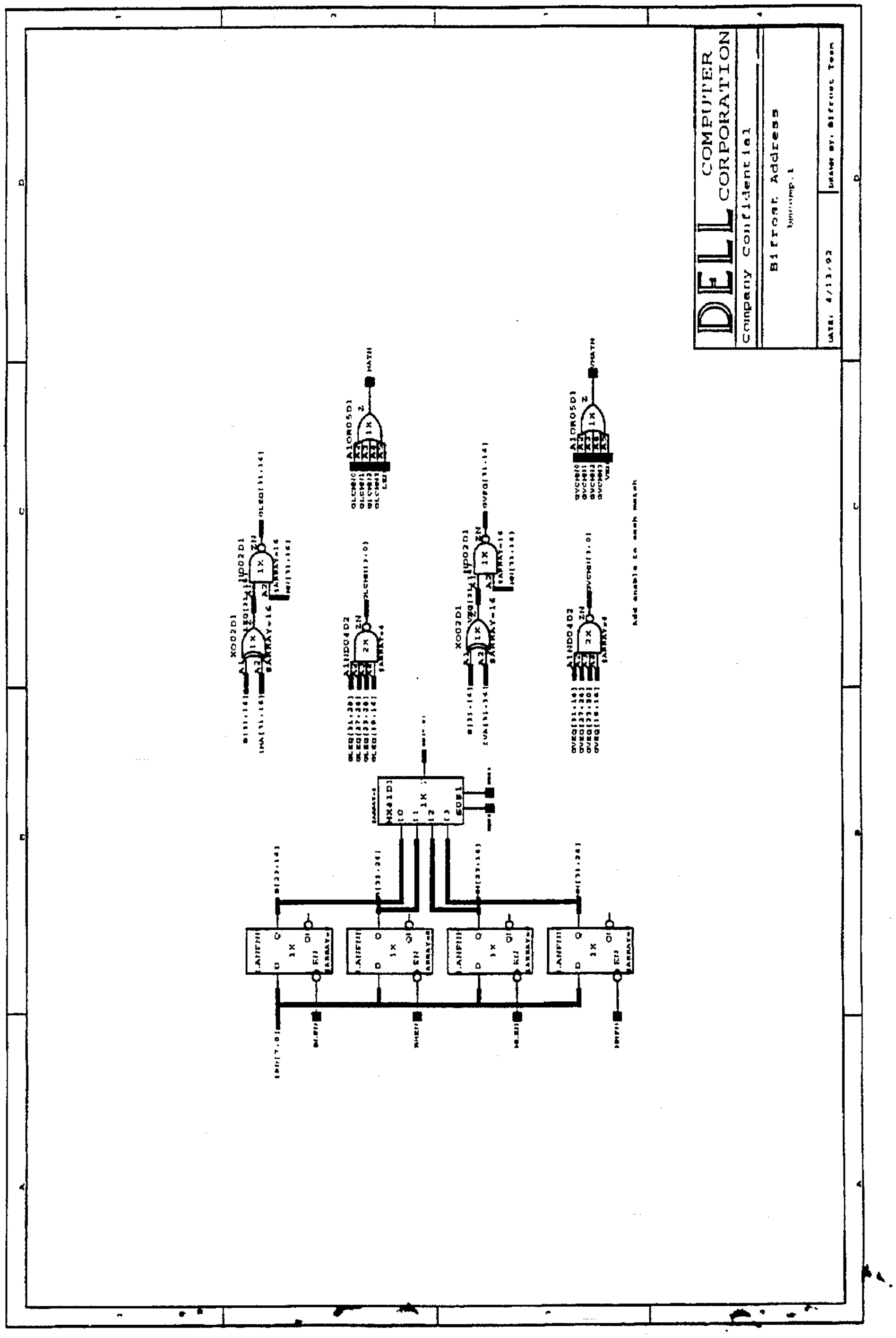
DELL COMPUTER CORPORATION
Company Confidential
Bifrost Address
DATE: 4/13/92
DRAWN BY: Bifrost Team
Add enable to each match

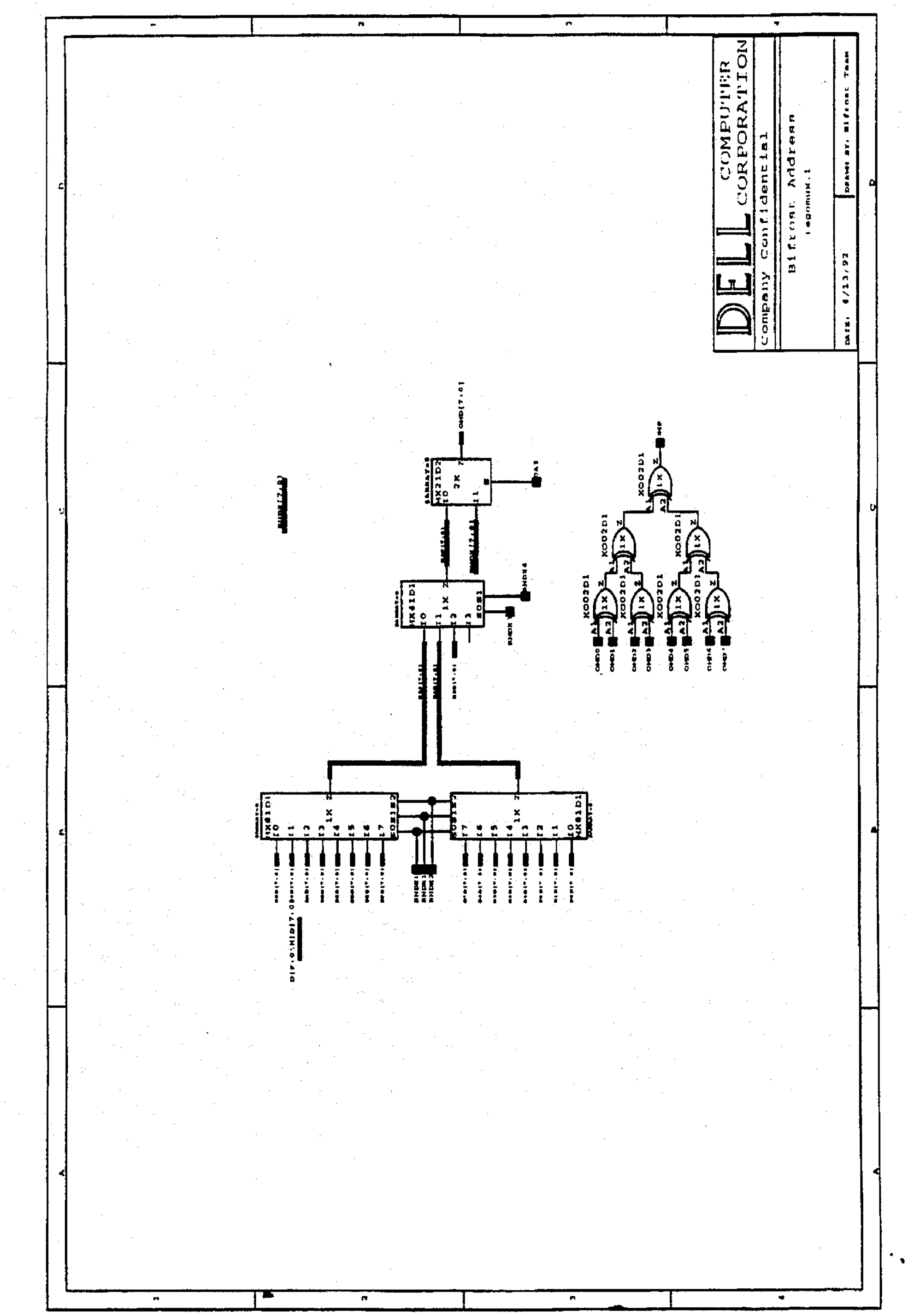
DELL COMPUTER CORPORATION
Company Confidential
Bifrost Address
DATE: 4/13/92
Drawn By: Bifrost Team

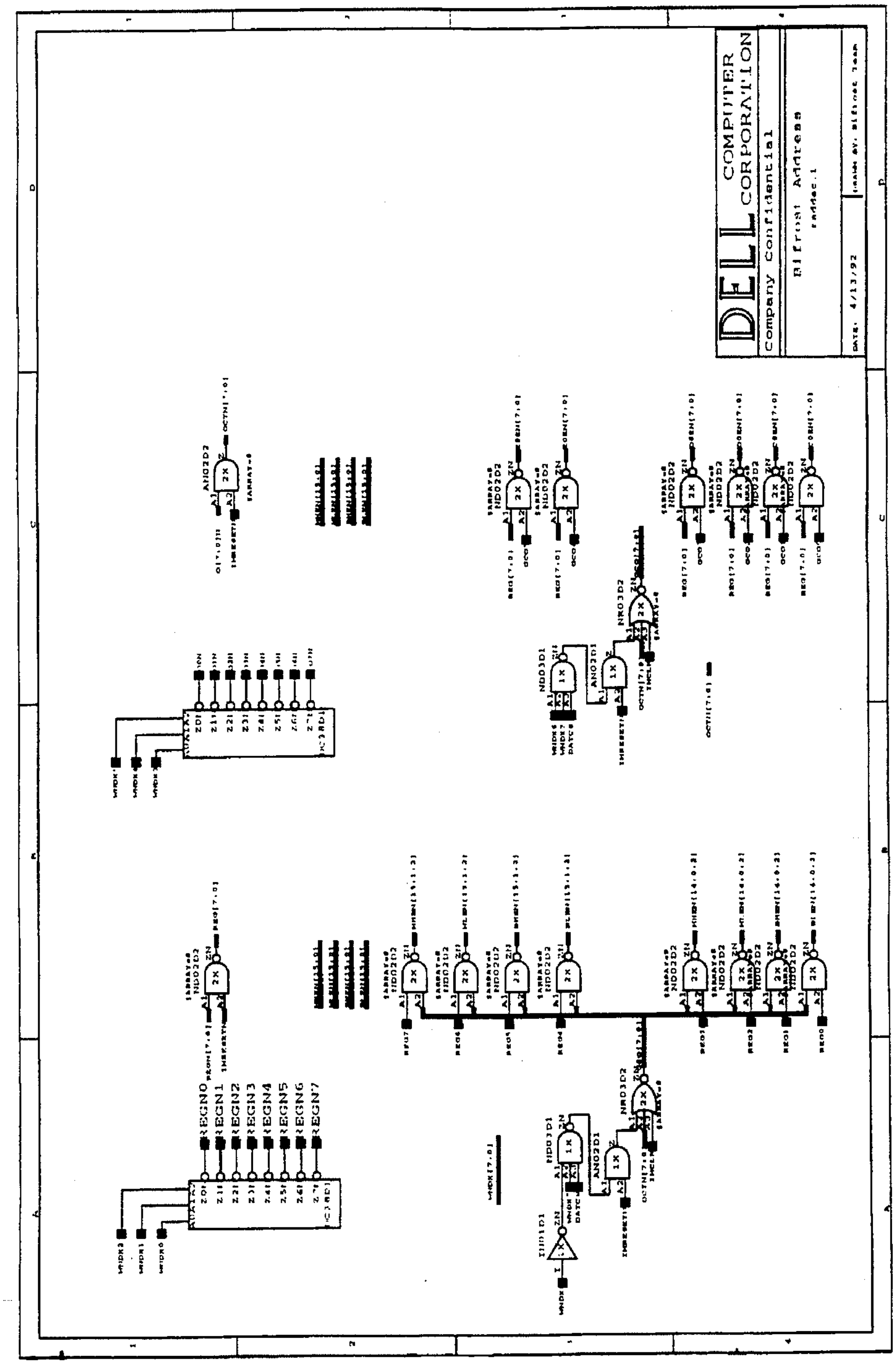
DELL COMPUTER CORPORATION
Company Confidential
REGN0
REGN1
REGN2
REGN3
REGN4
REGN5
REGN6
REGN7

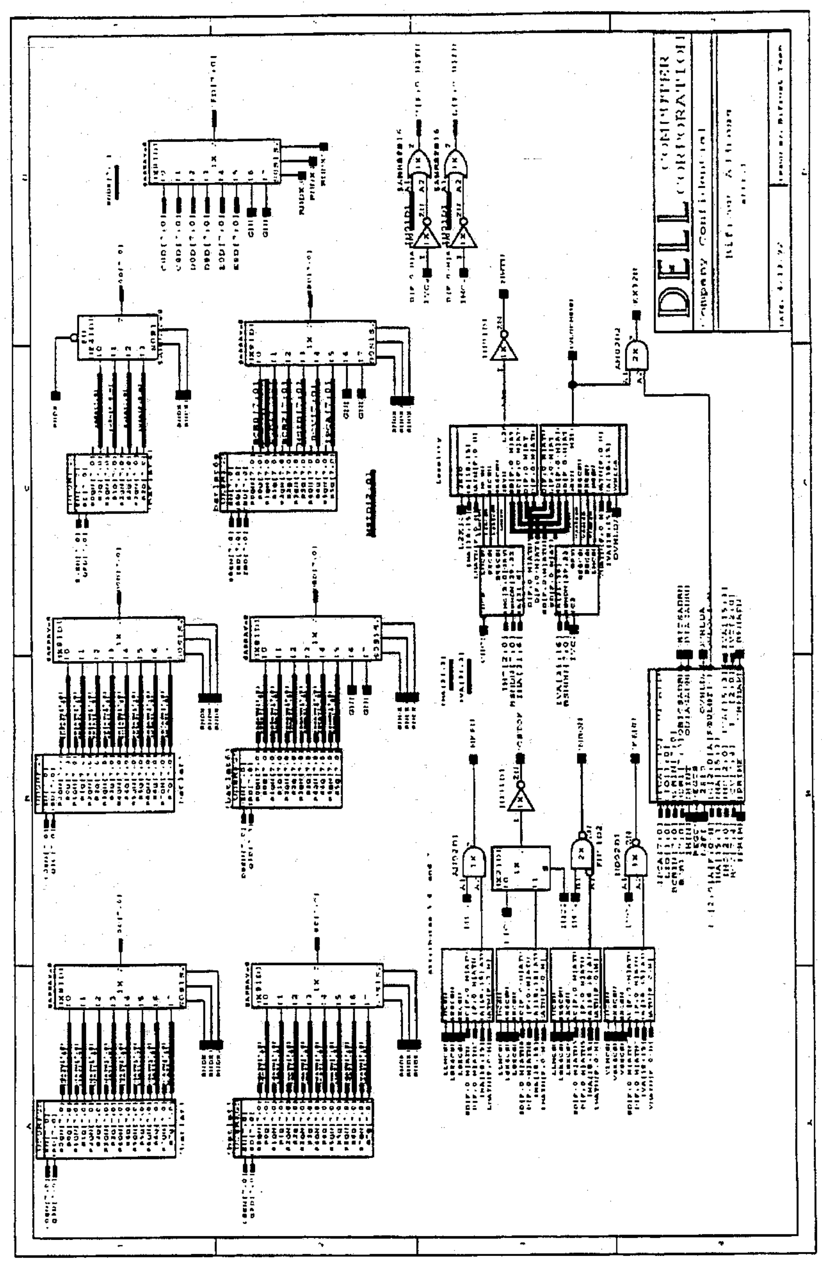
DELL
COMPUTER CORPORATION

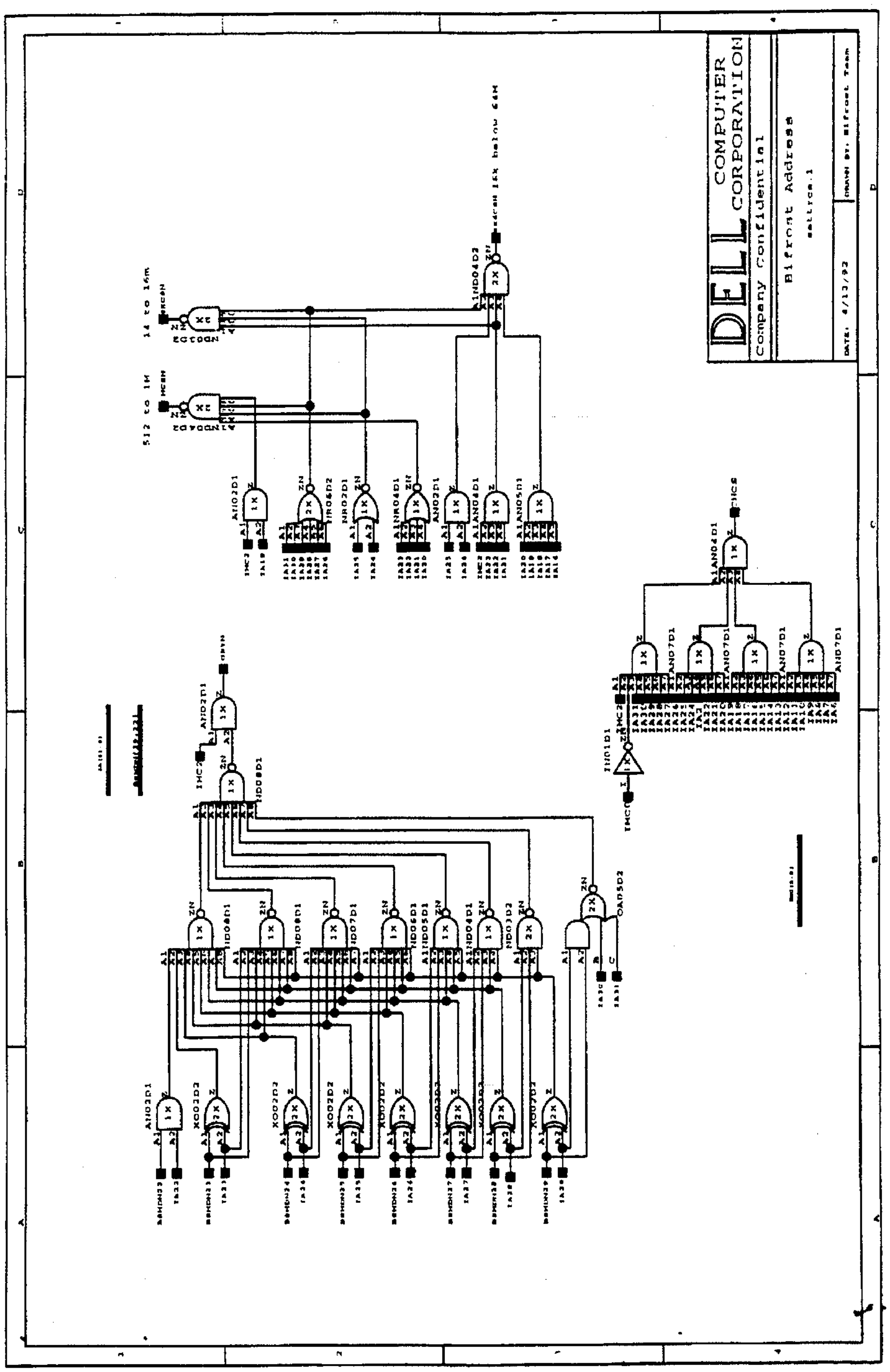
DELL COMPUTER CORPORATION
Company Confidential
Bifront Address

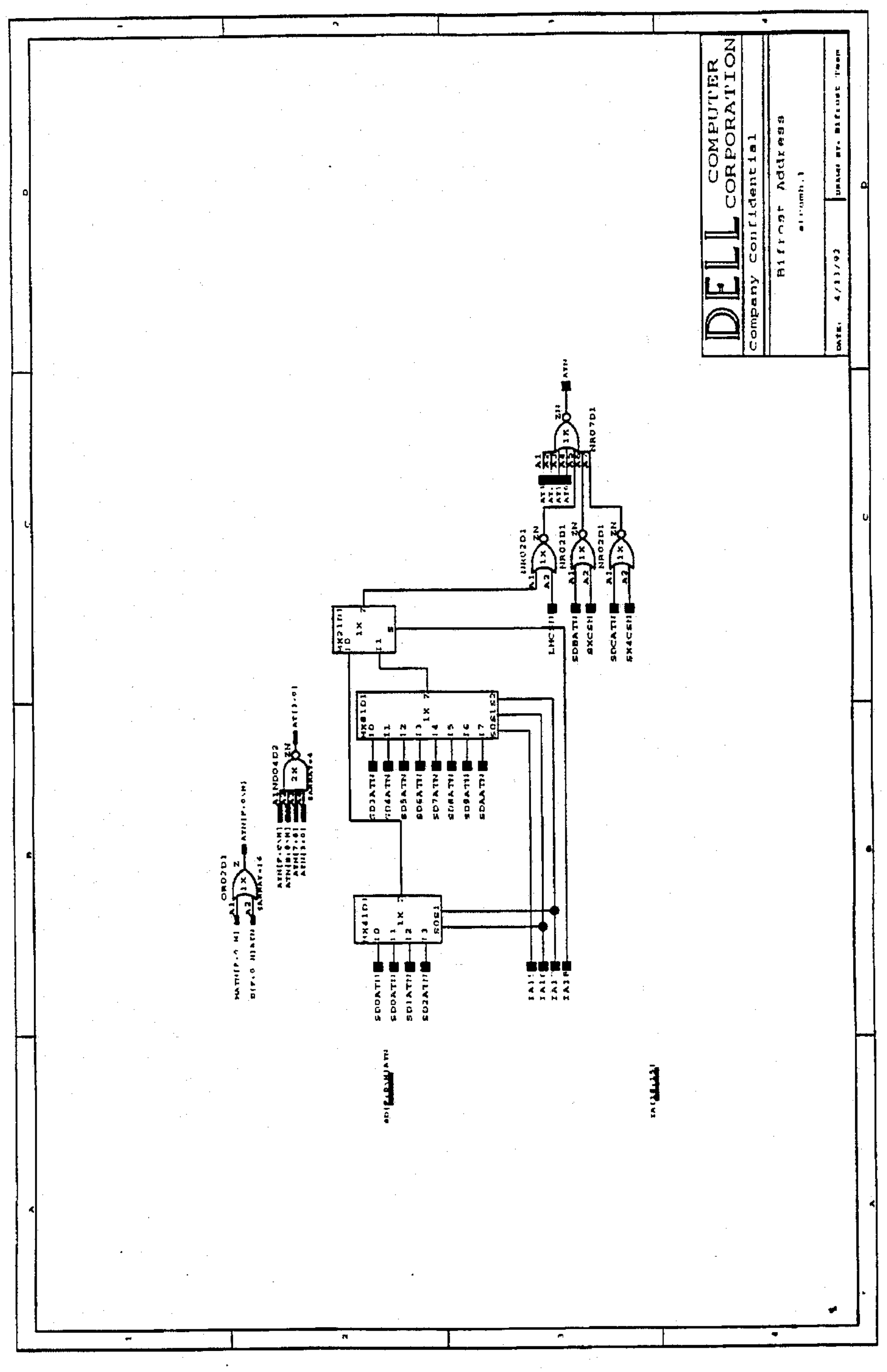
DELL COMPUTER CORPORATION
Company Confidential
Bifrost Address

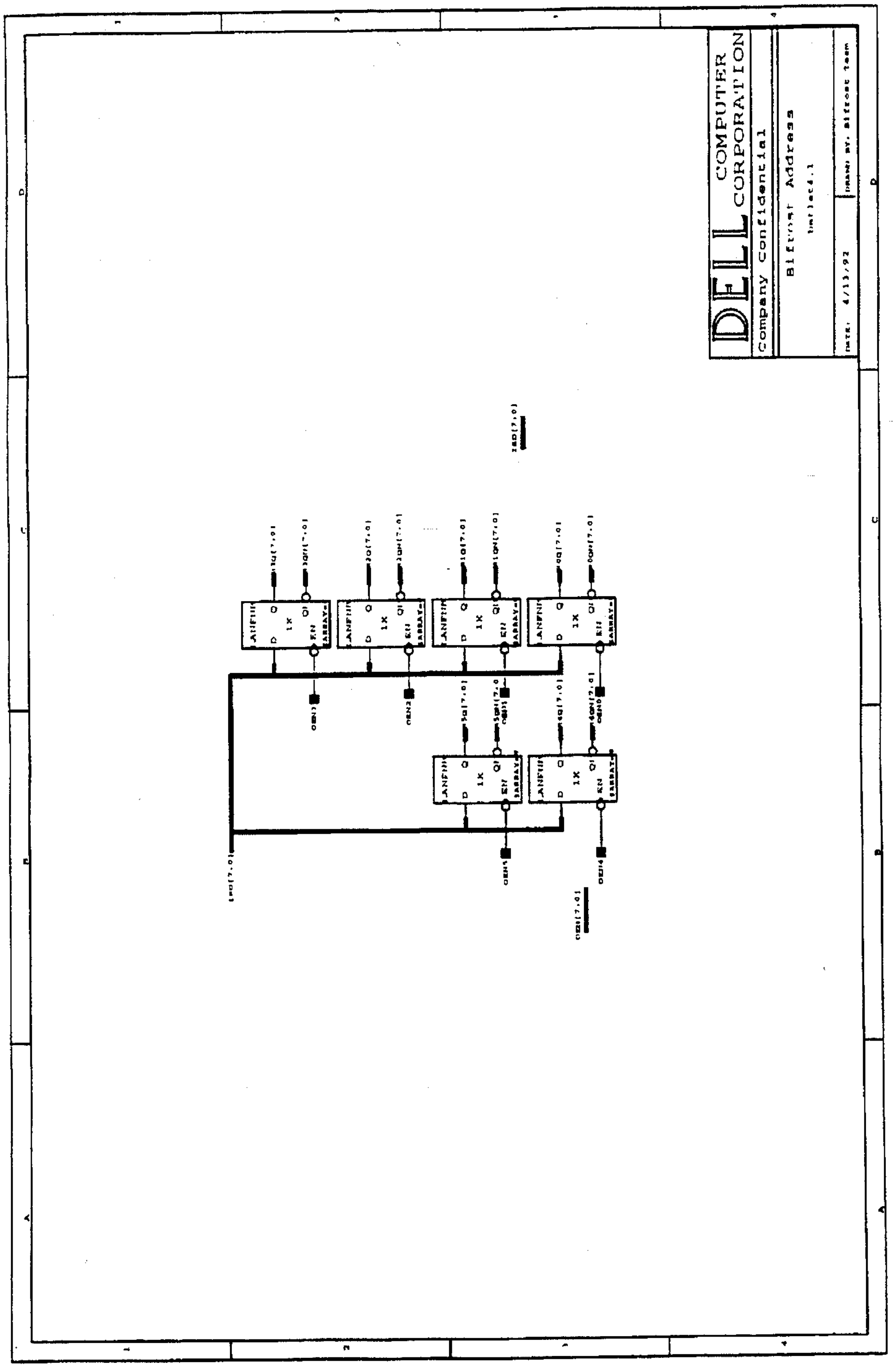
DELL
COMPUTER
CORPORATION
Company Confidential
Bifrost Address

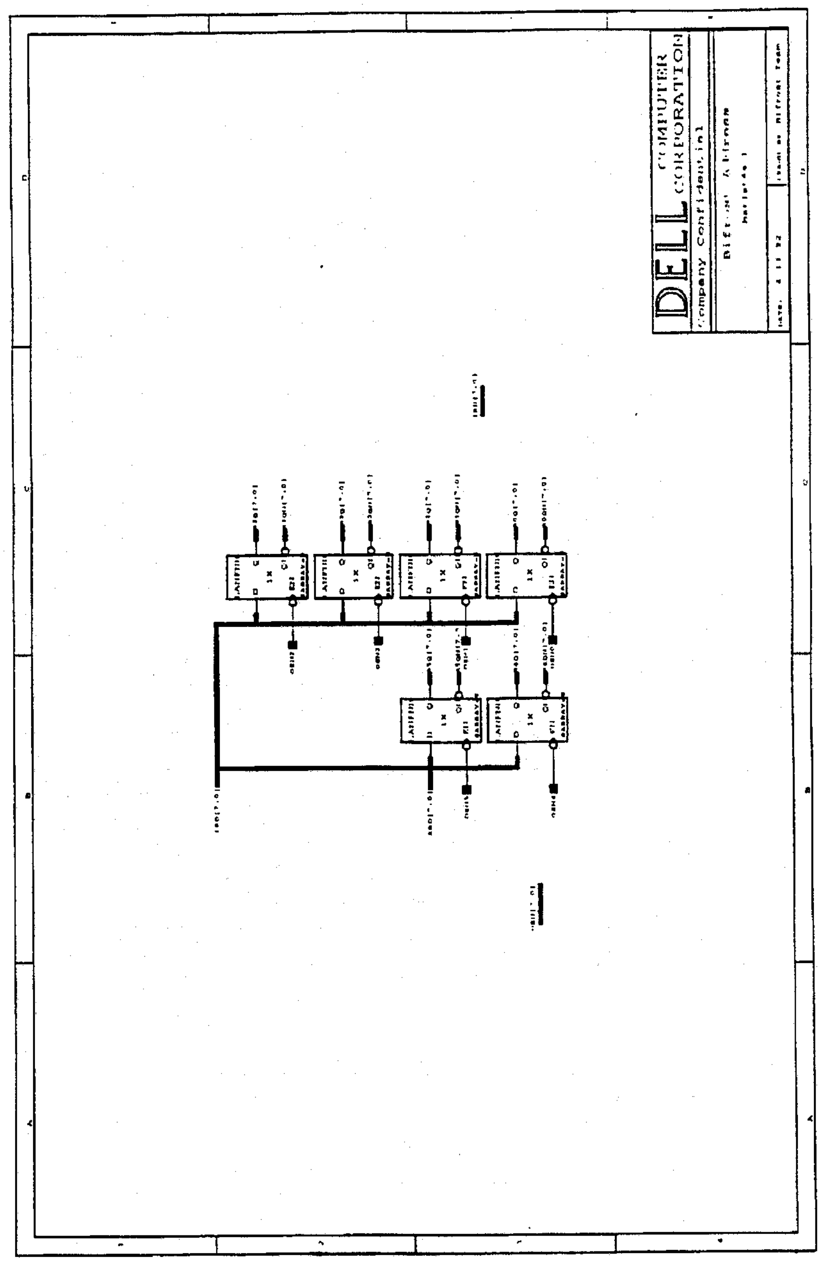
DELL COMPUTER CORPORATION
Company Confidential

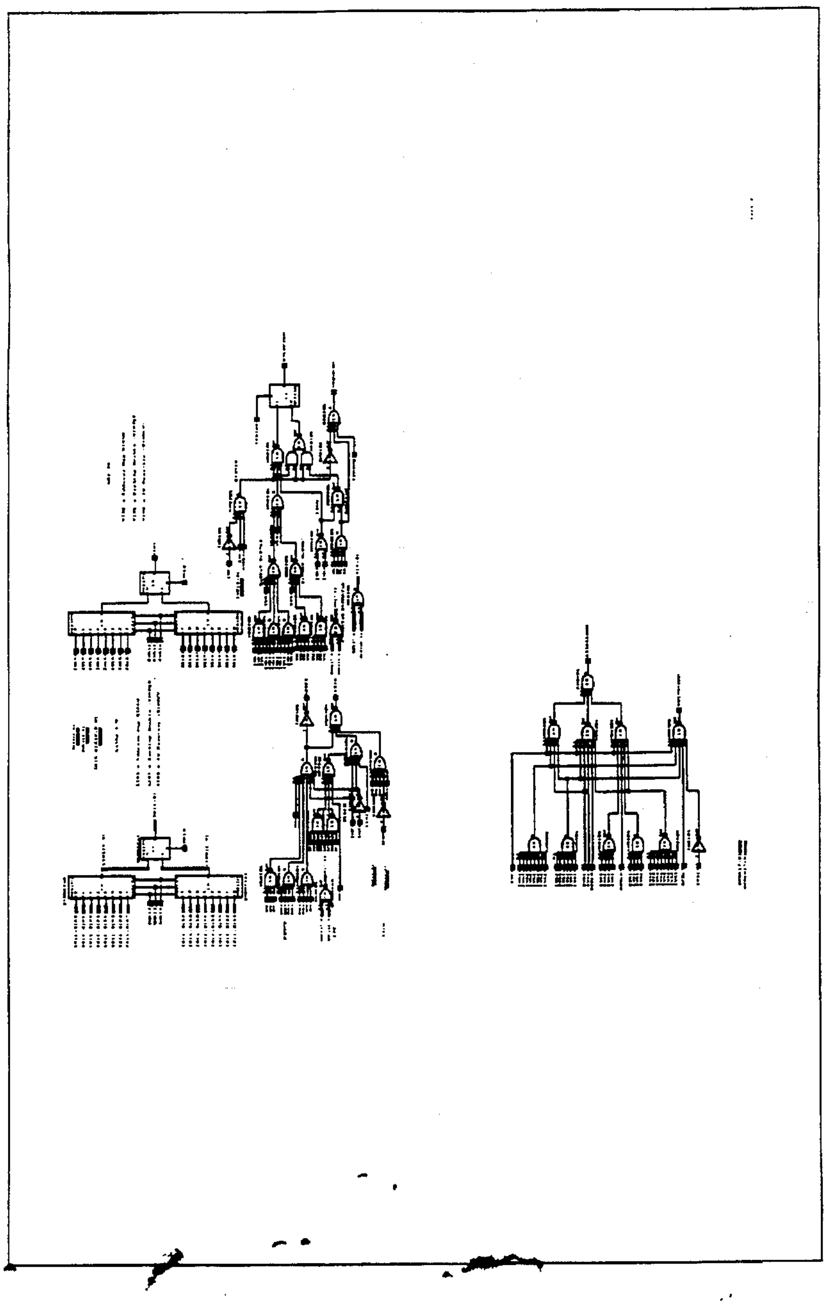

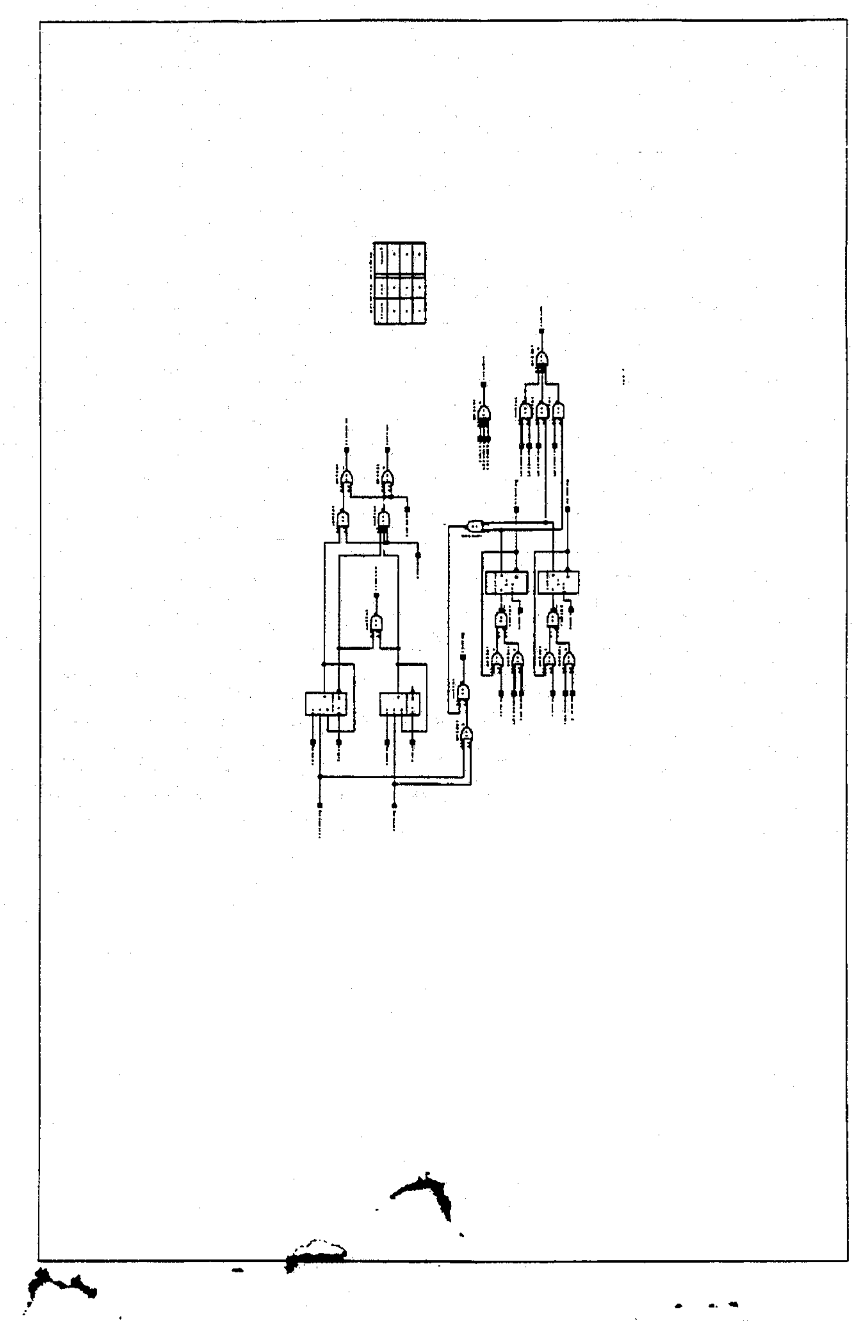

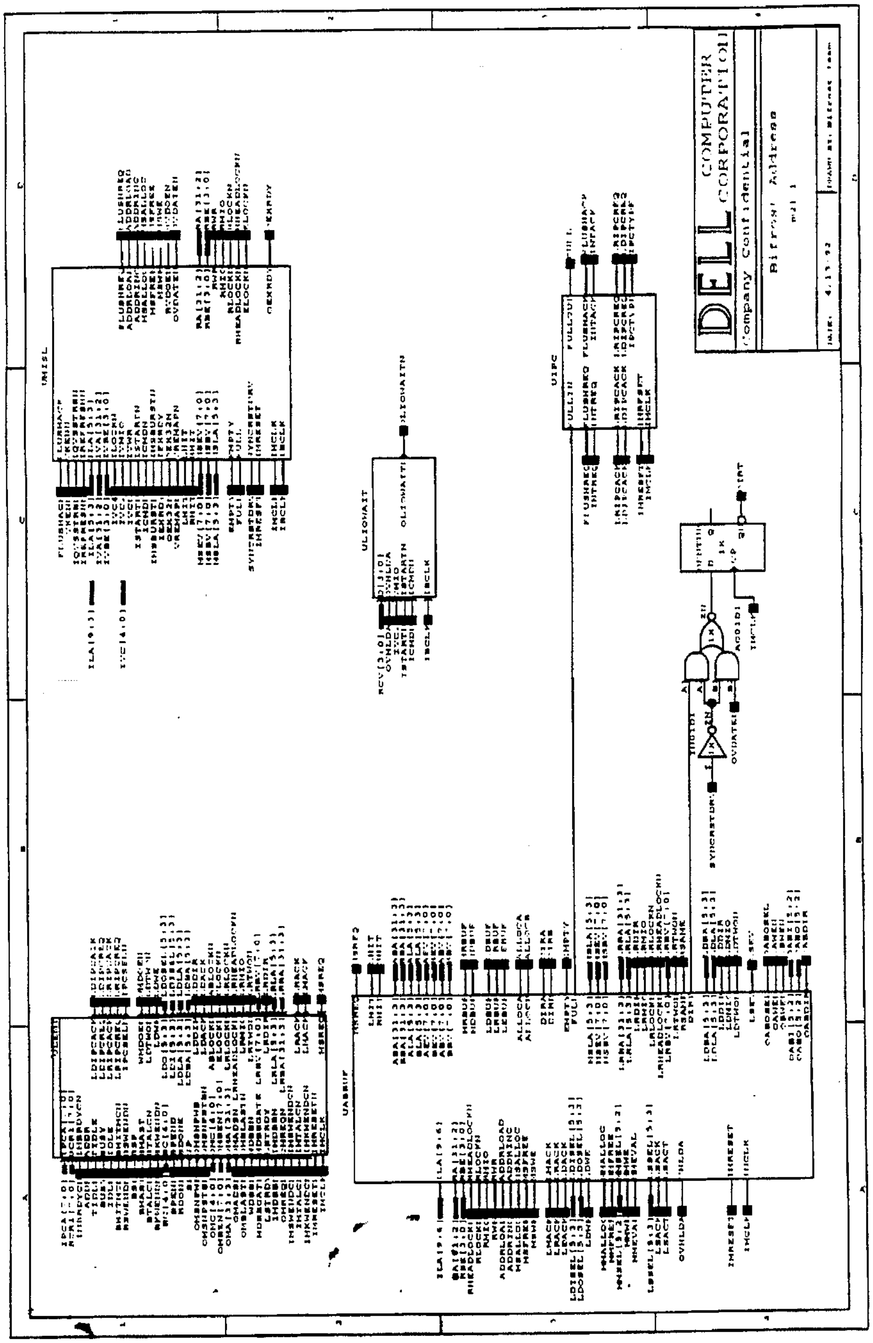
DELL COMPUTER CORPORATION
Company Confidential

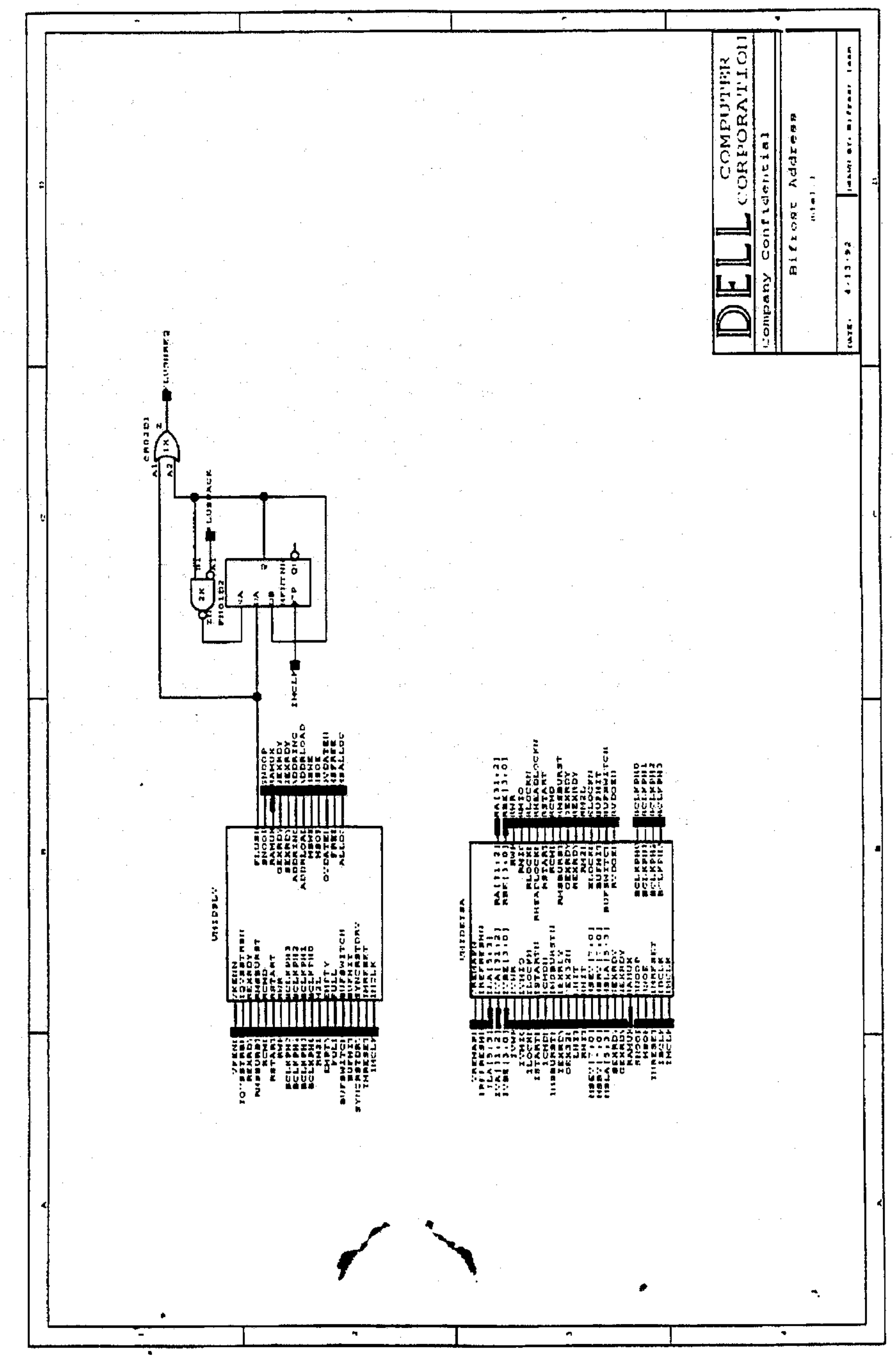

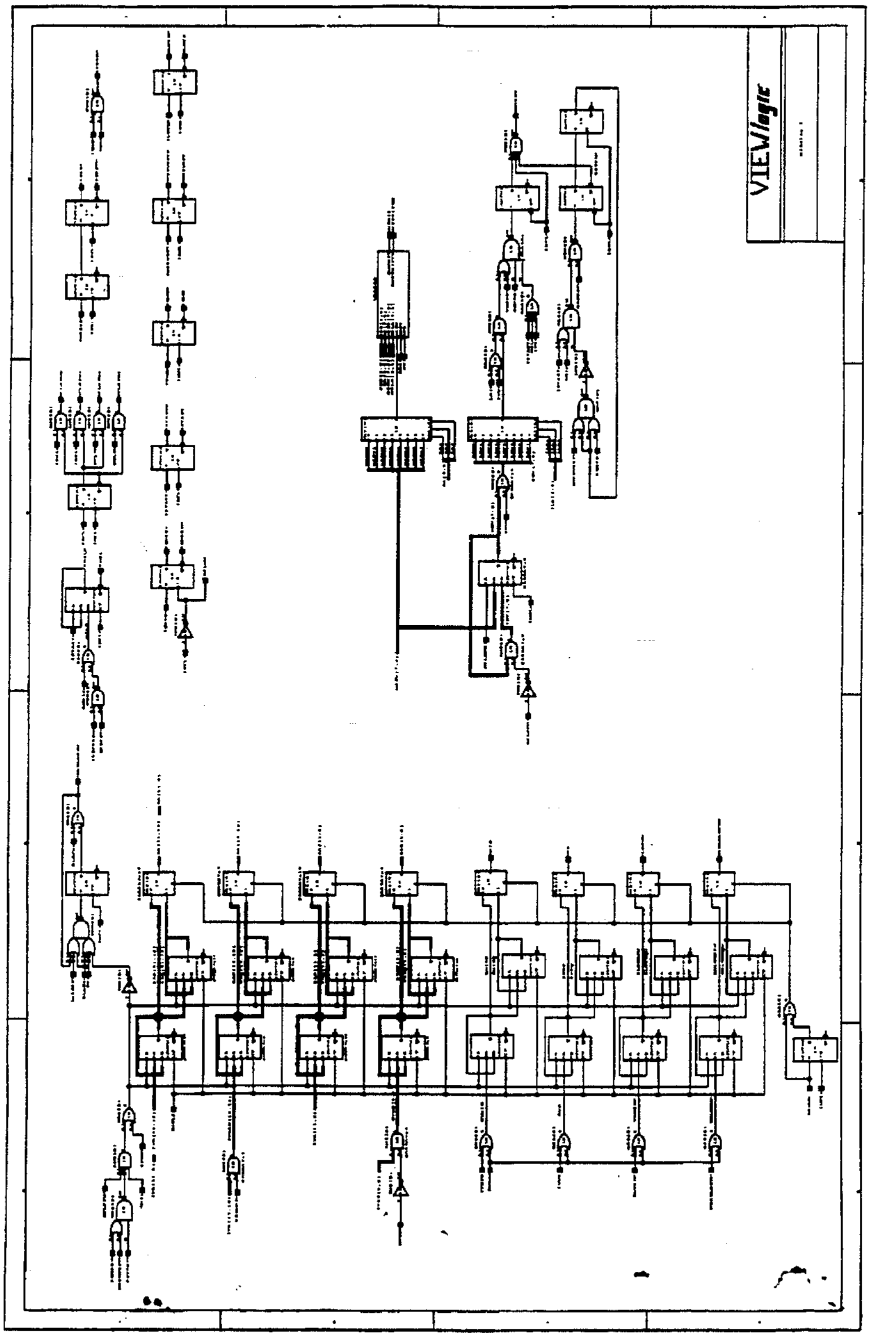
VIEWlogic

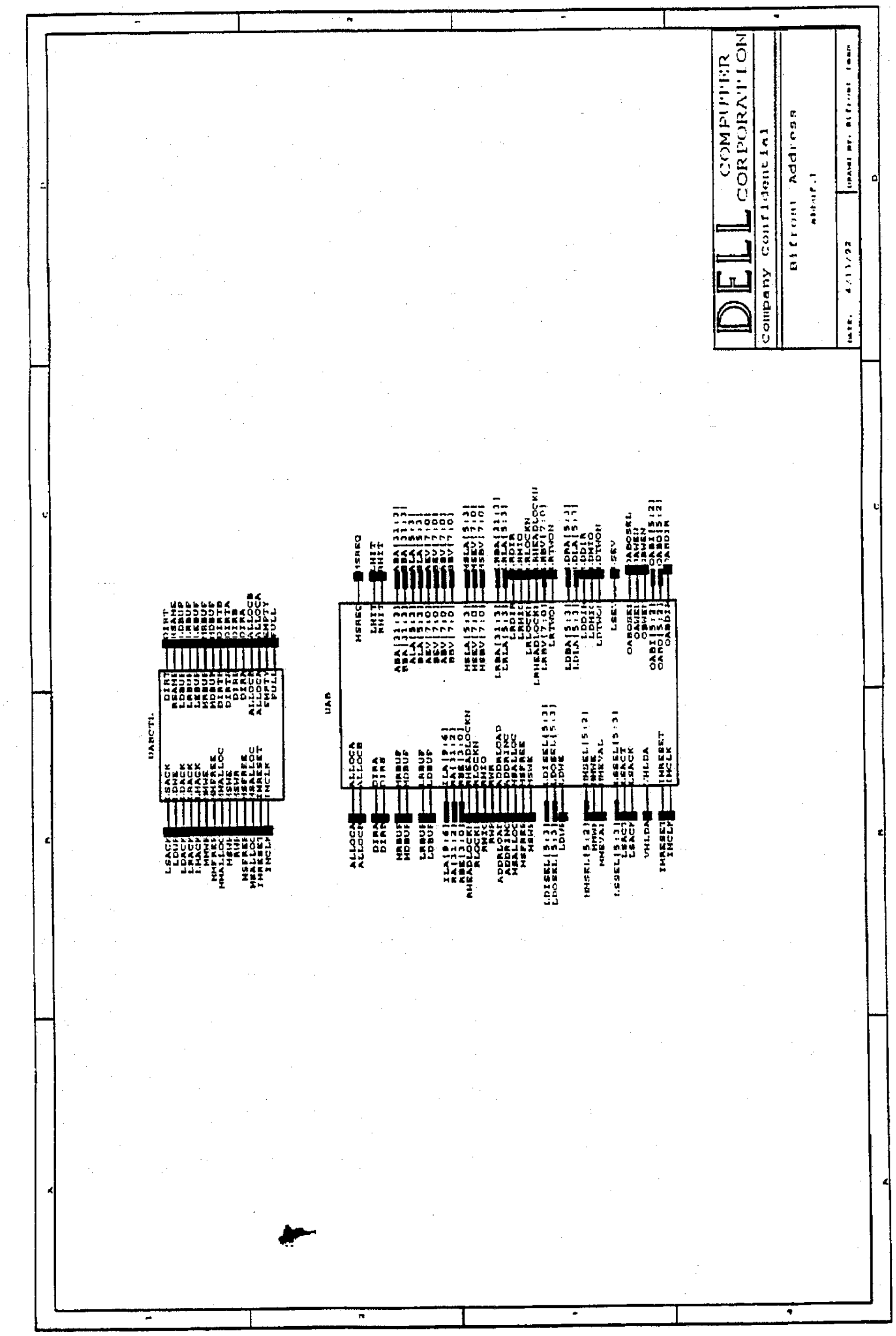
DELL COMPUTER CORPORATION
Company Confidential

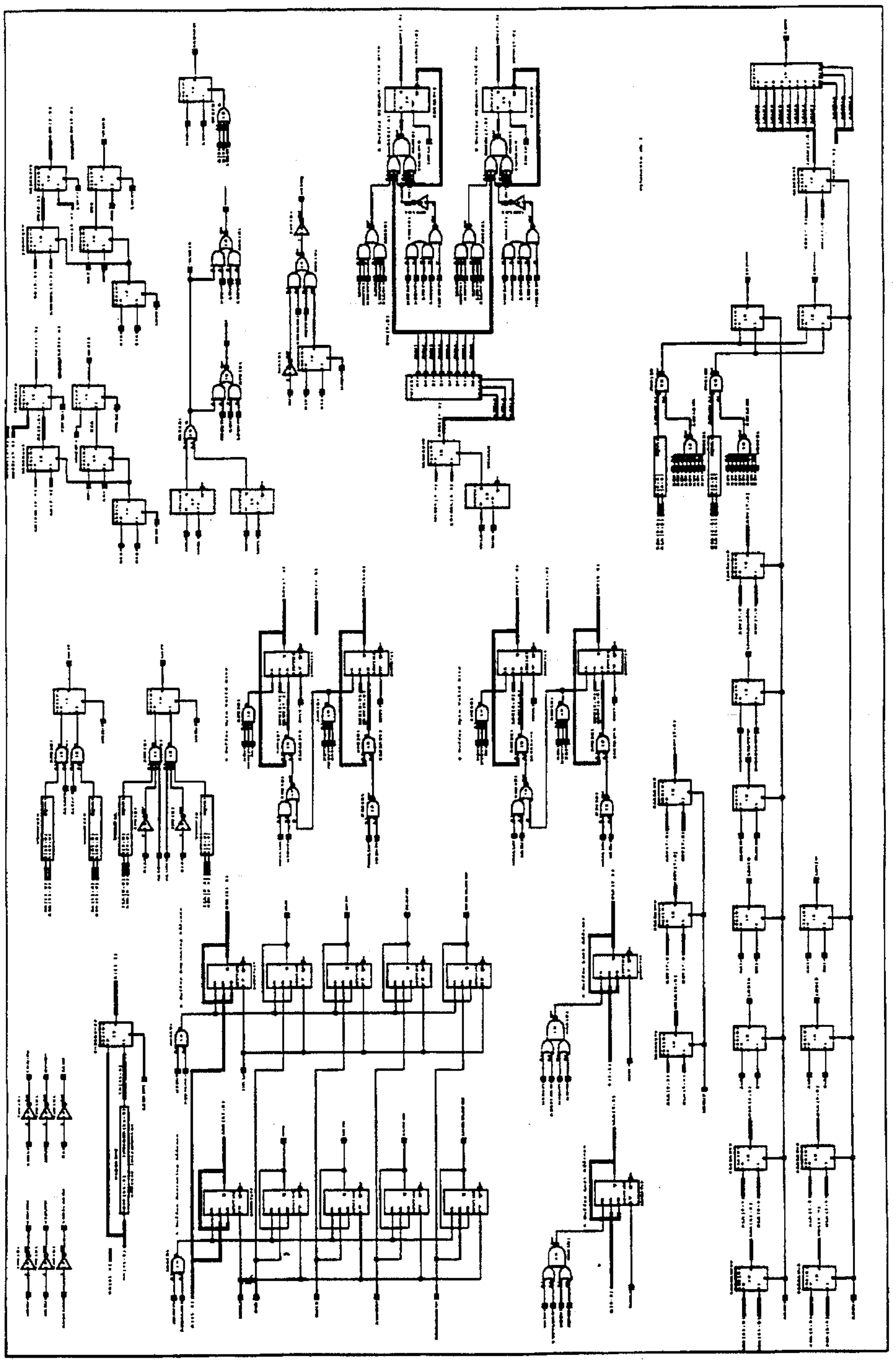

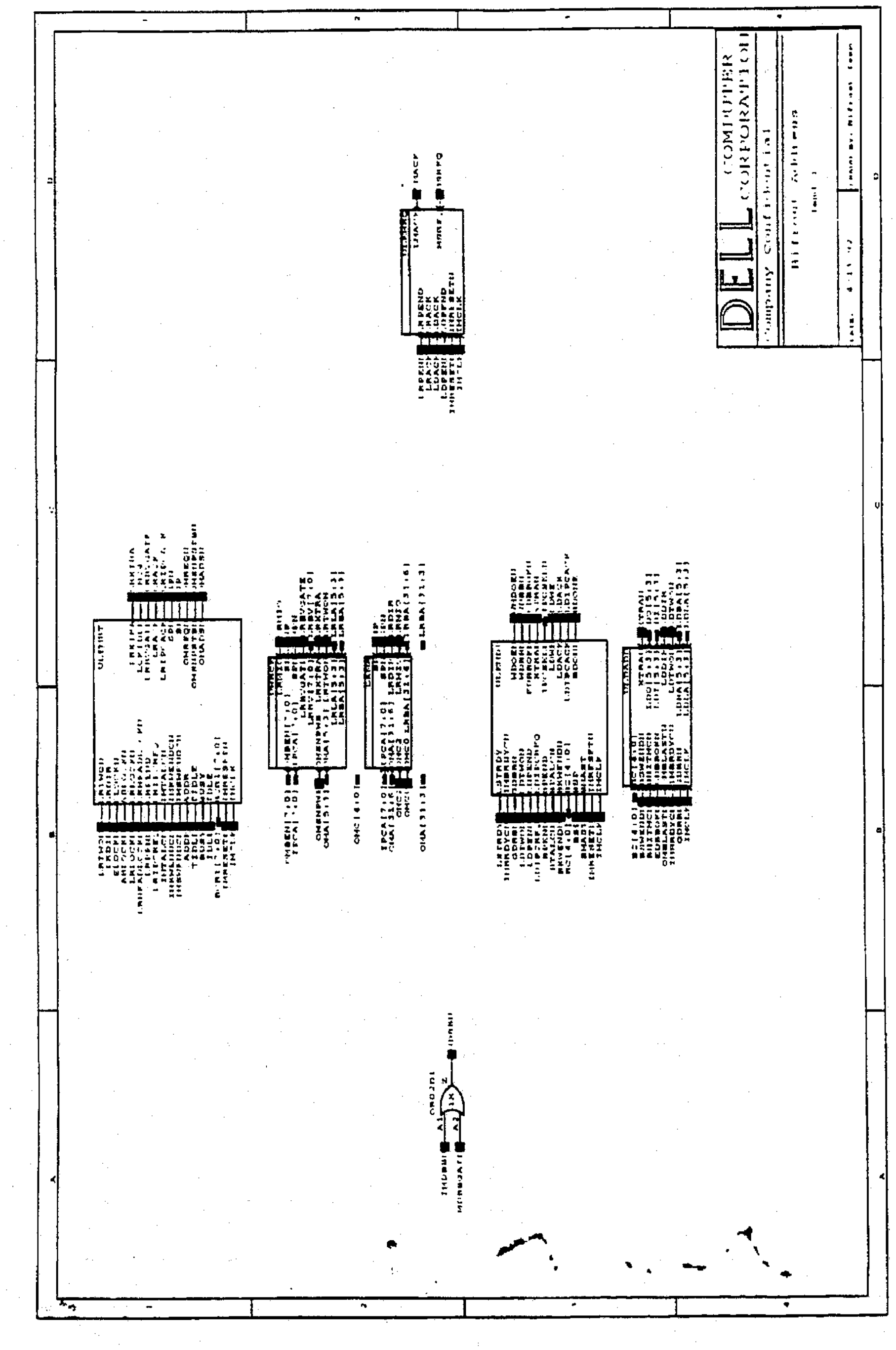
DELL
COMPUTER
CORPORATION
Company Confidential

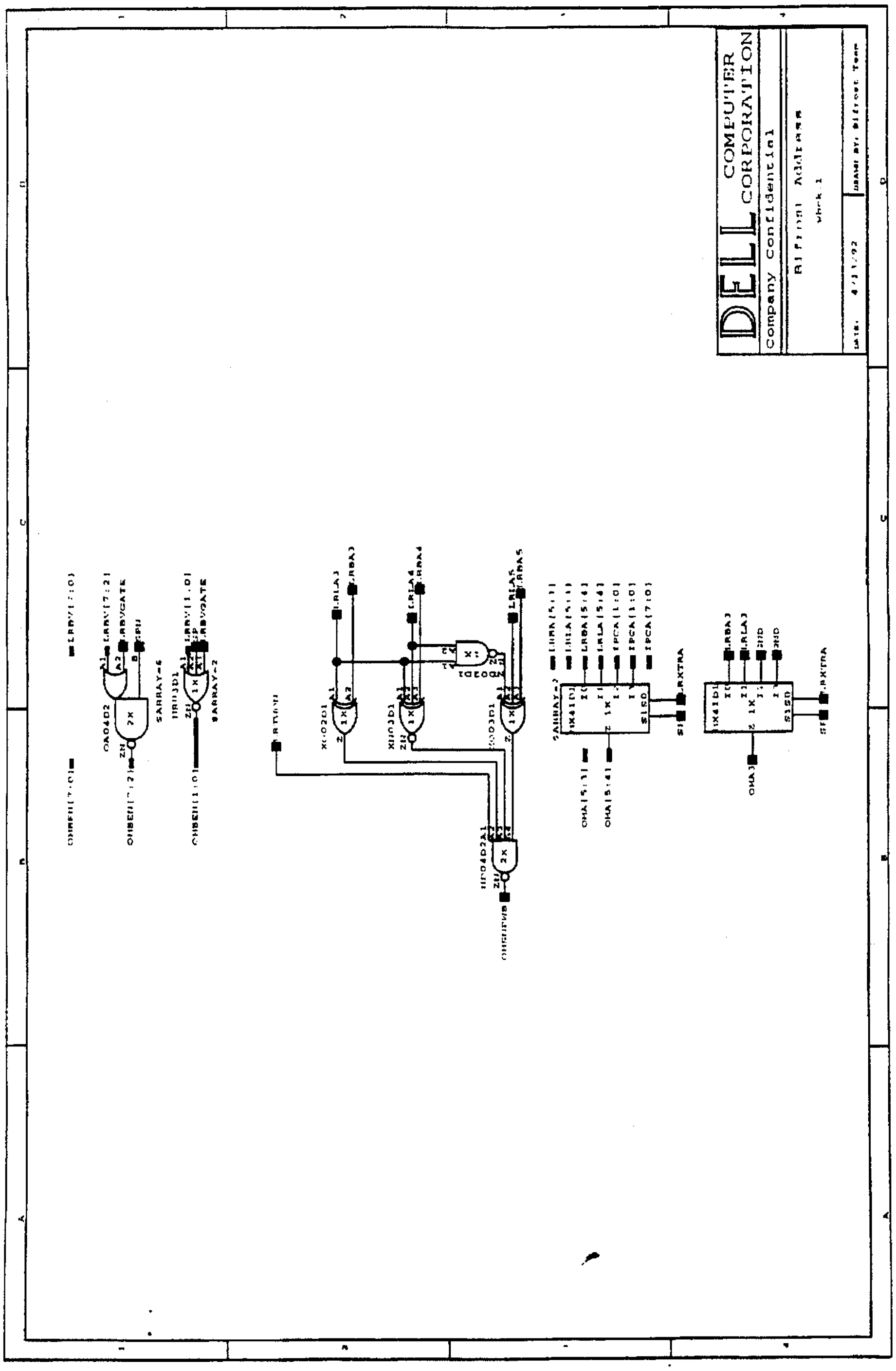
DELL COMPUTER CORPORATION
Company Confidential

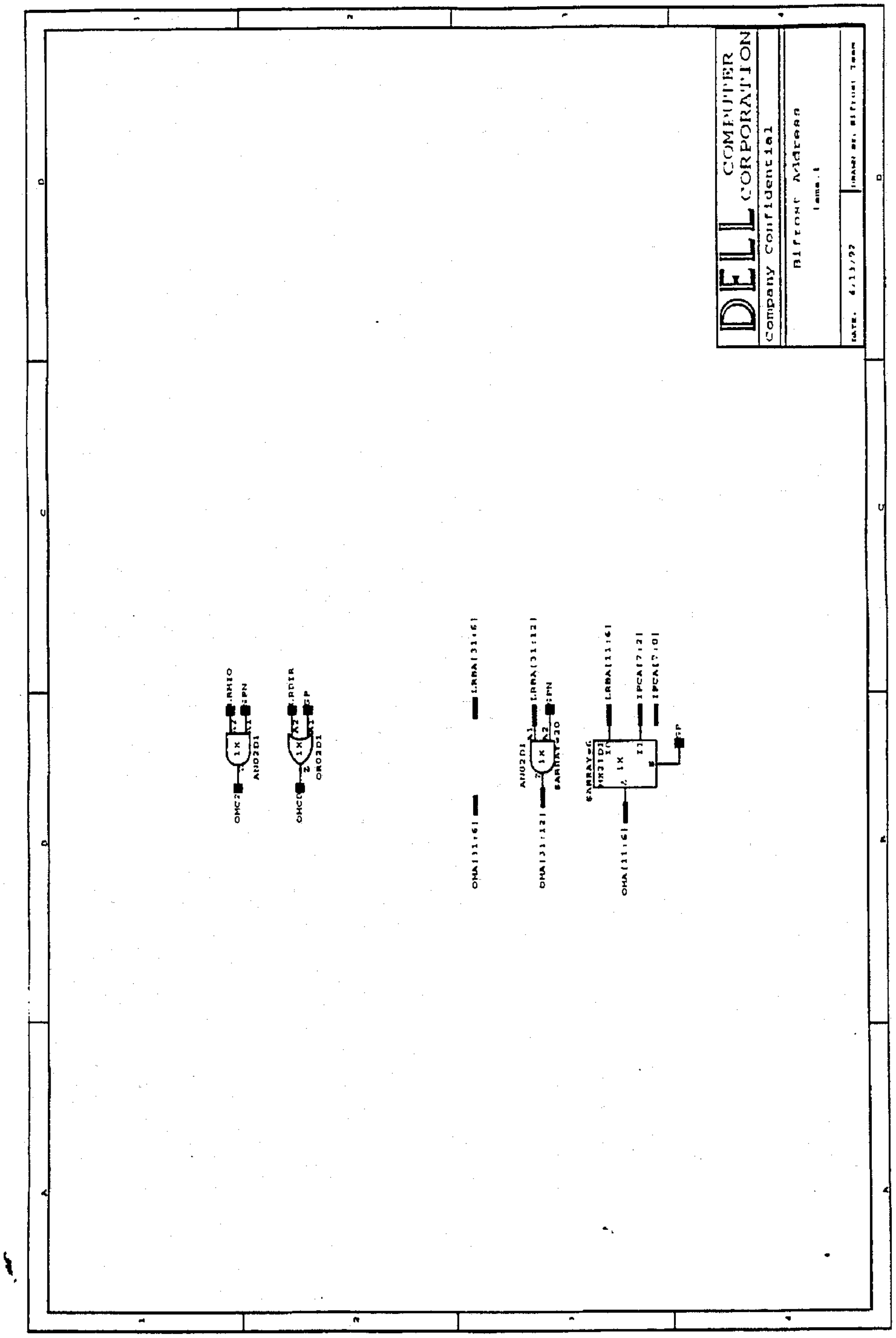
DELL
COMPUTER CORPORATION
Company Confidential

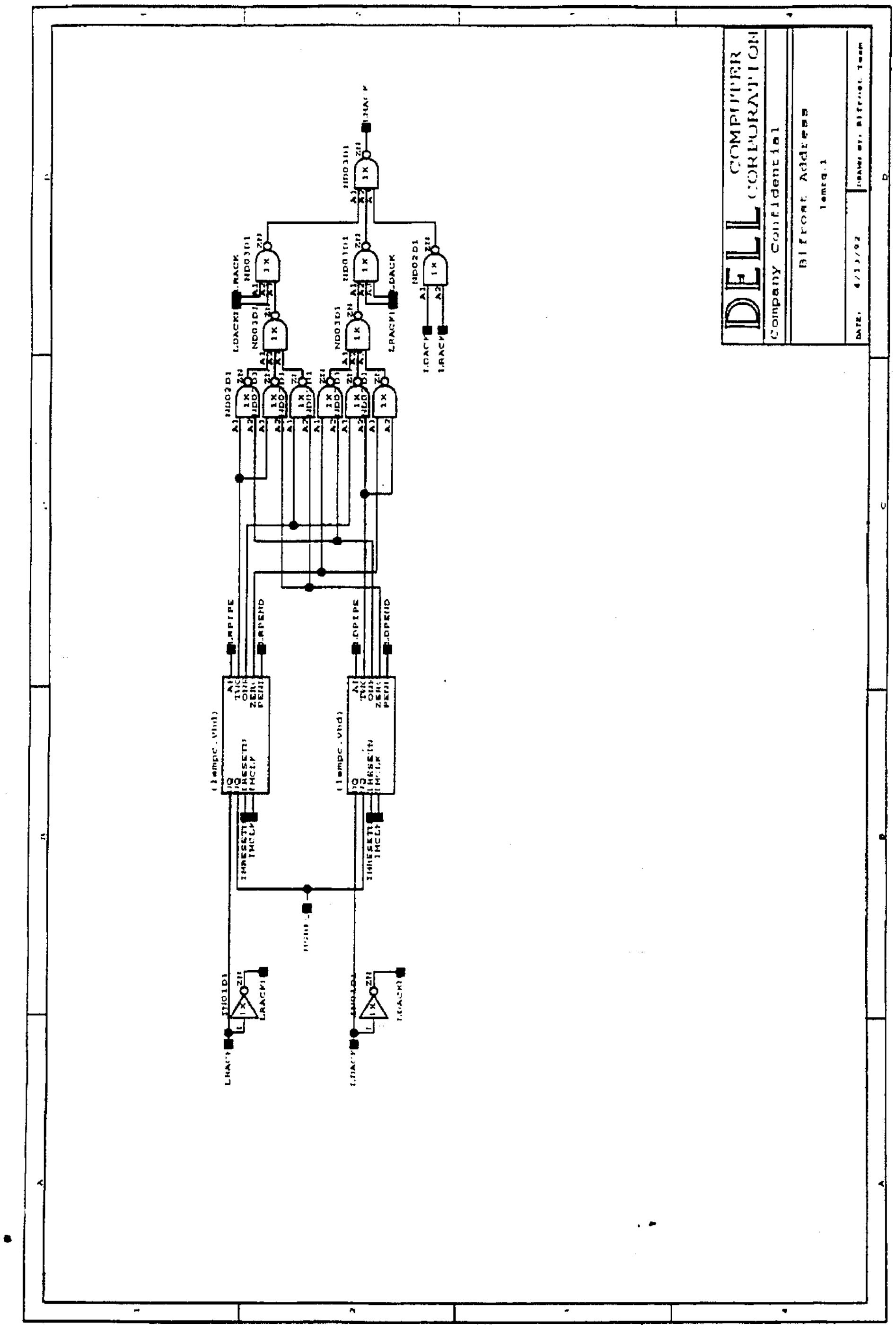
DELL
COMPUTER
CORPORATION
Company Confidential

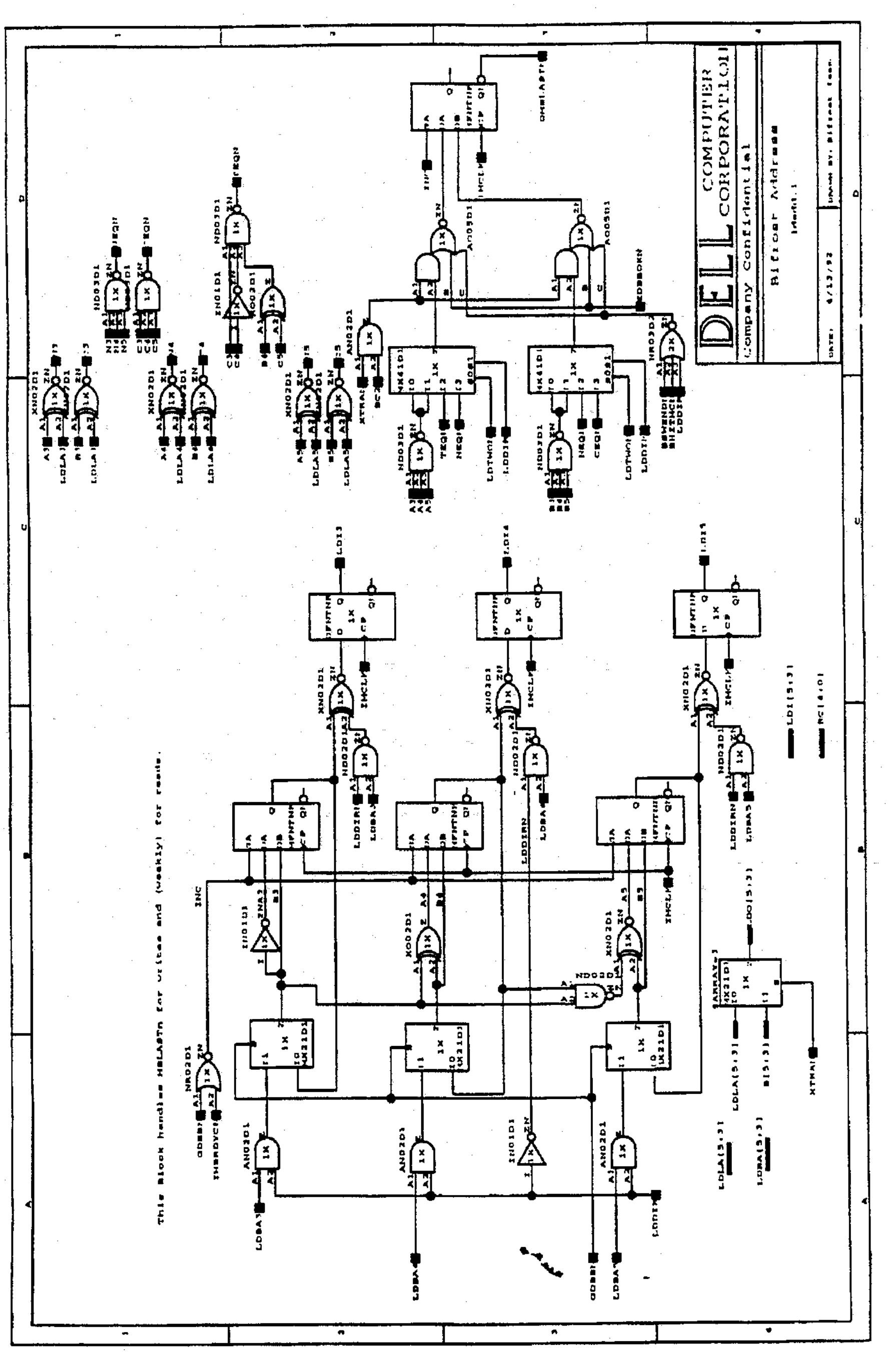
DELL
COMPUTER CORPORATION
Company Confidential

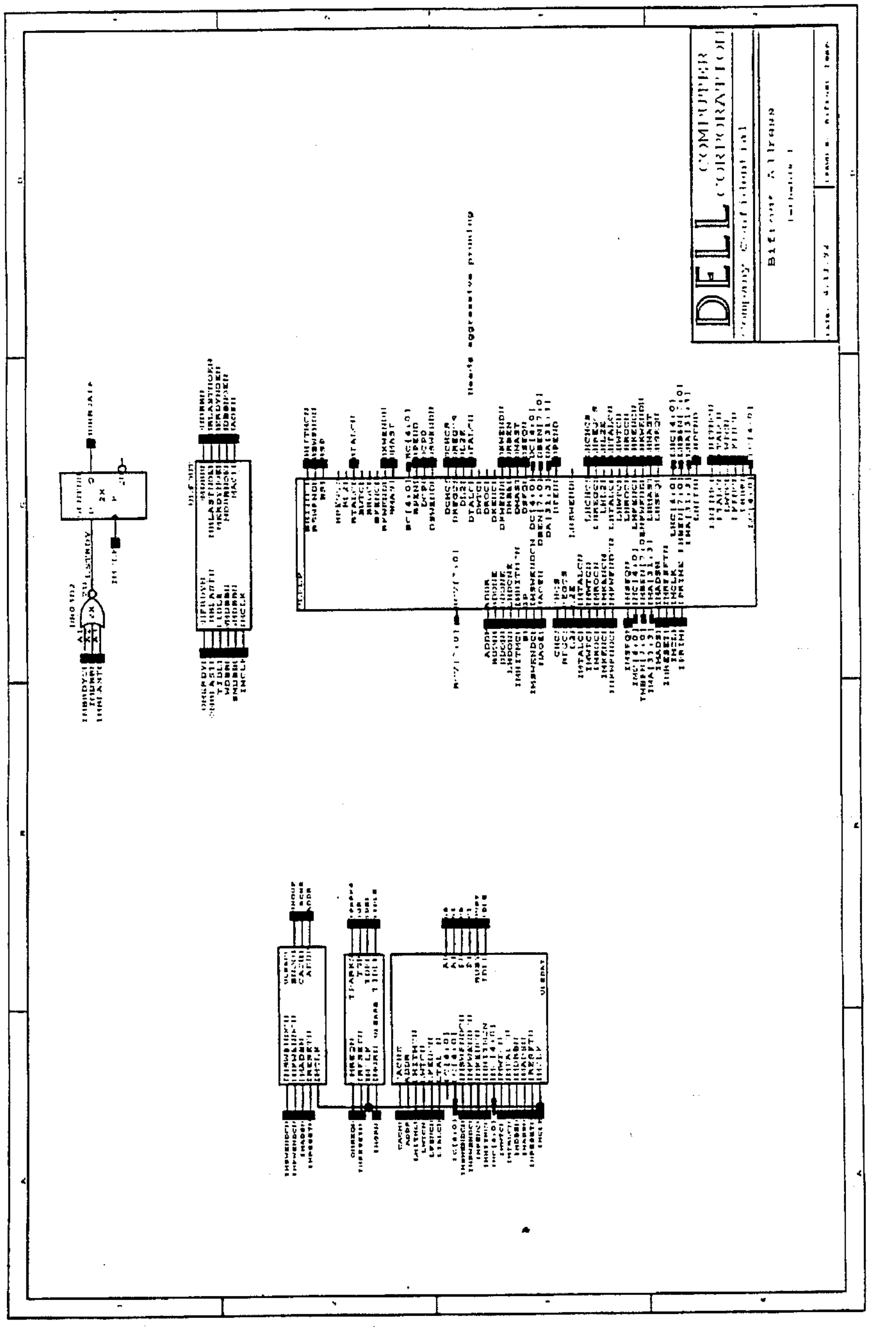
DELL COMPUTER CORPORATION
Company Confidential

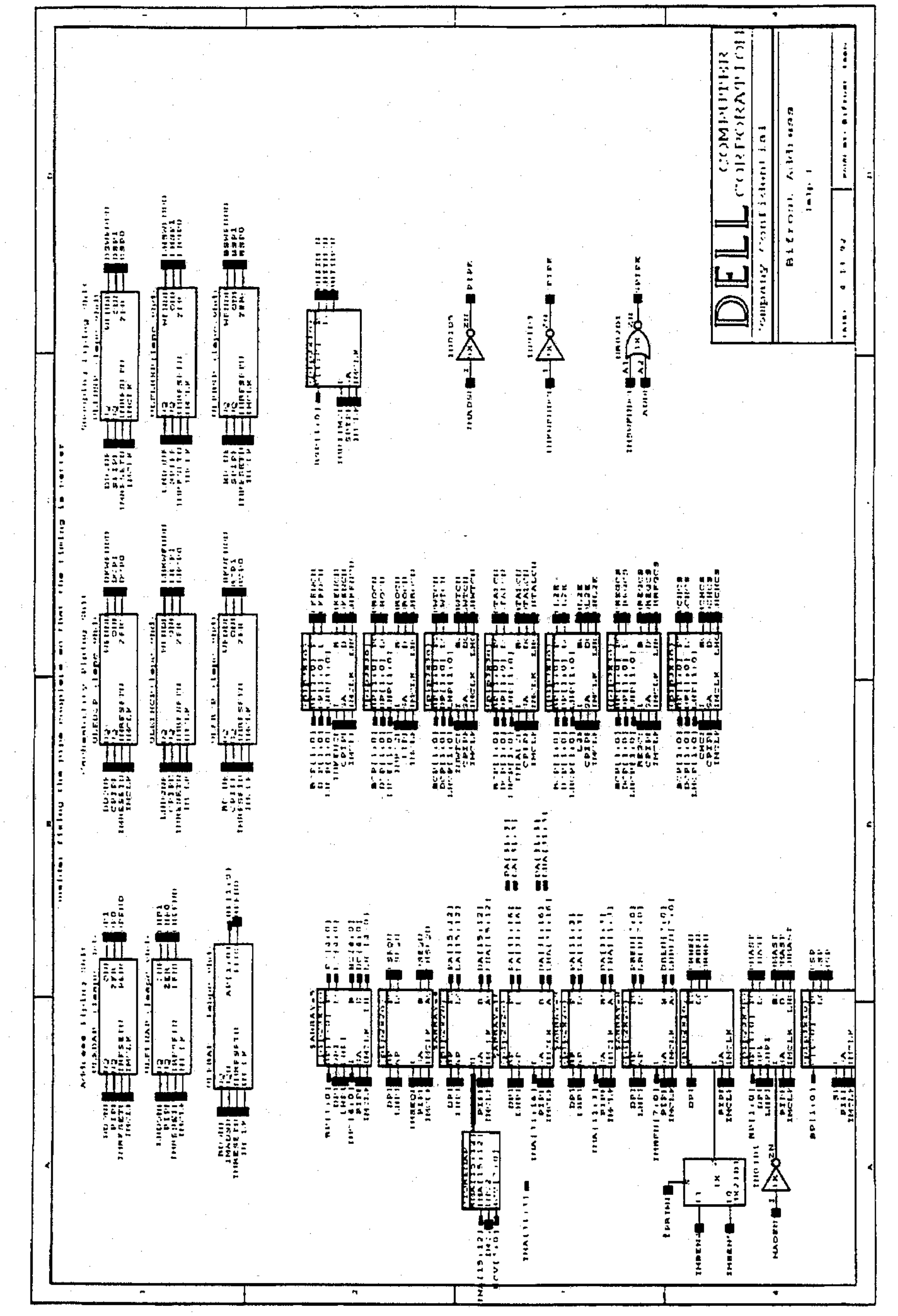
DELL COMPUTER CORPORATION

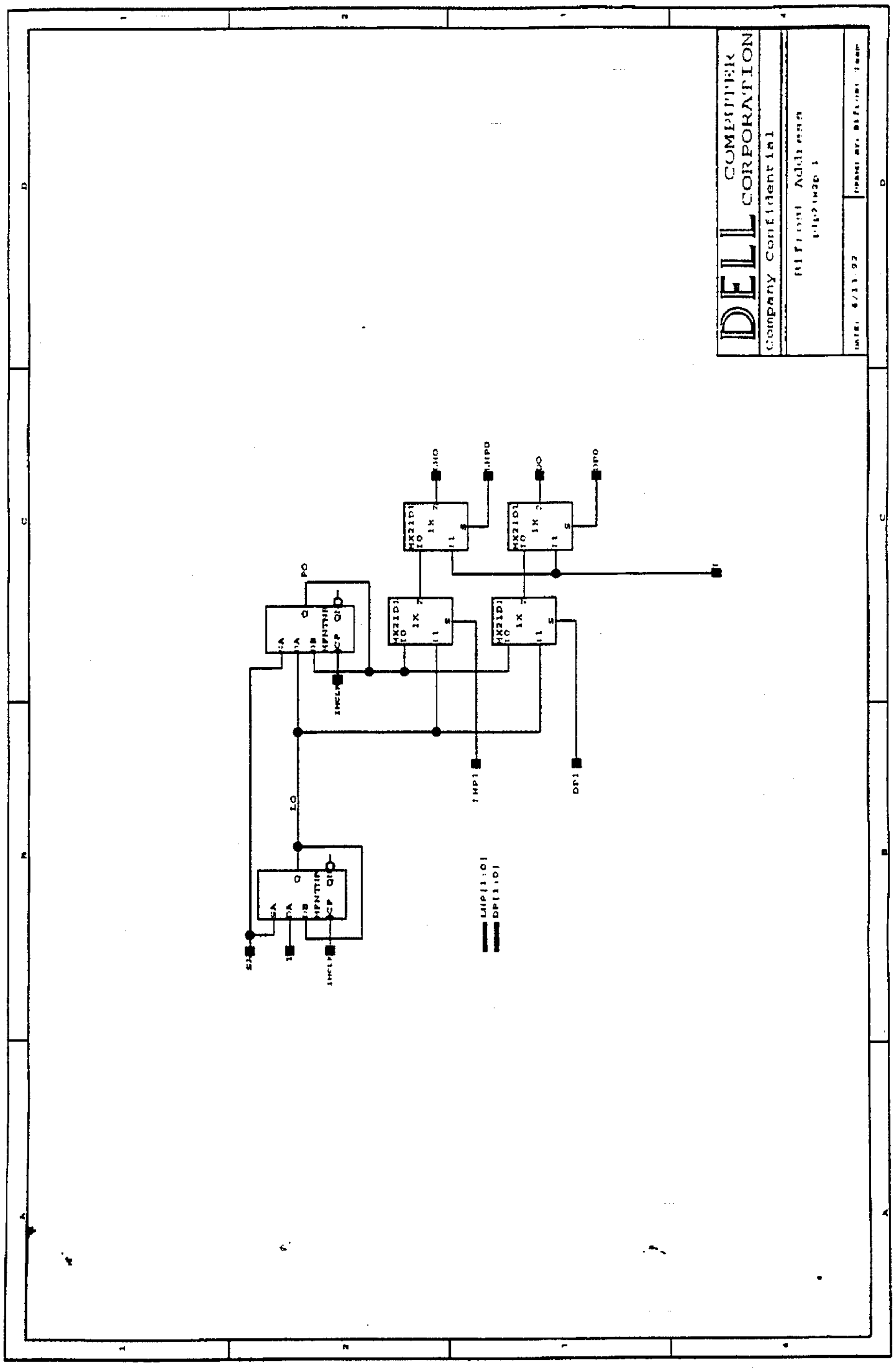
DELL
COMPUTER CORPORATION
Company Confidential

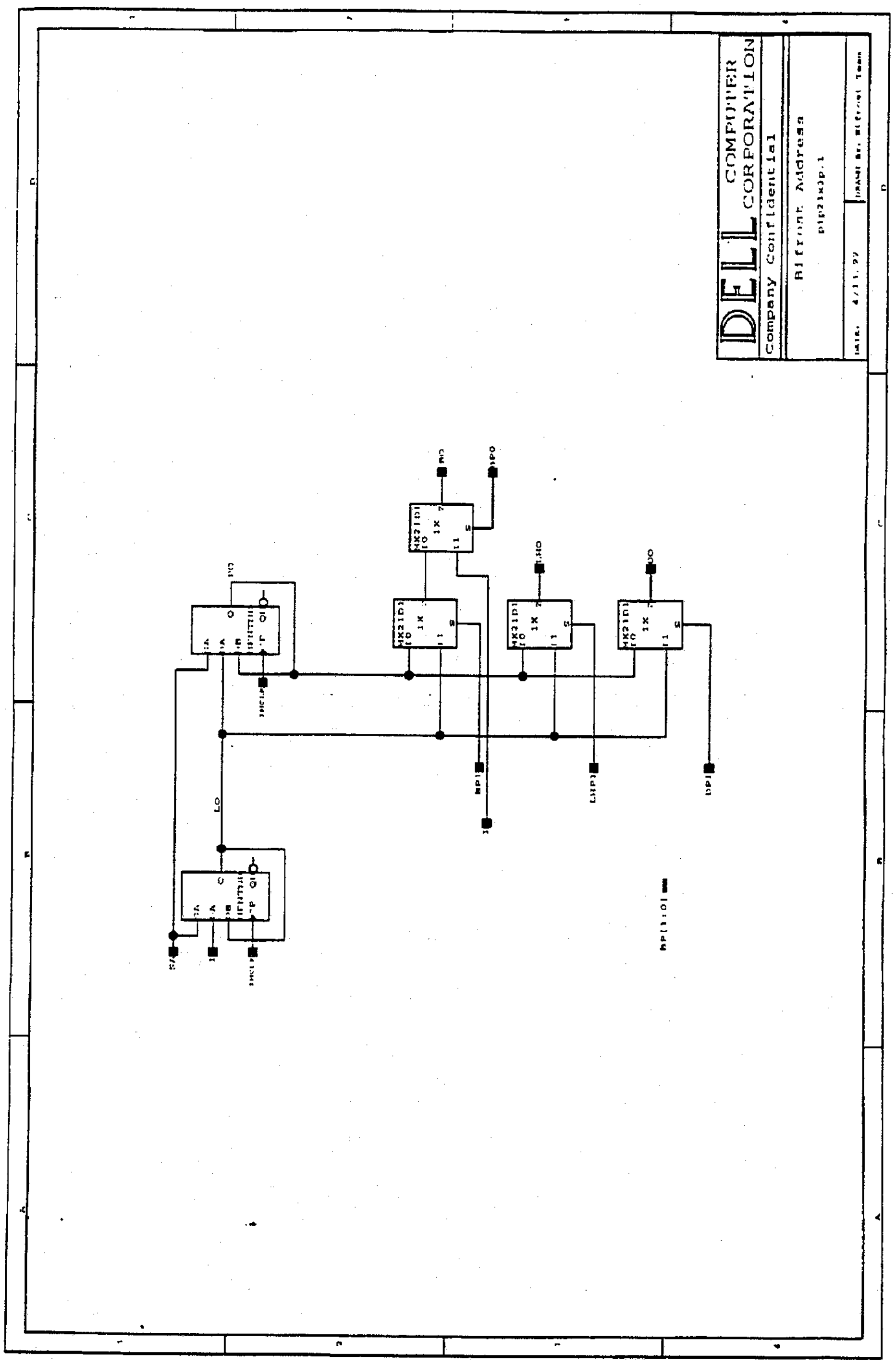
DELL
COMPUTER
CORPORATION
Company Confidential

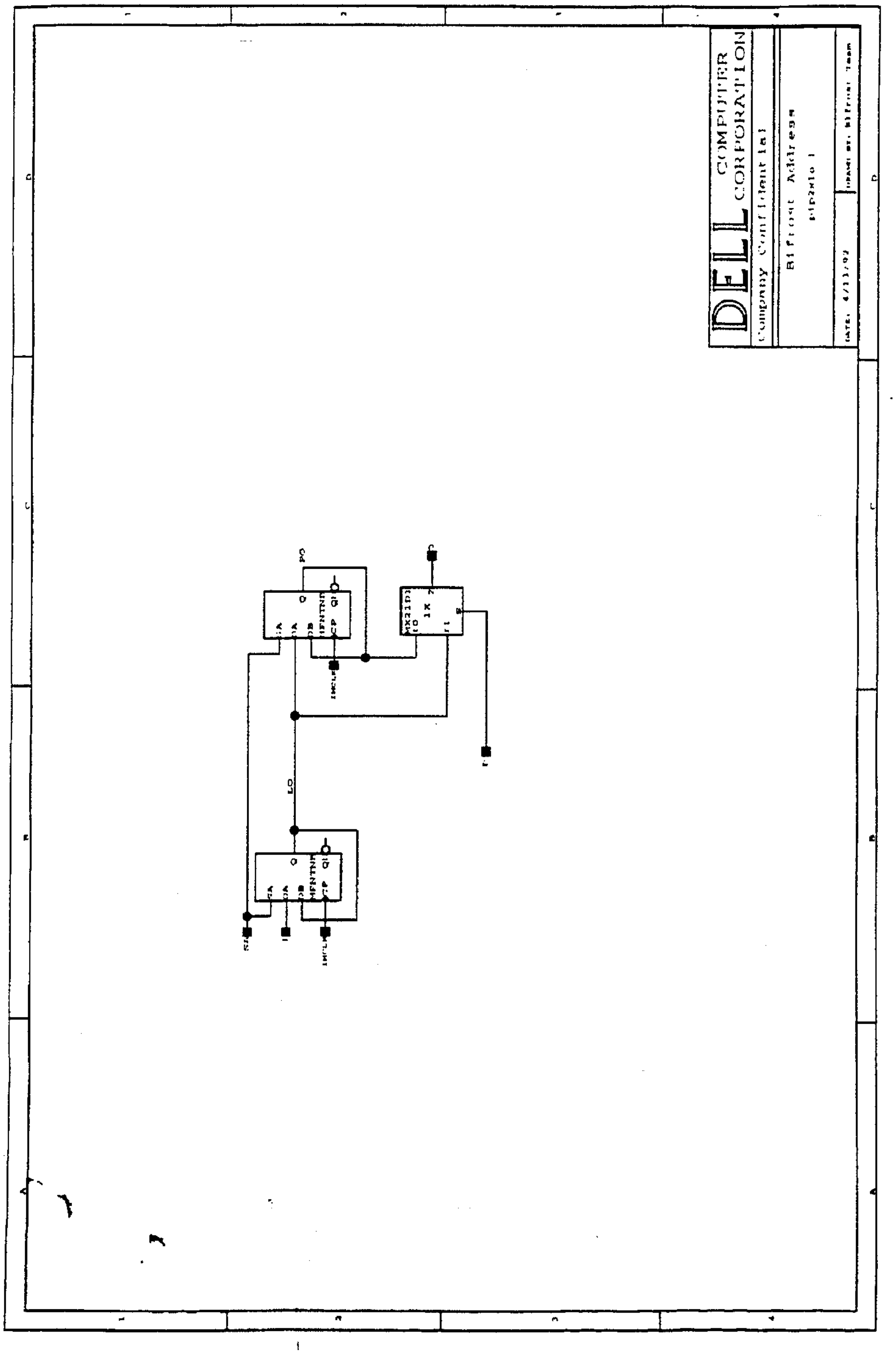
DELL
COMPUTER
CORPORATION
Company Confidential
Bifrost Address

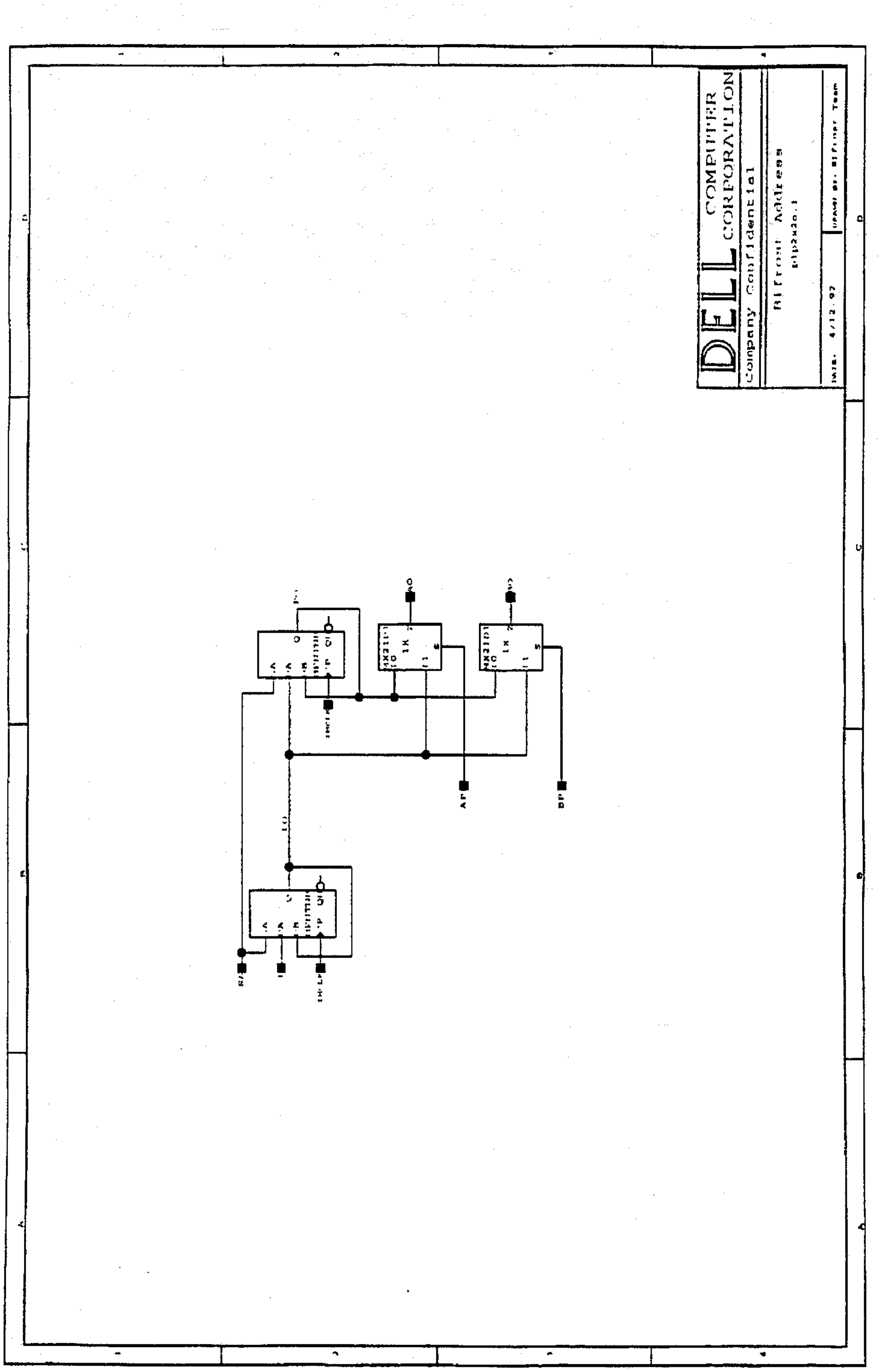
DELL COMPUTER CORPORATION
Company Confidential

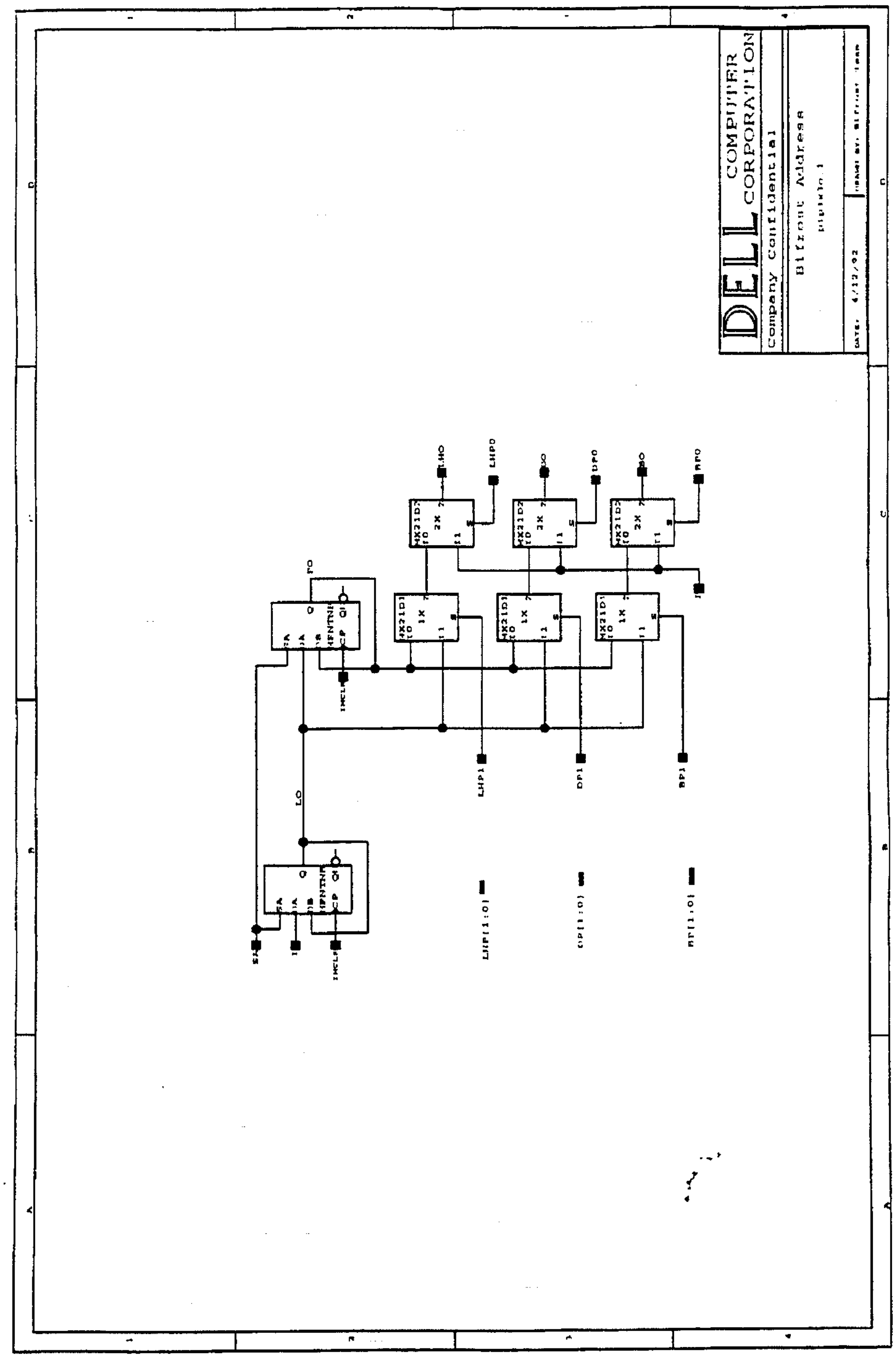
DELL
COMPUTER CORPORATION
Company Confidential

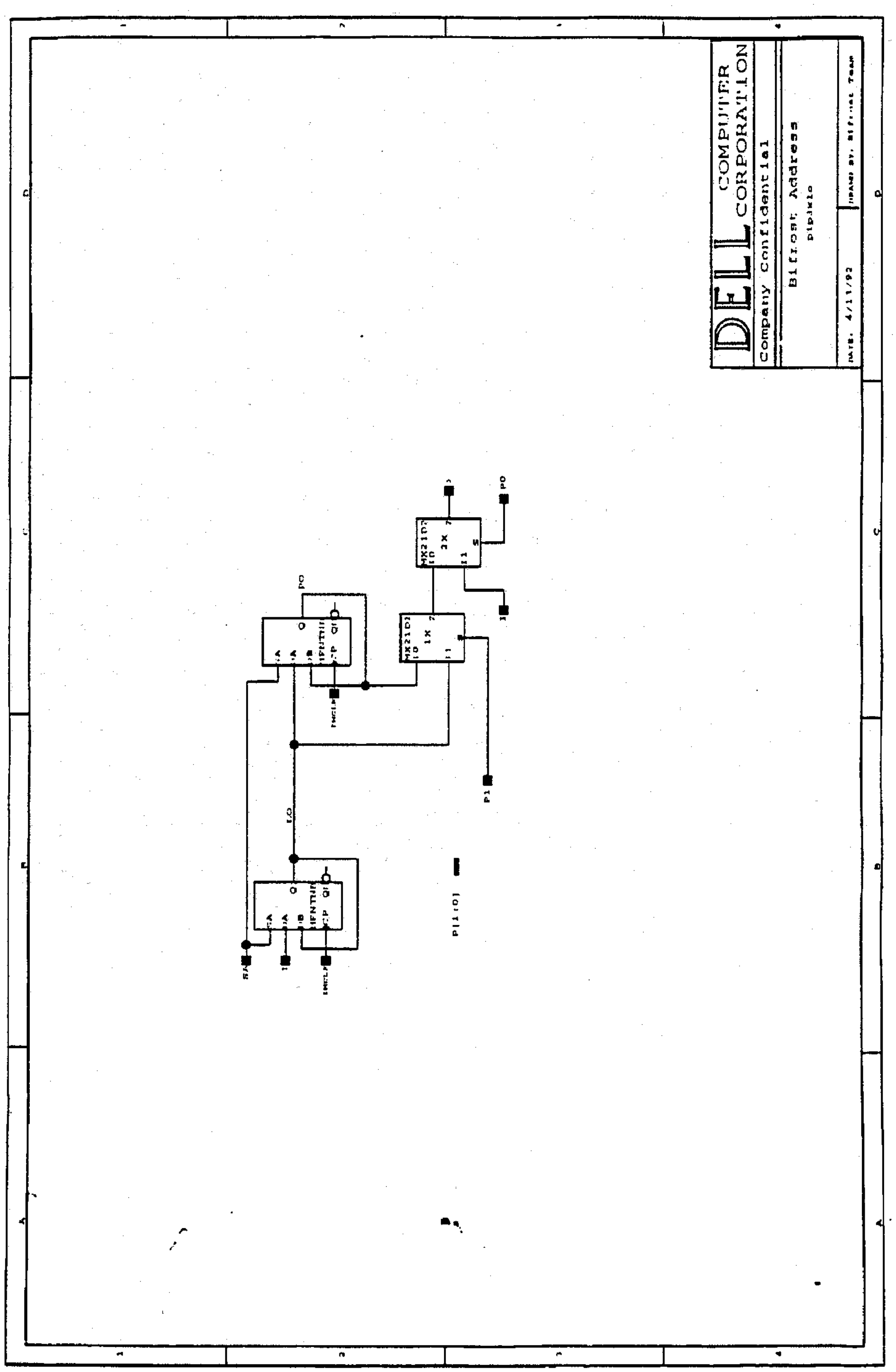
DELL
COMPUTER
CORPORATION
Company Confidential
Bifrost Address
DATE: 4/11/92

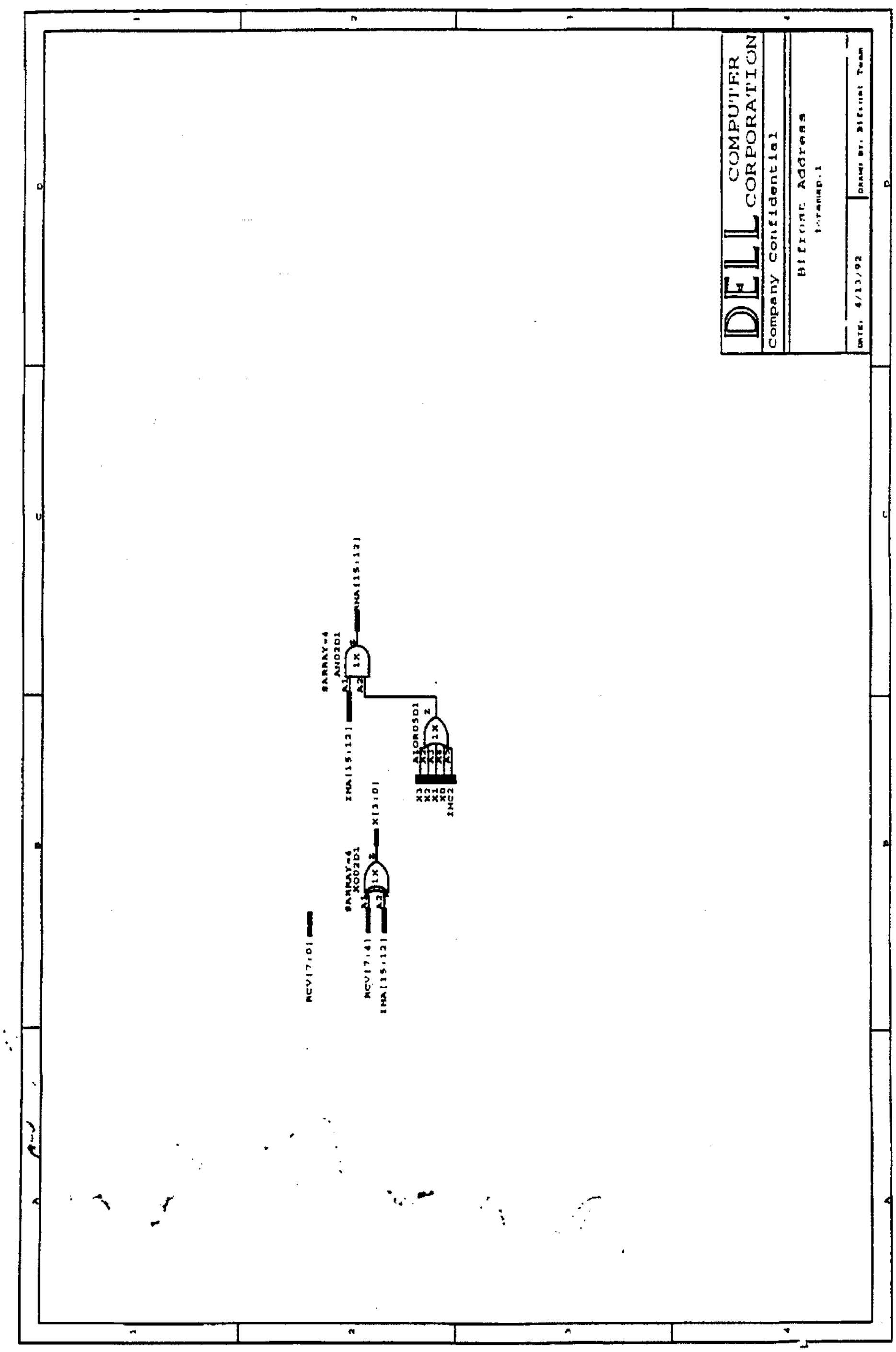
DELL COMPUTER CORPORATION
Company Confidential
Bifront Address
DATE: 4/13/92
DRAWN BY: Bifront Team
SARRAY=4
AND2D1
IMA[15:12]
XOD2D1
X[3:0]
RCV[7:0]
RCV[7:4]
INC2

What is claimed is:

1. A system for connecting a plurality of input/output (I/O) channels to a single system bus, which I/O channels compete for access to said single system bus, each of said I/O channels transferring data at an individual first rate, said single system bus transferring data at a second rate, each of said individual first rates being slower than said second rate, said system comprising:

a system controller coupled to said single system bus for establishing priority among said plurality of I/O channels competing for access to said single system bus and for allowing data signals therefrom to be transmitted to said single system bus; and a plurality of I/O channel bridges, each of said plurality of I/O channel bridge connected in circuit between said single system bus and an associated one of said plurality of I/O channels, each of said plurality of I/O channel bridges comprising structure for decoupling transfers of data on its associated I/O channel from said single system bus, which structure for decoupling comprises at least one cache buffer in which said transfers of data on said associated I/O channel are stored until said system controller allows said transfers of data from said associated I/O channel to proceed on said single system bus, wherein address and control information are also transferred; wherein each of said plurality of I/O channel bridges further comprises a buffer controller through which said address and control information pass between said plurality of I/O channels and said single system bus, and which buffer controller controls operation of said at least one cache buffer; wherein said at least one cache buffer is incorporated into at least one first application specific integrated circuit; wherein said buffer controller is incorporated into a second application specific integrated circuit; wherein said transfers of data comprise data bits carried on data signals; wherein said at least one first application specific integrated circuit comprises two first application specific integrated circuits, each of which is coupled to a first number of I/O channel data signals and to a second, larger, number of single system bus data signals; wherein each of said transfers of data stored within said cache buffers has an associated address; wherein said second application specific integrated circuit comprises buffer analogs for said cache buffers so that said associated addresses are represented within said second application specific integrated circuit in an ordered manner, which ensured address memory coherency; wherein said transfers of data, address and control information are transferred in cycles and further comprise interrupt communication cycles; and wherein said second application specifies integrated circuit further comprises structure for ensuring said interrupt communication cycles are ordered with respect to non-interrupt communication cycles.

2. A system for connecting a plurality of input/output (I/O) channels to a single system bus, which I/O channels compete for access to said single system bus, each of said I/O channels transferring data at an individual first rate, said single system bus transferring data at a second rate, each of said individual first rates being slower than said second rate, said system comprising:

a system controller coupled to said single system bus for establishing priority among said plurality of I/O channels competing for access to said single system bus and for allowing data signals therefrom to be transmitted to said single system bus; and a plurality of I/O channel bridges, each of said plurality of I/O channel bridge connected in circuit between said single system bus and an associated one of said plurality of I/O channels, each of said plurality of I/O channel bridges comprising structure for decoupling transfers of data on its associated I/O channel from said single system bus, which structure for decoupling comprises at least one cache buffer in which said transfers of data on said associated I/O channel are stored until said system controller allows said transfers of data from said associated I/O channel to proceed on said single system bus, wherein said transfers of data have associated transfers of address and control information; wherein each of said plurality of I/O channel bridges further comprises a buffer controller through which said address and control information pass between said plurality of I/O channels and said single system bus, and which buffer controller controls operation of said at least one cache buffer; wherein said at least one cache buffer is incorporated into at least one first application specific integrated circuit; wherein said buffer controller is incorporated into a second application specific integrated circuit; wherein said transfers of data comprise data bits carried on data signals; wherein said at least one first application specific integrated circuit comprises two first application specific integrated circuits, each of which is coupled to a first number of I/O channel data signals and to a second, larger, number of single system bus data signals; and wherein said at least one cache buffer comprises two cache buffers in each of said first application specific integrated circuits.

3. A computer system including a system bus, a plurality of input/output (I/O) channels connected to the system bus, and a processor system connected to the system bus, wherein the I/O channels compete for access to and communicate with the system bus, wherein the processor system includes a plurality of processors, each of which communicate with the system bus, and wherein the communications with the system bus comprises data and addresses, the computer system comprising:

a system controller, coupled to said system bus for establishing priority among said plurality of I/O channels competing for access to said system bus and for allowing data signals to be transmitted to said system bus from said I/O channels;

a plurality of I/O channel bridges, each of said plurality of I/O channel bridges connected between said system bus and an associated one of said plurality of I/O channels, wherein each of said plurality of I/O channel bridges decouples transfers of data on its associated I/O channel from said system bus;

a global address mapping system, connected to said system bus, for mapping said addresses to said plurality of I/O channels, comprising:

devices, partitioned among each of said plurality of I/O channels;

descriptors, allied with said partitioned devices, for designating which of said devices is associated with each of said plurality of I/O channels so that said addresses can be mapped to the appropriate one of said plurality of I/O channels wherein said devices comprise I/O devices having an I/O address space and wherein said descriptors further designate which portions of the I/O address space is associated with each of said plurality of I/O channels.

4. The computer system of claim 3, wherein one of said plurality of I/O channels is capable of generating an interrupt request, and wherein said I/O channel bridges further comprise:

a first circuit, coupled to one of said plurality of I/O channel bridges, for receiving said interrupt request for said associated one of said plurality of I/O channels;

a second circuit, coupled to said first circuit, for determining a processor-associated vector for said interrupt request; and a third circuit, coupled to said one of said plurality of I/O channel bridges, for packaging said processor-associated vector into an interprocessor communication message.

5. The computer system of claim 4 wherein said system controller further comprises:

receiving circuitry, coupled to said system controller, for receiving said interprocessor communication message from said one of said plurality of I/O channel bridges;

decoding circuitry, coupled to said receiving circuitry, for decoding said interprocessor communication message and obtaining said processor associated vector; and transmitting circuitry, coupled to said decoding circuitry and to said processor system for transmitting said processor-associated vector to said processor system.

6. The computer system of claim 5 wherein said transmitting circuitry transmits said processor-associated vector to an appropriate processor within said processor system.

7. A computer system including a system bus, a plurality of input/output (I/O) channels connected to the system bus, and a processor system connected to the system bus, wherein the I/O channels compete for access to and communicate with the system bus, wherein the processor system includes a plurality of processors, each of which communicate with the system bus, and wherein the communications with the system bus comprises data and addresses, the computer system comprising:

a system controller, coupled to said system bus for establishing priority among said plurality of I/O channels competing for access to said system bus and for allowing data signals to be transmitted to said system bus from said I/O channels;

a plurality of I/O channel bridges, each of said plurality of I/O channel bridges connected between said system bus and an associated one of said plurality of channels, wherein each of said plurality of I/O channel bridges decouples transfers of data on its associated I/O channel from said system bus;

a global address mapping system, connected to said system bus, for mapping said addresses to said plurality of I/O channels, comprising:

devices, partitioned among each of said plurality of I/O channels;

descriptors, allied with said partitioned devices, for designating which of said devices is associated with each of said plurality of I/O channels so that said addresses can be mapped to the appropriate one of said plurality of I/O channels;

wherein said devices comprise memory having an address space and wherein said descriptors further designate which portions of the memory address space is associated with each of said plurality of I/O channels.

* * * * *